US009240871B2

(12) United States Patent
Walton et al.

(10) Patent No.: US 9,240,871 B2
(45) Date of Patent: Jan. 19, 2016

(54) MIMO WLAN SYSTEM

(75) Inventors: J. Rodney Walton, Carlisle, MA (US); Mark S. Wallace, Bedford, MA (US); John W. Ketchum, Harvard, MA (US); Steven J. Howard, Ashland, MA (US)

(73) Assignee: Qualcomm Incorporated, San Diego, CA (US)

( * ) Notice: Subject to any disclaimer, the term of this patent is extended or adjusted under 35 U.S.C. 154(b) by 912 days.

(21) Appl. No.: 12/112,789

(22) Filed: Apr. 30, 2008

(65) Prior Publication Data

US 2008/0285669 A1 Nov. 20, 2008

Related U.S. Application Data

(62) Division of application No. 10/693,419, filed on Oct. 23, 2003.

(60) Provisional application No. 60/421,309, filed on Oct. 25, 2002.

(51) Int. Cl.
*H04B 7/06* (2006.01)
*H04B 7/08* (2006.01)
(Continued)

(52) U.S. Cl.
CPC .............. *H04L 5/0048* (2013.01); *H04B 7/022* (2013.01); *H04B 7/0421* (2013.01); *H04B 7/0669* (2013.01); *H04B 7/0689* (2013.01); *H04B 7/0697* (2013.01); *H04B 7/0854* (2013.01); *H04B 7/0871* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS 4,736,371 A 4/1988 Tejima et al.
4,750,198 A 6/1988 Harper
(Continued)

FOREIGN PATENT DOCUMENTS

AU 2002259221 11/2002
CA 2690245 A1 10/2001
(Continued)

OTHER PUBLICATIONS

Warner, W. et al.: "OFDM/FM Frame Synchronization for Mobile Radio Data Communication", IEEE Transactions on Vehicular Technology, vol. 42, No. 3, pp. 302-313.
(Continued)

*Primary Examiner* — Marcus R Smith
(74) *Attorney, Agent, or Firm* — S. Hossain Beladi

(57) ABSTRACT

A multiple-access MIMO WLAN system that employs MIMO, OFDM, and TDD. The system (1) uses a channel structure with a number of configurable transport channels, (2) supports multiple rates and transmission modes, which are configurable based on channel conditions and user terminal capabilities, (3) employs a pilot structure with several types of pilot (e.g., beacon, MIMO, steered reference, and carrier pilots) for different functions, (4) implements rate, timing, and power control loops for proper system operation, and (5) employs random access for system access by the user terminals, fast acknowledgment, and quick resource assignments. Calibration may be performed to account for differences in the frequency responses of transmit/receive chains at the access point and user terminals. The spatial processing may then be simplified by taking advantage of the reciprocal nature of the downlink and uplink and the calibration.

11 Claims, 23 Drawing Sheets

(51) Int. Cl.

| | | |
|---|---|---|
| *H04L 5/00* | (2006.01) | |
| *H04B 7/02* | (2006.01) | |
| *H04B 7/04* | (2006.01) | |
| *H04L 1/00* | (2006.01) | |
| *H04L 1/06* | (2006.01) | |
| *H04L 1/18* | (2006.01) | |
| *H04L 25/02* | (2006.01) | |
| *H04L 25/03* | (2006.01) | |
| *H04L 27/26* | (2006.01) | |
| *H04W 72/12* | (2009.01) | |
| *H04W 28/20* | (2009.01) | |
| *H04L 1/08* | (2006.01) | |
| *H04L 1/16* | (2006.01) | |
| *H04W 28/22* | (2009.01) | |
| *H04W 52/42* | (2009.01) | |
| *H04W 52/50* | (2009.01) | |
| *H04W 84/12* | (2009.01) | |

(52) U.S. Cl.
CPC ............ *H04L1/0017* (2013.01); *H04L 1/0025* (2013.01); *H04L 1/0059* (2013.01); *H04L 1/0069* (2013.01); *H04L 1/0071* (2013.01); *H04L 1/0606* (2013.01); *H04L 1/0625* (2013.01); *H04L 1/0656* (2013.01); *H04L 1/1887* (2013.01); *H04L 25/0204* (2013.01); *H04L 25/0248* (2013.01); *H04L 25/03343* (2013.01); *H04L 27/2602* (2013.01); *H04L 27/2647* (2013.01); *H04W 72/12* (2013.01); *H04B 7/043* (2013.01); *H04B 7/0443* (2013.01); *H04L 1/0061* (2013.01); *H04L 1/08* (2013.01); *H04L 1/16* (2013.01); *H04L 5/0023* (2013.01); *H04L 25/0226* (2013.01); *H04L 25/0228* (2013.01); *H04L 27/2607* (2013.01); *H04L 2025/03414* (2013.01); *H04L 2025/03426* (2013.01); *H04W 28/20* (2013.01); *H04W 28/22* (2013.01); *H04W 52/42* (2013.01); *H04W 52/50* (2013.01); *H04W 84/12* (2013.01)

(56) References Cited

U.S. PATENT DOCUMENTS

| | | |
|---|---|---|
| 4,797,879 A | 1/1989 | Habbab et al. |
| 5,239,677 A | 8/1993 | Jasinski |
| 5,241,544 A | 8/1993 | Jasper et al. |
| 5,295,159 A | 3/1994 | Kerpez |
| 5,404,355 A | 4/1995 | Raith |
| 5,422,733 A | 6/1995 | Merchant et al. |
| 5,471,647 A | 11/1995 | Gerlach et al. |
| 5,479,447 A | 12/1995 | Chow et al. |
| 5,491,837 A | 2/1996 | Haartsen |
| 5,493,712 A | 2/1996 | Ramesh et al. |
| 5,506,861 A | 4/1996 | Bottomley |
| 5,509,003 A | 4/1996 | Snijders et al. |
| 5,528,581 A | 6/1996 | De Bot |
| 5,606,729 A | 2/1997 | D"amico et al. |
| 5,638,369 A | 6/1997 | Ayerst et al. |
| 5,677,909 A | 10/1997 | Heide |
| 5,729,542 A | 3/1998 | Dupont |
| 5,790,550 A | 8/1998 | Peeters et al. |
| 5,799,005 A | 8/1998 | Soliman |
| 5,818,813 A | 10/1998 | Saito et al. |
| 5,822,374 A | 10/1998 | Levin |
| 5,832,387 A | 11/1998 | Bae et al. |
| 5,859,875 A | 1/1999 | Kato et al. |
| 5,867,478 A | 2/1999 | Baum et al. |
| 5,867,539 A | 2/1999 | Koslov |
| 5,883,887 A | 3/1999 | Take et al. |
| 5,886,988 A | 3/1999 | Yun et al. |
| 5,929,810 A | 7/1999 | Koutsoudis et al. |
| 5,959,965 A | 9/1999 | Ohkubo et al. |
| 5,963,589 A | 10/1999 | Nagano et al. |
| 5,973,638 A | 10/1999 | Robbins et al. |
| 5,982,327 A | 11/1999 | Vook et al. |
| 6,005,876 A | 12/1999 | Cimini, Jr. et al. |
| 6,011,963 A | 1/2000 | Ogoro |
| 6,049,548 A | 4/2000 | Bruno et al. |
| 6,067,290 A | 5/2000 | Paulraj et al. |
| 6,072,779 A | 6/2000 | Tzannes et al. |
| 6,084,915 A | 7/2000 | Williams |
| 6,097,771 A | 8/2000 | Foschini |
| 6,115,354 A | 9/2000 | Weck |
| 6,122,247 A | 9/2000 | Levin et al. |
| 6,131,016 A | 10/2000 | Greenstein et al. |
| 6,141,388 A | 10/2000 | Servais et al. |
| 6,141,542 A | 10/2000 | Kotzin et al. |
| 6,141,555 A | 10/2000 | Sato |
| 6,141,567 A | 10/2000 | Youssefmir et al. |
| 6,144,711 A | 11/2000 | Raleigh et al. |
| 6,154,661 A | 11/2000 | Goldburg |
| 6,163,296 A | 12/2000 | Lier et al. |
| 6,167,031 A | 12/2000 | Olofsson et al. |
| 6,175,588 B1 | 1/2001 | Visotsky et al. |
| 6,178,196 B1 | 1/2001 | Naguib et al. |
| 6,192,256 B1 | 2/2001 | Whinnett |
| 6,205,410 B1 | 3/2001 | Cai |
| 6,222,888 B1 | 4/2001 | Kao et al. |
| 6,232,918 B1 | 5/2001 | Wax et al. |
| 6,266,528 B1 | 7/2001 | Farzaneh |
| 6,272,354 B1 | 8/2001 | Saario |
| 6,275,543 B1 | 8/2001 | Petrus et al. |
| 6,278,726 B1 | 8/2001 | Mesecher et al. |
| 6,292,917 B1 | 9/2001 | Sinha et al. |
| 6,298,035 B1 | 10/2001 | Heiskala |
| 6,298,092 B1 | 10/2001 | Heath et al. |
| 6,308,080 B1 | 10/2001 | Burt et al. |
| 6,310,704 B1 | 10/2001 | Dogan et al. |
| 6,314,113 B1 | 11/2001 | Guemas |
| 6,314,289 B1 | 11/2001 | Eberlein et al. |
| 6,317,467 B1 | 11/2001 | Cox et al. |
| 6,317,612 B1 | 11/2001 | Farsakh |
| 6,330,277 B1 | 12/2001 | Gelblum et al. |
| 6,330,293 B1 | 12/2001 | Klank et al. |
| 6,330,462 B1 | 12/2001 | Chen |
| 6,333,953 B1 | 12/2001 | Bottomley et al. |
| 6,339,399 B1 | 1/2002 | Andersson et al. |
| 6,345,036 B1 | 2/2002 | Sudo et al. |
| 6,346,910 B1 | 2/2002 | Ito |
| 6,347,217 B1 | 2/2002 | Bengtsson et al. |
| 6,347,234 B1 | 2/2002 | Scherzer |
| 6,351,499 B1 | 2/2002 | Paulraj et al. |
| 6,363,267 B1 | 3/2002 | Lindskog et al. |
| 6,369,758 B1 | 4/2002 | Zhang |
| 6,377,812 B1 | 4/2002 | Rashid-Farrokhi et al. |
| 6,385,264 B1 | 5/2002 | Terasawa et al. |
| 6,389,056 B1 | 5/2002 | Kanterakis et al. |
| 6,426,971 B1 | 7/2002 | Wu et al. |
| 6,452,981 B1 | 9/2002 | Raleigh et al. |
| 6,463,290 B1 | 10/2002 | Stilp et al. |
| 6,473,467 B1 | 10/2002 | Wallace et al. |
| 6,478,422 B1 | 11/2002 | Hansen |
| 6,492,942 B1 | 12/2002 | Kezys |
| 6,510,184 B1 | 1/2003 | Okamura |
| 6,512,737 B1 | 1/2003 | Agee |
| 6,515,617 B1 | 2/2003 | Demers et al. |
| 6,532,225 B1 | 3/2003 | Chang et al. |
| 6,532,562 B1 | 3/2003 | Chou et al. |
| 6,545,997 B1 | 4/2003 | Bohnke et al. |
| 6,574,211 B2 | 6/2003 | Padovani et al. |
| 6,574,267 B1 | 6/2003 | Kanterakis et al. |
| 6,574,271 B2 | 6/2003 | Mesecher et al. |
| 6,590,883 B1 | 7/2003 | Kitade et al. |
| 6,594,473 B1 | 7/2003 | Dabak et al. |
| 6,594,798 B1 | 7/2003 | Chou et al. |
| 6,597,682 B1 | 7/2003 | Kari |
| 6,608,874 B1 | 8/2003 | Beidas et al. |
| 6,611,231 B2 | 8/2003 | Crilly, Jr. et al. |
| 6,631,121 B1 | 10/2003 | Yoon |
| 6,636,496 B1 | 10/2003 | Cho et al. |
| 6,636,568 B2 | 10/2003 | Kadous |

(56) References Cited

U.S. PATENT DOCUMENTS

| | | | |
|---|---|---|---|
| 6,654,590 | B2 | 11/2003 | Boros et al. |
| 6,654,613 | B1 | 11/2003 | Maeng et al. |
| 6,668,161 | B2 | 12/2003 | Boros et al. |
| 6,683,916 | B1 | 1/2004 | Sartori et al. |
| 6,690,660 | B2 | 2/2004 | Kim et al. |
| 6,693,992 | B2 | 2/2004 | Jones et al. |
| 6,694,155 | B1 | 2/2004 | Chin et al. |
| 6,697,346 | B1 | 2/2004 | Halton et al. |
| 6,711,121 | B1 | 3/2004 | Gerakoulis et al. |
| 6,721,267 | B2 | 4/2004 | Hiben et al. |
| 6,728,233 | B1 | 4/2004 | Park et al. |
| 6,731,668 | B2 | 5/2004 | Ketchum |
| 6,735,188 | B1 | 5/2004 | Becker et al. |
| 6,738,020 | B1 | 5/2004 | Lindskog et al. |
| 6,744,811 | B1 | 6/2004 | Kantschuk |
| 6,751,187 | B2 | 6/2004 | Walton et al. |
| 6,751,444 | B1 | 6/2004 | Meiyappan |
| 6,751,480 | B2 | 6/2004 | Kogiantis et al. |
| 6,757,263 | B1 | 6/2004 | Olds |
| 6,760,313 | B1 | 7/2004 | Sindhushayana et al. |
| 6,760,388 | B2 | 7/2004 | Ketchum et al. |
| 6,760,882 | B1 | 7/2004 | Gesbert et al. |
| 6,763,244 | B2 | 7/2004 | Chen et al. |
| 6,768,727 | B1 | 7/2004 | Sourour et al. |
| 6,771,706 | B2 | 8/2004 | Ling et al. |
| 6,785,341 | B2 | 8/2004 | Walton et al. |
| 6,785,513 | B1 | 8/2004 | Sivaprakasam |
| 6,788,948 | B2 | 9/2004 | Lindskog et al. |
| 6,792,041 | B1 | 9/2004 | Kim et al. |
| 6,795,424 | B1 | 9/2004 | Kapoor et al. |
| 6,798,738 | B1 | 9/2004 | Do et al. |
| 6,801,790 | B2 | 10/2004 | Rudrapatna |
| 6,802,035 | B2 | 10/2004 | Catreux et al. |
| 6,804,191 | B2 | 10/2004 | Richardson |
| 6,821,535 | B2 | 11/2004 | Nurmi et al. |
| 6,842,460 | B1 | 1/2005 | Olkkonen et al. |
| 6,847,828 | B2 | 1/2005 | Miyoshi et al. |
| 6,850,252 | B1 | 2/2005 | Hoffberg |
| 6,850,498 | B2 | 2/2005 | Heath et al. |
| 6,859,503 | B2 | 2/2005 | Pautler et al. |
| 6,862,271 | B2 | 3/2005 | Medvedev et al. |
| 6,862,440 | B2 | 3/2005 | Sampath |
| 6,868,079 | B1 | 3/2005 | Hunt |
| 6,873,651 | B2 | 3/2005 | Tesfai et al. |
| 6,879,578 | B2 | 4/2005 | Pan et al. |
| 6,879,579 | B1 | 4/2005 | Myles et al. |
| 6,882,868 | B1 | 4/2005 | Shattil |
| 6,885,708 | B2 | 4/2005 | Thomas et al. |
| 6,888,809 | B1 | 5/2005 | Foschini et al. |
| 6,888,899 | B2 | 5/2005 | Raleigh et al. |
| 6,891,858 | B1 | 5/2005 | Mahesh et al. |
| 6,920,192 | B1 | 7/2005 | Laroia et al. |
| 6,920,194 | B2 | 7/2005 | Stopler et al. |
| 6,927,728 | B2 | 8/2005 | Vook et al. |
| 6,937,592 | B1 | 8/2005 | Heath, Jr. et al. |
| 6,940,917 | B2 | 9/2005 | Menon et al. |
| 6,950,632 | B1 | 9/2005 | Yun et al. |
| 6,952,426 | B2 | 10/2005 | Wu et al. |
| 6,952,454 | B1 | 10/2005 | Jalali et al. |
| 6,956,813 | B2 | 10/2005 | Fukuda |
| 6,956,897 | B1 | 10/2005 | Honig |
| 6,956,906 | B2 | 10/2005 | Tager et al. |
| 6,959,171 | B2 | 10/2005 | Tsien et al. |
| 6,963,741 | B2 | 11/2005 | Johansson et al. |
| 6,963,742 | B2 | 11/2005 | Boros et al. |
| 6,965,762 | B2 | 11/2005 | Sugar et al. |
| 6,970,722 | B1 | 11/2005 | Lewis |
| 6,980,601 | B2 | 12/2005 | Jones |
| 6,980,800 | B2 | 12/2005 | Noerpel et al. |
| 6,985,434 | B2 | 1/2006 | Wu et al. |
| 6,985,534 | B1 | 1/2006 | Meister |
| 6,987,819 | B2 | 1/2006 | Thomas et al. |
| 6,990,059 | B1 | 1/2006 | Anikhindi et al. |
| 6,992,972 | B2 | 1/2006 | Van Nee |
| 6,996,380 | B2 | 2/2006 | Dent |
| 7,002,900 | B2 | 2/2006 | Walton et al. |
| 7,003,044 | B2 | 2/2006 | Subramanian et al. |
| 7,006,464 | B1 | 2/2006 | Gopalakrishnan et al. |
| 7,006,483 | B2 | 2/2006 | Nelson, Jr. et al. |
| 7,006,848 | B2 | 2/2006 | Ling et al. |
| 7,009,931 | B2 | 3/2006 | Ma et al. |
| 7,012,978 | B2 | 3/2006 | Talwar |
| 7,020,110 | B2 | 3/2006 | Walton et al. |
| 7,020,482 | B2 | 3/2006 | Medvedev et al. |
| 7,020,490 | B2 | 3/2006 | Khatri |
| 7,023,826 | B2 | 4/2006 | Sjoberg et al. |
| 7,024,163 | B1 | 4/2006 | Barratt et al. |
| 7,031,671 | B2 | 4/2006 | Mottier |
| 7,035,359 | B2 | 4/2006 | Molnar et al. |
| 7,039,125 | B2 | 5/2006 | Friedman |
| 7,039,363 | B1 | 5/2006 | Kasapi et al. |
| 7,042,858 | B1 | 5/2006 | Ma et al. |
| 7,043,259 | B1 | 5/2006 | Trott |
| 7,054,378 | B2 | 5/2006 | Walton et al. |
| 7,058,367 | B1 | 6/2006 | Luo et al. |
| 7,062,294 | B1 | 6/2006 | Rogard et al. |
| 7,068,628 | B2 | 6/2006 | Li et al. |
| 7,072,381 | B2 | 7/2006 | Atarashi et al. |
| 7,072,410 | B1 | 7/2006 | Monsen |
| 7,072,413 | B2 | 7/2006 | Walton et al. |
| 7,088,671 | B1 | 8/2006 | Monsen |
| 7,095,709 | B2 | 8/2006 | Walton et al. |
| 7,095,722 | B1 | 8/2006 | Walke et al. |
| 7,099,377 | B2 | 8/2006 | Berens et al. |
| 7,103,325 | B1 | 9/2006 | Jia |
| 7,110,378 | B2 | 9/2006 | Onggosanusi et al. |
| 7,110,463 | B2 | 9/2006 | Wallace et al. |
| 7,113,499 | B2 | 9/2006 | Nafie et al. |
| 7,116,652 | B2 | 10/2006 | Lozano |
| 7,120,199 | B2 * | 10/2006 | Thielecke et al. ............ 375/267 |
| 7,120,657 | B2 | 10/2006 | Ricks et al. |
| 7,127,009 | B2 | 10/2006 | Berthet et al. |
| 7,130,362 | B2 | 10/2006 | Girardeau et al. |
| 7,133,459 | B2 | 11/2006 | Onggosanusi et al. |
| 7,137,047 | B2 | 11/2006 | Mitlin et al. |
| 7,149,190 | B1 | 12/2006 | Li et al. |
| 7,149,239 | B2 | 12/2006 | Hudson |
| 7,149,254 | B2 | 12/2006 | Sampath |
| 7,155,171 | B2 | 12/2006 | Ebert et al. |
| 7,158,563 | B2 | 1/2007 | Ginis et al. |
| 7,164,649 | B2 | 1/2007 | Walton et al. |
| 7,164,669 | B2 | 1/2007 | Li et al. |
| 7,184,713 | B2 | 2/2007 | Kadous et al. |
| 7,187,646 | B2 | 3/2007 | Schramm |
| 7,190,749 | B2 | 3/2007 | Levin et al. |
| 7,191,381 | B2 | 3/2007 | Gesbert et al. |
| 7,194,237 | B2 | 3/2007 | Sugar et al. |
| 7,197,084 | B2 | 3/2007 | Ketchum et al. |
| 7,200,404 | B2 | 4/2007 | Panasik et al. |
| 7,206,354 | B2 | 4/2007 | Wallace et al. |
| 7,218,684 | B2 | 5/2007 | Bolourchi et al. |
| 7,221,956 | B2 | 5/2007 | Medvedev et al. |
| 7,224,704 | B2 | 5/2007 | Lu et al. |
| 7,231,184 | B2 | 6/2007 | Eilts et al. |
| 7,233,625 | B2 | 6/2007 | Ma et al. |
| 7,238,508 | B2 | 7/2007 | Lin et al. |
| 7,242,727 | B2 | 7/2007 | Liu et al. |
| 7,248,638 | B1 | 7/2007 | Banister |
| 7,248,841 | B2 * | 7/2007 | Agee et al. .................... 455/101 |
| 7,254,171 | B2 | 8/2007 | Hudson |
| 7,260,153 | B2 | 8/2007 | Nissani (Nissensohn) |
| 7,260,366 | B2 | 8/2007 | Lee et al. |
| 7,263,119 | B1 | 8/2007 | Hsu et al. |
| 7,269,127 | B2 | 9/2007 | Mody et al. |
| 7,272,162 | B2 | 9/2007 | Sano et al. |
| 7,274,734 | B2 | 9/2007 | Tsatsanis |
| 7,277,679 | B2 | 10/2007 | Barratt et al. |
| 7,280,467 | B2 | 10/2007 | Smee et al. |
| 7,280,625 | B2 | 10/2007 | Ketchum et al. |
| 7,283,508 | B2 | 10/2007 | Choi et al. |
| 7,283,581 | B2 | 10/2007 | Itoh |
| 7,289,570 | B2 | 10/2007 | Schmidl et al. |
| 7,292,854 | B2 | 11/2007 | Das et al. |
| 7,298,778 | B2 | 11/2007 | Visoz et al. |

(56) References Cited

U.S. PATENT DOCUMENTS

| | | |
|---|---|---|
| 7,308,035 B2 | 12/2007 | Rouquette et al. |
| 7,310,304 B2 | 12/2007 | Mody et al. |
| 7,317,750 B2 | 1/2008 | Shattil |
| 7,324,429 B2 | 1/2008 | Walton et al. |
| 7,327,800 B2 | 2/2008 | Oprea et al. |
| 7,333,556 B2 | 2/2008 | Maltsev et al. |
| 7,342,912 B1 | 3/2008 | Kerr et al. |
| 7,356,004 B2 | 4/2008 | Yano et al. |
| 7,356,089 B2 | 4/2008 | Jia et al. |
| 7,379,492 B2 | 5/2008 | Hwang |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 | 11/2008 | Lee et al. |
| 7,466,749 B2 | 12/2008 | Medvedev et al. |
| 7,480,278 B2 | 1/2009 | Pedersen et al. |
| 7,492,737 B1 | 2/2009 | Fong et al. |
| 7,508,748 B2 | 3/2009 | Kadous |
| 7,548,506 B2 | 6/2009 | Ma et al. |
| 7,551,546 B2 | 6/2009 | Ma et al. |
| 7,551,580 B2 | 6/2009 | Du Crest et al. |
| 7,573,805 B2 | 8/2009 | Zhuang et al. |
| 7,599,443 B2 | 10/2009 | Ionescu et al. |
| 7,603,141 B2 | 10/2009 | Dravida |
| 7,606,296 B1 | 10/2009 | Hsu et al. |
| 7,606,319 B2 | 10/2009 | Zhang et al. |
| 7,636,573 B2 | 12/2009 | Walton et al. |
| 7,646,747 B2 | 1/2010 | Atarashi et al. |
| 7,653,142 B2 | 1/2010 | Ketchum et al. |
| 7,653,415 B2 | 1/2010 | Van Rooyen |
| 7,656,967 B2 | 2/2010 | Tiirola et al. |
| 7,778,337 B2 | 8/2010 | Tong et al. |
| 7,787,514 B2 | 8/2010 | Shattil et al. |
| 7,822,140 B2 | 10/2010 | Catreux et al. |
| 7,843,972 B2 | 11/2010 | Nakahara et al. |
| 8,145,179 B2 | 3/2012 | Walton et al. |
| 8,170,513 B2 | 5/2012 | Walton et al. |
| 8,213,292 B2 | 7/2012 | Ma et al. |
| 8,254,246 B2 | 8/2012 | Ma et al. |
| 8,260,210 B2 | 9/2012 | Esteve et al. |
| 8,325,836 B2 | 12/2012 | Tong et al. |
| 8,358,714 B2 | 1/2013 | Walton et al. |
| 8,406,118 B2 | 3/2013 | Ma et al. |
| 8,711,763 B2 | 4/2014 | Walton et al. |
| 8,750,151 B2 | 6/2014 | Wallace et al. |
| 8,855,226 B2 | 10/2014 | Medvedev et al. |
| 8,873,365 B2 | 10/2014 | Walton et al. |
| 8,934,329 B2 | 1/2015 | Walton et al. |
| 9,013,974 B2 | 4/2015 | Walton et al. |
| 9,048,892 B2 | 6/2015 | Walton et al. |
| 2001/0017881 A1 | 8/2001 | Bhatoolaul et al. |
| 2001/0031621 A1 | 10/2001 | Schmutz et al. |
| 2001/0033623 A1 | 10/2001 | Hosur |
| 2001/0046205 A1 | 11/2001 | Easton et al. |
| 2002/0003774 A1 | 1/2002 | Wang et al. |
| 2002/0004920 A1 | 1/2002 | Cho et al. |
| 2002/0018310 A1 | 2/2002 | Hung |
| 2002/0018453 A1 | 2/2002 | Yu et al. |
| 2002/0027951 A1 | 3/2002 | Gormley et al. |
| 2002/0034263 A1* | 3/2002 | Schmidl et al. ............... 375/299 |
| 2002/0041632 A1 | 4/2002 | Sato et al. |
| 2002/0044591 A1 | 4/2002 | Lee et al. |
| 2002/0044610 A1 | 4/2002 | Jones |
| 2002/0057659 A1 | 5/2002 | Ozluturk et al. |
| 2002/0062472 A1 | 5/2002 | Medlock et al. |
| 2002/0064214 A1 | 5/2002 | Hattori et al. |
| 2002/0071445 A1 | 6/2002 | Wu et al. |
| 2002/0075830 A1 | 6/2002 | Hartman, Jr. |
| 2002/0085620 A1 | 7/2002 | Mesecher |
| 2002/0085641 A1 | 7/2002 | Baum |
| 2002/0098872 A1 | 7/2002 | Judson |
| 2002/0105928 A1 | 8/2002 | Kapoor et al. |
| 2002/0115467 A1 | 8/2002 | Hamabe |
| 2002/0115473 A1 | 8/2002 | Hwang et al. |
| 2002/0122381 A1 | 9/2002 | Wu et al. |
| 2002/0122393 A1 | 9/2002 | Caldwell et al. |
| 2002/0126803 A1 | 9/2002 | Jones et al. |
| 2002/0132600 A1 | 9/2002 | Rudrapatna et al. |
| 2002/0136271 A1 | 9/2002 | Hiramatsu et al. |
| 2002/0147032 A1 | 10/2002 | Yoon et al. |
| 2002/0150182 A1 | 10/2002 | Dogan et al. |
| 2002/0154705 A1 | 10/2002 | Walton et al. |
| 2002/0163879 A1 | 11/2002 | Li et al. |
| 2002/0177447 A1 | 11/2002 | Walton et al. |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 | 12/2002 | Onggosanusi et al. |
| 2003/0002450 A1 | 1/2003 | Jalali et al. |
| 2003/0003863 A1 | 1/2003 | Thielecke et al. |
| 2003/0007463 A1 | 1/2003 | Li et al. |
| 2003/0012308 A1 | 1/2003 | Sampath et al. |
| 2003/0039217 A1 | 2/2003 | Seo et al. |
| 2003/0039317 A1 | 2/2003 | Taylor et al. |
| 2003/0043887 A1 | 3/2003 | Hudson et al. |
| 2003/0045288 A1 | 3/2003 | Luschi et al. |
| 2003/0045318 A1 | 3/2003 | Subrahmanya |
| 2003/0048856 A1 | 3/2003 | Ketchum et al. |
| 2003/0050069 A1 | 3/2003 | Kogiantis et al. |
| 2003/0060173 A1 | 3/2003 | Lee et al. |
| 2003/0072395 A1 | 4/2003 | Jia et al. |
| 2003/0073409 A1 | 4/2003 | Nobukiyo et al. |
| 2003/0076797 A1 | 4/2003 | Lozano et al, |
| 2003/0076812 A1 | 4/2003 | Benedittis |
| 2003/0078024 A1 | 4/2003 | Magee et al. |
| 2003/0086514 A1 | 5/2003 | Ginis et al. |
| 2003/0092456 A1 | 5/2003 | Dent et al. |
| 2003/0095197 A1 | 5/2003 | Wheeler et al. |
| 2003/0099306 A1 | 5/2003 | Nilsson et al. |
| 2003/0103584 A1 | 6/2003 | Bjerke et al. |
| 2003/0112745 A1 | 6/2003 | Zhuang et al. |
| 2003/0117989 A1 | 6/2003 | Kim |
| 2003/0119452 A1 | 6/2003 | Kim et al. |
| 2003/0123381 A1 | 7/2003 | Zhuang et al. |
| 2003/0123389 A1 | 7/2003 | Russell |
| 2003/0125040 A1 | 7/2003 | Walton et al. |
| 2003/0128656 A1 | 7/2003 | Scarpa |
| 2003/0128658 A1 | 7/2003 | Walton et al. |
| 2003/0139194 A1 | 7/2003 | Onggosanusi et al. |
| 2003/0142732 A1 | 7/2003 | Moshavi et al. |
| 2003/0147371 A1 | 8/2003 | Choi et al. |
| 2003/0153320 A1 | 8/2003 | Noerpel et al. |
| 2003/0153345 A1 | 8/2003 | Cramer et al. |
| 2003/0153360 A1 | 8/2003 | Burke et al. |
| 2003/0157953 A1 | 8/2003 | Das et al. |
| 2003/0157954 A1 | 8/2003 | Medvedev et al. |
| 2003/0161282 A1 | 8/2003 | Medvedev et al. |
| 2003/0162519 A1 | 8/2003 | Smith et al. |
| 2003/0165189 A1 | 9/2003 | Kadous et al. |
| 2003/0174676 A1 | 9/2003 | Willenegger et al. |
| 2003/0174686 A1 | 9/2003 | Willenegger et al. |
| 2003/0185311 A1 | 10/2003 | Kim |
| 2003/0186650 A1 | 10/2003 | Liu |
| 2003/0190897 A1 | 10/2003 | Lei et al. |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0210668 A1 | 11/2003 | Malladi et al. |
| 2003/0235147 A1 | 12/2003 | Walton et al. |
| 2003/0235149 A1 | 12/2003 | Chan et al. |
| 2003/0235255 A1 | 12/2003 | Ketchum et al. |
| 2004/0005887 A1 | 1/2004 | Bahrenburg et al. |
| 2004/0013103 A1 | 1/2004 | Zhang et al. |
| 2004/0017785 A1 | 1/2004 | Zelst |
| 2004/0037257 A1 | 2/2004 | Ngo |
| 2004/0042439 A1 | 3/2004 | Menon et al. |
| 2004/0042556 A1 | 3/2004 | Medvedev et al. |
| 2004/0047284 A1 | 3/2004 | Eidson |
| 2004/0047292 A1 | 3/2004 | du Crest et al. |
| 2004/0052228 A1 | 3/2004 | Tellado et al. |
| 2004/0062192 A1 | 4/2004 | Liu et al. |
| 2004/0071104 A1 | 4/2004 | Boesel et al. |

(56) References Cited

U.S. PATENT DOCUMENTS

| | | |
|---|---|---|
| 2004/0071107 A1 | 4/2004 | Kats et al. |
| 2004/0076224 A1* | 4/2004 | Onggosanusi et al. ....... 375/144 |
| 2004/0081131 A1 | 4/2004 | Walton et al. |
| 2004/0082356 A1 | 4/2004 | Walton et al. |
| 2004/0085939 A1 | 5/2004 | Wallace et al. |
| 2004/0087324 A1 | 5/2004 | Ketchum et al. |
| 2004/0120411 A1 | 6/2004 | Walton et al. |
| 2004/0121730 A1 | 6/2004 | Kadous et al. |
| 2004/0136349 A1 | 7/2004 | Walton et al. |
| 2004/0151108 A1 | 8/2004 | Blasco Claret et al. |
| 2004/0151122 A1 | 8/2004 | Lau et al. |
| 2004/0156328 A1 | 8/2004 | Walton |
| 2004/0160921 A1 | 8/2004 | Kaipainen et al. |
| 2004/0160987 A1 | 8/2004 | Sudo et al. |
| 2004/0176097 A1 | 9/2004 | Wilson et al. |
| 2004/0179627 A1 | 9/2004 | Ketchum et al. |
| 2004/0184398 A1 | 9/2004 | Walton et al. |
| 2004/0198276 A1 | 10/2004 | Tellado et al. |
| 2004/0203853 A1 | 10/2004 | Sheynblat |
| 2004/0252632 A1 | 12/2004 | Bourdoux et al. |
| 2005/0002326 A1 | 1/2005 | Ling et al. |
| 2005/0047384 A1 | 3/2005 | Wax et al. |
| 2005/0047515 A1 | 3/2005 | Walton et al. |
| 2005/0099974 A1 | 5/2005 | Kats et al. |
| 2005/0111599 A1 | 5/2005 | Walton et al. |
| 2005/0120097 A1 | 6/2005 | Walton et al. |
| 2005/0128953 A1 | 6/2005 | Wallace et al. |
| 2005/0135284 A1 | 6/2005 | Nanda et al. |
| 2005/0135295 A1 | 6/2005 | Walton et al. |
| 2005/0135318 A1 | 6/2005 | Walton et al. |
| 2005/0147177 A1 | 7/2005 | Seo et al. |
| 2005/0174981 A1 | 8/2005 | Heath et al. |
| 2005/0185575 A1 | 8/2005 | Hansen et al. |
| 2005/0195915 A1 | 9/2005 | Raleigh et al. |
| 2005/0208959 A1 | 9/2005 | Chen et al. |
| 2005/0220211 A1 | 10/2005 | Shim et al. |
| 2005/0227628 A1 | 10/2005 | Inanoglu |
| 2005/0245264 A1 | 11/2005 | Laroia et al. |
| 2005/0276343 A1 | 12/2005 | Jones |
| 2006/0018247 A1 | 1/2006 | Driesen et al. |
| 2006/0018395 A1 | 1/2006 | Tzannes |
| 2006/0067417 A1 | 3/2006 | Park et al. |
| 2006/0072649 A1 | 4/2006 | Chang et al. |
| 2006/0077935 A1 | 4/2006 | Hamalainen et al. |
| 2006/0104196 A1 | 5/2006 | Wu et al. |
| 2006/0104340 A1 | 5/2006 | Walton et al. |
| 2006/0114858 A1 | 6/2006 | Walton et al. |
| 2006/0153237 A1 | 7/2006 | Hwang et al. |
| 2006/0159120 A1 | 7/2006 | Kim |
| 2006/0176968 A1 | 8/2006 | Keaney et al. |
| 2006/0183497 A1 | 8/2006 | Paranchych et al. |
| 2006/0209894 A1 | 9/2006 | Tzannes et al. |
| 2006/0209937 A1 | 9/2006 | Tanaka et al. |
| 2007/0086536 A1 | 4/2007 | Ketchum et al. |
| 2007/0177681 A1 | 8/2007 | Choi et al. |
| 2007/0274278 A1 | 11/2007 | Choi et al. |
| 2008/0069015 A1 | 3/2008 | Walton et al. |
| 2008/0267098 A1 | 10/2008 | Walton et al. |
| 2008/0267138 A1 | 10/2008 | Walton et al. |
| 2008/0285488 A1 | 11/2008 | Walton et al. |
| 2008/0285670 A1 | 11/2008 | Walton et al. |
| 2009/0161613 A1 | 6/2009 | Kent et al. |
| 2009/0291642 A1 | 11/2009 | Cozzo et al. |
| 2010/0067401 A1 | 3/2010 | Medvedev et al. |
| 2010/0119001 A1 | 5/2010 | Walton et al. |
| 2010/0142636 A1 | 6/2010 | Heath, Jr. et al. |
| 2010/0183088 A1 | 7/2010 | Inanoglu |
| 2010/0220825 A1 | 9/2010 | Dubuc et al. |
| 2010/0260060 A1 | 10/2010 | Abraham et al. |
| 2010/0271930 A1 | 10/2010 | Tong et al. |
| 2011/0096751 A1 | 4/2011 | Ma et al. |
| 2011/0235744 A1 | 9/2011 | Ketchum |
| 2012/0134435 A1 | 5/2012 | Kapoor et al. |
| 2012/0219093 A1 | 8/2012 | Jia et al. |
| 2013/0040682 A1 | 2/2013 | Chang et al. |
| 2013/0279614 A1 | 10/2013 | Walton et al. |
| 2014/0036823 A1 | 2/2014 | Ma et al. |

FOREIGN PATENT DOCUMENTS

| | | |
|---|---|---|
| CA | 2690247 | 10/2001 |
| CN | 1086061 | 4/1994 |
| CN | 1234661 | 11/1999 |
| CN | 1298266 A | 6/2001 |
| CN | 1308794 | 8/2001 |
| CN | 1314037 A | 9/2001 |
| CN | 1325198 | 12/2001 |
| CN | 1325243 A | 12/2001 |
| CN | 1339885 A | 3/2002 |
| CN | 1347609 A | 5/2002 |
| CN | 1469662 | 1/2004 |
| CN | 1489836 A | 4/2004 |
| CN | 1537371 | 10/2004 |
| DE | 19951525 A1 | 6/2001 |
| EP | 0755090 | 1/1997 |
| EP | 0762701 A2 | 3/1997 |
| EP | 0772329 | 5/1997 |
| EP | 0805568 A1 | 11/1997 |
| EP | 0869647 A2 | 10/1998 |
| EP | 0895387 | 2/1999 |
| EP | 0929172 A1 | 7/1999 |
| EP | 0951091 A2 | 10/1999 |
| EP | 0991221 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 A2 | 9/2001 |
| EP | 1137217 | 9/2001 |
| EP | 1143754 | 10/2001 |
| EP | 1170879 | 1/2002 |
| EP | 1175022 A2 | 1/2002 |
| EP | 1182799 A2 | 2/2002 |
| EP | 1185001 | 3/2002 |
| EP | 1185015 | 3/2002 |
| EP | 1185048 | 3/2002 |
| EP | 1207635 | 5/2002 |
| EP | 1207645 | 5/2002 |
| EP | 1223702 | 7/2002 |
| EP | 1241824 | 9/2002 |
| EP | 1265411 | 12/2002 |
| EP | 1315311 A1 | 5/2003 |
| EP | 1379020 | 1/2004 |
| EP | 1387545 A2 | 2/2004 |
| EP | 1416688 A1 | 5/2004 |
| EP | 1447934 A1 | 8/2004 |
| EP | 1556984 A2 | 7/2005 |
| GB | 2300337 | 10/1996 |
| GB | 2373973 A | 10/2002 |
| JP | 03104430 | 5/1991 |
| JP | 06003956 | 1/1994 |
| JP | 06501139 | 1/1994 |
| JP | 08274756 | 10/1996 |
| JP | 9135230 | 5/1997 |
| JP | 9266466 A | 10/1997 |
| JP | 9307526 | 11/1997 |
| JP | 09327073 | 12/1997 |
| JP | 9512156 T | 12/1997 |
| JP | 1028077 | 1/1998 |
| JP | 10051402 A | 2/1998 |
| JP | 10084324 | 3/1998 |
| JP | 10209956 | 8/1998 |
| JP | 10303794 A | 11/1998 |
| JP | 10327126 | 12/1998 |
| JP | 1132027 | 2/1999 |
| JP | 1141159 | 2/1999 |
| JP | 2991167 | 3/1999 |
| JP | 11069431 A | 3/1999 |
| JP | 11074863 | 3/1999 |
| JP | 11-163823 | 6/1999 |
| JP | 11205273 | 7/1999 |

(56) References Cited

FOREIGN PATENT DOCUMENTS

| | | |
|---|---|---|
| JP | 11252037 A | 9/1999 |
| JP | 11317723 A | 11/1999 |
| JP | 2000068975 A | 3/2000 |
| JP | 2000078105 | 3/2000 |
| JP | 2000092009 A | 3/2000 |
| JP | 2001-044930 | 2/2001 |
| JP | 200186045 | 3/2001 |
| JP | 2001103034 A | 4/2001 |
| JP | 2001186051 | 7/2001 |
| JP | 2001510668 A | 7/2001 |
| JP | 2001217896 | 8/2001 |
| JP | 2001231074 | 8/2001 |
| JP | 2001237751 A | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002118534 A | 4/2002 |
| JP | 2002510932 A | 4/2002 |
| JP | 2002514033 A | 5/2002 |
| JP | 2002164814 | 6/2002 |
| JP | 2002176379 A | 6/2002 |
| JP | 2002204217 | 7/2002 |
| JP | 2002232943 A | 8/2002 |
| JP | 2003504941 | 2/2003 |
| JP | 2003198442 | 7/2003 |
| JP | 2003530010 | 10/2003 |
| JP | 2004266586 | 9/2004 |
| JP | 2004297172 | 10/2004 |
| JP | 2004535694 | 11/2004 |
| JP | 2005519520 | 6/2005 |
| JP | 2006504372 | 2/2006 |
| KR | 200011799 | 2/2000 |
| KR | 20010098861 | 11/2001 |
| KR | 1020020003370 | 1/2002 |
| KR | 20030085040 | 11/2003 |
| KR | 2006-0095576 | 8/2006 |
| RU | 2015281 C1 | 6/1994 |
| RU | 2134489 | 8/1999 |
| RU | 2139633 | 10/1999 |
| RU | 2141168 C1 | 11/1999 |
| RU | 2149509 | 5/2000 |
| RU | 2152132 C1 | 6/2000 |
| RU | 2157592 | 10/2000 |
| RU | 2158479 | 10/2000 |
| RU | 2158479 C2 | 10/2000 |
| RU | 2168277 | 5/2001 |
| RU | 2168278 | 5/2001 |
| RU | 2197781 C2 | 1/2003 |
| RU | 2201034 | 3/2003 |
| RU | 2335852 | 1/2006 |
| TW | 419912 | 1/2001 |
| TW | 496620 | 7/2002 |
| TW | 503347 | 9/2002 |
| TW | 545006 B | 8/2003 |
| TW | 567689 | 12/2003 |
| TW | 567701 | 12/2003 |
| TW | 583842 B | 4/2004 |
| TW | I230525 | 4/2005 |
| TW | I263449 | 10/2006 |
| TW | I267251 B | 11/2006 |
| WO | WO8607223 | 12/1986 |
| WO | WO9307684 A1 | 4/1993 |
| WO | WO9507578 | 3/1995 |
| WO | WO-9516319 A1 | 6/1995 |
| WO | WO-9521501 A1 | 8/1995 |
| WO | 9530316 | 11/1995 |
| WO | 9532567 | 11/1995 |
| WO | 9719525 | 11/1995 |
| WO | WO9622662 A1 | 7/1996 |
| WO | WO9635268 | 11/1996 |
| WO | WO-9702667 | 1/1997 |
| WO | WO9736377 A1 | 10/1997 |
| WO | WO9809381 A | 3/1998 |
| WO | WO9809395 | 3/1998 |
| WO | WO9824192 A1 | 6/1998 |
| WO | WO9826523 | 6/1998 |
| WO | WO9830047 | 7/1998 |
| WO | WO9857472 | 12/1998 |
| WO | WO9903224 A1 | 1/1999 |
| WO | WO9914878 | 3/1999 |
| WO | WO9916214 | 4/1999 |
| WO | WO-9929049 A2 | 6/1999 |
| WO | 9944379 | 9/1999 |
| WO | WO-9952224 A1 | 10/1999 |
| WO | WO9957820 | 11/1999 |
| WO | WO0011823 A1 | 3/2000 |
| WO | WO0036764 A2 | 6/2000 |
| WO | WO0062456 | 10/2000 |
| WO | 0105067 | 1/2001 |
| WO | WO0126269 | 4/2001 |
| WO | WO-0163775 A2 | 8/2001 |
| WO | WO0169801 A2 | 9/2001 |
| WO | WO0171928 | 9/2001 |
| WO | 0176110 | 10/2001 |
| WO | 0180510 | 10/2001 |
| WO | 0182521 | 11/2001 |
| WO | WO0182521 A2 | 11/2001 |
| WO | WO-0195531 A2 | 12/2001 |
| WO | WO0197400 | 12/2001 |
| WO | WO0201732 A2 | 1/2002 |
| WO | WO0203557 A1 | 1/2002 |
| WO | WO-0205506 | 1/2002 |
| WO | WO0215433 A1 | 2/2002 |
| WO | 0225853 | 3/2002 |
| WO | 02062002 | 8/2002 |
| WO | WO02060138 A2 | 8/2002 |
| WO | WO02065664 A2 | 8/2002 |
| WO | 02069590 | 9/2002 |
| WO | 02073869 | 9/2002 |
| WO | WO02069523 A1 | 9/2002 |
| WO | 02078211 | 10/2002 |
| WO | WO02082689 A2 | 10/2002 |
| WO | WO02088656 | 11/2002 |
| WO | WO02093784 A1 | 11/2002 |
| WO | WO02099992 A1 | 12/2002 |
| WO | 03010984 | 2/2003 |
| WO | WO03010994 A1 | 2/2003 |
| WO | 03019984 | 3/2003 |
| WO | WO03028153 A1 | 4/2003 |
| WO | WO03034646 A2 | 4/2003 |
| WO | WO-03041330 | 5/2003 |
| WO | WO03047140 A1 | 6/2003 |
| WO | WO03075479 | 9/2003 |
| WO | WO04002011 | 12/2003 |
| WO | WO04002047 | 12/2003 |
| WO | 2004039011 | 5/2004 |
| WO | WO2004038985 A2 | 5/2004 |
| WO | WO2004038986 | 5/2004 |
| WO | WO2004039022 | 5/2004 |
| WO | WO2005041515 | 5/2005 |
| WO | WO2005043855 | 5/2005 |
| WO | WO2005046113 A2 | 5/2005 |

OTHER PUBLICATIONS

Alamouti, S.M., "A Simple Transmit Diversity Technique for Wireless Communications," IEEE Journal on Select Areas in Communications. vol. 16. No. 8, Oct. 1998. pp. 1451-1458.

ETSI TS 101 761-1 v1.3.1, "Broadband Radio Access Networks (BRAN); Hiperlan Type 2: Data Link Control (DLC) Layer: Part 1: Basic Data Transport Functions," ETSI Standards, European Telecommunications Standards Institute BR (V131), pp. 1-88 (Dec. 2001).

Chen, K.C. et al., "Novel Space-Time Processing of DS/CDMA Multipath Signal," IEEE 49th, Vehicular Technology Conference, Houston, Texas. May 16-20, 1999. pp. 1809-1813.

Choi, R. et al., "MIMO Transmit Optimization for Wireless Communication Systems," Proceedings of the First IEEE International workshops on Electronic Design, pp. 1-6, Piscataway, New Jersey, Jan. 29-31, 2002.

Fujii, M.: "Pseudo-Orthogonal Multibeam-Time Transmit Diversity for OFDM-CDMA" pp. 222-226 (2002).

(56) References Cited

OTHER PUBLICATIONS

Haustein, T. et al.: "Performance of MIMO Systems with Channel Inversion," IEEE 55th Vehicular Technology Conference, Birmingham, Alabama, May 6-9, 2002, pp. 35-39.
Hong, D. K. et al.: "Robust Frequency Offset Estimation for Pilot Symbol Assisted Packet CDMA with MIMO Antenna Systems," IEEE Communications Letters, vol. 6, No. 6, pp. 262-264 (Jun. 2002).
Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.
Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11, 2001, pp. 1508-1512.
Tarighat, A. et al.: "Performance Analysis of Different Algorithms for cdma2000 Antenna Array System and a New Multi User Beamforming(MUB) Algorithm". Wireless Communications and Networking Conference, pp. 409-414 Sep. 2000.
Thoen. S. et al.: "Improved Adaptive Downlink for OFDM/SDMA-Based Wireless Networks," IEEE VTS 53rd Vehicular Technology Conference, pp. 707-711, Rhodes, Greece, May 6-9, 2001.
Van Zelst, A. et al.: "Space Division Multiplexing (SDM) for OFDM Systems," IEEE 51st Vehicular Technology Conference Proceedings. pp. 1070-1074, Tokyo, Japan. May 15-18, 2000.
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
International Search Report, PCT/US2003/034514—International Search Authority—European Patent Office—May 12, 2005.
European Search Report, EP05019631—European Patent Office—Munich—Nov. 30, 2005.
European Search Report, EP05019630—European Patent Office—Munich—Nov. 16, 2005.
European Search Opinion, EP05019630—European Patent Office—Munich—Nov. 16, 2005.
European Search Report, EP08006576—European Patent Office—Munich—Jun. 16, 2008.
European Search Opinion, EP08006576—European Patent Office—Munich—Jun. 16, 2008.
Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinky, Finland, Jun. 11-14, 2001.
Li Lihua, et al.: "A Practical Space-Frequency Block Coded OFDM Scheme for Fast Fading Broadband Channels" 13th IEEE International Symposium on Personal Indoor and Mobile Radio Communications. PIMRC 2002. Sep. 15-18, 2002, pp. 212-216 vol. 1, XP00.
Kousa M A et al. "Multichannel Adaptive System" IEEE Proceedings I. Solid-State & Electron Device, Institution of Electrical Engineers. Stevenage, GB, October 1, 1993, pp, 357-364, vol. 140, No. 5, XP000403498.
Yoshiki, et al., "A Study on Subcarrier Adaptive Modulation System Using Multilevel Transmission Power control for OFDM/FDD System," Collection of Treatises Reported in the General Conference of the Institute of Electronics, Information and Communication Engineer of the year, 2000, Japan, Mar. 7, 2000, Comm. 1, p. 400.
3GPP2 TIA/EIA/IS-2000.2-A, "Physical Layer Standard for cdma2000 Spread Spectrum Systems", (Mar. 2000).
Diggavi, S. et al., "Intercarrier interference in MIMO OFDM," IEEE International Conference on Communications, 2002, vol. 1, 485-489.
Gao, et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, Sep. 24-28, 2002, IEEE Vehicular Technology Conference, pp. 199-203.
Hassibi B., et al., "High Rate Codes That Are Linear in Space and Time," Lucent Technologies, 2002, pp. 1-55.
Hayashi, K, A New Spatio-Temporal Equalization Method Based on Estimated Channel Response, Sep. 2001, IEEE Transaction on Vehicular Technology, vol. 50, Issue 5, pp. 1250-1259.
Iserte et al., "Joint beamforming strategies in OFDM-MIMO systems," 2002, sections 2 and 3, Department of Signal Theory and Communications.
John A.C. Bingham, "Multicarrier Modulation for Data Transmission: An Idea Whose Time Has Come", IEEE Communications Magazine, pp. 5-14 (May 1990).
Jongren et al., Utilizing Quantized Feedback Information in Orthogonal Space-Time Block Coding, 2000 IEEE Global Telecommunications Conference, 2(4): 995-999, Nov. 27, 2000.
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
L. Deneire, et al. "A Low Complexity ML Channel Estimator for OFDM," Proc IEEE ICC Jun. 2001 pp. 1461-1465.
Lebrun G., et al., "MIMO transmission over a time varying TDD channel using SVD," Electronics Letters, 2001, vol. 37, 1363-1364.
Li et al., "Simplified Channel Estimation for OFDM Systems with Multiple Transmit Antennas," IEEE Transactions on Wireless Communications, Jan. 2002, vol. 1, No. 1, 67-75.
Miyashita K et al: "High data-rate transmission with eigenbeam-space division multiplexing (E-SDM) in a MIMO channel" VTC 2002-Fall. 2002 IEEE 56th. Vehicular Technology Conference Proceedings. Vancouver, Canada, Sept. 24-28, 2002, IEEE Vehicular Technology Conference, New York, NY: IEEE, US, vol. 1 of 4. Conf. 56, Sep. 24, 2002, pp. 1302-1306, XP010608639.
Sampath H., et al., "Joint transmit and receive optimization for high data rate wireless communication using multiple antennas, XP010373976," 2002, 215-219.
S.W. Wales, "A mimo technique within the UTRA TDD standard," MIMO: Communications Systems from Concept to Implementations (Ref. No. 2001/175), IEE Seminar on, Dec. 12, 2001, pp. 1-8.
Wolniansky et al, "V-BLAST: An Architecture for Achieving Very High Data Rates over the Rich-Scattering Wireless Channel," Proc. ISSSE-98, 1998, Pisa, Italy, pp. 295-300.
Wong K. K., et al., "Optimizing time and space MIMO antenna system for frequency selective fading channels," 2001, Sections II and III and V, 1396.
Chung, J. et al: "Multiple antenna systems for 802.16 systems." IEEE 802.16 Broadband Wireless Access Working Group <http://ieee802.org/16>, IEEE 802.16abc-01/31, Sep. 7, 2001, (5 pages).
European Search Report—EP08012143.7, Search Authority—Munich Patent Office, Jan. 19, 2011.
European Search Report—EP10173988, Search Authority—Munich Patent Office, Jan. 14, 2011.
Gore D. A., et al: "Selecting an optimal set of transmit antennas for a low rank matrix channel," 2000 IEEE International Conference on Acoustics, Speech, and Signal Processing. Proceedings. (ICASSP). Istanbul, Turkey, June 5-9, 2000, New York, NY; IEEE, US, vol. 5 of 6, Jun. 5, 2000, pp. 2785-2788, XP001035763, abstract.
The Authoritative Dictionary of IEEE Standards Terms, Seventh Edition, IEEE Press: New York (Dec. 2000), p. 902.
Wong, Cheong. et al., "Multiuser OFDM with Adaptive Subcarrier, Bit and Power Allocation," Oct. 1999, IEEE Journal on Selected Areas in Communications, vol. 17, No. 10, pp. 1747-1758.
Grunheid, R. et al., "Adaptive Modulation and Multiple Access for the OFDM Transmission Technique," Wireless Personal Communications 13: May 13, 2000, 2000 Kluwer Academic Publishers, pp. 4-13, XP000894156.
Le Goff, S. et al: "Turbo-codes and high spectral efficiency modulation," IEEE International Conference on Communications, 1994. ICC "94, Supercomm/ICC "94, Conference Record, 'Serving Humanity Through Communications.' pp. 645-649, vol. 2, May 1-5, 1994, XP010126658, doi: 10.1109/ICC.1994.368804.
Office Action dated Aug. 13, 2008 for Australian Application Serial No. 2004223374, 2 pages.
Office Action dated Jun. 27, 2008 for Chinese Application Serial No. 200480011307.6, 3 pages.

(56) References Cited

OTHER PUBLICATIONS

Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI : 10.1109/ACSSC.1996.600812, p. 35, col. 2, paragraph 4 through p. 36, col. 1.

Vook, F. W. et al., "Adaptive antennas for OFDM", Vehicular Technology Conference, vol. 1, May 18-21, 1998, pp. 606-610, XP010287858, New York, NY, USA, IEEE, US DOI: 10.1109/VETEC.1998.686646 ISBN: 978-0-7803-4320-7.

Wyglinski, Alexander. "Physical Layer Loading Algorithms for Indoor Wireless Multicarrier Systems," Thesis Paper, McGill University, Montreal, Canada, Nov. 2004, p. 109.

3 rd Generation Partnership Project (3GPP); Technical Specification Group (TSG); Radio Access Network (RAN); RF requirements f o r 1.28Mcps UTRA TDD option, 3GPP Standard; 3G TR 25.945, 3rd Generation Partnership Project (3GPP), Mobile Competence Centre ; 650, Route Des Lucioles ; F-06921 Sophia-Antipolis Cedex; France, No. V2.0.0, Dec. 20, 2000, pp. 1-144, XP050400193, [retreived on Dec. 20, 2000], p. 126.

3rd Generation Partnership Project ; Technical Specification Group Radio Access Network; Radio Resource Control (RRC); Protocol Specification (Release 5 ), 3GPP Standard; 3GPP TS 25.331, 3rd Generation Partnership Project (3GPP), Mobile Competence Centre ; 650, Route Des Lucioles ; F-06921 Sophia-Antipolis Cedex; France, No. V5.2.0, Sep. 1, 2002, pp. 1-938, XP050367950, pp. 124, 358-p. 370.

3rd Generation Partnership Project; Technical Specification Group Radio Access 6-18, Network; Physical channels and mapping of 21-24 transport channels onto physical channels (TDD) (Release 5 ), 3GPP Standard; 3GPP TS 25.221, 3rd Generation Partnership Project (3GPP), Mobile Competence Centre; 650, Route Des Lucioles; F-06921 Sophia-Antipolis Cedex; France, No. V5.2.0, Sep. 1, 2002, pp. 1-97, XP050366967.

Catreux S., et al., "Simulation results for an interference-limited multiple input multiple output cellular system". Global Telecommunications letters. IEEE: U.S.A. Nov. 2000, vol. 4(11), pp. 334-336.

Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.

Co-pending U.S. Pat. No. 7,624,118, filed Dec. 7, 1990.

Editor: 3GPP Draft; 3rd Generation Partnership Project (3GPP), Technical Specification Group (TSG) Radio Access Network (RAN); Working Group 4(WG4); base Station conformance and testing, TS 25.141 V0.1.1 (May 1999), R4-99349, Mobile Competence Centre; 650, Route Des Lucioles; F-06921 Sophia-Antipolis Cedex; France, vol. RAN WG4, no.Miami; Oct. 24, 2001, XP050166323.

European Search Report—EP10174926—Search Authority—Munich—May 14, 2012.

European Search Report—EP10180324—Search Authority—Munich—May 10, 2012.

G. Bauch, J. Hagenauer, "Smart Versus Dumb Antennas—Capacities and FEC Performance," IEEE Communications Letters, vol. 6, No. 2, pp. 55-57, Feb. 2002.

Harada H., et al., "An OFDM-Based Wireless ATM Transmission System Assisted by a Cyclically ExtendedPN Sequence for Future Broad-BandMobile Multimedia Communications", IEEE Transactions on Vehicular Technology, IEEE Service Center, Piscataway, NJ, US, vol. 50, No. 6, Nov. 1, 2001, XP011064321, ISSN: 0018-9545.

Heath et al., "Multiuser diversity for MIMO wireless systems with linear receivers", Conference Record of the 35th Asilomar Conference on Signals, Systems, & Computers, Nov. 4, 2001, pp. 1194-1199, vol. 2, IEEE, XP010582229, DOI: 10.1109/ACSSC.2001.987680, ISBN: 978-0-7803-7147-7.

Lal D et al: "A novel MAC layer protocol for space division multiple access in wireless ad hoc networks", Computer Communications and Networks, 2002 Proceedings, Eleventh International Conference on Oct. 14, 2002, pp. 614-619.

Louvigne J.C., et al., "Experimental study of a real-time calibration procedure of a CDMA/TDD multiple antenna terminal," IEEE Antennas and Propagation Society International Symposium, 2002 Digest.APS.San Antonio, TX, Jun. 16-21, 2002, vol. 2, Jun. 16, 2002, pp. 644-647, XP010591780, DOI: 10.1109/APS.2002.1016729, ISBN: 978-0-7803-7330-3.

Nogueroles R., et al., "Performance of a random OFDMA system for mobile communications", Broadband Communications, 1998. Accessing, Transmission, Networking. Proceedings. 1998 International Zurich Seminar on Zurich, Switzerland Feb. 17-19, 1998, New York, NY, USA , IEEE, US, Feb. 17, 1998, pp. 37-43, XP010277032, DOI: 10.1109/IZSBC.1998.670242 ISBN: 978-0-7803-3893-7, p. 1-p. 2.

Sakaguchi et al, "Comprehensive Calibration for MIMO System", International Symposium on Wireless Personal Multimedia Communications, IEEE, vol. 2, Oct. 27, 2002, pp. 440-443.

Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.

Varanasi M.K, et al., "Optimum decision feedback multiuser equalization with successive decoding achieves the total capacity of the Gaussian multiple-access channel", Signals, Systems & Computers, 1997. Conference Record of the Thirty-First Asilomar Conference on Pacific Grove, CA, USA Nov. 2-5, 1997, Los Alamitos, CA, USA,IEEE Comput. Soc, US, vol. 2, Nov. 2, 1997, pp. 1405-1409, XP010280667, DOI: 10.1109/ACSSC.1997. 679134 ISBN : 978-0-8186-8316-9 * pp. 1,3,5; figures 1,3 *.

Yamamura, T et al., "High Mobility OFDM transmission system by a new channel estimation and ISI cancellation scheme using characteristics of pilot symbol inserted OFDM signal". Vehicular Technology Conference, vol. 1, Sep. 19-22, 1999, pp. 319-323, XP010352958 IEEE, Piscataway, NJ, USA, ISBN: 0-7803-5435-4.

* cited by examiner

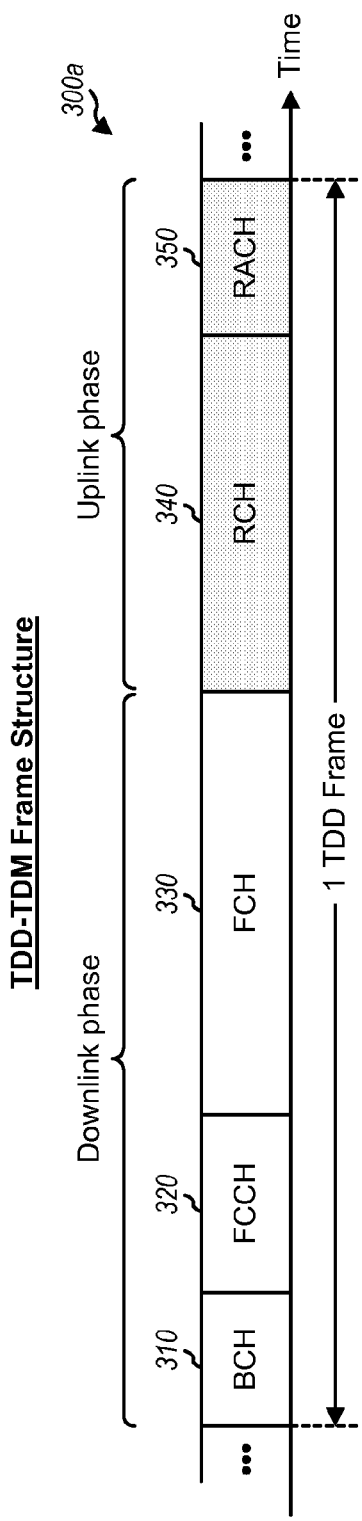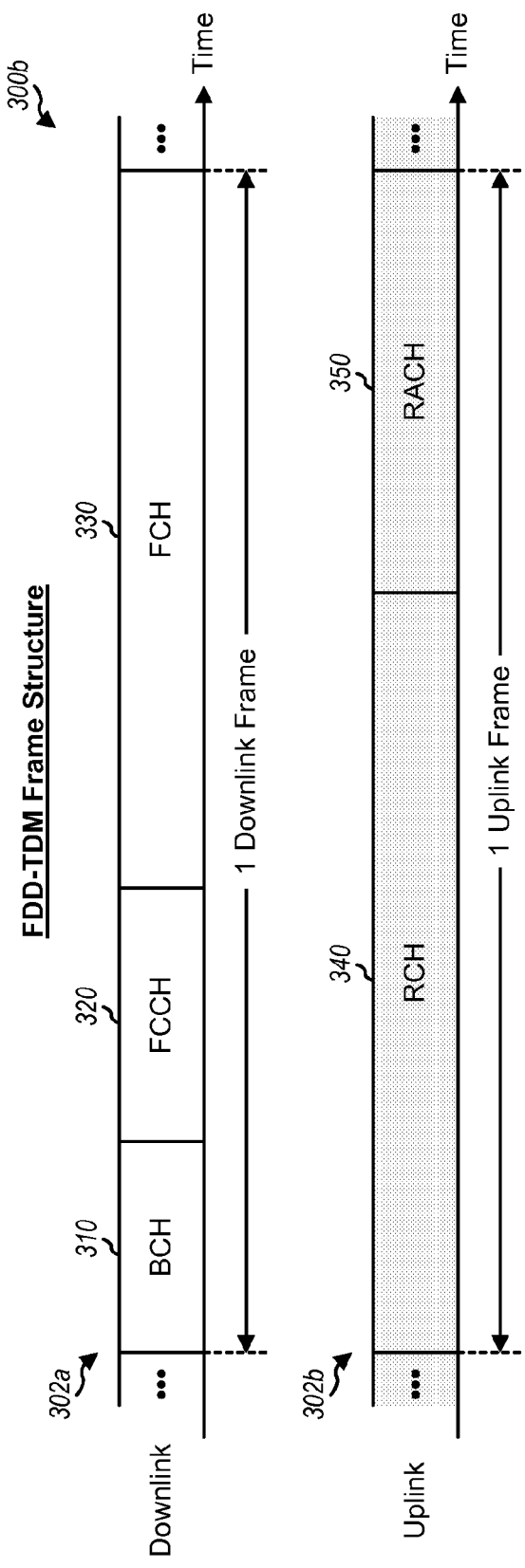
FIG. 3A
FIG. 3B

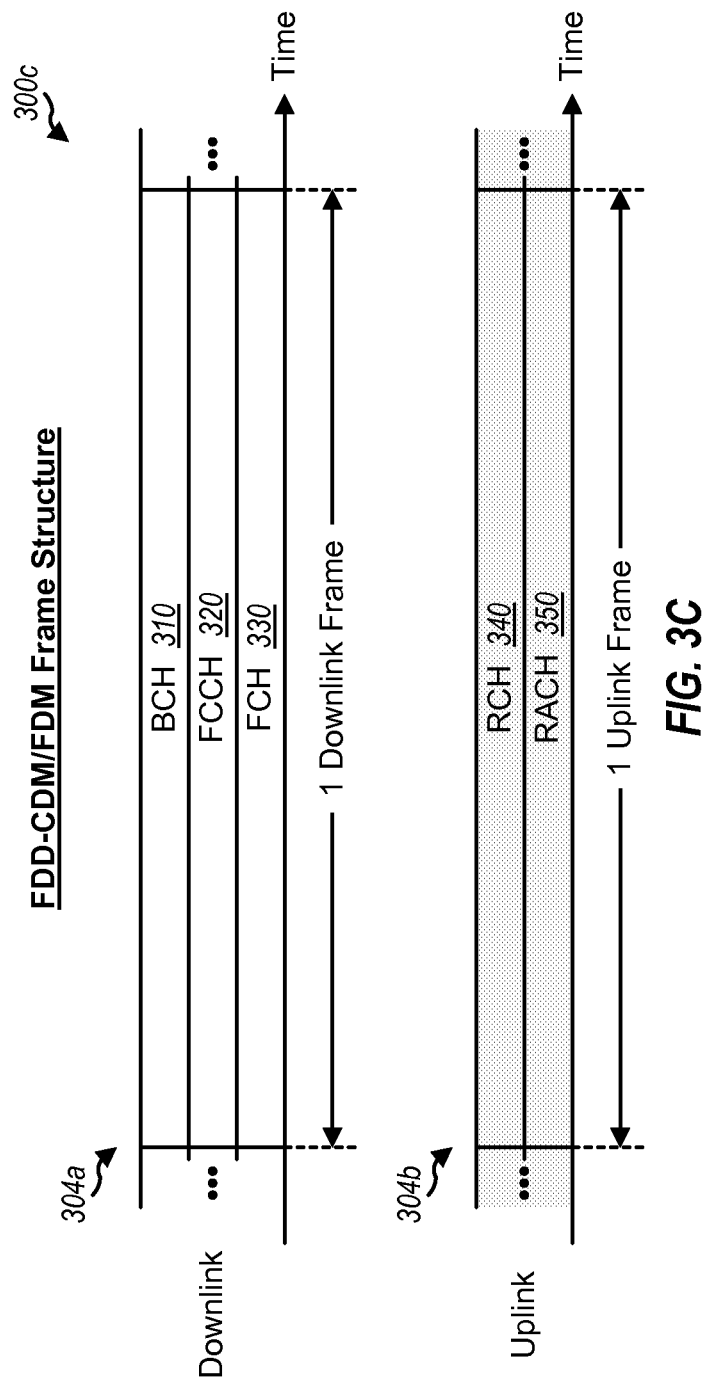

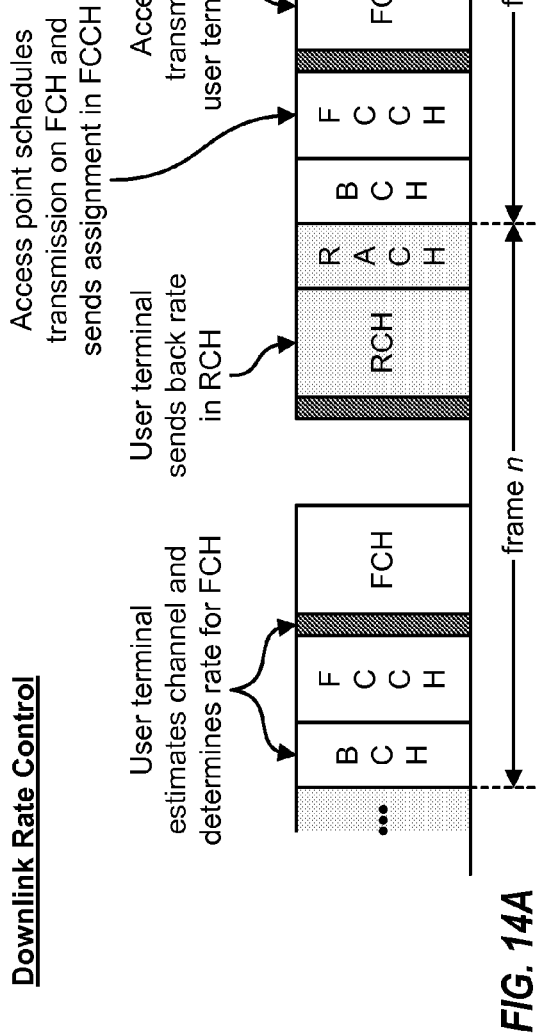
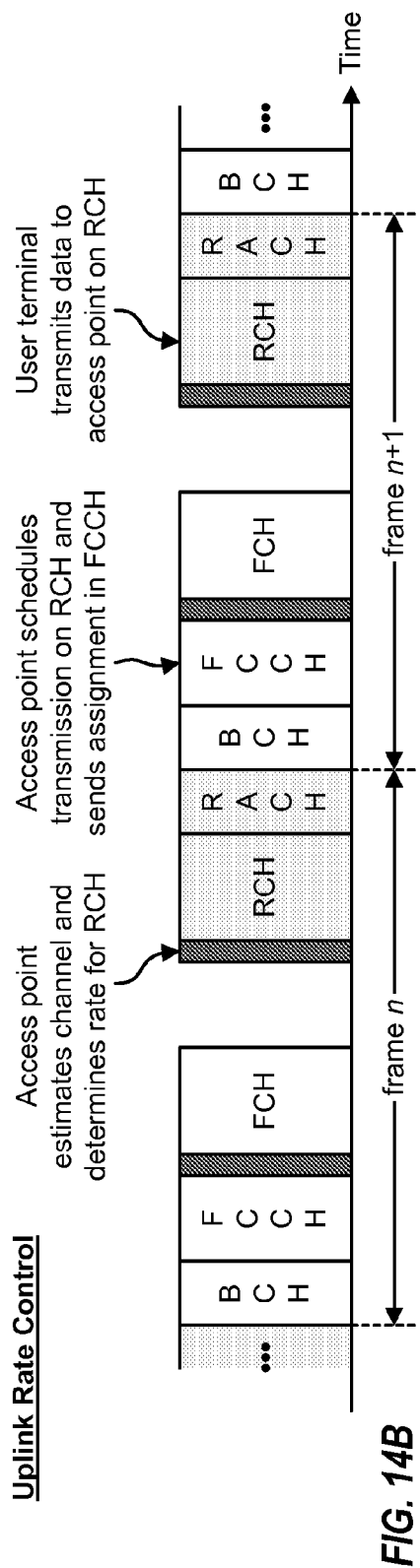
FIG. 14A
FIG. 14B

MIMO WLAN SYSTEM

CLAIM OF PRIORITY

This application is a divisional application of, and claims the benefit of priority from, U.S. patent application Ser. No. 10/693,419, filed Oct. 23, 2003 and entitled "MIMO WLAN System," which claims the benefit of priority from U.S. Provisional Patent Application Ser. No. 60/421,309, filed Oct. 25, 2002 and entitled "MIMO WLAN System," both of which are assigned to the assignee of this application and are fully incorporated herein by reference for all purposes.

BACKGROUND

1. Field

The present invention relates generally to data communication, and more specifically to a multiple-input multiple-output (MIMO) wireless local area network (WLAN) communication system.

2. Background

Wireless communication systems are widely deployed to provide various types of communication such as voice, packet data, and so on. These systems may be multiple-access systems capable of supporting communication with multiple users sequentially or simultaneously by sharing the available system resources. Examples of multiple-access systems include Code Division Multiple Access (CDMA) systems, Time Division Multiple Access (TDMA) systems, and Frequency Division Multiple Access (FDMA) systems.

Wireless local area networks (WLANs) are also widely deployed to enable communication among wireless electronic devices (e.g., computers) via wireless link. A WLAN may employ access points (or base stations) that act like hubs and provide connectivity for the wireless devices. The access points may also connect (or "bridge") the WLAN to wired LANs, thus allowing the wireless devices access to LAN resources.

In a wireless communication system, a radio frequency (RF) modulated signal from a transmitter unit may reach a receiver unit via a number of propagation paths. The characteristics of the propagation paths typically vary over time due to a number of factors, such as fading and multipath. To provide diversity against deleterious path effects and improve performance, multiple transmit and receive antennas may be used. If the propagation paths between the transmit and receive antennas are linearly independent (i.e., a transmission on one path is not formed as a linear combination of the transmissions on the other paths), which is generally true to at least an extent, then the likelihood of correctly receiving a data transmission increases as the number of antennas increases. Generally, diversity increases and performance improves as the number of transmit and receive antennas increases.

A MIMO system employs multiple (NT) transmit antennas and multiple (NR) receive antennas for data transmission. A MIMO channel formed by the NT transmit and NR receive antennas may be decomposed into NS spatial channels, with $N_S \leq \min\{N_T, N_R\}$. Each of the NS spatial channels corresponds to a dimension. The MIMO system can provide improved performance (e.g., increased transmission capacity and/or greater reliability) if the additional dimensionalities created by the multiple transmit and receive antennas are utilized.

The resources for a given communication system are typically limited by various regulatory constraints and requirements and by other practical considerations. However, the system may be required to support a number of terminals, provide various services, achieve certain performance goals, and so on.

There is, therefore, a need in the art for a MIMO WLAN system capable of supporting multiple users and providing high system performance.

SUMMARY

A multiple-access MIMO WLAN system having various capabilities and able to achieve high performance is described herein. In an embodiment, the system employs MIMO and orthogonal frequency division multiplexing (OFDM) to attain high throughput, combat deleterious path effects, and provide other benefits. Each access point in the system can support multiple user terminals. The allocation of downlink and uplink resources is dependent on the requirements of the user terminals, the channel conditions, and other factors.

A channel structure supporting efficient downlink and uplink transmissions is also provided herein. The channel structure comprises a number of transport channels that may be used for a number of functions, such as signaling of system parameters and resource assignments, downlink and uplink data transmissions, random access of the system, and so on. Various attributes of these transport channels are configurable, which allows the system to easily adapt to changing channel and loading conditions.

Multiple rates and transmission modes are supported by the MIMO WLAN system to attain high throughput when supported by the channel conditions and the capabilities of the user terminals. The rates are configurable based on estimates of the channel conditions and may be independently selected for the downlink and uplink. Different transmission modes may also be used, depending on the number of antennas at the user terminals and the channel conditions. Each transmission mode is associated with different spatial processing at the transmitter and receiver and may be selected for use under different operating conditions. The spatial processing facilitates data transmission from multiple transmit antennas and/or data reception with multiple receive antennas for higher throughput and/or diversity.

In an embodiment, the MIMO WLAN system uses a single frequency band for both the downlink and uplink, which share the same operating band using time division duplexing (TDD). For a TDD system, the downlink and uplink channel responses are reciprocal. Calibration techniques are provided herein to determine and account for differences in the frequency responses of the transmit/receive chains at the access point and user terminals. Techniques are also described herein to simplify the spatial processing at the access point and user terminals by taking advantage of the reciprocal nature of the downlink and uplink and the calibration.

A pilot structure with several types of pilot used for different functions is also provided. For example, a beacon pilot may be used for frequency and system acquisition, a MIMO pilot may be used for channel estimation, a steered reference (i.e., a steered pilot) may be used for improved channel estimation, and a carrier pilot may be used for phase tracking.

Various control loops for proper system operation are also provided. Rate control may be exercised independently on the downlink and uplink. Power control may be exercised for certain transmissions (e.g., fixed-rate services). Timing control may be used for uplink transmissions to account for different propagation delays of user terminals located throughout the system.

Random access techniques to allow user terminals to access the system are also provided. These techniques support system access by multiple user terminals, fast acknowledgment of system access attempts, and quick assignment of downlink/uplink resources.

The various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIGS. 3A, 3B and 3C show a TDD-TDM frame structure, an FDD-TDM frame structure, and an FDD-CDM frame structure, respectively;

FIGS. 14A and 14B show processes for controlling the rates of downlink and uplink transmissions, respectively;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Overall System

Figure 1:
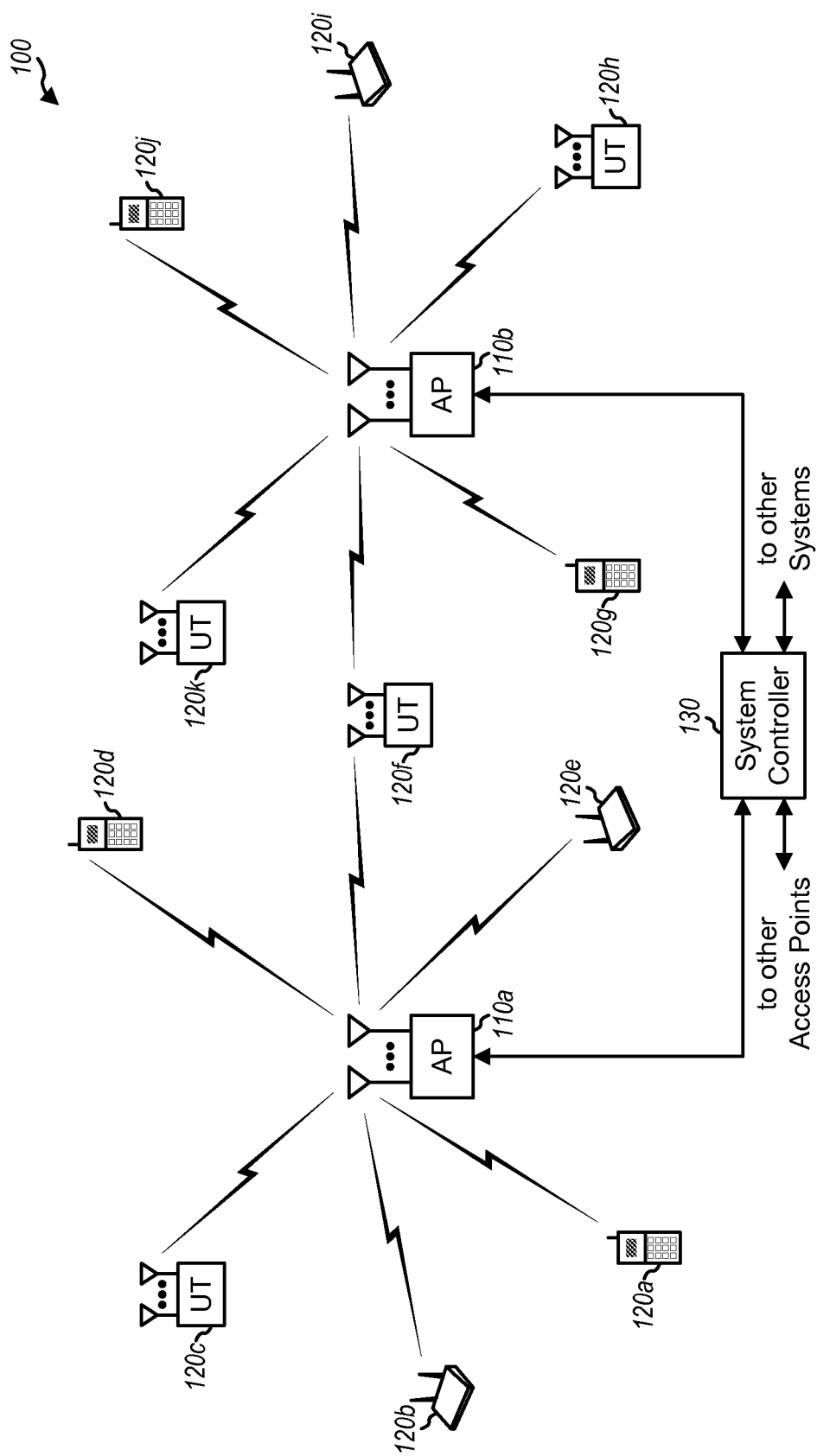
FIG. 1 shows a MIMO WLAN system.

FIG. 1 shows a MIMO WLAN system 100 that supports a number of users and is capable of implementing various aspects and embodiments of the invention. MIMO WLAN system 100 includes a number of access points (APs) 110 that support communication for a number of user terminals (UTs) 120. For simplicity, only two access points 110 are shown in FIG. 1. An access point is generally a fixed station that is used for communicating with the user terminals. An access point may also be referred to as a base station or some other terminology.

User terminals 120 may be dispersed throughout the system. Each user terminal may be a fixed or mobile terminal that can communicate with the access point. A user terminal may also be referred to as a mobile station, a remote station, an access terminal, a user equipment (UE), a wireless device, or some other terminology. Each user terminal may communicate with one or possibly multiple access points on the downlink and/or uplink at any given moment. The downlink (i.e., forward link) refers to transmission from the access point to the user terminal, and the uplink (i.e., reverse link) refers to transmission from the user terminal to the access point. In FIG. 1, access point 110a communicates with user terminals 120a through 120f, and access point 110b communicates with user terminals 120f through 120k. Depending on the specific design of system 100, an access point may communicate with multiple user terminals simultaneously (e.g., via multiple code channels or subbands) or sequentially (e.g., via multiple time slots). At any given moment, a user terminal may receive downlink transmissions from one or multiple access points. The downlink transmission from each access point may include overhead data intended to be received by multiple user terminals, user-specific data intended to be received by specific user terminals, other types of data, or any combination thereof. The overhead data may include pilot, page and broadcast messages, system parameters, and so on.

The MIMO WLAN system is based on a centralized controller network architecture. Thus, a system controller 130 couples to access points 110 and may further couple to other systems and networks. For example, system controller 130 may couple to a packet data network (PDN), a wired local area network (LAN), a wide area network (WAN), the Internet, a public switched telephone network (PSTN), a cellular communication network, and so on. System controller 130 may be designed to perform a number of functions such as (1) coordination and control for the access points coupled to it, (2) routing of data among these access points, (3) access and control of communication with the user terminals served by these access points, and so on.

The MIMO WLAN system may be able to provide high throughput with significantly greater coverage capability than conventional WLAN systems. The MIMO WLAN system can support synchronous, asynchronous, and isochronous data/voice services. The MIMO WLAN system may be designed to provide the following features:

High service reliability

Guaranteed quality of service (QoS)

High instantaneous data rates

High spectral efficiency

Extended coverage range.

The MIMO WLAN system may be operated in various frequency bands (e.g., the 2.4 GHz and 5.x GHz U-NII bands), subject to the bandwidth and emission constraints specific to the selected operating band. The system is designed to support both indoor and outdoor deployments, with typical maximum cell size of 1 km or less. The system supports fixed terminal applications, although some operating modes also support portable and limited mobility operation.

MIMO, MISO, and SIMO

In a specific embodiment and as described throughout the specification, each access point is equipped with four transmit and receive antennas for data transmission and reception, where the same four antennas are used to transmit and to receive. The system also supports the case where the transmit and receive antennas of the device (e.g. access point, user terminal) are not shared, even though this configuration normally provides lower performance than when the antennas are shared. The MIMO WLAN system may also be designed such that each access point is equipped with some other number of transmit/receive antennas. Each user terminal may be equipped with a single transmit/receive antenna or multiple transmit/receive antennas for data transmission and reception. The number of antennas employed by each user terminal type may be dependent on various factors such as, for example, the services to be supported by the user terminal (e.g., voice, data, or both), cost considerations, regulatory constraints, safety issues, and so on.

For a given pairing of multi-antenna access point and multi-antenna user terminal, a MIMO channel is formed by the NT transmit antennas and NR receive antennas available for use for data transmission. Different MIMO channels are formed between the access point and different multi-antenna user terminals. Each MIMO channel may be decomposed into NS spatial channels, with $N_S \leq \min \{N_T, N_R\}$. NS data streams may be transmitted on the NS spatial channels. Spatial processing is required at a receiver and may or may not be performed at a transmitter in order to transmit multiple data streams on the NS spatial channels.

The NS spatial channels may or may not be orthogonal to one another. This depends on various factors such as (1) whether or not spatial processing was performed at the transmitter to obtain orthogonal spatial channels and (2) whether or not the spatial processing at both the transmitter and the receiver was successful in orthogonalizing the spatial channels. If no spatial processing is performed at the transmitter, then the NS spatial channels may be formed with NS transmit antennas and are unlikely to be orthogonal to one another.

The NS spatial channels may be orthogonalized by performing decomposition on a channel response matrix for the MIMO channel, as described below. Each spatial channel is referred to as an eigenmode of the MIMO channel if the NS spatial channels are orthogonalized using decomposition, which requires spatial processing at both the transmitter and the receiver, as described below. In this case, NS data streams may be transmitted orthogonally on the NS eigenmodes. However, an eigenmode normally refers to a theoretical construct. The NS spatial channels are typically not completely orthogonal to one another due to various reasons. For example, the spatial channels would not be orthogonal if (1) the transmitter has no knowledge of the MIMO channel or (2) the transmitter and/or receiver have imperfect estimate of the MIMO channel. For simplicity, in the following description, the term "eigenmode" is used to denote the case where an attempt is made to orthogonalize the spatial channels using decomposition, even though the attempt may not be fully successful due to, for example, an imperfect channel estimate.

For a given number of (e.g., four) antennas at the access point, the number of spatial channels available for each user terminal is dependent on the number of antennas employed by that user terminal and the characteristics of the wireless MIMO channel that couples the access point antennas and the user terminal antennas. If a user terminal is equipped with one antenna, then the four antennas at the access point and the single antenna at the user terminal form a multiple-input single-output (MISO) channel for the downlink and a single-input multiple-output (SIMO) channel for the uplink.

The MIMO WLAN system may be designed to support a number of transmission modes. Table 1 lists the transmission modes supported by an exemplary design of the MIMO WLAN system.

TABLE 1

| Transmission modes | Description |
|---|---|
| SIMO | Data is transmitted from a single antenna but may be received by multiple antennas for receive diversity. |
| Diversity | Data is redundantly transmitted from multiple transmit antennas and/or multiple subbands to provide diversity. |
| Beam-steering | Data is transmitted on a single (best) spatial channel at full power using phase steering information for the principal eigenmode of the MIMO channel. |
| Spatial multiplexing | Data is transmitted on multiple spatial channels to achieve higher spectral efficiency. |

For simplicity, the term "diversity" refers to transmit diversity in the following description, unless noted otherwise.

The transmission modes available for use for the downlink and uplink for each user terminal are dependent on the number of antennas employed at the user terminal. Table 2 lists the transmission modes available for different terminal types for the downlink and uplink, assuming multiple (e.g., four) antennas at the access point.

TABLE 2

| | Downlink | | Uplink | |
|---|---|---|---|---|
| Transmission modes | Single-antenna user terminal | Multi-antenna user terminal | Single-antenna user terminal | Multi-antenna user terminal |
| MISO (on downlink)/ SIMO (on uplink) | X | X | X | X |
| Diversity | X | X | | X |
| Beam-steering | X | X | | X |
| Spatial multiplexing | | X | | X |

For the downlink, all of the transmission modes except for the spatial multiplexing mode may be used for single-antenna user terminals, and all transmission modes may be used for multi-antenna user terminals. For the uplink, all transmission modes may be used by multi-antenna user terminals, while single-antenna user terminals use the SIMO mode to transmit data from the one available antenna. Receive diversity (i.e., receiving a data transmission with multiple receive antennas) may be used for the SIMO, diversity, and beam-steering modes.

The MIMO WLAN system may also be designed to support various other transmission modes, and this is within the scope of the invention. For example, a beam-forming mode may be used to transmit data on a single eigenmode using both the amplitude and phase information for the eigenmode (instead of only the phase information, which is all that is used by the beam-steering mode). As another example, a "non-steered" spatial multiplexing mode can be defined whereby the transmitter simply transmits multiple data streams from multiple transmit antennas (without any spatial processing) and the receiver performs the necessary spatial processing to isolate and recover the data streams sent from the multiple transmit antennas. As yet another example, a "multi-user" spatial multiplexing mode can be defined whereby the access point transmits multiple data streams from multiple transmit antennas (with spatial processing) to multiple user terminals concurrently on the downlink. As yet another example, a spatial multiplexing mode can be defined whereby the transmitter performs spatial processing to attempt to orthogonalize the multiple data streams sent on the multiple transmit antennas (but may not be completely successful because of an imperfect channel estimate) and the receiver performs the necessary spatial processing to isolate and recover the data streams sent from the multiple transmit antennas. Thus, the spatial processing to transmit multiple data streams via multiple spatial channels may be performed (1) at both the transmitter and receiver, (2) at only the receiver, or (3) at only the transmitter. Different spatial multiplexing modes may be used depending on, for example, the capabilities of the access point and the user terminals, the available channel state information, system requirements, and so on.

In general, the access points and user terminals may be designed with any number of transmit and receive antennas. For clarity, specific embodiments and designs are described below whereby each access point is equipped with four transmit/receive antennas, and each user terminal is equipped with four or less transmit/receive antennas.

OFDM

In an embodiment, the MIMO WLAN system employs OFDM to effectively partition the overall system bandwidth into a number of (NF) orthogonal subbands. These subbands are also referred to as tones, bins, or frequency channels. With OFDM, each subband is associated with a respective subcarrier that may be modulated with data. For a MIMO system that utilizes OFDM, each spatial channel of each subband may be viewed as an independent transmission channel where the complex gain associated with each subband is effectively constant across the subband bandwidth.

In an embodiment, the system bandwidth is partitioned into 64 orthogonal subbands (i.e., $N_F$=64), which are assigned indices of −32 to +31. Of these 64 subbands, 48 subbands (e.g., with indices of ±{1, ..., 6, 8, ..., 20, 22, ..., 26}) are used for data, 4 subbands (e.g., with indices of ±{7, 21}) are used for pilot and possibly signaling, the DC subband (with index of 0) is not used, and the remaining subbands are also not used and serve as guard subbands. This OFDM subband structure is described in further detail in a document for IEEE Standard 802.11a and entitled "Part 11: Wireless LAN Medium Access Control (MAC) and Physical Layer (PHY) Specifications: High-speed Physical Layer in the 5 GHz Band," Sept. 1999, which is publicly available and incorporated herein by reference. Different numbers of subbands and various other OFDM subband structures may also be implemented for the MIMO WLAN system, and this is within the scope of the invention. For example, all 53 subbands with indices from −26 to +26 may be used for data transmission. As another example, a 128-subband structure, a 256-subband structure, or a subband structure with some other number of subbands may be used. For clarity, the MIMO WLAN system is described below with the 64-subband structure described above.

For OFDM, the data to be transmitted on each subband is first modulated (i.e., symbol mapped) using a particular modulation scheme selected for use for that subband. Zeros are provided for the unused subbands. For each symbol period, the modulation symbols and zeros for all NF subbands are transformed to the time domain using an inverse fast Fourier transform (IFFT) to obtain a transformed symbol that contains NF time-domain samples. The duration of each transformed symbol is inversely related to the bandwidth of each subband. In one specific design for the MIMO WLAN system, the system bandwidth is 20 MHz, $N_F$=64, the bandwidth of each subband is 312.5 KHz, and the duration of each transformed symbol is 3.2 μsec.

OFDM can provide certain advantages, such as the ability to combat frequency selective fading, which is characterized by different channel gains at different frequencies of the overall system bandwidth. It is well known that frequency selective fading causes inter-symbol interference (ISI), which is a phenomenon whereby each symbol in a received signal acts as distortion to subsequent symbols in the received signal. The ISI distortion degrades performance by impacting the ability to correctly detect the received symbols. Frequency selective fading can be conveniently combated with OFDM by repeating a portion of (or appending a cyclic prefix to) each transformed symbol to form a corresponding OFDM symbol, which is then transmitted.

The length of the cyclic prefix (i.e., the amount to repeat) for each OFDM symbol is dependent on the delay spread of the wireless channel. In particular, to effectively combat ISI, the cyclic prefix should be longer than the maximum expected delay spread for the system.

In an embodiment, cyclic prefixes of different lengths may be used for the OFDM symbols, depending on the expected delay spread. For the specific MIMO WLAN system described above, a cyclic prefix of 400 nsec (8 samples) or 800 nsec (16 samples) may be selected for use for the OFDM symbols. A "short" OFDM symbol uses the 400 nsec cyclic prefix and has a duration of 3.6 μsec. A "long" OFDM symbol uses the 800 nsec cyclic prefix and has a duration of 4.0 μsec. Short OFDM symbols may be used if the maximum expected delay spread is 400 nsec or less, and long OFDM symbols may be used if the delay spread is greater than 400 nsec. Different cyclic prefixes may be selected for use for different transport channels, and the cyclic prefix may also be dynamically selectable, as described below. Higher system throughput may be achieved by using the shorter cyclic prefix when possible, since more OFDM symbols of shorter duration can be transmitted over a given fixed time interval.

The MIMO WLAN system may also be designed to not utilize OFDM, and this is within the scope of the invention.

Layer Structure

Figure 2:
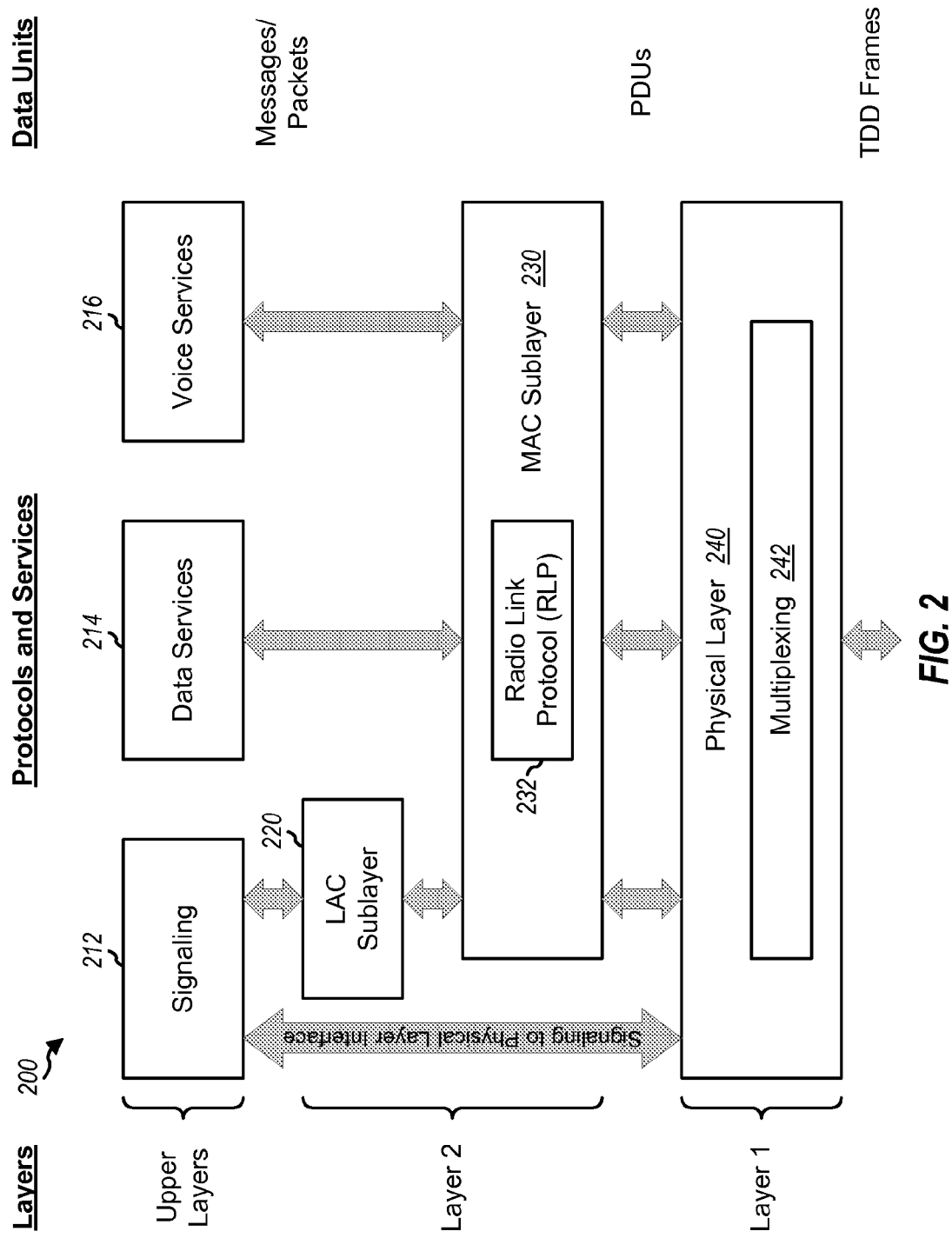
FIG. 2 shows a layer structure for the MIMO WLAN system.

FIG. 2 illustrates a layer structure 200 that may be used for the MIMO WLAN system. Layer structure 200 includes (1) applications and upper layer protocols that approximately correspond to Layer 3 and higher of the ISO/OSI reference model (upper layers), (2) protocols and services that correspond to Layer 2 (the link layer), and (3) protocols and services that correspond to Layer 1 (the physical layer).

The upper layers includes various applications and protocols, such as signaling services 212, data services 214, voice services 216, circuit data applications, and so on. Signaling is typically provided as messages and data is typically provided as packets. The services and applications in the upper layers originate and terminate messages and packets according to the semantics and timing of the communication protocol between the access point and the user terminal. The upper layers utilize the services provided by Layer 2.

Layer 2 supports the delivery of messages and packets generated by the upper layers. In the embodiment shown in FIG. 2, Layer 2 includes a Link Access Control (LAC) sublayer 220 and a Medium Access Control (MAC) sublayer 230. The LAC sublayer implements a data link protocol that provides for the correct transport and delivery of messages generated by the upper layers. The LAC sublayer utilizes the services provided by the MAC sublayer and Layer 1. The MAC sublayer is responsible for transporting messages and packets using the services provided by Layer 1. The MAC sublayer controls the access to Layer 1 resources by the applications and services in the upper layers. The MAC sublayer may include a Radio Link Protocol (RLP) 232, which is a retransmission mechanism that may be used to provide higher reliability for packet data. Layer 2 provides protocol data units (PDUs) to Layer 1.

Layer 1 comprises physical layer 240 and supports the transmission and reception of radio signals between the access point and user terminal. The physical layer performs coding, interleaving, modulation, and spatial processing for various transport channels used to send messages and packets generated by the upper layers. In this embodiment, the physical layer includes a multiplexing sublayer 242 that multiplexes processed PDUs for various transport channels into the proper frame format. Layer 1 provides data in units of frames.

FIG. 2 shows a specific embodiment of a layer structure that may be used for the MIMO WLAN system. Various other suitable layer structures may also be designed and used for the MIMO WLAN system, and this is within the scope of the invention. The functions performed by each layer are described in further detail below where appropriate.

Transport Channels

A number of services and applications may be supported by the MIMO WLAN system. Moreover, other data required for proper system operation may need to be sent by the access point or exchanged between the access point and user terminals. A number of transport channels may be defined for the MIMO WLAN system to carry various types of data. Table 3 lists an exemplary set of transport channels and also provides a brief description for each transport channel.

TABLE 3

| Transport channels | | Description |
|---|---|---|
| Broadcast channel | BCH | Used by the access point to transmit pilot and system parameters to the user terminals. |
| Forward control channel | FCCH | Used by the access point to allocate resources on the downlink and uplink. The resource allocation may be performed on a frame-by-frame basis. Also used to provide acknowledgment for messages received on the RACH. |
| Forward channel | FCH | Used by the access point to transmit user-specific data to the user terminals and possibly a reference (pilot) used by the user terminals for channel estimation. May also be used in a broadcast mode to send page and broadcast messages to multiple user terminals. |
| Random access channel | RACH | Used by the user terminals to gain access to the system and send short messages to the access point. |
| Reverse channel | RCH | Used by the user terminals to transmit data to the access point. May also carry a reference used by the access point for channel estimation. |

As shown in Table 3, the downlink transport channels used by the access point include the BCH, FCCH, and FCH. The uplink transport channels used by the user terminals include the RACH and RCH. Each of these transport channels is described in further detail below.

The transport channels listed in Table 3 represent a specific embodiment of a channel structure that may be used for the MIMO WLAN system. Fewer, additional, and/or different transport channels may also be defined for use for the MIMO WLAN system. For example, certain functions may be supported by function-specific transport channels (e.g., pilot, paging, power control, and sync channel channels). Thus, other channel structures with different sets of transport channels may be defined and used for the MIMO WLAN system, and this is within the scope of the invention.

Frame Structures

A number of frame structures may be defined for the transport channels. The specific frame structure to use for the MIMO WLAN system is dependent on various factors such as, for example, (1) whether the same or different frequency bands are used for the downlink and uplink and (2) the multiplexing scheme used to multiplex the transport channels together.

If only one frequency band is available, then the downlink and uplink may be transmitted on different phases of a frame using time division duplexing (TDD), as described below. If two frequency bands are available, then the downlink and uplink may be transmitted on different frequency bands using frequency division duplexing (FDD).

For both TDD and FDD, the transport channels may be multiplexed together using time division multiplexing (TDM), code division multiplexing (CDM), frequency division multiplexing (FDM), and so on. For TDM, each transport channel is assigned to a different portion of a frame. For CDM, the transport channels are transmitted concurrently but each transport channel is channelized by a different channelization code, similar to that performed in a code division multiple access (CDMA) system. For FDM, each transport channel is assigned a different portion of the frequency band for the link.

Table 4 lists the various frame structures that may be used to carry the transport channels. Each of these frame structures is described in further detail below. For clarity, the frame structures are described for the set of transport channels listed in Table 3.

TABLE 4

| | Shared frequency band for downlink and uplink | Separate frequency bands for downlink and uplink |
|---|---|---|
| Time division | TDD-TDM frame structure | FDD-TDM frame structure |
| Code division | TDD-CDM frame structure | FDD-CDM frame structure |

FIG. 3A illustrates an embodiment of a TDD-TDM frame structure 300a that may be used if a single frequency band is used for both the downlink and uplink. Data transmission occurs in units of TDD frames. Each TDD frame may be defined to span a particular time duration. The frame duration may be selected based on various factors such as, for example, (1) the bandwidth of the operating band, (2) the expected sizes of the PDUs for the transport channels, and so on. In general, a shorter frame duration may provide reduced delays. However, a longer frame duration may be more efficient since header and overhead may represent a smaller fraction of the frame. In a specific embodiment, each TDD frame has a duration of 2 msec.

Each TDD frame is partitioned into a downlink phase and an uplink phase. The downlink phase is further partitioned into three segments for the three downlink transport channels—the BCH, FCCH, and FCH. The uplink phase is further partitioned into two segments for the two uplink transport channels—the RCH and RACH.

The segment for each transport channel may be defined to have either a fixed duration or a variable duration that can change from frame to frame. In an embodiment, the BCH segment is defined to have a fixed duration, and the FCCH, FCH, RCH, and RACH segments are defined to have variable durations.

The segment for each transport channel may be used to carry one or more protocol data units (PDUs) for that transport channel. In the specific embodiment shown in FIG. 3A, a BCH PDU is transmitted in a first segment 310, an FCCH PDU is transmitted in a second segment 320, and one or more FCH PDUs are transmitted in a third segment 330 of the downlink phase. On the uplink phase, one or more RCH PDUs are transmitted in a fourth segment 340 and one or more RACH PDUs are transmitted in a fifth segment 350 of the TDD frame.

Frame structure 300a represents a specific arrangement of the various transport channels within a TDD frame. This arrangement can provide certain benefits such as reduced delays for data transmission on the downlink and uplink. The BCH is transmitted first in the TDD frame since it carries system parameters that may be used for the PDUs of the other transport channels within the same TDD frame. The FCCH is transmitted next since it carries channel assignment information indicative of which user terminal(s) are designated to receive downlink data on the FCH and which user terminal(s) are designated to transmit uplink data on the RCH within the current TDD frame. Other TDD-TDM frame structures may also be defined and used for the MIMO WLAN system, and this is within the scope of the invention.

FIG. 3B illustrates an embodiment of an FDD-TDM frame structure 300b that may be used if the downlink and uplink are transmitted using two separate frequency bands. Downlink data is transmitted in a downlink frame 302a, and uplink data is transmitted in an uplink frame 302b. Each downlink and uplink frame may be defined to span a particular time duration (e.g., 2 msec). For simplicity, the downlink and uplink frames may be defined to have the same duration and may further be defined to be aligned at the frame boundaries. However, different frame durations and/or non-aligned (i.e., offset) frame boundaries may also be used for the downlink and uplink.

As shown in FIG. 3B, the downlink frame is partitioned into three segments for the three downlink transport channels. The uplink frame is partitioned into two segments for the two uplink transport channels. The segment for each transport channel may be defined to have a fixed or variable duration, and may be used to carry one or more PDUs for that transport channel.

In the specific embodiment shown in FIG. 3B, the downlink frame carries a BCH PDU, an FCCH PDU, and one or more FCH PDUs in segments 310, 320, and 330, respectively. The uplink frame carries one or more RCH PDUs and one or more RACH PDUs in segments 340 and 350, respectively. This specific arrangement may provide the benefits described above (e.g., reduced delays for data transmission). The transport channels may have different PDU formats, as described below. Other FDD-TDM frame structures may also be defined and used for the MIMO WLAN system, and this is within the scope of the invention.

FIG. 3C illustrates an embodiment of an FDD-CDM/FDM frame structure 300c that may also be used if the downlink and uplink are transmitted using separate frequency bands. Downlink data may be transmitted in a downlink frame 304a, and uplink data may be transmitted in an uplink frame 304b. The downlink and uplink frames may be defined to have the same duration (e.g., 2 msec) and aligned at the frame boundaries.

As shown in FIG. 3C, the three downlink transport channels are transmitted concurrently in the downlink frame, and the two uplink transport channels are transmitted concurrently in the uplink frame. For CDM, the transport channels for each link are "channelized" with different channelization codes, which may be Walsh codes, orthogonal variable spreading factor (OVSF) codes, quasi-orthogonal functions (QOF), and so on. For FDM, the transport channels for each link are assigned different portions of the frequency band for the link. Different amounts of transmit power may also be used for different transport channels in each link.

Other frame structures may also be defined for the downlink and uplink transport channels, and this is within the scope of the invention. Moreover, it is possible to use different types of frame structure for the downlink and uplink. For example, a TDM-based frame structure may be used for the downlink and a CDM-based frame structure may be used for the uplink.

In the following description, the MIMO WLAN system is assumed to use one frequency band for both downlink and uplink transmissions. For clarity, the TDD-TDM frame structure shown in FIG. 3A is used for the MIMO WLAN system. For clarity, a specific implementation of the TDD-TDM frame structure is described throughout the specification. For this implementation, the duration of each TDD frame is fixed at 2 msec, and the number of OFDM symbols per TDD frame is a function of the length of the cyclic prefix used for the OFDM symbols. The BCH has a fixed duration of 80 μsec and uses the 800 nsec cyclic prefix for the OFDM symbols transmitted. The remainder of the TDD frame contains 480 OFDM symbols if the 800 nsec cyclic prefix is used, and 533 OFDM symbols plus 1.2 μsec of excess time if the 400 nsec cyclic prefix is used. The excess time can be added to the guard interval at the end of the RACH segment. Other frame structures and other implementations may also be used, and this is within the scope of the invention.

Transport Channels

The transport channels are used to send various types of data and may be categorized into two groups: common transport channels and dedicated transport channels. Because the common and dedicated transport channels are used for different purposes, different processing may be used for these two groups of transport channels, as described in further detail below.

Common Transport Channels

The common transport channels include the BCH, FCCH, and RACH. These transport channels are used to send data to or receive data from multiple user terminals. For improved reliability, the BCH and FCCH are transmitted by the access point using the diversity mode. On the uplink, the RACH is transmitted by the user terminals using the beam-steering mode (if supported by the user terminal). The BCH is operated at a known fixed rate so that the user terminals can receive and process the BCH without any additional information. The FCCH and RACH support multiple rates to allow for greater efficiency. As used herein, each "rate" or "rate set" is associated with a particular code rate (or coding scheme) and a particular modulation scheme.

Dedicated Transport Channels

The dedicated transport channels include the FCH and RCH. These transport channels are normally used to send user-specific data to or by specific user terminals. The FCH and RCH may be dynamically allocated to the user terminals as necessary and as available. The FCH may also be used in a broadcast mode to send overhead, page, and broadcast messages to the user terminals. In general, the overhead, page, and broadcast messages are transmitted prior to any user-specific data on the FCH.

Figure 4:
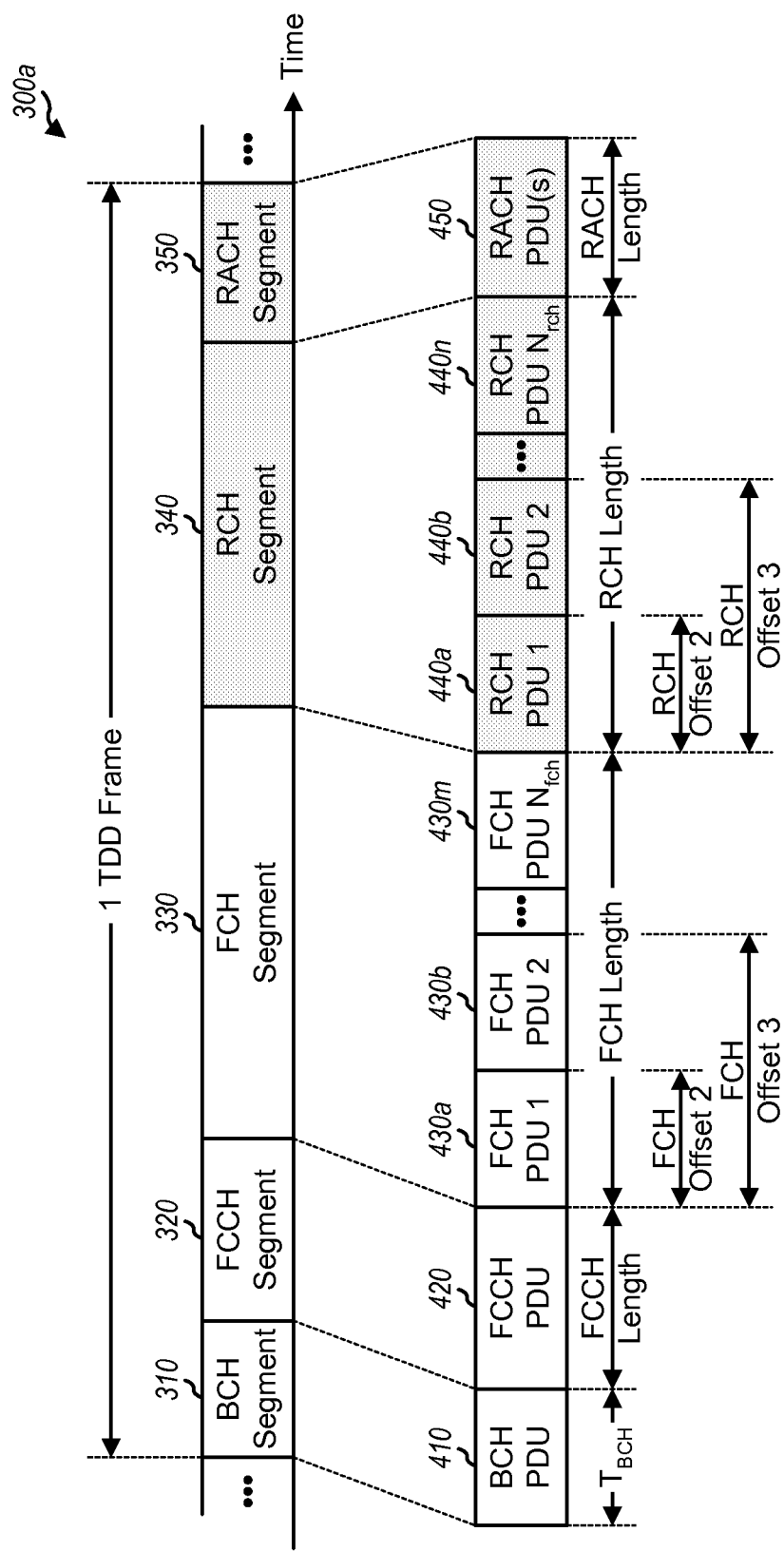
FIG. 4 shows the TDD-TDM frame structure with five transport channels—BCH, FCCH, FCH, RCH, and RACH.

FIG. 4 illustrates an exemplary transmission on the BCH, FCCH, FCH, RCH, and RACH based on TDD-TDM frame structure 300a. In this embodiment, one BCH PDU 410 and one FCCH PDU 420 are transmitted in BCH segment 310 and FCCH segment 320, respectively. FCH segment 330 may be used to send one or more FCH PDUs 430a-430m, each of which may be intended for a specific user terminal or multiple user terminals. Similarly, one or more RCH PDUs 440a-440n may be sent by one or more user terminals in RCH segment 340. The start of each FCH/RCH PDU is indicated by an FCH/RCH offset from the end of the preceding segment. A number of RACH PDUs 450 may be sent in RACH segment 350 by a number of user terminals to access the system and/or to send short messages, as described below.

For clarity, the transport channels are described for the specific TDD-TDM frame structure shown in FIGS. 3A and 4.

Broadcast Channel (BCH)—Downlink

The BCH is used by the access point to transmit a beacon pilot, a MIMO pilot, and system parameters to the user terminals. The beacon pilot is used by the user terminals to acquire system timing and frequency. The MIMO pilot is used by the user terminals to estimate the MIMO channel formed by the access point antennas and their own antennas. The beacon and MIMO pilots are described in further detail below. The system parameters specify various attributes of the downlink and uplink transmissions. For example, since the durations of the FCCH, FCH, RACH, and RCH segments are variable, the system parameters that specify the length of each of these segments for the current TDD frame are sent in the BCH.

Figure 5A:
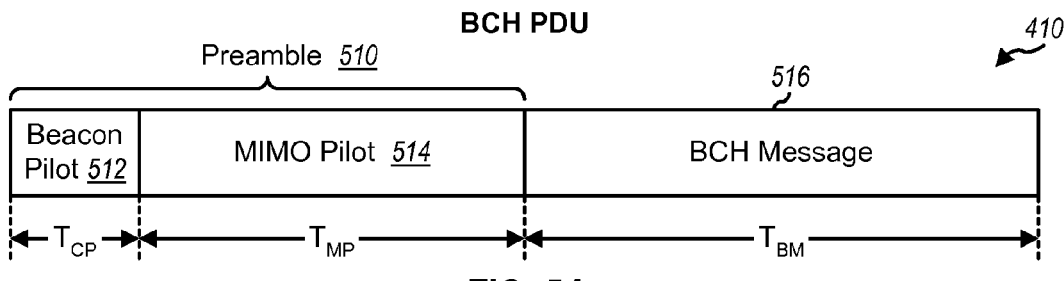
FIGS. 5A through 5G show various protocol data unit (PDU) formats for the five transport channels.

FIG. 5A illustrates an embodiment of BCH PDU 410. In this embodiment, BCH PDU 410 includes a preamble portion 510 and a message portion 516. Preamble portion 510 further includes a beacon pilot portion 512 and a MIMO pilot portion 514. Portion 512 carries a beacon pilot and has a fixed duration of $T_{CP}=8$ μsec. Portion 514 carries a MIMO pilot and has a fixed duration of $T_{MP}=32$ μsec. Portion 516 carries a BCH message and has a fixed duration of $T_{BM}=40$ μsec. The duration of the BCH PDU is fixed at $T_{CP}+T_{MP}+T_{BM}=80$ μsec.

A preamble may be used to send one or more types of pilot and/or other information. A beacon pilot comprises a specific set of modulation symbols that is transmitted from all transmit antennas. A MIMO pilot comprises a specific set of modulation symbols that is transmitted from all transmit antennas with different orthogonal codes, which then allows the receivers to recover the pilot transmitted from each antenna. Different sets of modulation symbols may be used for the beacon and MIMO pilots. The generation of the beacon and MIMO pilots is described in further detail below.

The BCH message carries system configuration information. Table 5 lists the various fields for an exemplary BCH message format.

TABLE 5

BCH Message

| Fields/ Parameter Names | Length (bits) | Description |
| --- | --- | --- |
| Frame Counter | 4 | TDD frame counter |
| Net ID | 10 | Network identifier (ID) |
| AP ID | 6 | Access point ID |
| AP Tx Lvl | 4 | Access point transmit level |
| AP Rx Lvl | 3 | Access point receive level |
| FCCH Length | 6 | Duration of FCCH (in units of OFDM symbols) |
| FCCH Rate | 2 | Physical layer rate of FCCH |
| FCH Length | 9 | Duration of FCH (in units of OFDM symbols) |
| RCH Length | 9 | Duration of RCH (in units of OFDM symbols) |
| RACH Length | 5 | Duration of RACH (in units of RACH slots) |
| RACH Slot Size | 2 | Duration of each RACH slot (in units of OFDM symbols) |
| RACH Guard Interval | 2 | Guard interval at the end of RACH |
| Cyclic Prefix Duration | 1 | Cyclic prefix duration |
| Page Bit | 1 | "0" = page message sent on FCH "1" = no page message sent |
| Broadcast Bit | 1 | "0" = broadcast message sent on FCH "1" = no broadcast message sent |
| RACH Acknowledgment Bit | 1 | "0" = RACH acknowledgment sent on FCH "1" = no RACH acknowledgment sent |
| CRC | 16 | CRC value for the BCH message |
| Tail Bits | 6 | Tail bits for convolutional encoder |
| Reserved | 32 | Reserved for future use |

The Frame Counter value may be used to synchronize various processes at the access point and user terminals (e.g., the pilot, scrambling codes, cover code, and so on). A frame counter may be implemented with a 4-bit counter that wraps around. This counter is incremented at the start of each TDD frame, and the counter value is included in the Frame Counter field. The Net ID field indicates the identifier (ID) of the network to which the access point belongs. The AP ID field indicates the ID of the access point within the network ID. The AP Tx Lvl and AP Rx Lvl fields indicate the maximum transmit power level and the desired receive power level at the access point, respectively. The desired receive power level may be used by the user terminal to determine the initial uplink transmit power.

The FCCH Length, FCH Length, and RCH Length fields indicate the lengths of the FCCH, FCH, and RCH segments, respectively, for the current TDD frame. The lengths of these segments are given in units of OFDM symbols. The OFDM symbol duration for the BCH is fixed at 4.0 μsec. The OFDM symbol duration for all other transport channels (i.e., the FCCH, FCH, RACH, and RCH) is variable and depends on the selected cyclic prefix, which is specified by the Cyclic Prefix Duration field. The FCCH Rate field indicates the rate used for the FCCH for the current TDD frame.

The RACH Length field indicates the length of the RACH segment, which is given in units of RACH slots. The duration of each RACH slot is given by the RACH Slot Size field, in units of OFDM symbols. The RACH Guard Interval field indicates the amount of time between the last RACH slot and the start of the BCH segment for the next TDD frame. These various fields for the RACH are described in further detail below.

The Page Bit and Broadcast Bit indicate whether or not page messages and broadcast messages, respectively, are being sent on the FCH in the current TDD frame. These two bits may be set independently for each TDD frame. The RACH Acknowledgment Bit indicates whether or not acknowledgments for PDUs sent on the RACH in prior TDD frames are being sent on the FCCH in the current TDD frame.

The CRC field includes a CRC value for the entire BCH message. This CRC value may be used by the user terminals to determine whether the received BCH message is decoded correctly (i.e., good) or in error (i.e., erased). The Tail Bits field includes a group of zeros used to reset the convolutional encoder to a known state at the end of the BCH message.

As shown in Table 5, the BCH message includes a total of 120 bits. These 120 bits may be transmitted with 10 OFDM symbols using the processing described in detail below.

Table 5 shows a specific embodiment of the format for the BCH message. Other BCH message formats with fewer, additional, and/or different fields may also be defined and used, and this is within the scope of the invention.

Forward Control Channel (FCCH)—Downlink

In an embodiment, the access point is able to allocate resources for the FCH and RCH on a per frame basis. The FCCH is used by the access point to convey the resource allocation for the FCH and RCH (i.e., the channel assignments).

Figure 5B:
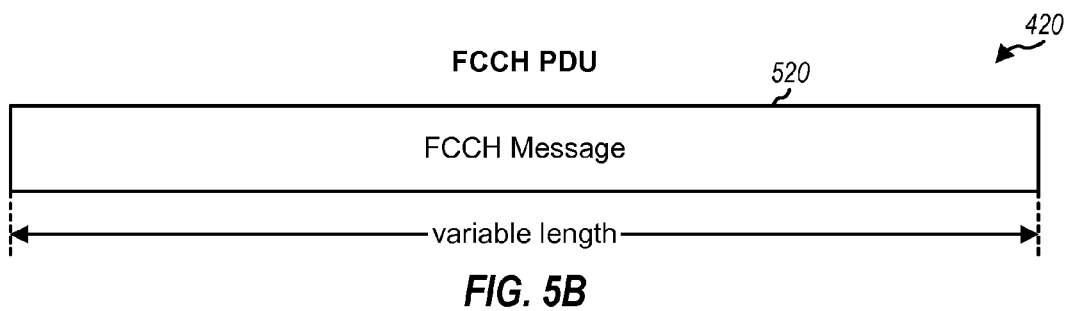

FIG. 5B illustrates an embodiment of FCCH PDU 420. In this embodiment, the FCCH PDU includes only a portion 520 for an FCCH message. The FCCH message has a variable duration that can change from frame to frame, depending on the amount of scheduling information being carried on the FCCH for that frame. The FCCH message duration is in even number of OFDM symbols and given by the FCCH Length field on the BCH message. The duration of messages sent using the diversity mode (e.g., BCH and FCCH messages) is given in even number of OFDM symbols because the diversity mode transmits OFDM symbols in pairs, as described below.

In an embodiment, the FCCH can be transmitted using four possible rates. The specific rate used for the FCCH PDU in each TDD frame is indicated by the FCCH Phy Mode field in the BCH message. Each FCCH rate corresponds to a particular code rate and a particular modulation scheme and is further associated with a particular transmission mode, as shown in Table 26.

An FCCH message may include zero, one, or multiple information elements (IEs). Each information element may be associated with a specific user terminal and may be used to provide information indicative of the assignment of FCH/RCH resources for that user terminal. Table 6 lists the various fields for an exemplary FCCH message format.

TABLE 6

FCCH Message

| Fields/Parameter Names | Length (bits) | Description |
| --- | --- | --- |
| N_IE | 6 | Number of IEs included in the FCCH message |
| N_IE information elements, each including: | | |
| IE Type | 4 | IE type |
| MAC ID | 10 | ID assigned to the user terminal |
| Control Fields | 48 or 72 | Control fields for channel assignment |
| Padding Bits | Variable | Pad bits to achieve even number of OFDM symbols in the FCCH message |
| CRC | 16 | CRC value for the FCCH message |
| Tail Bits | 6 | Tail bits for convolutional encoder |

The N_IE field indicates the number of information elements included in the FCCH message sent in the current TDD frame. For each information element (IE) included in the FCCH message, the IE Type field indicates the particular type of this IE. A number of IE types are defined for use to allocate resources for different types of transmissions, as described below.

The MAC ID field identifies the specific user terminal for which the information element is intended. Each user terminal registers with the access point at the start of a communication session and is assigned a unique MAC ID by the access point. This MAC ID is used to identify the user terminal during the session.

The Control Fields are used to convey channel assignment information for the user terminal and are described in detail below. The Padding Bits field includes a sufficient number of padding bits so that the overall length of the FCCH message is an even number of OFDM symbols. The FCCH CRC field includes a CRC value that may be used by the user terminals to determine whether the received FCCH message is decoded correctly or in error. The Tail Bits field includes zeros used to reset the convolutional encoder to a known state at the end of the FCCH message. Some of these fields are described in further detail below.

A number of transmission modes are supported by the MIMO WLAN system for the FCH and RCH, as indicated in Table 1. Moreover, a user terminal may be active or idle during a connection. Thus, a number of types of IE are defined for use to allocate FCH/RCH resources for different types of transmissions. Table 7 lists an exemplary set of IE types.

TABLE 7

FCCH IE Types

| IE Type | IE Size (bits) | IE Type | Description |
| --- | --- | --- | --- |
| 0 | 48 | Diversity Mode | Diversity mode only |
| 1 | 72 | Spatial Multiplexing Mode | Spatial multiplexing mode - variable rate services |
| 2 | 48 | Idle Mode | Idle state - variable rate services |
| 3 | 48 | RACH Acknowledgment | RACH acknowledgment - diversity mode |
| 4 | — | Beam Steering Mode | Beam steering mode |
| 5-15 | — | Reserved | Reserved for future use |

For IE types 0, 1 and 4, resources are allocated to a specific user terminal for both the FCH and RCH (i.e., in channel pairs). For IE type 2, minimal resources are allocated to the user terminal on the FCH and RCH to maintain up-to-date estimate of the link. An exemplary format for each IE type is described below. In general, the rates and durations for the FCH and RCH can be independently assigned to the user terminals.

IE Type 0, 4—Diversity/Beam-Steering Mode

IE type 0 and 4 are used to allocate FCH/RCH resources for the diversity and beam-steering modes, respectively. For fixed low-rate services (e.g., voice), the rate remains fixed for the duration of the call. For variable rate services, the rate may be selected independently for the FCH and RCH. The FCCH IE indicates the location of the FCH and RCH PDUs assigned to the user terminal. Table 8 lists the various fields of an exemplary IE Type 0 and 4 information element.

TABLE 8

FCCH IE Type 0 and 4

| Fields/Parameter Names | Length (bits) | Description |
|---|---|---|
| IE Type | 4 | IE type |
| MAC ID | 10 | Temporary ID assigned to the user terminal |
| FCH Offset | 9 | FCH offset from start of the TDD frame (in OFDM symbols) |
| FCH Preamble Type | 2 | FCH preamble size (in OFDM symbols) |
| FCH Rate | 4 | Rate for the FCH |
| RCH Offset | 9 | RCH offset from start of the TDD frame (in OFDM symbols) |
| RCH Preamble Type | 2 | RCH preamble size (in OFDM symbols) |
| RCH Rate | 4 | Rate for the RCH |
| RCH Timing Adjustment | 2 | Timing adjustment parameter for RCH |
| RCH Power Control | 2 | Power control bits for RCH |

The FCH and RCH Offset fields indicate the time offset from the beginning of the current TDD frame to the start of the FCH and RCH PDUs, respectively, assigned by the information element. The FCH and RCH Rate fields indicate the rates for the FCH and RCH, respectively.

The FCH and RCH Preamble Type fields indicate the size of the preamble in the FCH and RCH PDUs, respectively. Table 9 lists the values for the FCH and RCH Preamble Type fields and the associated preamble sizes.

TABLE 9

Preamble Type

| Type | Bits | Preamble Size |
|---|---|---|
| 0 | 00 | 0 OFDM symbol |
| 1 | 01 | 1 OFDM symbol |
| 2 | 10 | 4 OFDM symbols |
| 3 | 11 | 8 OFDM symbols |

The RCH Timing Adjustment field includes two bits used to adjust the timing of the uplink transmission from the user terminal identified by the MAC ID field. This timing adjustment is used to reduce interference in a TDD-based frame structure (such as the one shown in FIG. 3A) where the downlink and uplink transmissions are time division duplexed. Table 10 lists the values for the RCH Timing Adjustment field and the associated actions.

TABLE 10

RCH Timing Adjustment

| Bits | Description |
|---|---|
| 00 | Maintain current timing |
| 01 | Advance uplink transmit timing by 1 sample |
| 10 | Delay uplink transmit timing by 1 sample |
| 11 | Not used |

The RCH Power Control field includes two bits used to adjust the transmit power of the uplink transmission from the identified user terminal. This power control is used to reduce interference on the uplink. Table 11 lists the values for the RCH Power Control field and the associated actions.

TABLE 11

RCH Power Control

| Bits | Description |
|---|---|
| 00 | Maintain current transmit power |
| 01 | Increase uplink transmit power by δ dB, where δ is a system parameter. |
| 10 | Decrease uplink transmit power by δ dB, where δ is a system parameter. |
| 11 | Not used |

The channel assignment for the identified user terminal may be provided in various manners. In an embodiment, the user terminal is assigned FCH/RCH resources for only the current TDD frame. In another embodiment, the FCH/RCH resources are assigned to the terminal for each TDD frame until canceled. In yet another embodiment, the FCH/RCH resources are assigned to the user terminal for every n-th TDD frame, which is referred to as "decimated" scheduling of TDD frames. The different types of assignment may be indicated by an Assignment Type field in the FCCH information element.

IE Type 1—Spatial Multiplexing Mode

IE type 1 is used to allocate FCH/RCH resources to user terminals using the spatial multiplexing mode. The rate for these user terminals is variable, and may be selected independently for the FCH and RCH. Table 12 lists the various fields of an exemplary IE type 1 information element.

TABLE 12

FCCH IE Type 1

| Fields/Parameter Names | Length (bits) | Description |
|---|---|---|
| IE Type | 4 | IE type |
| MAC ID | 10 | Temporary ID assigned to the user terminal |
| FCH Offset | 9 | FCH offset from end of FCCH (in OFDM symbols) |
| FCH Preamble Type | 2 | FCH preamble size (in OFDM symbols) |
| FCH Spatial Channel 1 Rate | 4 | Rate for the FCH for spatial channel 1 |
| FCH Spatial Channel 2 Rate | 4 | Rate for the FCH for spatial channel 2 |
| FCH Spatial Channel 3 Rate | 4 | Rate for the FCH for spatial channel 3 |
| FCH Spatial Channel 4 Rate | 4 | Rate for the FCH for spatial channel 4 |
| RCH Offset | 9 | RCH offset from end of FCH (in OFDM symbols) |
| RCH Preamble Type | 2 | RCH preamble size (in OFDM symbols) |
| RCH Spatial Channel 1 Rate | 4 | Rate for the RCH for spatial channel 1 |
| RCH Spatial Channel 2 Rate | 4 | Rate for the RCH for spatial channel 2 |
| RCH Spatial Channel 3 Tate | 4 | Rate for the RCH for spatial channel 3 |

TABLE 12-continued

FCCH IE Type 1

| Fields/<br>Parameter Names | Length<br>(bits) | Description |
|---|---|---|
| RCH Spatial Channel 4 Rate | 4 | Rate for the RCH for spatial channel 4 |
| RCH Timing Adjustment | 2 | Timing adjustment parameter for RCH |
| Reserved | 2 | Reserved for future use |

For IE type 1, the rate for each spatial channel may be selected independently on the FCH and RCH. The interpretation of the rates for the spatial multiplexing mode is general in that it can specify the rate per spatial channel (e.g., for up to four spatial channels for the embodiment shown in Table 12). The rate is given per eigenmode if the transmitter performs spatial processing to transmit data on the eigenmodes. The rate is given per antenna if the transmitter simply transmits data from the transmit antennas and the receiver performs the spatial processing to isolate and recover the data (for the non-steered spatial multiplexing mode).

The information element includes the rates for all enabled spatial channels and zeros for the ones not enabled. User terminals with less than four transmit antennas set the unused FCH/RCH Spatial Channel Rate fields to zero. Since the access point is equipped with four transmit/receive antennas, user terminals with more than four transmit antennas may use them to transmit up to four independent data streams.

IE Type 2—Idle Mode

IE type 2 is used to provide control information for user terminals operating in an Idle state (described below). In an embodiment, when a user terminal is in the Idle state, steering vectors used by the access point and user terminal for spatial processing are continually updated so that data transmission can start quickly if and when resumed. Table 13 lists the various fields of an exemplary IE type 2 information element.

TABLE 13

FCCH IE Type 2

| Fields/<br>Parameter Names | Length<br>(bits) | Description |
|---|---|---|
| IE Type | 4 | IE type |
| MAC ID | 10 | Temporary ID assigned to the user terminal |
| FCH Offset | 9 | FCH offset from end of FCCH (in OFDM symbols) |
| FCH Preamble Type | 2 | FCH preamble size (in OFDM symbols) |
| RCH Offset | 9 | RCH offset from end of FCH (in OFDM symbols) |
| RCH Preamble Type | 2 | RCH preamble size (in OFDM symbols) |
| Reserved | 12 | Reserved for future use |

IE Type 3—RACH Quick Acknowledgment

IE type 3 is used to provide quick acknowledgment for user terminals attempting to access the system via the RACH. To gain access to the system or to send a short message to the access point, a user terminal may transmit an RACH PDU on the uplink. After the user terminal sends the RACH PDU, it monitors the BCH to determine if the RACH Acknowledgement Bit is set. This bit is set by the access point if any user terminal was successful in accessing the system and an acknowledgment is being sent for at least one user terminal on the FCCH. If this bit is set, then the user terminal processes the FCCH for acknowledgment sent on the FCCH. IE Type 3 information elements are sent if the access point desires to acknowledge that it correctly decoded the RACH PDUs from the user terminals without assigning resources. Table 14 lists the various fields of an exemplary IE Type 3 information element.

TABLE 14

FCCH IE Type 3

| Fields/<br>Parameter Names | Length<br>(bits) | Description |
|---|---|---|
| IE Type | 4 | IE type |
| MAC ID | 10 | Temporary ID assigned to user terminal |
| Reserved | 34 | Reserved for future use |

A single or multiple types of acknowledgment may be defined and sent on the FCCH. For example, a quick acknowledgment and an assignment-based acknowledgment may be defined. A quick acknowledgment may be used to simply acknowledge that the RACH PDU has been received by the access point but that no FCH/RCH resources have been assigned to the user terminal. An assignment-based acknowledgment includes assignments for the FCH and/or RCH for the current TDD frame.

The FCCH may be implemented in other manners and may also be transmitted in various ways. In one embodiment, the FCCH is transmitted at a single rate that is signaled in the BCH message. This rate may be selected, for example, based on the lowest signal-to-noise-and-interference ratios (SNRs) of all user terminals for which the FCCH is being sent in the current TDD frame. Different rates may be used for different TDD frames depending on the channel conditions of the recipient user terminals in each TDD frame.

In another embodiment, the FCCH is implemented with multiple (e.g., four) FCCH subchannels. Each FCCH subchannel is transmitted at a different rate and is associated with a different required SNR in order to recover the subchannel. The FCCH subchannels are transmitted in order from lowest rate to highest rate. Each FCCH subchannel may or may not be transmitted in a given TDD frame. The first FCCH subchannel (with the lowest rate) is transmitted first and can be received by all user terminals. This FCCH subchannel can indicate whether or not each of the remaining FCCH subchannels will be transmitted in the current TDD frame. Each user terminal can process the transmitted FCCH subchannels to obtain its FCCH information element. Each user terminal can terminate processing of the FCCH if any of the following occurs: (1) failure to decode the current FCCH subchannel, (2) reception of its FCCH information element in the current FCCH subchannel, or (3) all transmitted FCCH subchannels have been processed. A user terminal can terminate processing of the FCCH as soon as it encounters FCCH decoding failure because the FCCH subchannels are transmitted at ascending rates and the user terminal is unlikely to be able to decode subsequent FCCH subchannels transmitted at higher rates.

Random Access Channel (RACH)—Uplink

The RACH is used by the user terminals to gain access to the system and to send short messages to the access point. The operation of the RACH is based on a slotted Aloha random access protocol, which is described below.

Figure 5C:
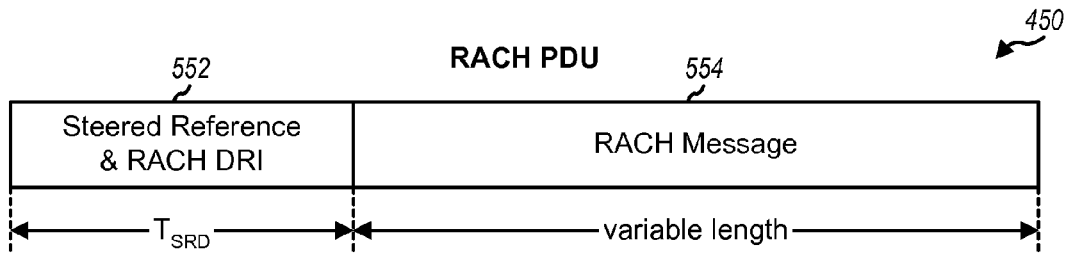

FIG. 5C illustrates an embodiment of RACH PDU 450. In this embodiment, the RACH PDU includes a preamble portion 552 and a message portion 554. Preamble portion 552 may be used to send a steered reference (i.e., a steered pilot), if the user terminal is equipped with multiple antennas. The steered reference is a pilot comprised of a specific set of modulation symbols that is subjected to spatial processing prior to transmission on the uplink. The spatial processing allows the pilot to be transmitted on a specific eigenmode of the MIMO channel. The processing for the steered reference is described in further detail below. Preamble portion 552 has a fixed duration of at least 2 OFDM symbols. Message portion 554 carries an RACH message and has a variable duration. The duration of the RACH PDU is thus variable.

In an embodiment, four different rates are supported for the RACH. The specific rate used for each RACH message is indicated by a 2-bit RACH data rate indicator (DRI), which is embedded in the preamble portion of the RACH PDU, as shown in FIG. 5C. In an embodiment, four different message sizes are also supported for the RACH. The size of each RACH message is indicated by a Message Duration field included in the RACH message. Each RACH rate supports 1, 2, 3 or all 4 message sizes. Table 15 lists the four RACH rates, their associated coding and modulation parameters, and the message sizes supported by these RACH rates.

TABLE 15

| | RACH Rates | | | RACH Message Sizes (in bits and OFDM symbols) | | | |
|---|---|---|---|---|---|---|---|
| bps/Hz | Code Rate | Modulation | DRI | 96 bits | 192 bits | 384 bits | 768 bits |
| 0.25 | 0.25 | BPSK | (1, 1) | 8 | n/a | n/a | n/a |
| 0.5 | 0.5 | BPSK | (1, −1) | 4 | 8 | n/a | n/a |
| 1 | 0.5 | QPSK | (−1, 1) | 2 | 4 | 8 | n/a |
| 2 | 0.5 | 16 QAM | (−1, −1) | 1 | 2 | 4 | 8 |

The RACH message carries short messages and access requests from the user terminal. Table 16 lists the various fields of an exemplary RACH message format and the size of each field for each of the four different message sizes.

TABLE 16

| Fields/ Parameter Names | RACH Message Sizes | | | | Description |
|---|---|---|---|---|---|
| | 96 bits | 192 bits | 384 bits | 768 bits | |
| Message Duration | 2 | 2 | 2 | 2 | Duration of message |
| MAC PDU Type | 4 | 4 | 4 | 4 | RACH message type |
| MAC ID | 10 | 10 | 10 | 10 | MAC ID |
| Slot ID | 6 | 6 | 6 | 6 | Tx Slot ID |
| Payload | 44 | 140 | 332 | 716 | Info bits |
| CRC | 24 | 24 | 24 | 24 | CRC value for the RACH message |
| Tail Bits | 6 | 6 | 6 | 6 | Tail bits |

The Message Duration field indicates the size of the RACH message. The MAC PDU Type field indicates the RACH message type. The MAC ID field contains the MAC ID that uniquely identifies the user terminal sending the RACH message. During initial system access, a unique MAC ID has not been assigned to the user terminal. In this case, a registration MAC ID (e.g., a specific value reserved for registration purpose) may be included in the MAC ID field. The Slot ID field indicates the starting RACH slot on which the RACH PDU was sent (the RACH timing and transmission is described below). The Payload field includes the information bits for the RACH message. The CRC field contains a CRC value for the RACH message, and the Tail Bits field is used to reset the convolutional encoder for the RACH. The operation of the RACH in conjunction with the BCH and FCCH for system access is described in further detail below.

The RACH may also be implemented with a "fast" RACH (F-RACH) and a "slow" RACH (S-RACH). The F-RACH and S-RACH can be designed to efficiently support user terminals in different operating states. For example, the F-RACH may be used by user terminals that (1) have registered with the system, (2) can compensate for their round trip delays (RTDs) by properly advancing their transmit timing, and (3) achieve the required SNR for operation on the F-RACH. The S-RACH may be used by user terminals that cannot use the F-RACH for any reasons.

Different designs may be used for the F-RACH and S-RACH to facilitate rapid access to the system whenever possible and to minimize the amount of system resources needed to implement random access. For example, the F-RACH can use a shorter PDU, employ a weaker coding scheme, require F-RACH PDUs to arrive approximately time-aligned at the access point, and utilize a slotted Aloha random access scheme. The S-RACH can use a longer PDU, employ a stronger coding scheme, allow S-RACH PDUs to arrive non-aligned in time at the access point, and utilize an unslotted Aloha random access scheme.

For simplicity, the following description assumes that a single RACH is used for the MIMO WLAN system.

Forward Channel (FCH)—Downlink

The FCH is used by the access point to transmit user-specific data to specific user terminals and page/broadcast messages to multiple user terminals. The FCH may also be used to transmit pilot to user terminals. The FCH can be allocated on a per frame basis. A number of FCH PDU types are provided to accommodate different uses of the FCH. Table 17 lists an exemplary set of FCH PDU types.

TABLE 17

| FCH PDU Types | | |
|---|---|---|
| Code | FCH PDU Type | Description |
| 0 | Message Only | FCH broadcast/page service/user message |
| 1 | Message and Preamble | FCH user message |
| 2 | Preamble Only | FCH Idle state |

FCH PDU Type 0 is used to send page/broadcast messages and user messages/packets on the FCH and only includes the message/packet. (Data for a specific user terminal may be sent as a message or a packet, and these two terms are used interchangeably herein.) FCH PDU Type 1 is used to send user packets and includes a preamble. FCH PDU Type 2 includes only the preamble and no message/packet, and is associated with Idle state FCH traffic.

Figure 5D:
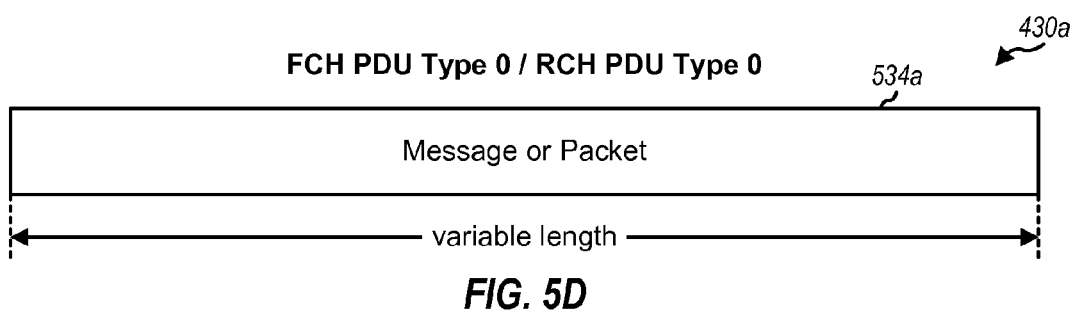

FIG. 5D illustrates an embodiment of an FCH PDU 430a for FCH PDU Type 0. In this embodiment, FCH PDU 430a includes only a message portion 534a for a page/broadcast message or a user packet. The message/packet can have variable length, which is given by the FCH Message Length field in the FCH PDU. The message length is given in integer number of PHY frames (described below). The rate and transmission mode for the page/broadcast message are specified and described below. The rate and transmission mode for the user packet are specified in the associated FCCH information element.

Figure 5E:
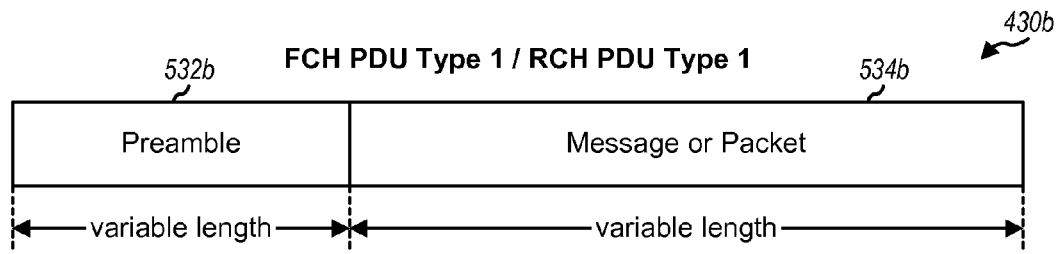

FIG. 5E illustrates an embodiment of an FCH PDU 430b for FCH PDU Type 1. In this embodiment, FCH PDU 430b includes a preamble portion 532b and a message/packet portion 534b. Preamble portion 532b is used to send a MIMO pilot or a steered reference and has a variable length, which is given by the FCH Preamble Type field in the associated FCCH information element. Portion 534b is used to send an FCH packet and also has a variable length (in integer number of PHY frames), which is given by the FCH Message Length field in the FCH PDU. The FCH packet is sent using the rate and transmission mode specified by the associated FCCH information element.

Figure 5F:
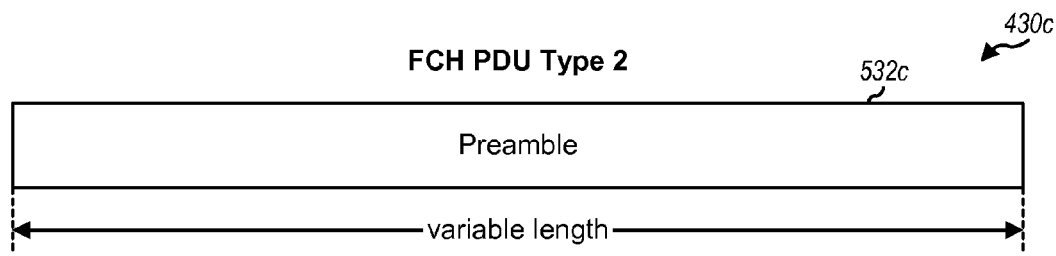

FIG. 5F illustrates an embodiment of an FCH PDU 430c for FCH PDU Type 2. In this embodiment, FCH PDU 430c includes only a preamble portion 532c and no message portion. The length of the preamble portion is indicated by the FCCH IE. The FCH PDU Type 2 may be used to allow the user terminal to update its channel estimate while in the Idle state.

A number of FCH Message types are provided to accommodate different uses of the FCH. Table 18 lists an exemplary set of FCH Message types.

TABLE 18

FCH Message Types

| Code | FCH Message Type | Description |
| --- | --- | --- |
| 0 | Page Message | Page message - diversity mode, rate = 0.25 bps/Hz |
| 1 | Broadcast Message | Broadcast message - diversity mode, rate = 0.25 bps/Hz |
| 2 | User Packet | Dedicated channel operation - user terminal specific PDU, rate specified in the FCCH |
| 3-15 | Reserved | Reserved for future use |

A page message may be used to page multiple user terminals and is sent using FCH PDU Type 0. If the Page Bit in the BCH message is set, then one or more FCH PDUs with page messages (or "Page PDUs") are sent first on the FCH. Multiple Page PDUs may be sent in the same frame. Page PDUs are transmitted using the diversity mode and the lowest rate of 0.25 bps/Hz to increase the likelihood of correct reception by the user terminals.

A broadcast message may be used to send information to multiple user terminals and is sent using FCH PDU Type 0. If the Broadcast Bit in the BCH message is set, then one or more FCH PDUs with broadcast messages (or "Broadcast PDUs") are sent on the FCH immediately following any Page PDUs sent on the FCH. The Broadcast PDUs are also transmitted using the diversity mode and the lowest rate of 0.25 bps/Hz to increase the likelihood of correct reception.

A user packet may be used to send user-specific data, and may be sent using FCH PDU Type 1 or 2. User PDUs of Type 1 and 2 are sent on the FCH following any Page and Broadcast PDUs sent on the FCH. Each User PDU may be transmitted using the diversity, beam-steering, or spatial multiplexing mode. The FCCH information element specifies the rate and transmission mode used for each User PDU sent on the FCH.

A message or packet sent on the FCH comprises an integer number of PHY frames. In an embodiment and as described below, each PHY frame may include a CRC value that permits individual PHY frames in an FCH PDU to be checked and retransmitted if necessary. For asynchronous services, the RLP may be employed for segmentation, retransmission, and reassembly of PHY frames within a given FCH PDU. In another embodiment, a CRC value is provided for each message or packet, instead of each PHY frame.

Figure 6:
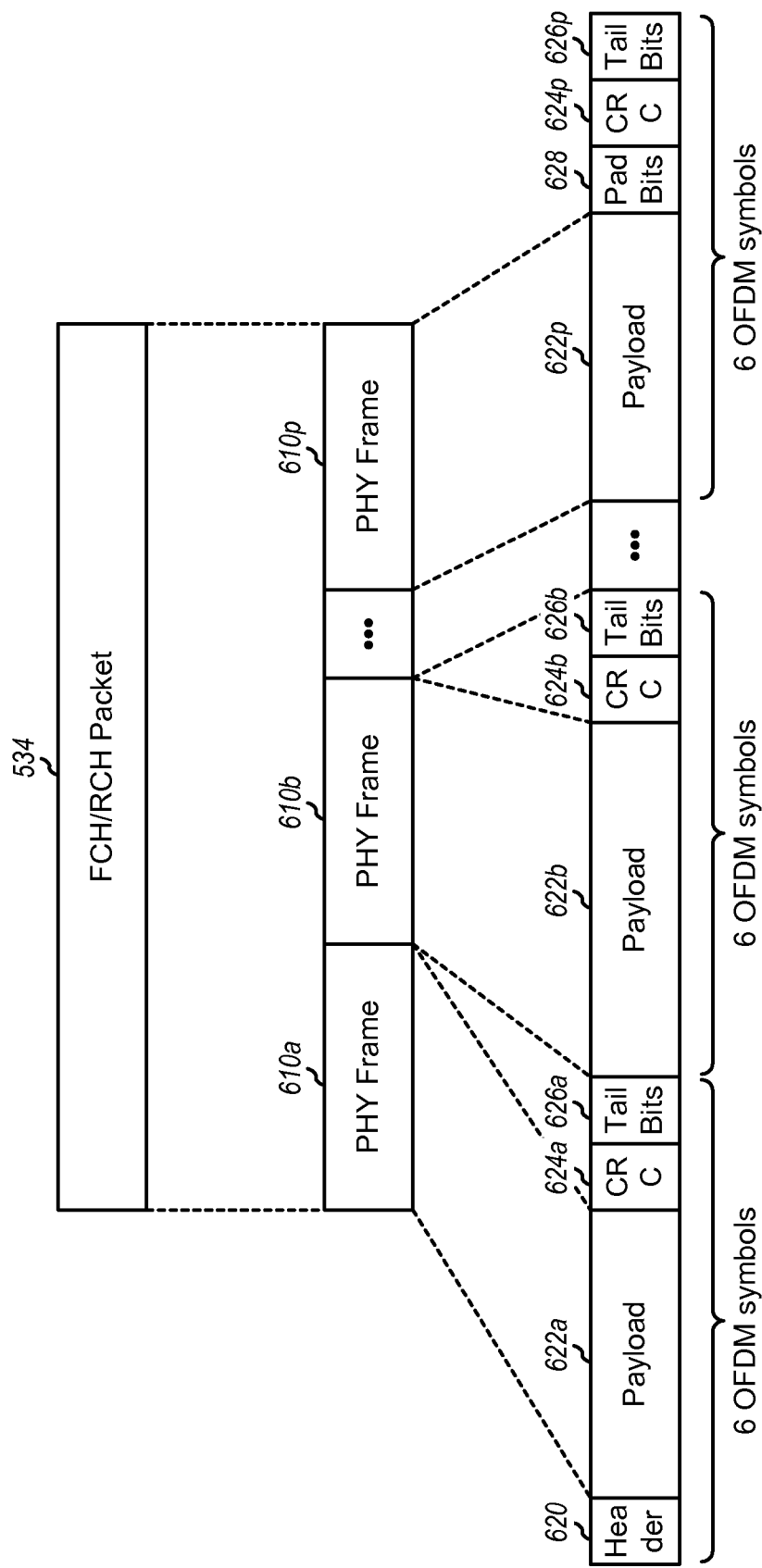
FIG. 6 shows a structure for an FCH/RCH packet.

FIG. 6 illustrates an embodiment of the structure for an FCH packet 534. The FCH packet comprises an integer number of PHY frames 610a-610p. Each PHY frame includes a payload field 622a-622p, a CRC field 624a-624p, and a tail bit field 626a-626p. The first PHY frame for the FCH packet further includes a header field 620, which indicates the message type and duration. The last PHY frame in the FCH packet further includes a pad bit field 628, which contains zero padding bits at the end of the payload in order to fill the last PHY frame. In an embodiment, each PHY frame comprises 6 OFDM symbols. The number of bits included in each PHY frame is dependent on the rate used for that PHY frame.

Table 19 lists the various fields for an exemplary FCH PDU format for FCH PDU Types 0 and 1.

TABLE 19

FCH PDU Format

| | Fields/ Parameter Names | Length (bits) | Description |
| --- | --- | --- | --- |
| First PHY frame | FCH Message Type | 4 | FCH message type |
| | FCH Message Length | 16 | Number of bytes in FCH PDU |
| | Payload | Variable | Payload bits |
| | CRC | 16 | CRC value for PHY frame (optional) |
| | Tail Bits | 6 | Tail bits for convolutional encoder |
| Each Middle PHY frame | Payload | Variable | Payload bits |
| | CRC | 16 | CRC value for PHY frame (optional) |
| | Tail Bits | 6 | Tail bits for convolutional encoder |
| Last PHY frame | Payload | Variable | Payload bits |
| | Pad bits | Variable | Pad bits to fill out PHY frame |
| | CRC | 16 | CRC value for PHY frame (optional) |
| | Tail Bits | 6 | Tail bits for convolutional encoder |

The FCH Message Type and FCH Message Length fields are sent in the header of the first PHY frame of the FCH PDU. The payload, CRC, and tail bits fields are included in each PHY frame. The payload portion of each FCH PDU carries the information bits for the page/broadcast message or user-specific packet. Pad bits are used to fill the last PHY frame of the FCH PDU, if required.

A PHY frame may also be defined to comprise some other number of OFDM symbols (e.g., one, two, four, eight, and so on). The PHY frame may be defined with even number of OFDM symbols because OFDM symbols are transmitted in pairs for the diversity mode, which may be used for the FCH and RCH. The PHY frame size may be selected based on the expected traffic such that inefficiency is minimized. In particular, if the frame size is too large, then inefficiency results from using a large PHY frame to send a small amount of data. Alternatively, if the frame size is too small, then the overhead represents a larger fraction of the frame.

Reverse Channel (RCH)—Uplink

The RCH is used by the user terminals to transmit uplink data and pilot to the access point. The RCH may be allocated on a per TDD frame basis. One or more user terminals may be designated to transmit on the RCH in any given TDD frame. A number of RCH PDU types are provided to accommodate different operating modes on the RCH. Table 20 lists an exemplary set of RCH PDU types.

TABLE 20

RCH PDU Types

| Code | RCH PDU Type | Description |
| --- | --- | --- |
| 0 | Message Only | RCH user message, no preamble |
| 1 | Message and Preamble, not Idle | RCH user message, with preamble |
| 2 | Message and Preamble, Idle | RCH Idle state message with preamble |

RCH PDU Type 0 is used to send a message/packet on the RCH and does not include a preamble. RCH PDU Type 1 is used to send a message/packet and includes a preamble. RCH PDU Type 2 includes a preamble and a short message, and is associated with Idle state RCH traffic.

FIG. 5D illustrates an embodiment of an RCH PDU for RCH PDU Type 0. In this embodiment, the RCH PDU includes only a message portion 534a for a variable-length RCH packet, which is given in integer number of PHY frames by the RCH Message Length field in the RCH PDU. The rate and transmission mode for the RCH packet are specified in the associated FCCH information element.

FIG. 5E illustrates an embodiment of an RCH PDU for RCH PDU Type 1. In this embodiment, the RCH PDU includes a preamble portion 532b and a packet portion 534b. Preamble portion 532b is used to send a reference (e.g., a MIMO pilot or a steered reference) and has a variable length, which is given by the RCH Preamble Type field in the associated FCCH information element. Portion 534b is used to send an RCH packet and also has a variable length, which is given by the RCH Message Length field in the RCH PDU. The RCH packet is sent using the rate and transmission mode specified in the associated FCCH information element.

Figure 5G:
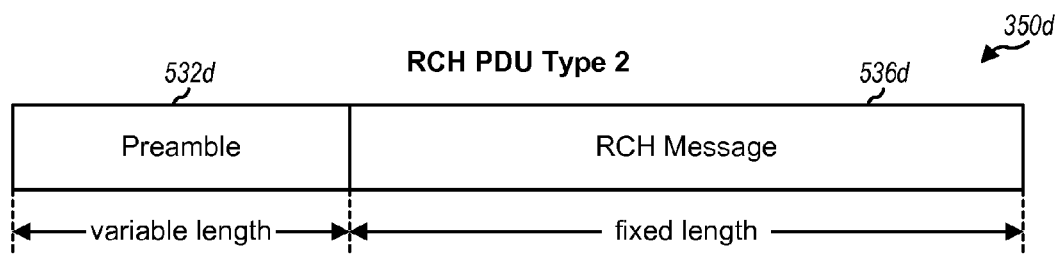

FIG. 5G illustrates an embodiment of an RCH PDU 350d for RCH PDU Type 2. In this embodiment, the RCH PDU includes a preamble portion 532d and a message portion 536d. Preamble portion 532d is used to send a reference and has a length of 1, 4 or 8 OFDM symbols. Portion 536d is used to send a short RCH message and has a fixed length of one OFDM symbol. The short RCH message is sent using a specific rate and transmission mode (e.g., rate 1/2 or rate 1/4 and BPSK modulation).

A packet sent on the RCH (for PDU Types 0 and 1) comprises an integer number of PHY frames. The structure for an RCH packet (for PDU Types 0 and 1) is shown in FIG. 6, and is the same as for the FCH packet. The RCH packet comprises an integer number of PHY frames 610. Each PHY frame includes payload field 622, an optional CRC field 624, and tail bit field 626. The first PHY frame in the RCH packet further includes header field 620, and the last PHY frame in the packet further includes pad bit field 628.

Table 21 lists the various fields for an exemplary RCH PDU format for RCH PDU Types 0 and 1.

TABLE 21

RCH PDU Format (PDU Types 0 and 1)

| | Fields/ Parameter Names | Length (bits) | Description |
| --- | --- | --- | --- |
| First PHY frame | RCH Message Type | 4 | RCH message type |
| | RCH Message Length | 16 | Number of bytes in RCH PDU |
| | FCH Rate Indicator | 16 | Indicate maximum rate for each spatial channel on FCH |
| | Payload | Variable | Payload bits |
| | CRC | 16 | CRC value for PHY frame (optional) |
| | Tail Bits | 6 | Tail bits for convolutional encoder |
| Each Middle PHY frame | Payload | Variable | Payload bits |
| | CRC | 16 | CRC value for PHY frame (optional) |
| | Tail Bits | 6 | Tail bits for convolutional encoder |
| Last PHY frame | Payload | Variable | Payload bits |
| | Pad bits | Variable | Pad bits to fill out PHY frame |
| | CRC | 16 | CRC value for PHY frame (optional) |
| | Tail Bits | 6 | Tail bits for convolutional encoder |

The RCH Message Type, RCH Message Length, and FCH Rate Indicator fields are sent in the header of the first PHY frame of the RCH PDU. The FCH Rate Indicator field is used to convey FCH rate information (e.g., the maximum rates supported by each of the spatial channels) to the access point.

Table 22 lists the various fields for an exemplary RCH PDU format for RCH PDU Type 2.

TABLE 22

RCH Message for RCH PDU Type 2

| Fields/ Parameter Names | Length (bits) | Description |
| --- | --- | --- |
| FCH Rate Indicator | 16 | Indicate maximum rate for each spatial channel on FCH |
| RCH Request | 1 | User terminal request to send additional data |
| Reserved | 1 | Reserved for future use |
| Tail Bits | 6 | Tail bits for convolutional encoder |

The RCH Request field is used by the user terminal to request additional capacity on the uplink. This short RCH message does not include a CRC and is transmitted in a single OFDM symbol.

Dedicated Channel Activity

Data transmission on the FCH and RCH can occur independently. Depending on the transmission modes selected for use for the FCH and RCH, one or multiple spatial channels (for the beam-steering and diversity modes) may be active and used for data transmission for each dedicated transport channel. Each spatial channel may be associated with a specific rate.

When only the FCH or only the RCH has all four rates set to zero, the user terminal is idle on that link. The idle terminal still transmits an idle PDU on the RCH. When both the FCH and RCH have all four rates set to zero, both the access point and user terminal are off and not transmitting. User terminals with less than four transmit antennas set the unused rate fields to zero. User terminals with more than four transmit antennas use no more than four spatial channels to transmit data. Table 23 shows the transmission state and channel activity when the rates on all four spatial channels of either the FCH or RCH (or both) are set to zero.

TABLE 23

| FCH Rates | RCH Rates | Channel Activity | Transmission State |
| --- | --- | --- | --- |
| At least one rate on FCH ≠ 0 | At least one rate on RCH ≠ 0 | FCH and RCH are active | FCH and/or RCH are transmitting |
| At least one rate on FCH ≠ 0 | All rates on RCH = 0 | FCH active, RCH idle | |
| All rates on FCH = 0 | At least one rate on RCH ≠ 0 | FCH idle, RCH active | |
| All rates on FCH = 0 | All rates on RCH = 0 | FCH and RCH are OFF | No transmissions |

There may also be a situation where both the RCH and FCH are idle (i.e., not transmitting data) but still transmitting preamble. This is referred to as the Idle state. The control fields used to support a user terminal in the Idle state are provided in an FCCH IE Type 2 information element, which is shown in Table 13.

Alternative Designs

For clarity, specific PDU types, PDU structures, message formats, and so on, have been described for an exemplary design. Fewer, additional, and/or different types, structures, and formats may also be defined for use, and this is within the scope of the invention.

OFDM Subband Structures

In the above description, the same OFDM subband structure is used for all of the transport channels. Improved efficiency may be achieved by using different OFDM subband structures for different transport channels. For example, a 64-subband structure may be used for some transport channels, a 256-subband structure may be used for some other transport channels, and so on. Moreover, multiple OFDM subband structures may be used for a given transport channel.

For a given system bandwidth of W, the duration of an OFDM symbol is dependent on the number of total subbands. If the total number of subbands is N, then the duration of each transformed symbol (without a cyclic prefix) is N/W μsec (if W is given in MHz). A cyclic prefix is added to each transformed symbol to form a corresponding OFDM symbol. The length of the cyclic prefix is determined by the expected delay spread of the system. The cyclic prefix represents overhead, which is needed for each OFDM symbol in order to combat a frequency selective channel. This overhead represents a larger percentage of the OFDM symbol if the symbol is short and a smaller percentage if the symbol is long.

Since different transport channels may be associated with different types of traffic data, a suitable OFDM subband structure may be selected for use for each transport channel to match the expected traffic data type. If a large amount of data is expected to be transmitted on a given transport channel, then a larger subband structure may be defined for use for the transport channel. In this case, the cyclic prefix would represent a smaller percentage of the OFDM symbol and greater efficiency may be achieved. Conversely, if a small amount of data is expected to be transmitted on a given transport channel, than a smaller subband structure may be defined for use for the transport channel. In this case, even though the cyclic prefix represents a larger percentage of the OFDM symbol, greater efficiency may still be achieved by reducing the amount of excess capacity by using a smaller size OFDM symbol. The OFDM symbol may thus be viewed as a "box car" that is used to send data, and the proper size "box car" may be selected for each transport channel depending on the amount of data expected to be sent.

For example, for the embodiment described above, the data on the FCH and RCH is sent in PHY frames, each of which comprises 6 OFDM symbols. In this case, another OFDM structure may be defined for use for the FCH and RCH. For example, a 256-subband structure may be defined for the FCH and RCH. A "large" OFDM symbol for the 256-subband structure would be approximately four times the duration of a "small" OFDM symbol for the 64-subband structure but would have four times the data-carrying capacity. However, only one cyclic prefix is needed for one large OFDM symbol, whereas four cyclic prefixes are needed for the equivalent four small OFDM symbols. Thus, the amount of overhead for the cyclic prefixes may be reduced by 75% by the use of the larger 256-subband structure.

This concept may be extended so that different OFDM subband structures may be used for the same transport channel. For example, the RCH supports different PDU types, each of which may be associated with a certain size. In this case, a larger subband structure may be used for a larger-size RCH PDU type, and a smaller subband structure may be used for a smaller-size RCH PDU type. A combination of different subband structures may also be used for a given PDU. For example, if one long OFDM symbol is equivalent to four short OFDM symbols, then a PDU may be sent using Nlarge large OFDM symbols and Nsmall small OFDM symbols, where $N_{large} \geq 0$ and $3 \geq N_{small} \geq 0$.

Different OFDM subband structures are associated with OFDM symbols of different lengths. Thus, if different OFDM subband structures are used for different transport channels (and/or for the same transport channel), then the FCH and RCH offsets for the FCH and RCH PDUs would need to be specified with the proper time resolution, which is smaller than an OFDM symbol period. In particular, the time increment for the FCH and RCH PDUs may be given in integer numbers of cyclic prefix length, instead of OFDM symbol period.

Rates and Transmission Modes

The transport channels described above are used to send various types of data for various services and functions. Each transport channel may be designed to support one or more rates and one or more transmission modes.

Transmission Modes

A number of transmission modes are supported for the transport channels. Each transmission mode is associated with specific spatial processing at the transmitter and receiver, as described below. Table 24 lists the transmission mode(s) supported by each of the transport channels.

TABLE 24

| Transport Channels | Transmission Modes | | | |
|---|---|---|---|---|
| | SIMO | Tx Diversity | Beam-Steering | Spatial Multiplexing |
| BCH | — | X | — | — |
| FCCH | — | X | — | — |
| RACH | X | — | X | — |
| FCH | — | X | X | X |
| RCH | X | X | X | X |

For the diversity mode, each data symbol is transmitted redundantly over multiple transmit antennas, multiple subbands, multiple symbol periods, or a combination thereof to achieve spatial, frequency, and/or time diversity. For the beam-steering mode, a single spatial channel is used for data transmission (typically the best spatial channel), and each data symbol is transmitted on the single spatial channel using full transmit power available for the transmit antennas. For the spatial multiplexing mode, multiple spatial channels are used for data transmission, and each data symbol is transmitted on one spatial channel, where a spatial channel may correspond to an eigenmode, a transmit antenna, and so on. The beam-steering mode may be viewed as a special case of the spatial multiplexing mode whereby only one spatial channel is used for data transmission.

The diversity mode may be used for the common transport channels (BCH and FCCH) for the downlink from the access point to the user terminals. The diversity mode may also be used for the dedicated transport channels (FCH and RCH). The use of the diversity mode on the FCH and RCH may be negotiated at call setup. The diversity mode transmits data on one "spatial mode" using a pair of antennas for each subband.

The beam-steering mode may be employed on the RACH by user terminals with multiple transmit antennas. A user terminal can estimate the MIMO channel based on the MIMO pilot sent on the BCH. This channel estimate may then be used to perform beam-steering on the RACH for system accesses. The beam-steering mode may also be used for the dedicated transport channels (FCH and RCH). The beam-steering mode may be able to achieve higher received signal-to-noise-and-interference ratio (SNR) at the receiver than the diversity mode by exploiting the gain of the antenna array at the transmitter. In addition, the preamble portion of the PDU may be reduced since the steered reference only includes symbols for a single "steered" antenna. The diversity mode may also be used for the RACH.

The spatial multiplexing mode may be used for the FCH and RCH to achieve greater throughput, when supported by the channel conditions. The spatial multiplexing and beam-steering modes are reference driven and require closed-loop control for proper operation. As such, a user terminal is allocated resources on both the FCH and RCH to support the spatial multiplexing mode. Up to four spatial channels may be supported on the FCH and RCH (limited by the number of antennas at the access point).

Coding and Modulation

A number of different rates are supported for the transport channels. Each rate is associated with a particular code rate and a particular modulation scheme, which collectively results in a particular spectral efficiency (or data rate). Table 25 lists the various rates supported by the system.

TABLE 25

| Rate Word | Spectral Efficiency (bps/Hz) | Code Rate | Modulation Scheme | Info bits/ OFDM symbol | Code bits/ OFDM symbol |
|---|---|---|---|---|---|
| 0000 | 0.0 | — | off | — | — |
| 0001 | 0.25 | 1/4 | BPSK | 12 | 48 |
| 0010 | 0.5 | 1/2 | BPSK | 24 | 48 |
| 0011 | 1.0 | 1/2 | QPSK | 48 | 96 |
| 0100 | 1.5 | 3/4 | QPSK | 72 | 96 |
| 0101 | 2.0 | 1/2 | 16 QAM | 96 | 192 |
| 0110 | 2.5 | 5/8 | 16 QAM | 120 | 192 |
| 0111 | 3.0 | 3/4 | 16 QAM | 144 | 192 |
| 1000 | 3.5 | 7/12 | 64 QAM | 168 | 288 |
| 1001 | 4.0 | 2/3 | 64 QAM | 192 | 288 |
| 1010 | 4.5 | 3/4 | 64 QAM | 216 | 288 |
| 1011 | 5.0 | 5/6 | 64 QAM | 240 | 288 |
| 1100 | 5.5 | 11/16 | 256 QAM | 264 | 384 |
| 1101 | 6.0 | 3/4 | 256 QAM | 288 | 384 |
| 1110 | 6.5 | 13/16 | 256 QAM | 312 | 384 |
| 1111 | 7.0 | 7/8 | 256 QAM | 336 | 384 |

Each common transport channel supports one or more rates and one transmission mode (or possibly more, as may be the case for the RACH). The BCH is transmitted at a fixed rate using the diversity mode. The FCCH may be transmitted at one of four possible rates, as indicated by the FCCH Phy Mode field in the BCH message, using the diversity mode. In one embodiment, the RACH may be transmitted at one of four possible rates, as indicated by the RACH DRI embedded in the preamble of the RACH PDU, and each RACH message is one of four possible sizes. In another embodiment, the RACH is transmitted at a single rate. Table 26 lists the coding, modulation, and transmission parameters and the message sizes supported by each common transport channel.

TABLE 26

Parameters for Common Transport Channels

| Transport Channel | Spectral Efficiency (bps/Hz) | Code Rate | Modulation Scheme | Transmission Mode | Message Size bits | Message Size OFDM symbols |
|---|---|---|---|---|---|---|
| BCH | 0.25 | 1/4 | BPSK | Diversity | 120 | 10 |
| FCCH | 0.25 | 1/4 | BPSK | Diversity | variable | variable |
| " | 0.5 | 1/2 | BPSK | Diversity | variable | variable |
| " | 1.0 | 1/2 | QPSK | Diversity | variable | variable |
| " | 2.0 | 1/2 | 16 QAM | Diversity | variable | variable |
| RACH | 0.25 | 1/4 | BPSK | Beam-Steering | 96 | 8 |
| " | 0.5 | 1/2 | BPSK | Beam-Steering | 96, 192 | 4, 8 |
| " | 1.0 | 1/2 | QPSK | Beam-Steering | 96, 192, 384 | 2, 4, 8 |
| " | 2.0 | 1/2 | 16 QAM | Beam-Steering | 96, 192, 384, 768 | 1, 2, 4, 8 |

The FCCH message is variable in size and given in even number of OFDM symbols.

The FCH and RCH support all of the rates listed in Table 25. Table 27 lists the coding, modulation, and transmission parameters and the message sizes supported by the FCH and RCH.

TABLE 27

Parameters for FCH and RCH

| Spectral Efficiency (bps/Hz) | Code Rate | Modulation Scheme | Payload (bits/ PHY frame) | Parity (bits/ PHY frame) | PHY Frame Size code bits | PHY Frame Size mod symbols | PHY Frame Size OFDM symbols |
|---|---|---|---|---|---|---|---|
| 0.25[A] | 1/4 | BPSK | 72 | 72 | 144 | 288 | 6 |
| 0.5 | 1/2 | BPSK | 144 | 144 | 288 | 288 | 6 |
| 1.0 | 1/2 | QPSK | 288 | 288 | 576 | 288 | 6 |
| 1.5 | 3/4 | QPSK | 432 | 144 | 576 | 288 | 6 |
| 2.0 | 1/2 | 16 QAM | 576 | 576 | 1152 | 288 | 6 |
| 2.5 | 5/8 | 16 QAM | 720 | 432 | 1152 | 288 | 6 |
| 3.0 | 3/4 | 16 QAM | 864 | 288 | 1152 | 288 | 6 |
| 3.5 | 7/12 | 64 QAM | 1008 | 720 | 1728 | 288 | 6 |
| 4.0 | 2/3 | 64 QAM | 1152 | 576 | 1728 | 288 | 6 |
| 4.5 | 3/4 | 64 QAM | 1296 | 432 | 1728 | 288 | 6 |
| 5.0 | 5/6 | 64 QAM | 1440 | 288 | 1728 | 288 | 6 |
| 5.5 | 11/16 | 256 QAM | 1584 | 720 | 2304 | 288 | 6 |
| 6.0 | 3/4 | 256 QAM | 1728 | 576 | 2304 | 288 | 6 |
| 6.5 | 13/16 | 256 QAM | 1872 | 432 | 2304 | 288 | 6 |
| 7.0 | 7/8 | 256 QAM | 2016 | 288 | 2304 | 288 | 6 |

Note

[A]each rate 1/2 code bit is repeated on two subbands to obtain an effective code rate of 1/4. The parity bits represent redundancy bits introduced by the coding and are used for error correction by the receiver.

The PHY frame size in Table 27 indicates the number of code bits, modulation symbols, and OFDM symbols for each PHY frame. If 48 data subbands are used for data transmission, then each OFDM symbol includes 48 modulation symbols. For the diversity and beam-steering modes, one symbol stream is transmitted and the PHY frame size corresponds to the single rate employed for this symbol stream. For the spatial multiplexing mode, multiple symbol streams may be sent on multiple spatial channels, and the overall PHY frame size is determined by the sum of the PHY frame sizes for the individual spatial channels. The PHY frame size for each spatial channel is determined by the rate employed for that spatial channel.

As an example, suppose the MIMO channel is capable of supporting four spatial channels operating at spectral efficiencies of 0.5, 1.5, 4.5, and 5.5 bps/Hz. The four rates selected for the four spatial channels would then be as shown in Table 28.

TABLE 28

Example Spatial Multiplexing Transmission

| Spatial channel Index | Spectral Efficiency (bps/Hz) | Code Rate | Modulation Scheme | Payload (bits/ PHY frame) | PHY Frame Size | | |
|---|---|---|---|---|---|---|---|
| | | | | | code bits | mod symbols | OFDM symbols |
| 1 | 0.5 | 1/2 | BPSK | 144 | 288 | 288 | 6 |
| 2 | 1.5 | 3/4 | QPSK | 432 | 576 | 288 | 6 |
| 3 | 4.5 | 3/4 | 64 QAM | 1296 | 1728 | 288 | 6 |
| 4 | 5.5 | 11/16 | 256 QAM | 1584 | 2304 | 288 | 6 |

The overall PHY frame size is then 144+432+1296+1584=3456 information bits or 288+576+1728+2304=4896 code bits. Even though each of the four spatial channels supports a different number of payload bits, the overall PHY frame can be transmitted in 6 OFDM symbols (e.g., 24 μsec, assuming 4 μsec/OFDM symbol).

Physical Layer Processing

Figure 7:
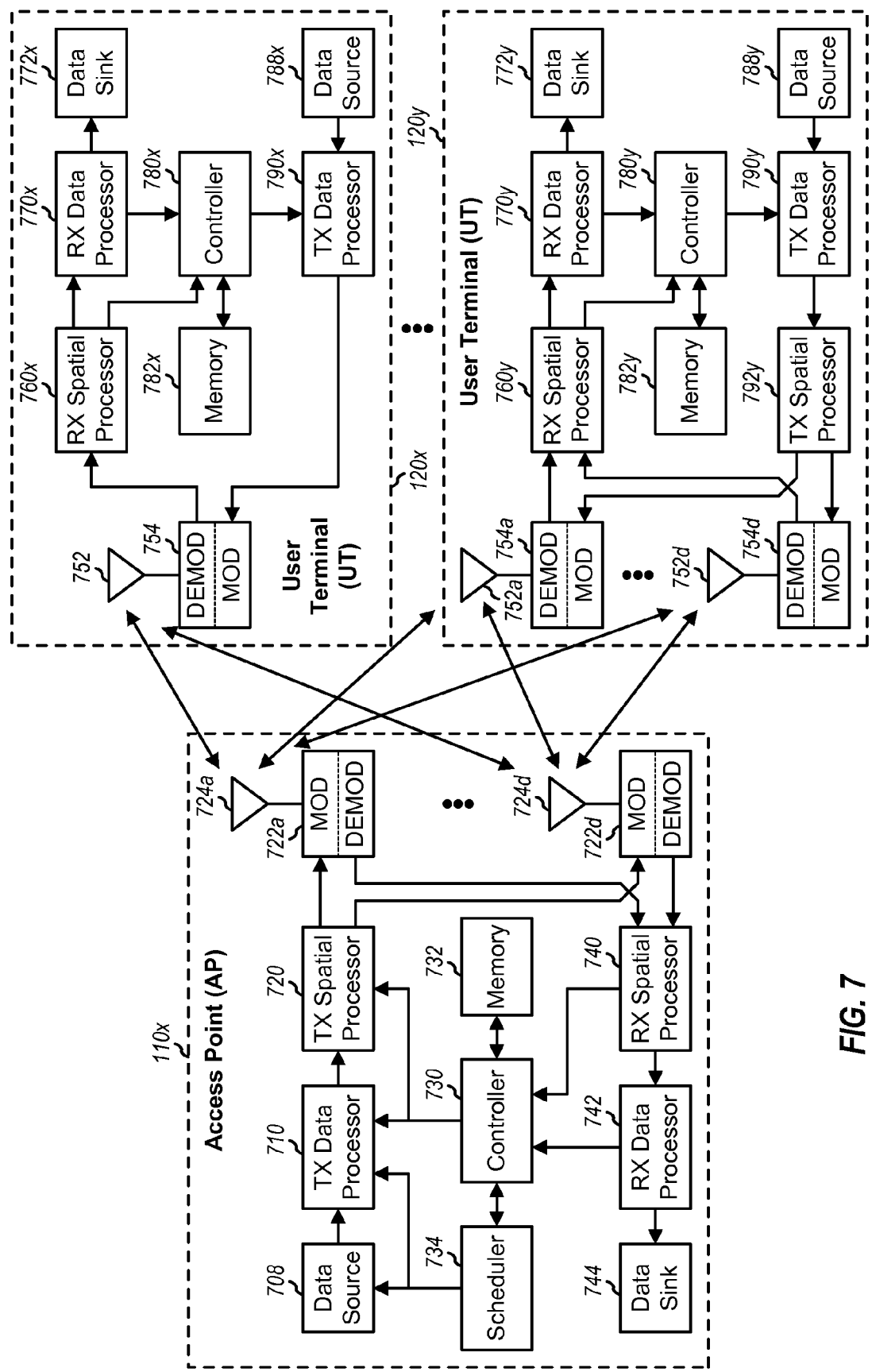
FIG. 7 shows an access point and two user terminals.

FIG. 7 shows a block diagram of an embodiment of an access point 110x and two user terminals 120x and 120y within the MIMO WLAN system.

On the downlink, at access point 110x, a transmit (TX) data processor 710 receives traffic data (i.e., information bits) from a data source 708 and signaling and other information from a controller 730 (which may utilize, e.g., memory 732) and possibly a scheduler 734. These various types of data may be sent on different transport channels. TX data processor 710 "frames" the data (if necessary), scrambles the framed/unframed data, encodes the scrambled data, interleaves (i.e., reorders) the coded data, and maps the interleaved data into modulation symbols. For simplicity, a "data symbol" refers to a modulation symbol for traffic data, and a "pilot symbol" refers to a modulation symbol for pilot. The scrambling randomizes the data bits. The encoding increases the reliability of the data transmission. The interleaving provides time, frequency, and/or spatial diversity for the code bits. The scrambling, coding, and modulation may be performed based on control signals provided by controller 730 and are described in further detail below. TX data processor 710 provides a stream of modulation symbols for each spatial channel used for data transmission.

A TX spatial processor 720 receives one or more modulation symbol streams from TX data processor 710 and performs spatial processing on the modulation symbols to provide four streams of transmit symbols, one stream for each transmit antenna. The spatial processing is described in further detail below.

Each modulator (MOD) 722 receives and processes a respective transmit symbol stream to provide a corresponding stream of OFDM symbols. Each OFDM symbol stream is further processed to provide a corresponding downlink modulated signal. The four downlink modulated signals from modulator 722a through 722d are then transmitted from four antennas 724a through 724d, respectively.

At each user terminal 120, one or multiple antennas 752 receive the transmitted downlink modulated signals, and each receive antenna provides a received signal to a respective demodulator (DEMOD) 754. Each demodulator 754 performs processing complementary to that performed at modulator 722 and provides received symbols. A receive (RX) spatial processor 760 then performs spatial processing on the received symbols from all demodulators 754 to provide recovered symbols, which are estimates of the modulation symbols sent by the access point.

An RX data processor 770 receives and demultiplexes the recovered symbols into their respective transport channels. The recovered symbols for each transport channel may be symbol demapped, deinterleaved, decoded, and descrambled to provide decoded data for that transport channel. The decoded data for each transport channel may include recovered packet data, messages, signaling, and so on, which are provided to a data sink 772 for storage and/or a controller 780 (which may utilize, e.g., memory 782) for further processing.

The processing by access point 110 and terminal 120 for the downlink is described in further detail below. The processing for the uplink may be the same or different from the processing for the downlink.

For the downlink, at each active user terminal 120, RX spatial processor 760 further estimates the downlink to obtain channel state information (CSI). The CSI may include channel response estimates, received SNRs, and so on. RX data processor 770 may also provide the status of each packet/frame received on the downlink. A controller 780 (and, possibly, memory 782) receives the channel state information and the packet/frame status and determines the feedback information to be sent back to the access point. The feedback information is processed by a TX data processor 790 and a TX spatial processor 792 (if present), conditioned by one or more modulators 754, and transmitted via one or more antennas 752 back to the access point. TX data processor may also receive data (e.g., information bits) from a data source 788.

At access point 110, the transmitted uplink signal(s) are received by antennas 724, demodulated by demodulators 722, and processed by an RX spatial processor 740 and an RX data processor 742 in a complementary manner to that performed at the user terminal. The recovered feedback information is then provided to controller 730 (and, possibly, memory 732) and a scheduler 734. The decoded data may be provided to a data sink 744.

Scheduler 734 uses the feedback information to perform a number of functions such as (1) selecting a set of user terminals for data transmission on the downlink and uplink, (2) selecting the transmission rate(s) and the transmission mode for each selected user terminal, and (3) assigning the available FCH/RCH resources to the selected terminals. Scheduler 734 and/or controller 730 further uses information (e.g., steering vectors) obtained from the uplink transmission for the processing of the downlink transmission, as described in further detail below.

A number of transmission modes are supported for data transmission on the downlink and uplink. The processing for each of these transmission modes is described in further detail below.

Diversity Mode—Transmit Processing

Figure 8A:
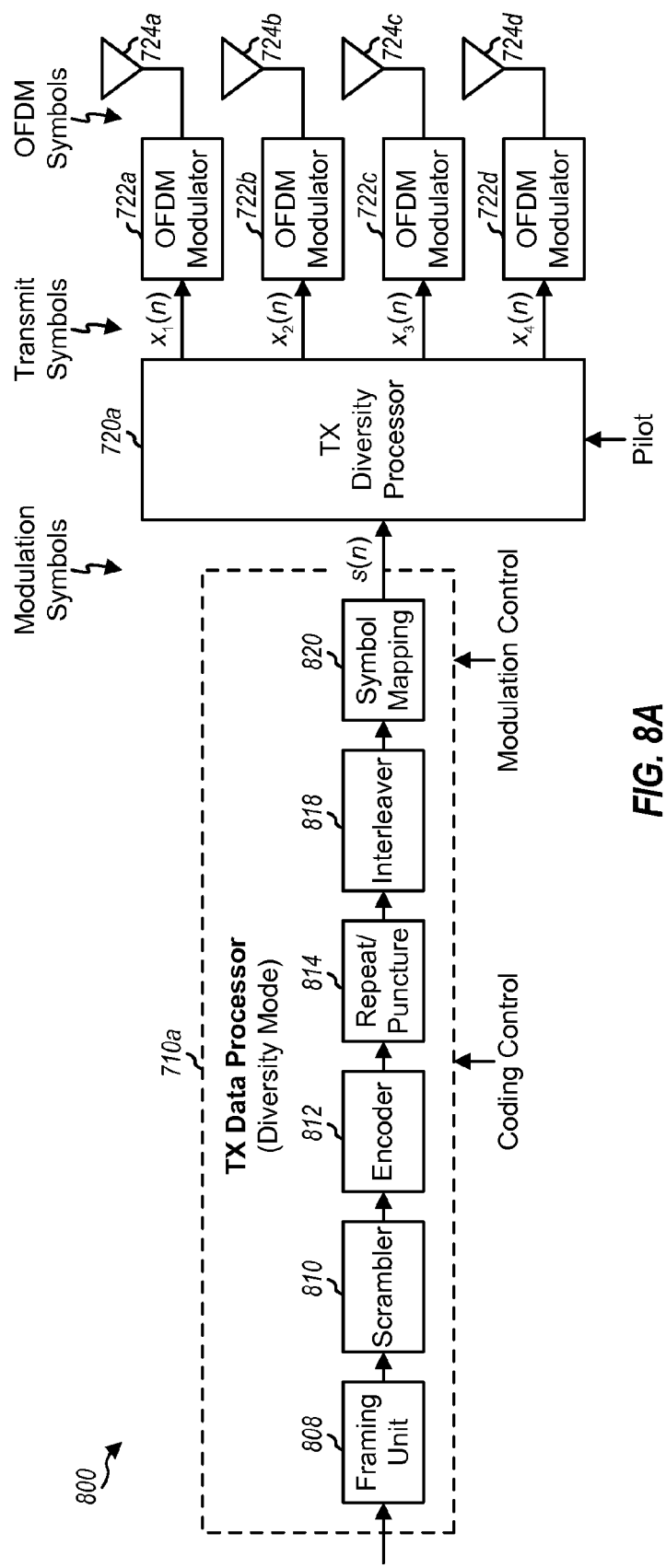
FIGS. 8A, 9A, and 10A show three transmitter units for the diversity, spatial multiplexing, and beam-steering modes, respectively.

FIG. 8A shows a block diagram of an embodiment of a transmitter unit 800 capable of performing the transmit processing for the diversity mode. Transmitter unit 800 may be used for transmitter portion of the access point and the user terminal.

Within a TX data processor 710a, a framing unit 808 frames the data for each packet to be transmitted on the FCH or RCH. The framing need not be performed for the other transport channels. The framing may be performed as illustrated in FIG. 6 to generate one or more PHY frames for each user packet. A scrambler 810 then scrambles the framed/unframed data for each transport channel to randomize the data.

An encoder 812 receives and codes the scrambled data in accordance with a selected coding scheme to provide code bits. A repeat/puncture unit 814 then repeats or punctures (i.e., deletes) some of the code bits to obtain the desired code rate. In an embodiment, encoder 812 is a rate 1/2, constraint length 7, binary convolutional encoder. A code rate of 1/4 may be obtained by repeating each code bit once. Code rates greater than 1/2 may be obtained by deleting some of the code bits from encoder 812. A specific design for framing unit 808, scrambler 810, encoder 812, and repeat/puncture unit 814 is described below.

An interleaver 818 then interleaves (i.e., reorders) the code bits from unit 814 based on a selected interleaving scheme. In an embodiment, each group of 48 consecutive code bits to be transmitted on a given spatial channel is spread over the 48 data-carrying subbands (or simply, data subbands) to provide frequency diversity. The interleaving is described in further detail below.

A symbol mapping unit 820 then maps the interleaved data in accordance with a particular modulation scheme to provide modulation symbols. As shown in Table 26, BPSK, 4 QAM, or 16 QAM may be used for the diversity mode, depending on the selected rate. In the diversity mode, the same modulation scheme is used for all data subbands. The symbol mapping may be achieved by (1) grouping sets of B bits to form B-bit values, where $B \geq 1$, and (2) mapping each B-bit value to a point in a signal constellation corresponding to the selected modulation scheme. Each mapped signal point is a complex value and corresponds to a modulation symbol. Symbol mapping unit 820 provides a stream of modulation symbols to a TX diversity processor 720a.

In an embodiment, the diversity mode utilizes space-time transmit diversity (STTD) for dual transmit diversity on a per subband basis. STTD supports simultaneous transmission of independent symbol streams on two transmit antennas while maintaining orthogonality at the receiver.

The STTD scheme operates as follows. Suppose that two modulation symbols, denoted as $s_1$ and $s_2$, are to be transmitted on a given subband. The transmitter generates two vectors, $\underline{x}_1 = [s_1 \ s_2]^T$ and $\underline{x}_2 = [s_2^* \ -s_1^*]^T$, where "*" denotes the complex conjugate and "T" denotes the transpose. Each vector includes two elements that are to be transmitted from two transmit antennas in one symbol period (i.e., vector $\underline{x}_1$ is transmitted from two antennas in the first symbol period, and vector $\underline{x}_2$ is transmitted from two antennas in the next symbol period).

If the receiver is equipped with a single receive antenna, then the received symbols may be expressed as:

$$r_1 = h_1 s_1 + h_2 s_2 + n_1, \text{ and}$$

$$r_2 = h_1 s_2^* - h_2 s_1^* + n_2, \quad \text{Eq. (1)}$$

where $r_1$ and $r_2$ are two symbols received in two consecutive symbol periods at the receiver;

$h_1$ and $h_2$ are the path gains from the two transmit antennas to the receive antenna for the subband under consideration, where the path gains are assumed to be constant over the subband and static over the 2-symbol period; and $n_1$ and $n_2$ are the noise associated with the two received symbols $r_1$ and $r_2$, respectively.

The receiver may then derive estimates of the two transmitted symbols, $s_1$ and $s_2$, as follows:

$$\hat{s}_1 = \frac{h_1^* r_1 - h_2 r_2^*}{|h_1|^2 + |h_2|^2} = s_1 + \frac{h_1^* n_1 - h_2 n_2^*}{|h_1|^2 + |h_2|^2}, \text{ and} \quad \text{Eq. (2)}$$

$$\hat{s}_2 = \frac{h_2^* r_1 + h_1 r_2^*}{|h_1|^2 + |h_2|^2} = s_2 + \frac{h_2^* n_1 + h_1 n_2^*}{|h_1|^2 + |h_2|^2}.$$

Alternatively, the transmitter may generate two vectors $\underline{x}_1 = [s_1 \ -s_2^*]^T$ and $\underline{x}_2 = [s_2 \ s_1^*]^T$ and transmit the two vectors sequentially in two symbol periods from two transmit antennas. The received symbols may then be expressed as:

$$r_1 = h_1 s_1 - h_2 s_2^* + n_1, \text{ and}$$

$$r_2 = h_1 s_2 + h_2 s_1^* + n_2.$$

The receiver may then derive estimates of the two transmitted symbols as follows:

$$\hat{s}_1 = \frac{h_1^* r_1 + h_2 r_2^*}{|h_1|^2 + |h_2|^2} = s_1 + \frac{h_1^* n_1 + h_2 n_2}{|h_1|^2 + |h_2|^2}, \text{ and}$$

$$\hat{s}_2 = \frac{-h_2 r_1^* + h_1^* r_2}{|h_1|^2 + |h_2|^2} = s_2 + \frac{h_1^* n_2 - h_2 n_1}{|h_1|^2 + |h_2|^2}.$$

The above description may be extended for a MIMO-OFDM system with two or more transmit antennas, NR receive antennas, and multiple subbands. Two transmit antennas are used for any given subband. Suppose that two modulation symbols, denoted as $s_1(k)$ and $s_2(k)$, are to be transmitted on a given subband k. The transmitter generates two vectors $\underline{x}_1(k) = [s_1(k) \ s_2(k)]^T$ and $\underline{x}_2(k) = [s_2^*(k) \ -s_1^*(k)]^T$ or equivalently two symbol sets $\{x_i(k)\} = \{s_1(k) \ s_2^*(k)\}$ and $\{x_j(k)\} = \{s_2(k) \ -s_1^*(k)\}$. Each symbol set includes two elements that are to be transmitted sequentially in two symbol periods from a respective transmit antenna on subband k (i.e., symbol set $\{x_i(k)\}$ is transmitted on subband k from antenna i in two symbol periods, and symbol set $\{x_j(k)\}$ is transmitted on subband k from antenna j in the same 2-symbol period).

The vectors of received symbols at the receive antennas in the two symbol periods may be expressed as:

$$\underline{r}_1(k) = \underline{h}_i(k) s_1(k) + \underline{h}_j(k) s_2(k) + \underline{n}_1(k), \text{ and}$$

$$\underline{r}_2(k) = \underline{h}_i(k) s_2^*(k) - \underline{h}_j(k) s_1^*(k) + \underline{n}_2(k),$$

where $\underline{r}_1(k)$ and $\underline{r}_2(k)$ are two symbol vectors received in two consecutive symbol periods on subband k at the receiver, with each vector including $N_R$ received symbols for $N_R$ receive antennas;

$\underline{h}_i(k)$ and $\underline{h}_j(k)$ are the vectors of path gains from the two transmit antennas i and j to the $N_R$ receive antennas for subband k, with each vector including the channel gains from the associated transmit antenna to each of the $N_R$ receive antennas, where the path gains are assumed to be constant over the subband and static over the 2-symbol period; and $\underline{n}_1(k)$ and $\underline{n}_2(k)$ are noise vectors associated with the two received vectors $\underline{r}_1(k)$ and $\underline{r}_2(k)$, respectively.

The receiver may then derive estimates of the two transmitted symbols, $s_1(k)$ and $s_2(k)$, as follows:

$$\hat{s}_1(k) = \frac{\hat{\underline{h}}_i^H(k)\underline{r}_1(k) - \underline{r}_2^H(k)\hat{\underline{h}}_j(k)}{\|\hat{\underline{h}}_i(k)\|^2 + \|\hat{\underline{h}}_j(k)\|^2}$$

$$= s_1(k) + \frac{\hat{\underline{h}}_i^H(k)\underline{n}_1(k) - \underline{n}_2^H(k)\hat{\underline{h}}_j(k)}{\|\hat{\underline{h}}_i(k)\|^2 + \|\hat{\underline{h}}_j(k)\|^2}, \text{ and}$$

$$\hat{s}_2(k) = \frac{\hat{\underline{h}}_j^H(k)\underline{r}_1(k) + \underline{r}_2^H(k)\hat{\underline{h}}_i(k)}{\|\hat{\underline{h}}_i(k)\|^2 + \|\hat{\underline{h}}_j(k)\|^2}$$

$$= s_2(k) + \frac{\hat{\underline{h}}_j^H(k)\underline{n}_1(k) + \underline{n}_2^H(k)\hat{\underline{h}}_i(k)}{\|\hat{\underline{h}}_i(k)\|^2 + \|\hat{\underline{h}}_j(k)\|^2}.$$

Alternatively, the transmitter may generate two symbol sets $\{x_i(k)\}=\{s_1(k)\ s_2(k)\}$ and $\{x_j(k)\}=\{-s_2^*(k)\ s_1^*(k)\}$ and transmit these two symbol sets from two transmit antennas $i$ and $j$. The vectors of received symbols may then be expressed as:

$\underline{r}_1(k) = \underline{h}_i(k)s_1(k) - \underline{h}_j(k)s_2^*(k) + \underline{n}_1(k)$, and $\underline{r}_2(k) = \underline{h}_i(k)s_2(k) + \underline{h}_j(k)s_1^*(k) + \underline{n}_2(k)$.

The receiver may then derive estimates of the two transmitted symbols as follows:

$$\hat{s}_1(k) = \frac{\hat{\underline{h}}_i^H(k)\underline{r}_1(k) + \underline{r}_2^H(k)\hat{\underline{h}}_j(k)}{\|\hat{\underline{h}}_i(k)\|^2 + \|\hat{\underline{h}}_j(k)\|^2}$$

$$= s_1(k) + \frac{\hat{\underline{h}}_i^H(k)\underline{n}_1(k) + \underline{n}_2^H(k)\hat{\underline{h}}_j(k)}{\|\hat{\underline{h}}_i(k)\|^2 + \|\hat{\underline{h}}_j(k)\|^2}, \text{ and}$$

$$\hat{s}_2(k) = \frac{\hat{\underline{h}}_i^H(k)\underline{r}_2(k) - \underline{r}_1^H(k)\hat{\underline{h}}_j(k)}{\|\hat{\underline{h}}_i(k)\|^2 + \|\hat{\underline{h}}_j(k)\|^2}$$

$$= s_2(k) + \frac{\hat{\underline{h}}_i^H(k)\underline{n}_2(k) - \underline{n}_1^H(k)\hat{\underline{h}}_j(k)}{\|\hat{\underline{h}}_i(k)\|^2 + \|\hat{\underline{h}}_j(k)\|^2}.$$

The STTD scheme is described by S. M. Alamouti in a paper entitled "A Simple Transmit Diversity Technique for Wireless Communications," IEEE Journal on Selected Areas in Communications, Vol. 16, No. 8, October 1998, pgs. 1451-1458. The STTD scheme is also described in commonly assigned U.S. patent application Ser. No. 09/737,602, entitled "Method and System for Increased Bandwidth Efficiency in Multiple Input—Multiple Output Channels," filed Jan. 5, 2001, and U.S. patent application Ser. No. 10/179,439, entitled "Diversity Transmission Modes for MIMO OFDM Communication Systems," filed Jun. 24, 2002.

The STTD scheme effectively transmits one modulation symbol per subband over two transmit antennas in each symbol period. However, the STTD scheme distributes the information in each modulation symbol over two successive OFDM symbols. Thus, the symbol recovery at the receiver is performed based on two consecutive received OFDM symbols.

The STTD scheme utilizes one pair of transmit antennas for each data subband. Since the access point includes four transmit antennas, each antenna may be selected for use for half of the 48 data subbands. Table 29 lists an exemplary subband-antenna assignment scheme for the STTD scheme.

TABLE 29

| Subband Indices | TX Ant | Bit Index |
|---|---|---|
| — | — | — |
| −26 | 1, 2 | 0 |
| −25 | 3, 4 | 6 |
| −24 | 1, 3 | 12 |
| −23 | 2, 4 | 18 |
| −22 | 1, 4 | 24 |
| −21 | 1 | P0 |
| −20 | 2, 3 | 30 |
| −19 | 1, 2 | 36 |
| −18 | 3, 4 | 42 |
| −17 | 1, 3 | 2 |
| −16 | 2, 4 | 8 |
| −15 | 1, 4 | 14 |
| −14 | 2, 3 | 20 |
| −13 | 1, 2 | 26 |
| −12 | 3, 4 | 32 |
| −11 | 1, 3 | 38 |
| −10 | 2, 4 | 44 |
| −9 | 1, 4 | 4 |
| −8 | 2, 3 | 10 |
| −7 | 2 | P1 |
| −6 | 1, 2 | 16 |
| −5 | 3, 4 | 22 |
| −4 | 1, 3 | 28 |
| −3 | 2, 4 | 34 |
| −2 | 1, 4 | 40 |
| −1 | 2, 3 | 46 |
| 0 | — | — |
| 1 | 3, 4 | 1 |
| 2 | 1, 2 | 7 |
| 3 | 2, 4 | 13 |
| 4 | 1, 3 | 19 |
| 5 | 2, 3 | 25 |
| 6 | 1, 4 | 31 |
| 7 | 3 | P2 |
| 8 | 3, 4 | 37 |
| 9 | 1, 2 | 43 |
| 10 | 2, 4 | 3 |
| 11 | 1, 3 | 9 |
| 12 | 2, 3 | 15 |
| 13 | 1, 4 | 21 |
| 14 | 3, 4 | 27 |
| 15 | 1, 2 | 33 |
| 16 | 2, 4 | 39 |
| 17 | 1, 3 | 45 |
| 18 | 2, 3 | 5 |
| 19 | 1, 4 | 11 |
| 20 | 3, 4 | 17 |
| 21 | 4 | P3 |
| 22 | 1, 2 | 23 |
| 23 | 2, 4 | 29 |
| 24 | 1, 3 | 35 |
| 25 | 2, 3 | 41 |
| 26 | 1, 4 | 47 |
| — | — | — |

As shown in Table 29, transmit antennas 1 and 2 are used for subbands with indices −26, −19, −13, and so on, transmit antennas 2 and 4 are used for subbands with indices −25, −18, −12, and so on, transmit antennas 1 and 3 are used for subbands with indices −24, −17, −11, and so on. There are six different antenna pairings with four transmit antennas. Each of the six antenna pairings is used for 8 data subbands, which are spaced approximately uniformly across the 48 data subbands. The antenna pairing to subband assignment is such that different antennas are used for adjacent subbands, which may provide greater frequency and spatial diversity. For example, antennas 1 and 2 are used for subband −26, and antennas 3 and 4 are used for subband −25.

The antenna-subband assignment in Table 29 is also such that all four transmit antennas are used for each code bit for the lowest rate of 1/4, which may maximize spatial diversity. For rate 1/4, each code bit is repeated and sent on two subbands (which is also referred to as dual subband repeat coding). The two subbands used for each code bit are mapped to different antenna pairs so that all four antennas are used to transmit that code bit. For example, bit indices 0 and 1 in Table 29 correspond to the same code bit for the diversity mode, where the bit with index 2 is transmitted from antennas 1 and 2 on subband −26 and the bit with index 2 is transmitted from antennas 3 and 4 on subband 1. As another example, bit indices 2 and 3 in Table 29 correspond to the same code bit, where the bit with index 2 is transmitted from antennas 1 and 3 in subband −17 and the bit with index 2 is transmitted from antennas 2 and 4 in subband 10.

The system may support other transmit diversity schemes, and this is within the scope of the invention. For example, the system may support a space-frequency transmit diversity (SFTD) that can achieve space and frequency diversity on a per-subband-pair basis. An exemplary SFTD scheme operates as follows. Suppose that two modulation symbols, denoted as s(k) and s(k+1), are generated and mapped to two adjacent subbands of an OFDM symbol. For SFTD, the transmitter would transmit symbols s(k) and s(k+1) from two antennas on subband k and would transmit symbols s*(k+1) and −s*(k) from the same two antennas on subband k+1. Adjacent subbands are used for the pair of modulation symbols because the channel response is assumed to be constant for the transmission of the two pairs of symbols. The processing at the receiver to recover the modulation symbols is the same as for the STTD scheme, except that the received symbols for two subbands instead of two OFDM symbol periods are processed.

Figure 8C:
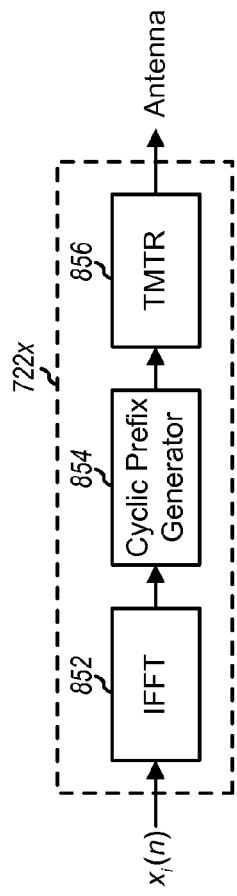
FIG. 8C shows an OFDM modulator.
Figure 8D:
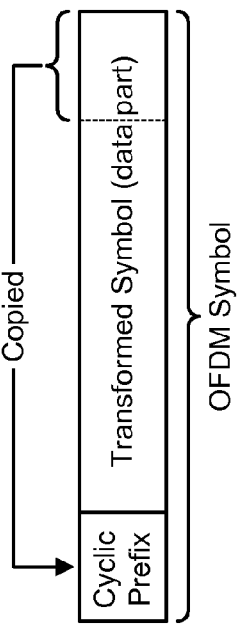
FIG. 8D shows an OFDM symbol.
Figure 8B:
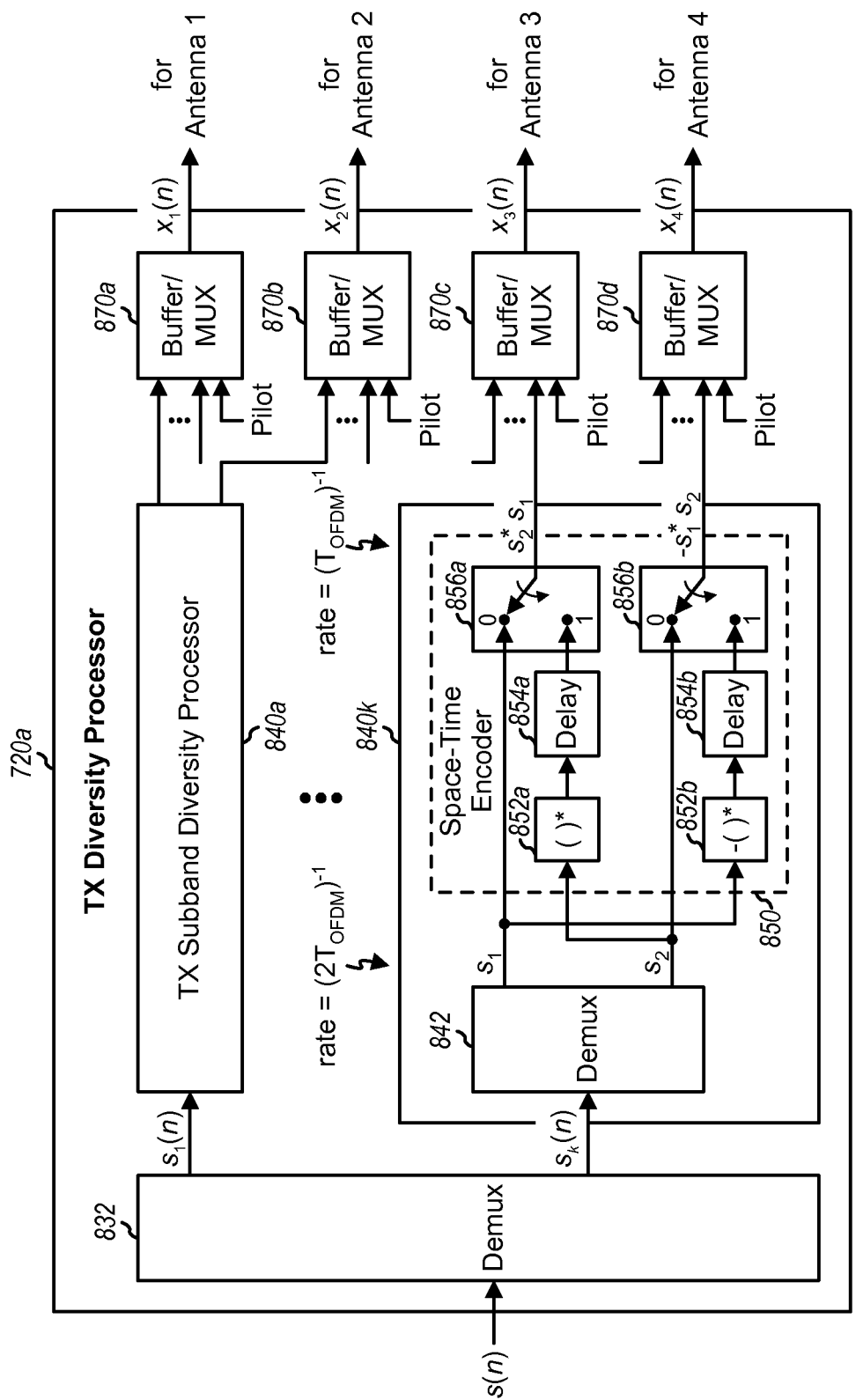
FIGS. 8B, 9B, and 10B show three TX diversity processors for the diversity, spatial multiplexing, and beam-steering modes, respectively.

FIG. 8B shows a block diagram of an embodiment of a TX diversity processor 720a capable of implementing the STTD scheme for the diversity mode.

Within TX diversity processor 720a, a demultiplexer 832 receives and demultiplexes the stream of modulation symbols s(n) from TX data processor 710a into 48 substreams, denoted as $s_1(n)$ through $s_k(n)$, for the 48 data subbands. Each modulation symbol substream includes one modulation symbol for each symbol period, which corresponds to a symbol rate of $(T_{OFDM})^{-1}$, where $T_{OFDM}$ is the duration of one OFDM symbol. Each modulation symbol substream is provided to a respective TX subband diversity processor 840.

Within each TX subband diversity processor 840, a demultiplexer 842 demultiplexes the modulation symbols for the subband into two symbol sequences, with each sequence having a symbol rate of $(2T_{OFDM})^{-1}$. A space-time encoder 850 receives the two modulation symbol sequences and, for each 2-symbol period, uses two symbols s1 and s2 in the two sequences to form two symbol sets $\{x_i\}=\{s_1\ s_2^*\}$ and $\{x_j\}=\{s_2\ -s_1^*\}$ for two transmit antennas. Each symbol set includes two symbols, one symbol from each of the two sequences. Symbol set $\{x_i\}$ is generated by providing symbol $s_1$ first and symbol $s_2^*$ next, where $s_1$ is obtained via a switch 856a and $s_2^*$ is obtained by taking the conjugate of $s_2$ with a unit 852a and delaying the conjugated symbol by one symbol period with a delay unit 854a. Similarly, symbol set $\{x_j\}$ is generated by providing symbol $s_2$ first and symbol $-s_1^*$ next, where $s_2$ is obtained via a switch 856b and $-s_1^*$ is obtained by taking the negative conjugate of $s_1$ with a unit 852b and delaying the negative conjugated symbol by one symbol period with a delay unit 854b. The two symbol sets $\{x_i\}$ and $\{x_j\}$ are to be transmitted from two antennas i and j assigned to the subband, as indicated in Table 29. Space-time encoder 850 provides the first symbol set $\{x_i\}=\{s_1\ s_2^*\}$ to a buffer/multiplexer 870 for the first transmit antenna i and the second symbol set $\{x_j\}=\{s_2\ -s_1^*\}$ to another buffer/multiplexer 870 for the second transmit antenna j. The two symbols provided by space-time encoder 850 for each symbol period are referred to as STTD symbols.

Buffers/multiplexers 870a through 870d are used to buffer and multiplex the STTD symbols from all diversity processors 840. Each buffer/multiplexer 870 receives pilot symbols and STTD symbols from the appropriate TX subband diversity processors 840, as determined by Table 29. For example, buffer/multiplexer 870a receives modulation symbols for subbands −26, −24, −22, −19, and so on (i.e., all subbands mapped to antenna 1), buffer/multiplexer 870b receives modulation symbols for subbands −26, −23, −20, −19, and so on (i.e., all subbands mapped to antenna 2), buffer/multiplexer 870c receives modulation symbols for subbands −25, −24, −20, −18, and so on (i.e., all subbands mapped to antenna 3), and buffer/multiplexer 870d receives modulation symbols for subbands −25, −23, −22, −18, and so on (i.e., all subbands mapped to antenna 4).

Each buffer/multiplexer 870 then, for each symbol period, multiplexes four pilots, 24 STTD symbols, and 36 zeros for the four pilot subbands, 24 data subbands, and 36 unused subbands, respectively, to form a sequence of 64 transmit symbols for the 64 total subbands. Although there are a total of 48 data subbands, only 24 subbands are used for each transmit antenna for the diversity mode, and the effective total number of unused subbands for each antenna is thus 36 instead of 12. Each transmit symbol is a complex value (which may be zero for an unused subband) that is sent on one subband in one symbol period. Each buffer/multiplexer 870 provides a stream of transmit symbols $x_i(n)$ for one transmit antenna. Each transmit symbol stream comprises concatenated sequences of 64 transmit symbols, one sequence for each symbol period. Referring back to FIG. 8A, TX diversity processor 720a provides four transmit symbol streams, $x_1(n)$ through $x_4(n)$, to four OFDM modulators 722a through 722d.

FIG. 8C shows a block diagram of an embodiment of an OFDM modulator 722x, which may be used for each of OFDM modulators 722a through 722d in FIG. 8A. Within OFDM modulator 722x, an inverse fast Fourier transform (IFFT) unit 852 receives a stream of transmit symbol, $x_i(n)$, and converts each sequence of 64 transmit symbols into its time-domain representation (which is referred to as a transformed symbol) using a 64-point inverse fast Fourier transform. Each transformed symbol comprises 64 time-domain samples corresponding to the 64 total subbands.

For each transformed symbol, cyclic prefix generator 854 repeats a portion of the transformed symbol to form a corresponding OFDM symbol. As noted above, one of two different cyclic prefix lengths may be used. The cyclic prefix for the BCH is fixed and is 800 nsec. The cyclic prefix for all other transport channels is selectable (either 400 nsec or 800 nsec) and indicated by the Cyclic Prefix Duration field of the BCH message. For a system with a bandwidth of 20 MHz, a sample period of 50 nsec, and 64 subbands, each transformed symbol has a duration of 3.2 msec (or 64×50 nsec) and each OFDM symbol has a duration of either 3.6 msec or 4.0 msec depending on whether the 400 nsec or 800 nsec cyclic prefix is used for the OFDM symbol.

FIG. 8D illustrates an OFDM symbol. The OFDM symbol is composed of two parts: a cyclic prefix having a duration of 400 or 800 nsec (8 or 16 samples) and a transformed symbol with a duration of 3.2 μsec (64 samples). The cyclic prefix is a copy of the last 8 or 16 samples (i.e., a cyclic continuation) of the transformed symbol and is inserted in front of the transformed symbol. The cyclic prefix ensures that the OFDM symbol retains its orthogonal property in the presence of multipath delay spread, thereby improving performance against deleterious path effects such as multipath and channel dispersion caused by frequency selective fading.

Cyclic prefix generator 854 provides a stream of OFDM symbols to a transmitter (TMTR) 856. Transmitter 856 converts the OFDM symbol stream into one or more analog signals, and further amplifies, filters, and frequency upconverts the analog signals to generate a modulated signal suitable for transmission from an associated antenna.

The baseband waveform for an OFDM symbol may be expressed as:

$$x_n(t) = \sum_{k=-N_{ST}/2, k \neq 0}^{N_{ST}/2} c_n(k)\Psi_n(k, t), \quad \text{Eq. (3)}$$

where n denotes the symbol period (i.e., the OFDM symbol index);
k denotes the subband index;
$N_{ST}$ is the number of pilot and data subbands;
$c_n(k)$ denotes the symbol transmitted on subband k of symbol period n; and $$\Psi_n(k, t) = \begin{cases} e^{j2\pi k \Delta f(t - T_{CP} - nT_S)}, & \text{for } nT_S \leq t \leq (n+1)T_S \\ 0, & \text{otherwise} \end{cases}, \quad \text{Eq. (4)}$$

where $T_{CP}$ is the cyclic prefix duration;
$T_S$ is the OFDM symbol duration; and
$\Delta f$ is the bandwidth of each subband.

Spatial Multiplexing Mode—Transmit Processing

Figure 9A:
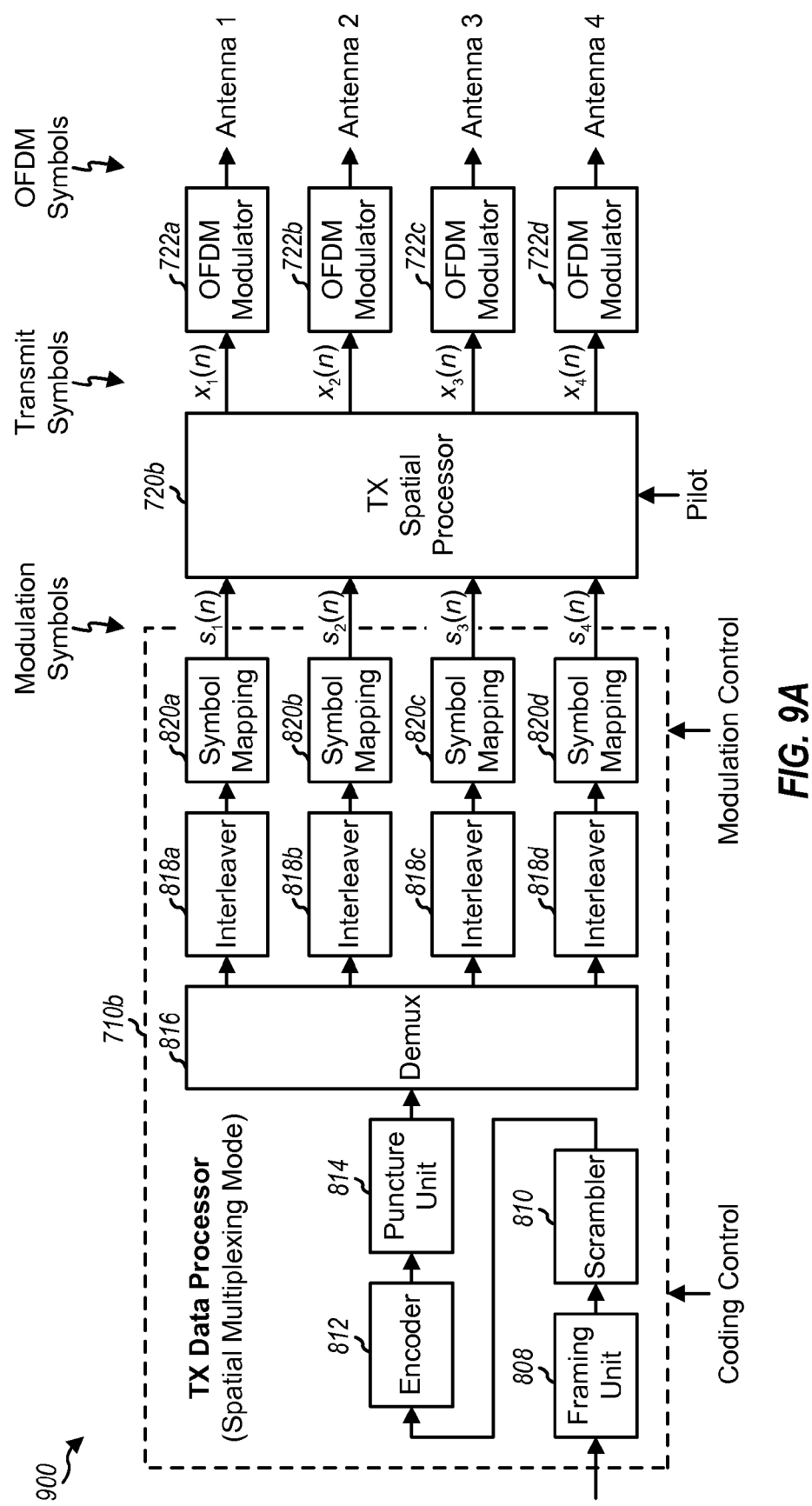

FIG. 9A shows a block diagram of a transmitter unit 900 capable of performing the transmit processing for the spatial multiplexing mode. Transmitter unit 900 is another embodiment of the transmitter portion of the access point and the user terminal. For the spatial multiplexing mode, again assuming that four transmit antennas and four receive antennas are available, data may be transmitted on up to four spatial channels. A different rate may be used for each spatial channel depending on its transmission capacity. Each rate is associated with a particular code rate and modulation scheme, as shown in Table 25. In the following description it is assumed that NE spatial channels are selected for use for data transmission, where $N_E \leq N_S \leq \min\{N_T, N_R\}$.

Within a TX data processor 710b, framing unit 808 frames the data for each FCH/RCH packet to generate one or more PHY frames for the packet. Each PHY frame includes the number of data bits that may be transmitted in all NE spatial channels within 6 OFDM symbols. Scrambler 810 scrambles the data for each transport channel. Encoder 812 receives and codes the scrambled data in accordance with a selected coding scheme to provide code bits. In an embodiment, a common coding scheme is used to code the data for all NE spatial channels, and different code rates for different spatial channels are obtained by puncturing the code bits with different puncturing patterns. Puncture unit 814 thus punctures the code bits to obtain the desired code rate for each spatial channel. The puncturing for the spatial multiplexing mode is described in further detail below.

A demultiplexer 816 receives and demultiplexes the code bits from puncture unit 814 to provide NE code bit streams for the NE spatial channels selected for use. Each code bit stream is provided to a respective interleaver 818, which interleaves the code bits in the stream across the 48 data subbands. The coding and interleaving for the spatial multiplexing mode are described in further detail below. The interleaved data from each interleaver 818 is provided to a respective symbol mapping unit 820.

In the spatial multiplexing mode, up to four different rates may be used for the four spatial channels, depending on the received SNRs achieved for these spatial channels. Each rate is associated with a particular modulation scheme, as shown in Table 25. Each symbol mapping unit 820 maps the interleaved data in accordance with a particular modulation scheme selected for the associated spatial channel to provide modulation symbols. If all four spatial channels are selected for use, then symbol mapping units 820a through 820d provide four streams of modulation symbols for the four spatial channels to a TX spatial processor 720b.

TX spatial processor 720b performs spatial processing for the spatial multiplexing mode. For simplicity, the following description assumes that four transmit antennas, four receive antennas, and 48 data subbands are used for data transmission. The data subband indices are given by the set K, where $K = \pm\{1, \ldots, 6, 8, \ldots, 20, 22, \ldots 26\}$ for the OFDM subband structure described above.

The model for a MIMO-OFDM system may be expressed as:

$$\underline{r}(k) = \underline{H}(k)\underline{x}(k) + \underline{n}(k), \text{ for } k \in K, \quad \text{Eq. (5)}$$

where $\underline{r}(k)$ is a "receive" vector with four entries for the symbols received via the four receive antennas for subband k (i.e., $\underline{r}(k) = [r_1(k) \ r_2(k) \ r_3(k) \ r_4(k)]^T$);
$\underline{x}(k)$ is a "transmit" vector with four entries for the symbols transmitted from the four transmit antennas for subband k (i.e., $\underline{x}(k) = [x_1(k) \ x_2(k) \ x_3(k) \ x_4(k)]^T$);
$\underline{H}(k)$ is an $(N_R \times N_T)$ channel response matrix for subband k; and
$\underline{n}(k)$ is a vector of additive white Gaussian noise (AWGN) for subband k.

The noise vector $\underline{n}(k)$ is assumed to have components with zero mean and a covariance matrix of $\underline{\Lambda}_n = \sigma^2 \underline{I}$, where $\underline{I}$ is the identity matrix and $\sigma^2$ is the noise variance.

The channel response matrix $\underline{H}(k)$ for subband k may be expressed as:

$$\underline{H}(k) = \begin{bmatrix} h_{1,1}(k) & h_{1,2}(k) & h_{1,3}(k) & h_{1,4}(k) \\ h_{2,1}(k) & h_{2,2}(k) & h_{2,3}(k) & h_{2,4}(k) \\ h_{3,1}(k) & h_{3,2}(k) & h_{3,3}(k) & h_{3,4}(k) \\ h_{4,1}(k) & h_{4,2}(k) & h_{4,3}(k) & h_{4,4}(k) \end{bmatrix}, \text{ for } k \in K, \quad \text{Eq. (6)}$$

where entry $h_{i,j}(k)$, for $i \in \{1, 2, 3, 4\}$ and $j \in \{1, 2, 3, 4\}$, is the coupling (i.e., complex gain) between transmit antenna i and receive antenna j for subband k. For simplicity, it is assumed that the channel response matrices $\underline{H}(k)$, for $k \in K$, are known or can be ascertained by both the transmitter and receiver.

The channel response matrix $\underline{H}(k)$ for each subband may be "diagonalized" to obtain the NS eigenmodes for that subband. This can be achieved by performing eigenvalue decomposition on the correlation matrix of $\underline{H}(k)$, which is $\underline{R}(k) = \underline{H}^H(k)\underline{H}(k)$, where $\underline{H}^H(k)$ denotes the conjugate transpose of $\underline{H}(k)$. The eigenvalue decomposition of the correlation matrix $\underline{R}(k)$ may be expressed as:

$$\underline{R}(k) = \underline{V}(k)\underline{D}(k)\underline{V}^H(k), \text{ for } k \in K, \quad \text{Eq. (7)}$$

where $\underline{V}(k)$ is an ($N_T \times N_T$) unitary matrix whose columns are eigenvectors of $\underline{R}(k)$ (i.e., $\underline{V}(k)=[\underline{v}_1(k) \ \underline{v}_2(k) \ \underline{v}_3(k) \ \underline{v}_4(k)]$, where each $\underline{v}_i(k)$ is an eigenvector for one eigenmode); and $\underline{D}(k)$ is an ($N_T \times N_T$) diagonal matrix of eigenvalues of $\underline{R}(k)$. A unitary matrix is characterized by the property $\underline{M}^H\underline{M}=\underline{I}$. Eigenvectors $\underline{v}_i(k)$, for $i \in \{1, 2, 3, 4\}$, are also referred to as transmit steering vectors for each of the spatial channels.

The channel response matrix $\underline{H}(k)$ may also be diagonalized using singular value decomposition, which may be expressed as:

$$\underline{H}(k) = \underline{U}(k)\underline{\Sigma}(k)\underline{V}^H(k), \text{ for } k \in K, \quad \text{Eq. (8)}$$

where $\underline{V}(k)$ is a matrix whose columns are right eigenvectors of $\underline{H}(k)$;

$\underline{\Sigma}(k)$ is a diagonal matrix containing singular values of $\underline{H}(k)$, which are positive square roots of the diagonal elements of $\underline{D}(k)$, the eigenvalues of $\underline{R}(k)$; and $\underline{U}(k)$ is a matrix whose columns are left eigenvectors of $\underline{H}(k)$.

Singular value decomposition is described by Gilbert Strang in a book entitled "Linear Algebra and Its Applications," Second Edition, Academic Press, 1980. As shown in equations (7) and (8), the columns of the matrix $\underline{V}(k)$ are eigenvectors of $\underline{R}(k)$ as well as right eigenvectors of $\underline{H}(k)$. The columns of the matrix $\underline{U}(k)$ are eigenvectors of $\underline{H}(k)\underline{H}^H(k)$ as well as left eigenvectors of $\underline{H}(k)$.

The diagonal matrix $\underline{D}(k)$ for each subband contains non-negative real values along the diagonal and zeros everywhere else. The eigenvalues of $\underline{R}(k)$ are denoted as $\{\lambda_1(k), \lambda_2(k), \lambda_3(k), \lambda_4(k)\}$ or $\{\lambda_i(k)\}$ for $i \in \{1, 2, 3, 4\}$.

The eigenvalue decomposition may be performed independently for the channel response matrix $\underline{H}(k)$ for each of the 48 data subbands to determine the four eigenmodes for that subband (assuming that each matrix $\underline{H}(k)$ is full rank). The four eigenvalues for each diagonal matrix $\underline{D}(k)$ may be ordered such that $\{\lambda_1(k) \geq \lambda_2(k) \geq \lambda_3(k) \geq \lambda_4(k)\}$, where $\lambda_1(k)$ is the largest eigenvalue and $\lambda_4(k)$ is the smallest eigenvalue for subband k. When the eigenvalues for each diagonal matrix $\underline{D}(k)$ are ordered, the eigenvectors (or columns) of the associated matrix $\underline{V}(k)$ are also ordered correspondingly.

A "wideband" eigenmode may be defined as the set of same-order eigenmodes of all subbands after the ordering (i.e., wideband eigenmode m includes eigenmodes m of all subbands). Each wideband eigenmode is associated with a respective set of eigenvectors for all of the subbands. The "principal" wideband eigenmode is the one associated with the largest singular value in each of the matrices $\underline{\hat{\Sigma}}(k)$ after the ordering.

A vector $\underline{d}^m$ may then be formed to include the m-th rank eigenvalue for all 48 data subbands. This vector $\underline{d}^m$ may be expressed as:

$$\underline{d}^m = [\lambda_m(-26) \ldots \lambda_m(-22) \ldots \lambda_m(22) \ldots \lambda_m(26)], \text{ for } m=\{1, 2, 3, 4\}. \quad \text{Eq (9)}$$

The vector $\underline{d}^1$ includes the eigenvalues for the best or principal wideband eigenmode. For a MIMO-OFDM system with four transmit antennas and four receive antennas (i.e., a 4×4 system), there are up four wideband eigenmodes.

If the noise variance $\sigma^2$ at the receiver is constant across the operating band and known to the transmitter, then the received SNR for each subband of each wideband eigenmode may be determined by dividing the eigenvalue $\lambda_m(k)$ by the noise variance $\sigma^2$. For simplicity, the noise variance can be assumed to be equal to one (i.e., $\sigma^2=1$).

For the spatial multiplexing mode, the total transmit power $P_{total}$ available to the transmitter may be distributed to the wideband eigenmodes based on various power allocation schemes. In one scheme, the total transmit power $P_{total}$ is distributed uniformly to all four wideband eigenmodes such that $P_m = P_{total}/4$, where $P_m$ is the transmit power allocated to wideband eigenmode m. In another scheme, the total transmit power $P_{total}$ is distributed to the four wideband eigenmodes using a water-filling procedure.

The water-filling procedure distributes power such that the wideband eigenmodes with higher power gains receive greater fractions of the total transmit power. The amount of transmit power allocated to a given wideband eigenmode is determined by its received SNR, which in turn is dependent on the power gains (or eigenvalues) for all of the subbands of that wideband eigenmode. The water-filling procedure may allocate zero transmit power to wideband eigenmodes with sufficiently poor received SNRs. The water-filling procedure receives $\underline{\beta}=\{\beta_1, \beta_2, \beta_3, \beta_4\}$ for the four wideband eigenmodes, where $\beta_m$ is a normalization factor for wideband eigenmode m and may be expressed as:

$$\beta_m = \frac{1}{\sum_{k \in K} \lambda_m^{-1}(k)}, \text{ for } m = \{1, 2, 3, 4\}. \quad \text{(Eq. 10)}$$

The normalization factor $\beta_m$ keeps the transmit power allocated to wideband eigenmode m invariant after channel inversion is applied, as described below. As shown in equation (10), the normalization factor $\beta_m$ can be derived based on the eigenvalues in the vector $\underline{d}^m$ and with the assumption of the noise variance being equal to one (i.e., $\sigma^2=1$).

The water-filling procedure then determines the fraction $\alpha_m$ of the total transmit power to allocate to each wideband eigenmode based on the set $\underline{\beta}$ such that spectral efficiency or some other criterion is optimized. The transmit power allocated to wideband eigenmode m by the water-filling procedure may be expressed as:

$$P_m = \alpha_m P_{total}, \text{ for } m=\{1, 2, 3, 4\}. \quad \text{Eq. (11)}$$

The power allocations for the four wideband eigenmodes may be given by $\underline{\alpha} = \{\alpha_1, \alpha_2, \alpha_3, \alpha_4\}$, where $$\sum_{m=1}^{4} \alpha_m = 1 \text{ and } \sum_{m=1}^{4} P_m = P_{total}.$$

The spatial multiplexing mode may be selected for use if more than one value in set $\underline{\alpha}$ is non-zero.

The procedure for performing water-filling is known in the art and not described herein. One reference that describes water-filling is "Information Theory and Reliable Communication," by Robert G. Gallager, John Wiley and Sons, 1968, which is incorporated herein by reference.

For the spatial multiplexing mode, the rate for each spatial channel or wideband eigenmode may be selected based on the received SNR achieved by that spatial channel/wideband eigenmode with its allocated transmit power of $P_m$. For simplicity, the following description assumes data transmission on the wideband eigenmodes. The received SNR for each wideband eigenmode may be expressed as:

$$\gamma_m = \frac{P_m \beta_m}{\sigma^2}, \text{ for } m = \{1, 2, 3, 4\}. \quad \text{Eq. (12)}$$

In one embodiment, the rate for each wideband eigenmode is determined based on a table that includes the rates supported by the system and a range of SNRs for each rate. This table may be obtained by computer simulation, empirical measurements, and so on. The particular rate to use for each wideband eigenmode is the rate in the table with a range of SNRs covering the received SNR for the wideband eigenmode. In another embodiment, the rate for each wideband eigenmode is selected based on (1) the received SNR for the wideband eigenmode, (2) an SNR offset used to account for estimation error, variability in the MIMO channel, and other factors, and (3) a table of supported rates and their required SNRs. For this embodiment, an average received SNR for each wideband eigenmode is first computed as described above or as an average of the received SNRs (in units of dBs) for all of the subbands of the wideband eigenmode. In any case, an operating SNR is next computed as the sum of the received SNR and the SNR offset (where both are given in units of dBs). The operating SNR is then compared against the required SNR for each of the rates supported by the system. The highest rate in the table with a required SNR that is less than or equal to the operating SNR is then selected for the wideband eigenmode. The rate for the transmit diversity mode and the beam-steering mode may also be determined in similar manner.

The transmit power $P_m$ allocated for each wideband eigenmode may be distributed across the 48 data subbands of that wideband eigenmode such that the received SNRs for all subbands are approximately equal. This non-uniform allocation of power across the subbands is referred to as channel inversion. The transmit power $P_m(k)$ allocated to each subband may be expressed as:

$$P_m(k) = \frac{\beta_m P_m}{\lambda_m(k)}, \text{ for } k \in K \text{ and } m = \{1, 2, 3, 4\}, \quad \text{Eq. (13)}$$

where $\beta_m$ is given in equation (10).

As shown in equation (13), the transmit power $P_m$ is distributed non-uniformly across the data subbands based on their channel power gains, which is given by the eigenvalues $\lambda_m(k)$, for $k \in K$. The power distribution is such that approximately equal received SNRs are achieved at the receiver for all data subbands of each wideband eigenmode. This channel inversion is performed independently for each of the four wideband eigenmodes. The channel inversion per wideband eigenmode is described in further detail in commonly assigned U.S. patent application Ser. No. 10/229,209, entitled "Coded MIMO Systems with Selective Channel Inversion Applied Per Eigenmode," filed Aug. 27, 2002.

The channel inversion may be performed in various manners. For full channel inversion, all data subbands are used for data transmission if a wideband eigenmode is selected for use. For selective channel inversion, all or a subset of the available data subbands may be selected for use for each wideband eigenmode. The selective channel inversion discards poor subbands with received SNR below a particular threshold and performs channel inversion on only the selected subbands. Selective channel inversion for each wideband eigenmode is also described in commonly assigned U.S. patent application Ser. No. 10/229,209, entitled "Coded MIMO Systems with Selective Channel Inversion Applied Per Eigenmode," filed Aug. 27, 2002. For simplicity, the following description assumes that full channel inversion is performed for each wideband eigenmode selected for use.

The gain to use for each subband of each wideband eigenmode may be determined based on the transmit power $P_m(k)$ allocated to that subband. The gain $g_m(k)$ for each data subband may be expressed as:

$$g_m(k) = \sqrt{P_m(k)}, \text{ for } k \in K \text{ and } m = \{1, 2, 3, 4\}. \quad \text{Eq. (14)}$$

A diagonal gain matrix $\underline{G}(k)$ may be defined for each subband. This matrix $\underline{G}(k)$ includes the gains for the four eigenmodes for subband k along the diagonal, and may be expressed as: $\underline{G}(k) = \text{diag}[g_1(k), g_2(k), g_3(k), g_4(k)]$.

For the spatial multiplexing mode, the transmit vector $\underline{x}(k)$ for each data subband may be expressed as:

$$\underline{x}(k) = \underline{V}(k)\underline{G}(k)\underline{s}(k), \text{ for } k \in K, \quad \text{Eq. (15)}$$

where $\underline{s}(k) = [s_1(k) \ s_2(k) \ s_3(k) \ s_4(k)]^T$, and
$\underline{x}(k) = [x_1(k) \ x_2(k) \ x_3(k) \ x_4(k)]^T$.

The vector $\underline{s}(k)$ includes four modulation symbols to be transmitted on the four eigenmodes for subband k, and the vector $\underline{x}(k)$ includes four transmit symbols to be transmitted from the four antennas for subband k. For simplicity, equation (15) does not include the correction factors used to account for differences between the transmit/receive chains at the access point and the user terminal, which are described in detail below.

Figure 9B:
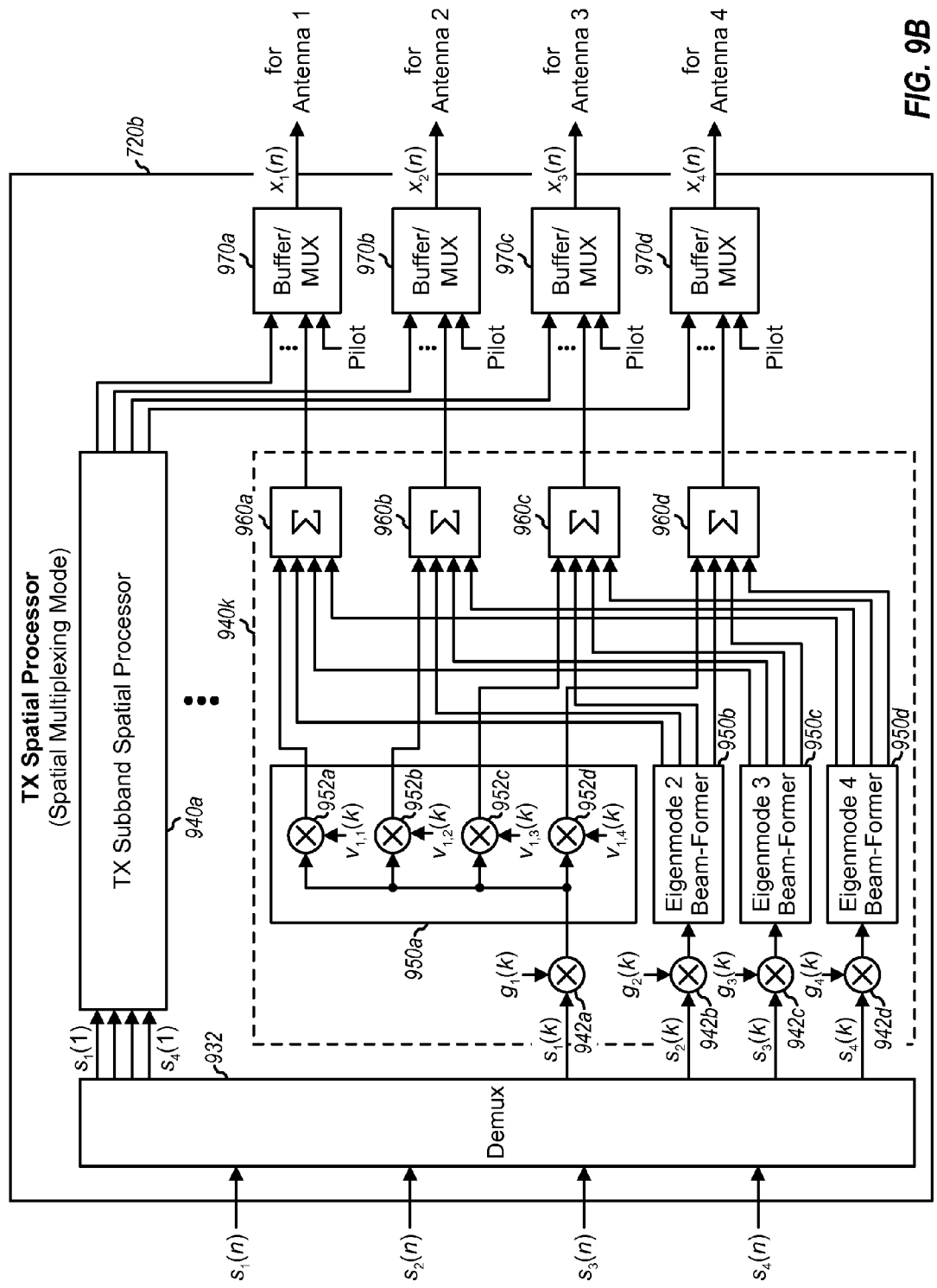

FIG. 9B shows a block diagram of an embodiment of TX spatial processor 720b capable of performing spatial processing for the spatial multiplexing mode. For simplicity, the following description assumes that all four wideband eigenmodes are selected for use. However, less than four wideband eigenmodes may also be selected for use.

Within processor 720b, a demultiplexer 932 receives the four modulation symbol streams (denoted as $s_1(n)$ through $s_4(n)$) to be transmitted on the four wideband eigenmodes, demultiplexes each stream into 48 substreams for the 48 data subbands, and provides four modulation symbol substreams for each data subband to a respective TX subband spatial processor 940. Each processor 940 performs the processing shown in equation (15) for one subband.

Within each TX subband spatial processor 940, the four modulation symbol substreams (denoted as $s_1(k)$ through $s_4(k)$) are provided to four multipliers 942a through 942d, which also receive the gains $g_1(k), g_2(k), g_3(k)$, and $g_4(k)$ for the four eigenmodes of the associated subband. Each gain $g_m(k)$ may be determined based on the transmit power $P_m(k)$ allocated to that subband/eigenmode, as shown in equation (14). Each multiplier 942 scales its modulation symbols with its gain $g_m(k)$ to provide scaled modulation symbols. Multipliers 942a through 942d provide four scaled modulation symbol substreams to four beam-formers 950a through 950d, respectively.

Each beam-former 950 performs beam-forming to transmit one symbol substream on one eigenmode of one subband. Each beam-former 950 receives one symbol substream $s_m(k)$ and one eigenvector $\underline{v}_m(k)$ for the associated eigenmode. In particular, beam-former 950a receives eigenvector $\underline{v}_1(k)$ for the first eigenmode, beam-former 950b receives eigenvector $\underline{v}_2(k)$ for the second eigenmode, and so on. The beam-forming is performed using the eigenvector for the associated eigenmode.

Within each beam-former 950, the scaled modulation symbols are provided to four multipliers 952a through 952d, which also receive four elements, $v_{m,1}(k), v_{m,2}(k), v_{m,3}(k)$, and $v_{m,4}(k)$, of eigenvector $\underline{v}_m(k)$ for the associated eigenmode. Each multiplier 952 then multiplies the scaled modulation symbols with its eigenvector value $v_{m,j}(k)$ to provide "beam-formed" symbols. Multipliers 952a through 952d provide four beam-formed symbol substreams (which are to be transmitted from four antennas) to summers 960a through 960d, respectively.

Each summer 960 receives and sums four beam-formed symbols for the four eigenmodes for each symbol period to provide a preconditioned symbol for an associated transmit antenna. Summers 960a through 960d provide four substreams of preconditioned symbols for four transmit antennas to buffers/multiplexers 970a through 970d, respectively.

Each buffer/multiplexer 970 receives pilot symbols and the preconditioned symbols from TX subband spatial processors 940a through 940k for the 48 data subbands. Each buffer/multiplexer 970 then, for each symbol period, multiplexes 4 pilot symbols, 48 preconditioned symbols, and 12 zeros for 4 pilot subbands, 48 data subbands, and 12 unused subbands, respectively, to form a sequence of 64 transmit symbols for that symbol period. Each buffer/multiplexer 970 provides a stream of transmit symbols $x_i(n)$ for one transmit antenna, where the transmit symbol stream comprises concatenated sequences of 64 transmit symbols. The transmit symbols can be scaled with correction factors to account for differences between the transmit/receive chains at the access point and the user terminal, as described below. The subsequent OFDM modulation for each transmit symbol stream is described above.

Parallel symbol streams may also be transmitted from the four transmit antennas without spatial processing at the access point using the non-steered spatial multiplexing mode. For this mode, the channel inversion process and beam-forming by beam-former 950 may be omitted. Each modulation symbol stream is further OFDM processed and transmitted from a respective transmit antenna.

The non-steered spatial multiplexing mode may be used for various situations such as if the transmitter is unable to perform the spatial processing necessary to support beam-steering based on eigenmode decomposition. This may be because the transmitter has not performed calibration procedures, is unable to generate a sufficiently good estimate of the channel, or does not have calibration and eigenmode processing capabilities at all. For the non-steered spatial multiplexing mode, spatial multiplexing is still used to increase the transmission capacity, but the spatial processing to separate out the individual symbol streams is performed by the receiver.

For the non-steered spatial multiplexing mode, the receiver performs the spatial processing to recover the transmitted symbol streams. In particular, a user terminal may implement a channel correlation matrix inversion (CCMI) technique, a minimum mean square error (MMSE) technique, a successive interference cancellation receiver processing technique, or some other receiver spatial processing technique. These techniques are described in detail in commonly assigned U.S. patent application Ser. No. 09/993,087, entitled "Multiple-Access Multiple-Input Multiple-Output (MIMO) Communication System," filed Nov. 6, 2001. The non-steered spatial multiplexing mode may be used for both downlink and uplink transmissions.

The multi-user spatial multiplexing mode supports data transmission to multiple user terminals simultaneously on the downlink based on the "spatial signatures" of the user terminals. The spatial signature for a user terminal is given by a channel response vector (for each subband) between the access point antennas and each user terminal antenna. The access point may obtain the spatial signatures, for example, based on the steered reference transmitted by the user terminals. The access point may process the spatial signatures for user terminals desiring data transmission to (1) select a set of user terminals for simultaneous data transmission on the downlink and (2) derive steering vectors for each of the independent data streams to be transmitted to the selected user terminals.

The steering vectors for the multi-user spatial multiplexing mode may be derived in various manners. Two exemplary schemes are described below. For simplicity, the following description is for one subband and assumes that each user terminal is equipped with a single antenna.

In a first scheme, the access point obtains the steering vectors using channel inversion. The access point may select Nap single-antenna user terminals for simultaneous transmission on the downlink. The access point obtains an $1 \times N_{ap}$ channel response row vector for each selected user terminal and forms an $N_{ap} \times N_{ap}$ channel response matrix $\underline{H}_{mu}$ with the Nap row vectors for the Nap user terminals. The access point then obtains a matrix $\underline{H}_{steer}$ of Nap steering vectors for the Nap selected user terminals as $\underline{H}_{steer} = \underline{H}_{mu}^{-1}$. The access point can also transmit a steered reference to each selected user terminal. Each user terminal processes its steered reference to estimate the channel gain and phase and coherently demodulates received symbols for its single antenna with the channel gain and phase estimates to obtain recovered symbols.

In a second scheme, the access point precodes Nap symbol streams to be sent to Nap user terminals such that these symbol streams experience little cross-talk at the user terminals. The access point can form the channel response matrix $\underline{H}_{mu}$ for the Nap selected user terminals and perform QR factorization on $\underline{H}_{mu}$ such that $\underline{H}_{mu} = \underline{T}_{tri} \underline{Q}_{mu}$, where $\underline{T}_{tri}$ is a lower left triangular matrix $\underline{T}_{tri}$ and $\underline{Q}_{mu}$ is a unitary matrix. The access point then precodes the Nap data symbol streams with the matrix $\underline{T}_{tri}$ to obtain Nap precoded symbol streams $\underline{a}$, and further processes the precoded symbol streams with the unitary matrix $\underline{Q}_{mu}$ to obtain the Nap transmit symbol streams for transmission to the Nap user terminals. Again, the access point can also transmit a steered reference to each user terminal. Each user terminal uses the steered reference to coherently demodulate its received symbols to obtain recovered symbols.

For the uplink in the multi-user spatial multiplexing mode, the access point can recover Nap symbol streams transmitted simultaneously by Nap user terminals using MMSE receiver processing, successive interference cancellation, or some other receiver processing technique. The access point can estimate the uplink channel response for each user terminal and use the channel response estimate for receiver spatial processing and for scheduling uplink transmissions. Each single-antenna user terminal can transmit an orthogonal pilot on the uplink. The uplink pilots from the Nap user terminals can be orthogonal in time and/or frequency. Time orthogonality can be achieved by having each user terminal covers its uplink pilot with an orthogonal sequence assigned to the user terminal. Frequency orthogonality can be achieved by having each user terminal transmits its uplink pilot on a different set of subbands. The uplink transmissions from the user terminals should be approximately time-aligned at the access point (e.g., time-aligned to within the cyclic prefix).

Beam-Steering Mode—Transmit Processing

Figure 10A:
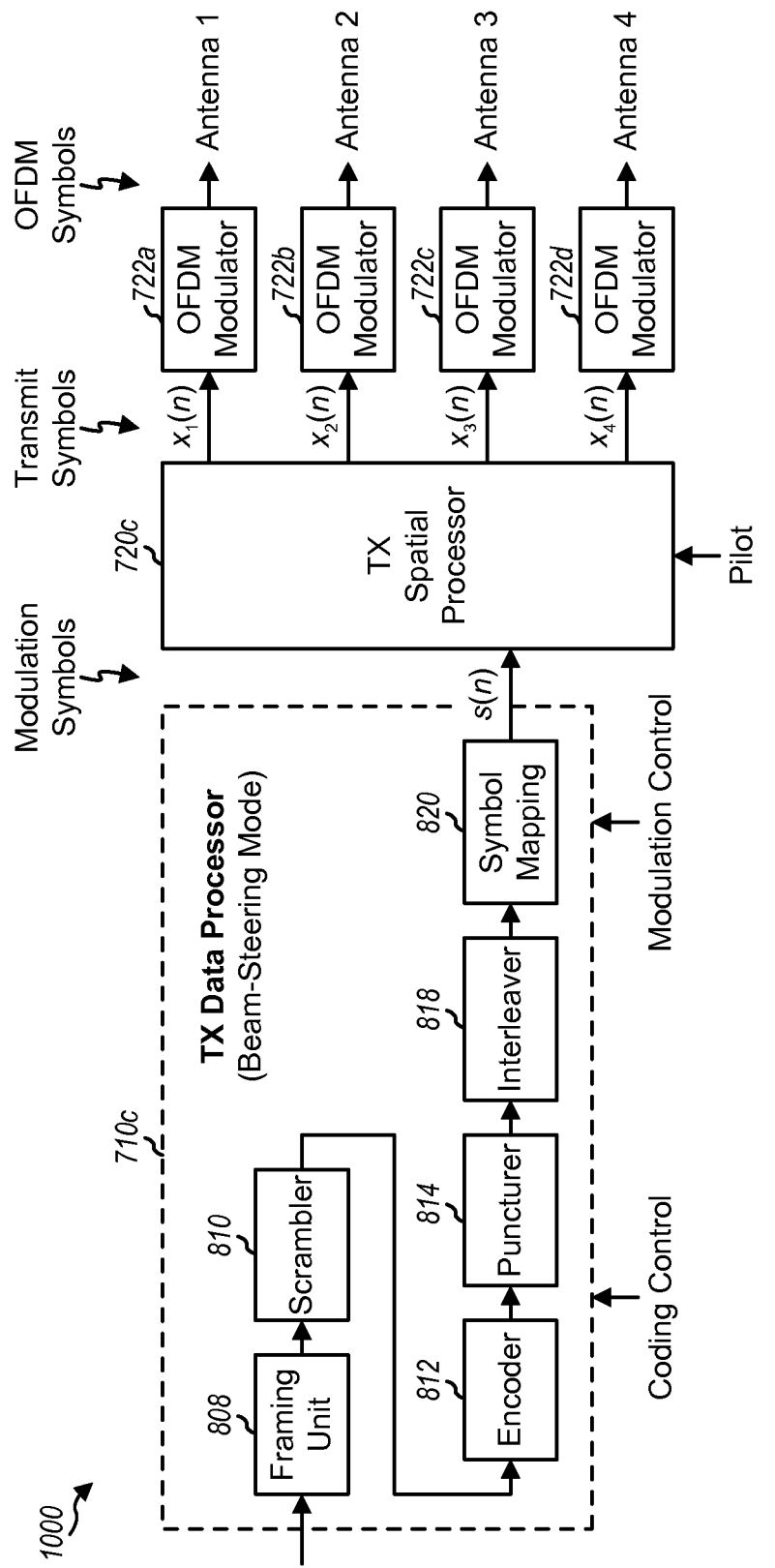

FIG. 10A shows a block diagram of a transmitter unit 1000 capable of performing the transmit processing for the beam-steering mode. Transmitter unit 1000 is yet another embodiment of the transmitter portion of the access point and the user terminal.

Within a TX data processor 710c, framing unit 808 frames the data for each FCH/RCH packet to generate one or more PHY frames for the packet. Scrambler 810 then scrambles the data for each transport channel. Encoder 812 next codes the framed data in accordance with a selected coding scheme to provide code bits. Puncture unit 814 then punctures the code bits to obtain the desired code rate for the wideband eigenmode used for data transmission. The code bits from puncture unit 818 are interleaved across all data subbands. Symbol mapping unit 820 then maps the interleaved data in accordance with a selected modulation scheme to provide modulation symbols. A TX spatial processor 720c then performs transmit processing on the modulation symbols for the beam-steering mode.

The beam-steering mode may be used to transmit data on one spatial channel or wideband eigenmode—typically the one associated with the largest eigenvalues for all of the data subbands. The beam-steering mode may be selected if the transmit power allocation to the wideband eigenmodes results in only one entry in the set $\underline{\alpha}$ being non-zero. Whereas the spatial multiplexing mode performs beam-forming for each of the selected eigenmodes of each subband based on its eigenvector, the beam-steering mode performs beam-steering based on a "normalized" eigenvector for the principal eigenmode of each subband to transmit data on that single eigenmode.

The four elements of each eigenvector $\underline{v}_1(k)$, for k∈K, for the principal eigenmode may have different magnitudes. The four preconditioned symbols obtained based on the four elements of eigenvector $\underline{v}_1(k)$ for each subband may then have different magnitudes. Consequently, the four per-antenna transmit vectors, each of which includes the preconditioned symbols for all data subbands for a given transmit antenna, may have different magnitudes. If the transmit power for each transmit antenna is limited (e.g., because of limitations of the power amplifiers), then the beam-forming technique may not fully use the total power available for each antenna.

The beam-steering mode uses only the phase information from eigenvectors $\underline{v}_1(k)$, for k∈K, for the principal eigenmode and normalizes each eigenvector such that all four elements in the eigenvector have equal magnitudes. The normalized eigenvector $\underline{\tilde{v}}(k)$ for subband k may be expressed as:

$$\underline{\tilde{v}}(k)=[Ae^{j\theta_1(k)}\ Ae^{j\theta_2(k)}\ Ae^{j\theta_3(k)}\ Ae^{j\theta_4(k)}]^T, \quad \text{Eq. (16)}$$

where A is a constant (e.g., A=1); and
$\theta_i(k)$ is the phase for subband k of transmit antenna i, which is given as:

$$\theta_i(k) = \angle v_{1,i}(k) = \tan^{-1}\left(\frac{\text{Im}\{v_{1,i}(k)\}}{\text{Re}\{v_{1,i}(k)\}}\right). \quad \text{Eq. (17)}$$

As shown in equation (17), the phase of each element in the vector $\underline{\tilde{v}}(k)$ is obtained from the corresponding element of eigenvector $\underline{v}_1(k)$ (i.e., $\theta_i(k)$ is obtained from $v_{1,i}(k)$, where $\underline{v}_1(k)=[v_{1,1}(k)\ v_{1,2}(k)\ v_{1,3}(k)\ v_{1,4}(k)]^T$).

Channel inversion may also be performed for the beam-steering mode so that a common rate can be used for all data subbands. The transmit power $\tilde{P}_1(k)$ allocated to each data subband for the beam-steering mode may be expressed as:

$$\tilde{P}_1(k) = \frac{\tilde{\beta}_1 \tilde{P}_1}{\tilde{\lambda}_1(k)}, \text{ for } k \in K, \quad \text{Eq. (18)}$$

where $\tilde{\beta}_1$ is a normalization factor that keeps the total transmit power invariant after channel inversion is applied;
$\tilde{P}_1$ is the transmit power allocated to each of the four antennas; and $\tilde{\lambda}_1(k)$ is the power gain for subband k of the principal eigenmode for the beam-steering mode.

The normalization factor $\tilde{\beta}_1$ may be expressed as:

$$\tilde{\beta}_1 = \frac{1}{\sum_{k\in K} \tilde{\lambda}_1^{-1}(k)}. \quad \text{Eq. (19)}$$

The transmit power $\tilde{P}_1$ may be given as $\tilde{P}_1=P_{total}/4$ (i.e., uniform allocation of the total transmit power across the four transmit antennas). The power gain $\tilde{\lambda}_1(k)$ may be expressed as:

$$\tilde{\lambda}_1(k)=\underline{\tilde{v}}^H(k)\underline{H}^H(k)\underline{H}(k)\underline{\tilde{v}}(k). \quad \text{Eq. (20)}$$

The channel inversion results in power allocation of $\tilde{P}_1(k)$, for k∈K, for the 48 data subbands. The gain for each data subband may then be given as $\tilde{g}(k)=\sqrt{\tilde{P}_1(k)}$.

For the beam-steering mode, the transmit vector $\underline{x}(k)$ for each subband may be expressed as:

$$\underline{x}(k)=\underline{\tilde{v}}(k)\tilde{g}(k)s(k), \text{ for } k\in K. \quad \text{Eq. (21)}$$

Again for simplicity, equation (21) does not include the correction factors used to account for differences between the transmit/receive chains at the access point and the user terminal.

As shown in equation (16), the four elements of the normalized steering vector $\underline{\tilde{v}}(k)$ for each subband have equal magnitude but possibly different phases. The beam-steering thus generates one transmit vector $\underline{x}(k)$ for each subband, with the four elements of $\underline{x}(k)$ having the same magnitude but possibly different phases.

Figure 10B:
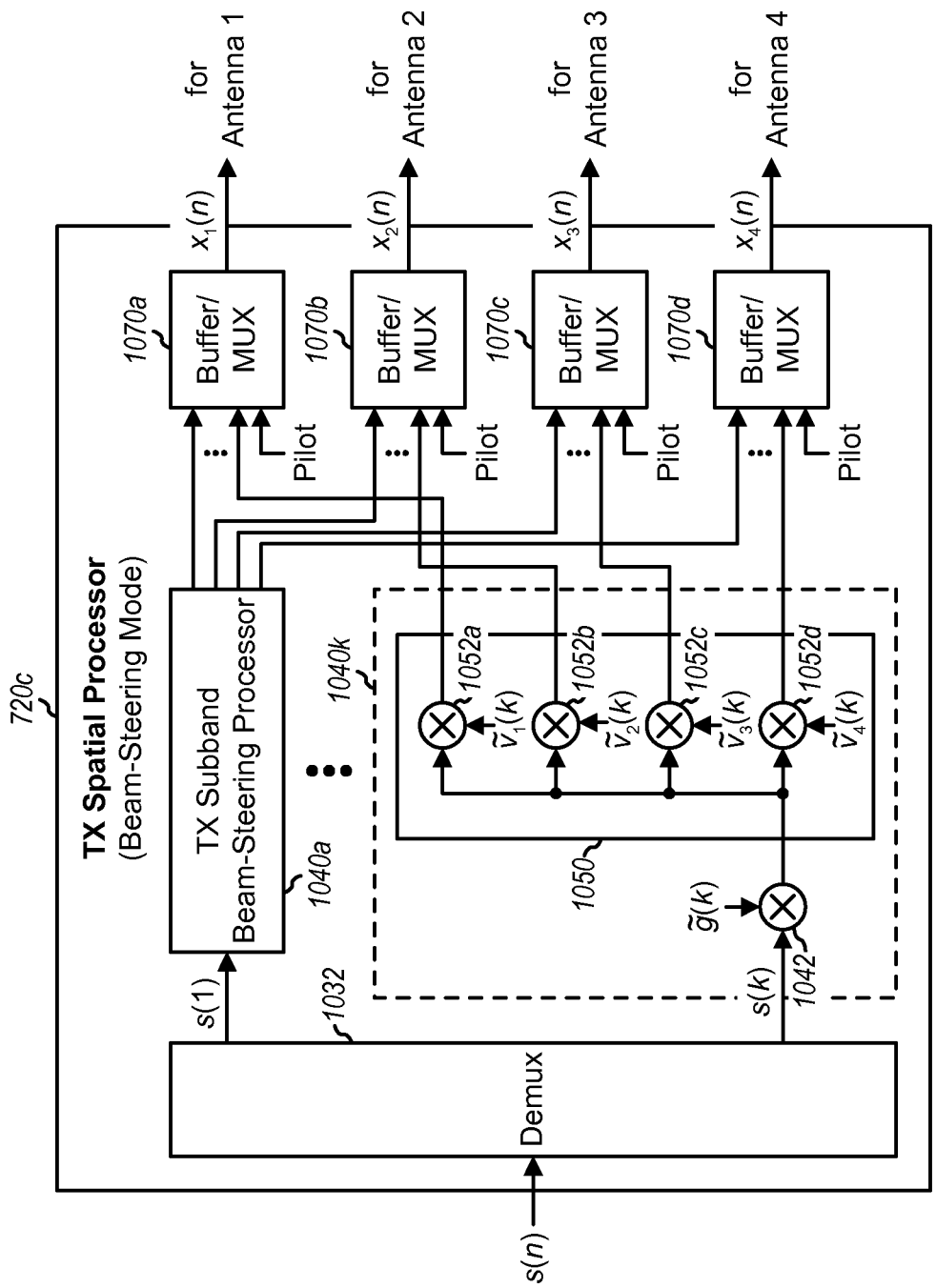

FIG. 10B shows a block diagram of an embodiment of TX spatial processor 720c capable of performing the spatial processing for the beam-steering mode.

Within processor 720c, a demultiplexer 1032 receives and demultiplexes the modulation symbol stream s(n) into 48 substreams for the 48 data subbands (denoted as s(1) through s(k)). Each symbol substream is provided to a respective TX subband beam-steering processor 1040. Each processor 1040 performs the processing shown in equation (14) for one subband.

Within each TX subband beam-steering processor 1040, the modulation symbol substream is provided to a multiplier 1042, which also receives the gain $\tilde{g}(k)$ for the associated subband. Multiplier 1042 then scales the modulation symbols with the gain $\tilde{g}(k)$ to obtain scaled modulation symbols, which are then provided to a beam-steering unit 1050.

Beam-steering unit 1050 also receives the normalized eigenvector $\underline{\tilde{v}}(k)$ for the associated subband. Within beam-steering unit 1050, the scaled modulation symbols are provided to four multipliers 1052a through 1052d, which also respectively receive the four elements, $\tilde{v}_1(k)$, $\tilde{v}_2(k)$, $\tilde{v}_3(k)$, and $\tilde{v}_4(k)$ of the normalized eigenvector $\underline{\tilde{v}}(k)$. Each multiplier 1052 multiplies its scaled modulation symbols with its normalized eigenvector value $\tilde{v}_i(k)$ to provide preconditioned symbols. Multipliers 1052a through 1052d provide four preconditioned symbol substreams to buffers/multiplexers 1070a through 1070d, respectively.

Each buffer/multiplexer 1070 receives pilot symbols and the preconditioned symbols from TX subband beam-steering processors 1040a through 1040k for the 48 data subbands, multiplexes the pilot and preconditioned symbols and zeros for each symbol period, and provides a stream of transmit symbols $x_i(n)$ for one transmit antenna. The subsequent OFDM modulation for each transmit symbol stream is described above.

The processing for the beam-steering mode is described in further detail in commonly assigned U.S. patent application Ser. No. 10/228,393, entitled "Beam-Steering and Beam-Forming for Wideband MIMO Systems," filed Aug. 27, 2002. The system may also be designed to support a beam-forming mode whereby a data stream is transmitted on the principal eigenmode using the eigenvector instead of the normalized eigenvector.

Framing for PHY Frames

Figure 11A:
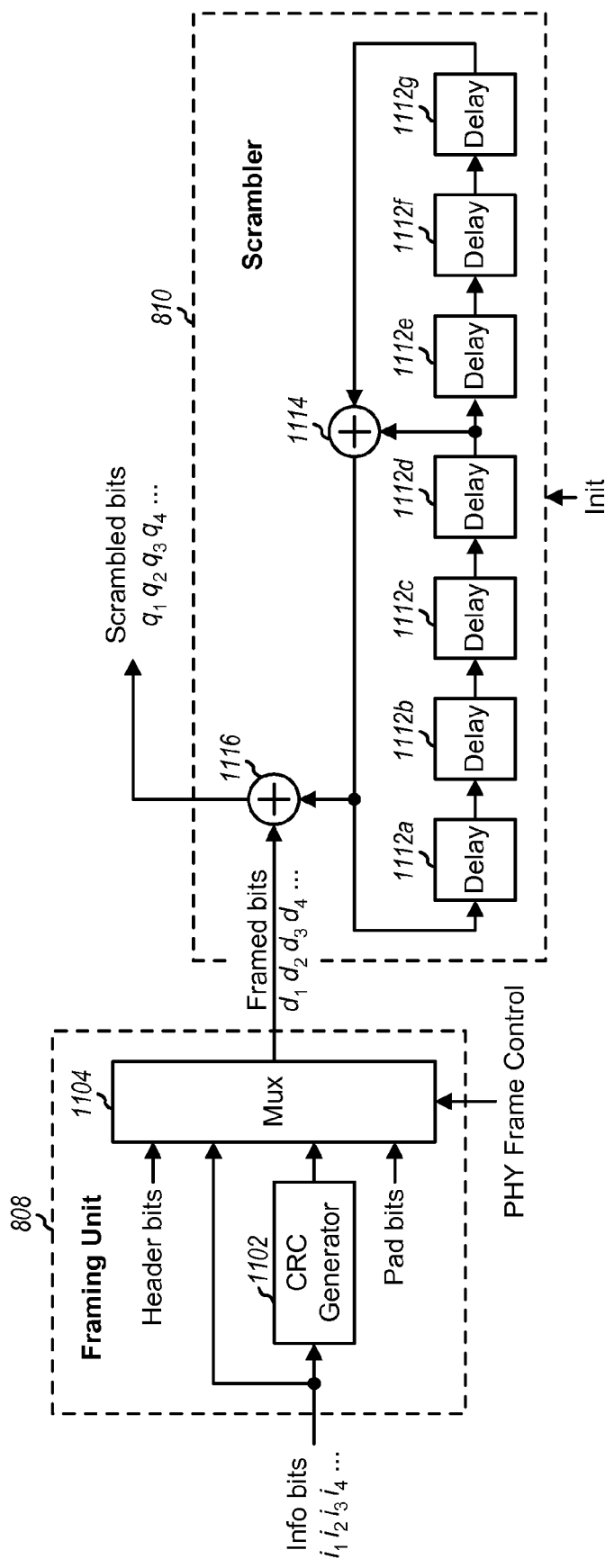
FIG. 11A shows a framing unit and a scrambler within a TX data processor.

FIG. 11A shows an embodiment of framing unit 808, which is used to frame the data for each FCH/RCH packet prior to subsequent processing by the TX data processor. This framing function may be bypassed for messages sent on the BCH, FCCH, and RACH. The framing unit generates an integer number of PHY frames for each FCH/RCH packet, where each PHY frame spans 6 OFDM symbols for the embodiment described herein.

For the diversity and beam-steering modes, only one spatial channel or wideband eigenmode is used for data transmission. The rate for this mode is known, and the number of information bits that may be sent in the payload of each PHY frame may be computed. For the spatial multiplexing mode, multiple spatial channels may be used for data transmission. Since the rate of each spatial channel is known, the number of information bits that may be sent in the payload of each PHY frame for all spatial channels may be computed.

As shown in FIG. 11A, the information bits (denoted as $i_1$ $i_2$ $i_3$ $i_4$ ...) for each FCH/RCH packet are provided to a CRC generator 1102 and a multiplexer 1104 within framing unit 808. CRC generator 1102 generates a CRC value for the bits in the header (if any) and payload fields of each PHY frame and provides CRC bits to multiplexer 1104. Multiplexer 1104 receives the information bits, CRC bits, header bits, and pad bits (e.g., zeros), and provides these bits in the proper order, as shown in FIG. 6, based on a PHY Frame Control signal. The framing function may be bypassed by providing the information bits directly through multiplexer 1104. The framed or unframed bits (denoted as $d_1$ $d_2$ $d_3$ $d_4$ ...) are provided to scrambler 810.

Scrambling

In an embodiment, the data bits for each transport channel are scrambled prior to coding. The scrambling randomizes the data so that a long sequence of all ones or all zeros is not transmitted. This can reduce the variation in the peak to average power of the OFDM waveform. The scrambling may be omitted for one or more transport channels and may also be selectively enabled and disabled.

FIG. 11A also shows an embodiment of scrambler 810. In this embodiment, scrambler 810 implements a generator polynomial:

$$G(x)=x^7+x^4+x. \quad \text{Eq. (22)}$$

Other generator polynomials may also be used, and this is within the scope of the invention.

As shown in FIG. 11A, scrambler 810 includes seven delay elements 1112a through 1112g coupled in series. For each clock cycle, an adder 1114 performs modulo-2 addition of two bits stored in delay elements 1112d and 1112g and provides a scrambling bit to delay element 1112a.

The framed/unframed bits ($d_1$ $d_2$ $d_3$ $d_4$ ...) are provided to an adder 1116, which also receives scrambling bits from adder 1114. Adder 1116 performs modulo-2 addition of each bit $d_n$ with a corresponding scrambling bit to provide a scrambled bit $q_n$. Scrambler 810 provides a sequence of scrambled bits, which is denoted as $q_1$ $q_2$ $q_3$ $q_4$ ....

The initial state of the scrambler (i.e., the content of delay elements 1112a through 1112g) is set to a 7-bit non-zero number at the start of each TDD frame. The three most significant bits (MSBs) (i.e., delay element 1112e through 1112f) are always set to one ('1') and the four least significant bits (LSBs) are set to the TDD frame counter, as indicated in the BCH message.

Encoding/Puncturing

In an embodiment, a single base code is used to code data prior to transmission. This base code generates code bits for one code rate. All other code rates supported by the system (as listed in Table 25) may be obtained by either repeating or puncturing the code bits.

Figure 11B:
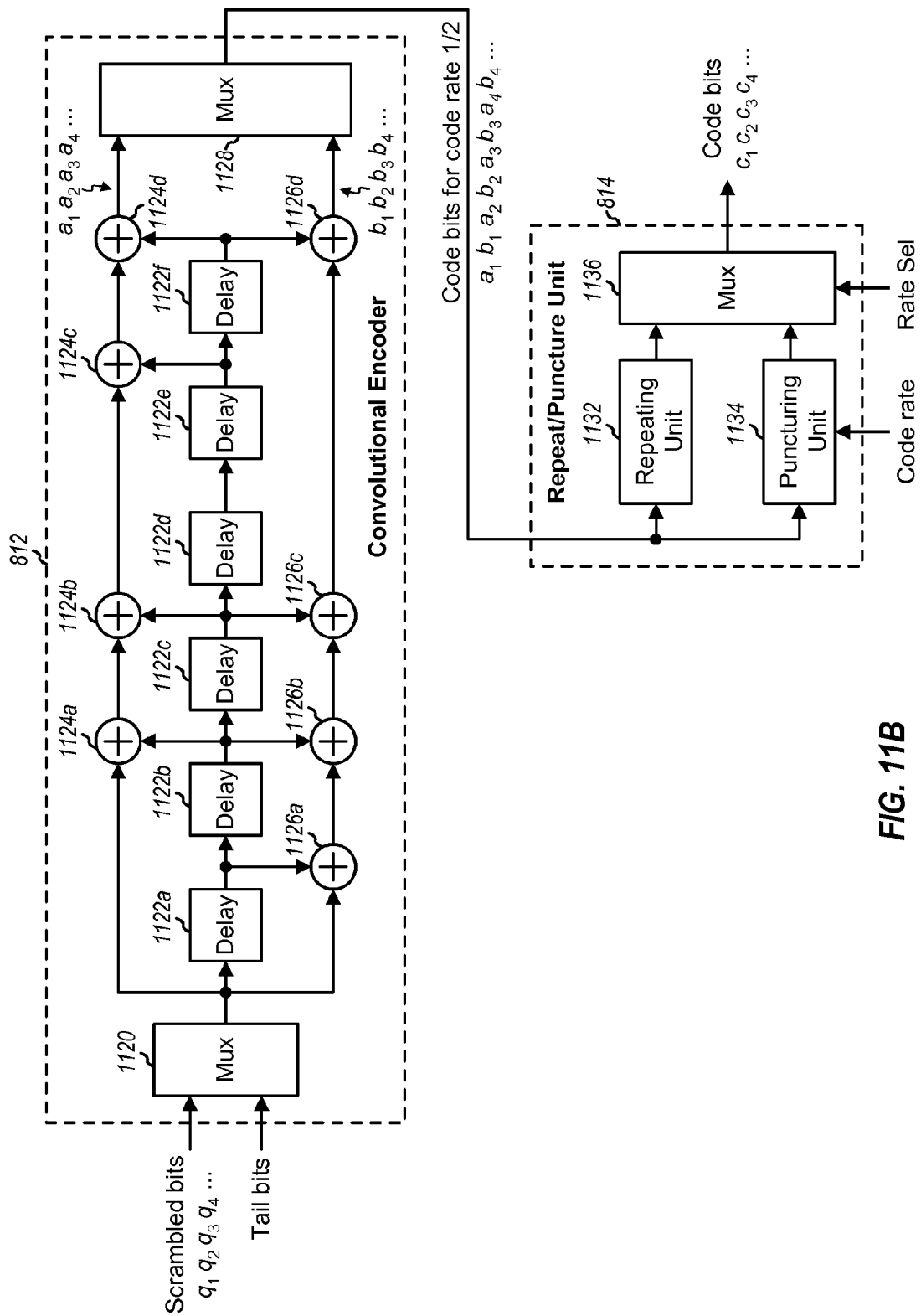
FIG. 11B shows an encoder and a repeat/puncture unit within the TX data processor.

FIG. 11B shows an embodiment of encoder 812 that implements the base code for the system. In this embodiment, the base code is a rate 1/2, constraint length 7 (K=7), convolutional code with generators of 133 and 171 (octal).

Within encoder 812, a multiplexer 1120 receives and multiplexes the scrambled bits and tail bits (e.g., zeros). Encoder 812 further includes six delay elements 1122a through 1122f coupled in series. Four adders 1124a through 1124d are also coupled in series and used to implement the first generator (133). Similarly, four adders 1126a through 1126d are coupled in series and used to implement the second generator (171). The adders are further coupled to the delay elements in a manner to implement the two generators of 133 and 171, as shown in FIG. 11B.

The scrambled bits are provided to the first delay element 1122a and to adders 1124a and 1126a. For each clock cycle, adders 1124a through 1124d perform modulo-2 addition of the incoming bit and four prior bits stored in delay elements 1122b, 1122c, 1122e, and 1122f to provide the first code bit for that clock cycle. Similarly, adders 1126a through 1126d perform modulo-2 addition of the incoming bit and four prior bits stored in delay elements 1122a, 1122b, 1122c, and 1122f to provide the second code bit for that clock cycle. The code bits generated by the first generator are denoted as $a_1$ $a_2$ $a_3$ $a_4$ ..., and the code bits generated by the second generator are denoted as $b_1$ $b_2$ $b_3$ $b_4$ .... A multiplexer 1128 then receives and multiplexes the two streams of code bits from the two generators into a single stream of code bits, which is denoted as $a_1$ $b_1$ $a_2$ $b_2$ $a_3$ $b_3$ $a_4$ $b_4$ .... For each scrambled bit $q_n$, two code bits $a_n$ and $b_n$ are generated, which results in a code rate of 1/2.

FIG. 11B also shows an embodiment of repeat/puncture unit 814 that can be used to generate other code rates based on the base code rate of 1/2. Within unit 814, the rate 1/2 code bits from encoder 812 are provided to a repeating unit 1132 and a puncturing unit 1134. Repeating unit 1132 repeats each rate 1/2 code bit once to obtain an effective code rate of 1/4. Puncturing unit 1134 deletes some of the rate 1/2 code bits based on a specific puncturing pattern to provide the desired code rate.

Table 30 lists exemplary puncturing patterns that may be used for the various code rates supported by the system. Other puncturing patterns may also be used, and this is within the scope of the invention.

TABLE 30

| Code Rate | Puncturing Pattern |
|---|---|
| 1/2 | 11 |
| 7/12 | 11111110111110 |
| 5/8 | 1110111011 |

TABLE 30-continued

| Code Rate | Puncturing Pattern |
|---|---|
| 2/3 | 1110 |
| 11/16 | 1111101111111010011100 |
| 3/4 | 111001 |
| 13/16 | 01111011111101110000101100 |
| 5/6 | 1110011001 |
| 7/8 | 11101010011001 |

To obtain a code rate of k/n, puncturing unit 1134 provides n code bits for each group of 2k rate 1/2 code bits received from encoder 812. Thus, 2k−n code bits are deleted from each group of 2k code bits. The bits to be deleted from each group are denoted by zeros in the puncturing pattern. For example, to obtain a code rate of 7/12, two bits are deleted from each group of 14 code bits from encoder 812, with the deleted bits being the 8th and 14th code bits in the group, as denoted by the puncturing pattern of "11111110111110". No puncturing is performed if the desired code rate is 1/2.

A multiplexer 1136 receives the stream of code bits from repeating unit 1132 and the stream of code bits from puncturing unit 1134. Multiplexer 1136 then provides the code bits from repeating unit 1132 if the desired code rate is 1/4 and the code bits from puncturing unit 1134 if the desired code rate is 1/2 or higher.

Other codes and puncturing patterns besides those described above may also be used, and this is within the scope of the invention. For example, a Turbo code, a block code, some other codes, or any combination thereof may be used to code data. Also, different coding schemes may be used for different transport channels. For example, convolutional coding may be used for the common transport channels, and Turbo coding may be used for the dedicated transport channels.

Interleaving

In an embodiment, the code bits to be transmitted are interleaved across the 48 data subbands. For the diversity and beam-steering modes, one stream of code bits is transmitted and interleaved across all data subbands. For the spatial multiplexing mode, up to four streams of code bits may be transmitted on up to four spatial channels. The interleaving may be performed separately for each spatial channel such that each stream of code bits is interleaved across all data subbands of the spatial channel used to transmit that stream. Table 29 shows an exemplary code bit-subband assignment that may be used for the interleaving for all transmission modes.

In one embodiment, the interleaving is performed across all 48 data subbands in each interleaving interval. For this embodiment, each group of 48 code bits in a stream is spread over the 48 data subbands to provide frequency diversity. The 48 code bits in each group may be assigned indices of 0 through 47. Each code bit index is associated with a respective subband. All code bits with a particular index are transmitted on the associated subband. For example, the first code bit (with index 0) in each group is transmitted on subband −26, the second code bit (with index 1) is transmitted on subband 1, the third code bit (with index 2) is transmitted on subband −17, and so on. This interleaving scheme may be used for the diversity, beam-steering, and spatial multiplexing modes. An alternative interleaving scheme for the spatial multiplexing mode is described below.

The interleaving may alternatively or additionally be performed over time. For example, after the interleaving across the data subbands, the code bits for each subband may further be interleaved (e.g., over one PHY frame or one PDU) to provide time diversity. For the spatial multiplexing mode, the interleaving may also be performed over multiple spatial channels.

Additionally, interleaving may be employed across the dimensions of the QAM symbols such that code bits forming QAM symbols are mapped to different bit positions of the QAM symbols.

Symbol Mapping

Table 31 shows the symbol mapping for various modulation schemes supported by the system. For each modulation scheme (except for BPSK), half of the bits are mapped to an inphase (I) component and the other half of the bits are mapped to a quadrature (Q) component.

In an embodiment, the signal constellation for each supported modulation scheme may be defined based on Gray mapping. With Gray mapping, neighboring points in the signal constellation (in both the I and Q components) differ by only one bit position. Gray mapping reduces the number of bit errors for more likely error events, which corresponds to a received symbol being mapped to a location near the correct location, in which case only one code bit would be received in error.

TABLE 31

| BPSK | | | |
|---|---|---|---|
| b | I | | Q |
| 0 | −1 | | 0 |
| 1 | 1 | | 0 |
| QPSK | | | |
| $b_0$ | I | $b_1$ | Q |
| 0 | −1 | 0 | −1 |
| 1 | 1 | 1 | 1 |
| 16 QAM | | | |
| $b_0b_1$ | I | $b_2b_3$ | Q |
| 00 | −3 | 00 | −3 |
| 01 | −1 | 01 | −1 |
| 11 | 1 | 11 | 1 |
| 10 | 3 | 10 | 3 |
| 64 QAM | | | |
| $b_0b_1b_2$ | I | $b_3b_4b_5$ | Q |
| 000 | −7 | 000 | −7 |
| 001 | −5 | 001 | −5 |
| 011 | −3 | 011 | −3 |
| 010 | −1 | 010 | −1 |
| 110 | 1 | 110 | 1 |
| 111 | 3 | 111 | 3 |
| 101 | 5 | 101 | 5 |
| 100 | 7 | 100 | 7 |
| 256 QAM | | | |
| $b_0b_1b_2b_3$ | I | $b_4b_5b_6b_7$ | Q |
| 0000 | −15 | 0000 | −15 |
| 0001 | −13 | 0001 | −13 |
| 0011 | −11 | 0011 | −11 |
| 0010 | −9 | 0010 | −9 |
| 0110 | −7 | 0110 | −7 |
| 0111 | −5 | 0111 | −5 |
| 0101 | −3 | 0101 | −3 |
| 0100 | −1 | 0100 | −1 |
| 1100 | 1 | 1100 | 1 |
| 1101 | 3 | 1101 | 3 |
| 1111 | 5 | 1111 | 5 |

TABLE 31-continued

| | | | |
|---|---|---|---|
| 1110 | 7 | 1110 | 7 |
| 1010 | 9 | 1010 | 9 |
| 1011 | 11 | 1011 | 11 |
| 1001 | 13 | 1001 | 13 |
| 1000 | 15 | 1000 | 15 |

Normalization Factor $K_{norm}$

| Modulation Scheme | Value |
|---|---|
| BPSK | 1.0 |
| QPSK | $1/\sqrt{2}$ |
| 16 QAM | $1/\sqrt{10}$ |
| 64 QAM | $1/\sqrt{42}$ |
| 256 QAM | $1/\sqrt{170}$ |

The I and Q values for each modulation scheme shown in Table 31 are scaled by a normalization factor $K_{norm}$ so that the average power of all signal points in the associated signal constellation is equal to unity. The normalization factor for each modulation scheme is shown in Table 31. Quantized values for the normalization factors for the supported modulation schemes may also be used. A modulation symbol from a particular signal constellation would then have the following form:

$$s = (I+jQ) \cdot K_{norm},$$

where I and Q are the values in Table 31 for the signal constellation.

For a given PDU, the modulation may be different across the PDU and may be different for multiple spatial channels used for data transmission. For example, for the BCH PDU, different modulation schemes may be used for the beacon pilot, the MIMO pilot, and the BCH message.

Processing for Spatial Multiplexing Mode

For the spatial multiplexing mode, a PDU may be transmitted over multiple spatial channels. Various schemes may be used to process data for transmission over multiple spatial channels. Two specific processing schemes for the spatial multiplexing mode are described below.

In the first processing scheme, coding and puncturing are performed on a per spatial channel basis to achieve the desired code rate for each spatial channel. The NE spatial channels to use for data transmission are ranked from the highest to lowest received SNR. The data for the entire PDU is first coded to obtain a stream of rate 1/2 code bits. The code bits are then punctured to obtain the desired code rate for each spatial channel.

The puncturing may be performed in sequential order for the $N_E$ spatial channels, from the best (i.e., highest SNR) to the worst (i.e., lowest SNR) spatial channel. In particular, the puncture unit first performs puncturing for the best spatial channel with the highest received SNR. When the correct number of code bits has been generated for the best spatial channel, the puncture unit then performs puncturing for the second best spatial channel with the next highest received SNR. This process continues until the code bits for all $N_E$ spatial channels are generated. The order for puncturing is from the largest to smallest received SNR, regardless of the specific code rate used for each spatial channel.

For the example shown in Table 28, the 3456 information bits to be transmitted in the overall PHY frame are first coded with the rate 1/2 base code to obtain 6912 code bits. The first 3168 code bits are punctured using the puncturing pattern for code rate 11/16 to obtain 2304 code bits, which are provided in the PHY frame for the first spatial channel. The next 2592 code bits are then punctured using the puncturing pattern for code rate 3/4 to obtain 1728 code bits, which are provided in the PHY frame for the second spatial channel. The next 864 code bits are then punctured using the puncturing pattern for code rate 3/4 to obtain 576 code bits, which are provided in the PHY frame for the third spatial channel. The last 288 code bits for the PHY frame are then punctured using the puncturing pattern for code rate 1/2 to obtain 288 code bits, which are provided in the PHY frame for the last spatial channel. These four individual PHY frames are further processed and transmitted on the four spatial channels. The puncturing for the next overall PHY frame is then performed in similar manner. The first processing scheme may be implemented by TX data processor 710b in FIG. 9A.

In the second processing scheme, the coding and puncturing are performed for pairs of subbands. Moreover, the coding and puncturing are cycled through all selected spatial channels for each pair of subbands.

Figure 11C:
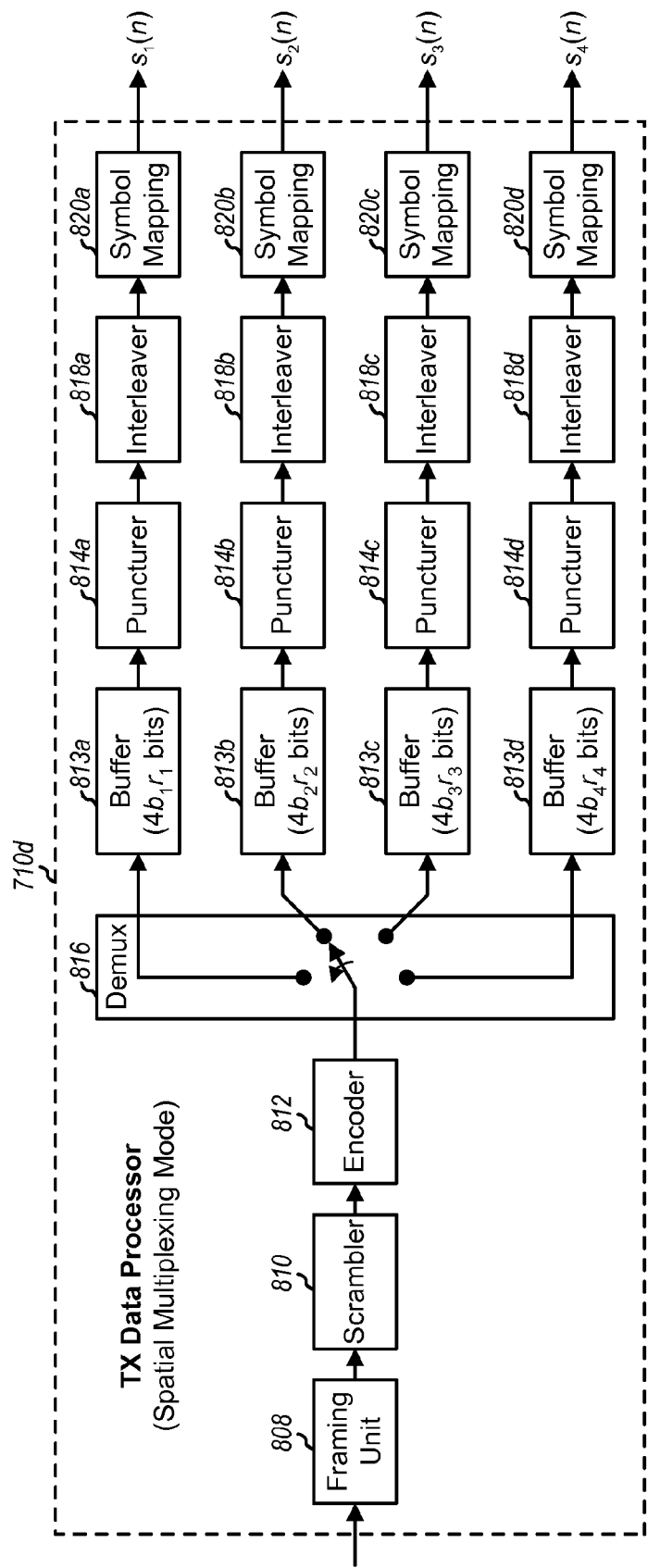
FIG. 11C shows another TX data processor that may be used for the spatial multiplexing mode.

FIG. 11C shows a block diagram that illustrates a TX data processor 710d that implements the second processing scheme. Encoder 812 performs rate 1/2 convolutional encoding of the scrambled bits from scrambler 810. Each spatial channel is assigned a particular rate, which is associated with a specific combination of code rate and modulation scheme, as shown in Table 25. Let $b_m$ denote the number of code bits per modulation symbol for spatial channel m (or equivalently, the number of code bits sent on each data subband of spatial channel m) and $r_m$ denote the code rate used for spatial channel m. The value for $b_m$ is dependent on the constellation size of the modulation scheme used for spatial channel m. In particular, $b_m = 1, 2, 4, 6$ and 8 for BPSK, QPSK, 16-QAM, 64-QAM and 256-QAM, respectively.

Encoder 812 provides a stream of rate 1/2 code bits to demultiplexer 816, which demultiplexes the received code bit stream into four substreams for the four spatial channels. The demultiplexing is such that the first $4b_1 r_1$ code bits are sent to buffer 813a for spatial channel 1, the next $4b_2 r_2$ code bits are sent to buffer 813b for spatial channel 2, and so on. Each buffer 813 receives $4b_m r_m$ code bits each time demultiplexer 816 cycles through all four spatial channels. A total of $$b_{total} = \sum_{m=1}^{4} 4 b_m r_m$$

rate 1/2 code bits are provided to the four buffers 813a through 813d for each cycle. Demultiplexer 816 thus cycles through all four positions for the four spatial channels for every $b_{total}$ code bits, which is the number of code bits that can be sent on a pair of subbands using all four spatial channels.

Once each buffer 813 has been filled with $4b_m r_m$ code chips for the associated spatial channel, the code bits in the buffer are punctured to obtain the code rate for that spatial channel. Since $4b_m r_m$ rate 1/2 code bits span an integer number of puncturing periods for each puncturing pattern, exactly $2b_m$ code bits are provided after the puncturing for each spatial channel m. The $2b_m$ code bits for each spatial channel are then distributed (interleaved) over the data subbands.

In an embodiment, the interleaving is performed for each spatial channel in groups of 6 subbands at a time. The code bits after the puncturing for each spatial channel may be numbered sequentially as $c_i$, for $i = 0, 1, 2, \ldots$. A counter $C_m$ may be maintained for each spatial channel to count every group of $6b_m$ code bits provided by the puncturing unit for that spatial channel. For example, for QPSK with $b_m = 2$, the counter would be set to $C_m = 0$ for code bits $c_0$ through $c_{11}$ provided by the puncturing unit, $C_m=1$ after code bits $c_{12}$ through $c_{23}$, and so on. The counter value $C_m$ for spatial channel m may be expressed as:

$$C_m = \lfloor i/(6b_m) \rfloor \bmod 8. \qquad \text{Eq. (23)}$$

To determine the subband to which code bit $c_i$ is assigned, the bit index for the code bit is first determined as follows:

$$\text{bit index} = (i \bmod 6) + 6 \cdot C_m. \qquad \text{Eq. (24)}$$

The bit index is then mapped to the corresponding subband using Table 29.

For the example above, the first group of 6 code bits $c_0$ through $c_5$ is associated with bit indices 0 through 5, respectively, the second group of 6 code bits $c_6$ through $c_{11}$ is also associated with bit indices 0 through 5, respectively. Code bits $c_0$ and $c_6$ would be mapped to subband −26, code bits $c_1$ and $c_7$ would be mapped to subband 1, and so on, as shown in Table 29. The spatial processing may then commence for this first group of 6 subbands. The third group of 6 code bits $c_{12}$ through $c_{17}$ (with $C_m=1$) is associated with bit indices 6 through 11, respectively, and the fourth group of 6 code bits $c_{18}$ through $c_{23}$ is also associated with bit indices 6 through 11, respectively. Code bits $c_{12}$ and $c_{18}$ would be mapped to subband −25, code bits $c_{13}$ and $c_{19}$ would be mapped to subband 2, and so on. The spatial processing may then commence for this next group of 6 subbands.

The number 6 in equation (24) comes from the fact that the interleaving is performed in groups of six subbands. The (mod 8) operation in equation (23) comes from the fact that there are eight interleaving groups for the 48 data subbands. Since each cycle of demultiplexer 816 shown in FIG. 11C produces enough code bits to fill two subbands for each wideband eigenmode, a total of 24 cycles are needed to provide the $48b_m$ code bits for one OFDM symbol for each spatial channel.

The interleaving in groups of 6 subbands at a time can reduce processing delays. In particular, the spatial processing can commence once each group of 6 subbands is available.

In alternative embodiments, the interleaving may be performed for each spatial channel in groups of NB subbands at a time, where NB may be any integer (e.g., NB may be equal to 48 for interleaving over all 48 data subbands).

Calibration

For a TDD system, the downlink and uplink share the same frequency band in a time division duplexed manner. In this case, a high degree of correlation typically exists between the downlink and uplink channel responses. This correlation may be exploited to simplify the channel estimation and spatial processing. For a TDD system, each subband of the wireless link may be assumed to be reciprocal. That is, if $\underline{H}(k)$ represents the channel response matrix from antenna array A to antenna array B for subband k, then a reciprocal channel implies that the coupling from array B to array A is given by the transpose of $\underline{H}(k)$, which is $\underline{H}^T(k)$.

However, the responses (gain and phase) of the transmit and receive chains at the access point are typically different from the responses of the transmit and receive chains at the user terminal. Calibration may be performed to determine the difference in the frequency responses of the transmit/receive chains at the access point and user terminal, and to account for the difference, such that the calibrated downlink and uplink responses can be expressed in terms of each other. Once the transmit/receive chains have been calibrated and accounted for, a measurement for one link (e.g., the downlink) may be used to derive steering vectors for the other link (e.g., the uplink).

The "effective" downlink and uplink channel responses, $\underline{H}_{dn}(k)$ and $\underline{H}_{up}(k)$, which include the responses of the applicable transmit and receive chains at the access point and user terminal, may be expressed as:

$$\underline{H}_{dn}(k) = \underline{R}_{ut}(k)\underline{H}(k)\underline{T}_{ap}(k), \text{ for } k \in K, \text{ and}$$

$$\underline{H}_{up}(k) = \underline{R}_{ap}(k)\underline{H}^T(k)\underline{T}_{ut}(k), \text{ for } k \in K, \qquad \text{Eq. (25)}$$

where $\underline{T}_{ap}(k)$ and $\underline{R}_{ap}(k)$ are $N_{ap} \times N_{ap}$ diagonal matrices with entries for the complex gains associated with the transmit chain and receive chain, respectively, for the $N_{ap}$ antennas at the access point for subband k;

$\underline{T}_{ut}(k)$ and $\underline{R}_{ut}(k)$ are $N_{ut} \times N_{ut}$ diagonal matrices with entries for the complex gains associated with the transmit chain and receive chain, respectively, for the $N_{ut}$ antennas at the user terminal for subband k; and $\underline{H}(k)$ is an $N_{ut} \times N_{ap}$ channel response matrix for the downlink.

Combining the two equations in equation set (25), the following relationship may be obtained:

$$\underline{H}_{up}(k)\underline{K}_{ut}(k) = (\underline{H}_{dn}(k)\underline{K}_{ap}(k))^T, \text{ for } k \in K, \qquad \text{Eq. (26)}$$

where $\underline{K}_{ut}(k) = \underline{T}_{ut}^{-1}(k)\underline{R}_{ut}(k)$ and $\underline{K}_{ap}(k) = \underline{T}_{ap}^{-1}(k)\underline{R}_{ap}(k)$.

The left-hand side of equation (26) represents the "true" calibrated channel response on the uplink, and the right-hand side represents the transpose of the "true" calibrated channel response on the downlink. The application of the diagonal matrices $\underline{K}_{ap}(k)$ and $\underline{K}_{ut}(k)$ to the effective downlink and uplink channel responses, respectively, as shown in equation (26), allows the calibrated channel responses for the downlink and uplink to be expressed as transposes of each other. The $(N_{ap} \times N_{ap})$ diagonal matrix $\underline{K}_{ap}(k)$ for the access point is the ratio of the receive chain response $\underline{R}_{ap}(k)$ to the transmit chain response $\underline{T}_{ap}(k)$ (i.e., $$K_{ap}(k) = \frac{R_{ap}(k)}{T_{ap}(k)}),$$

where the ratio is taken element-by-element. Similarly, the $(N_{ut} \times N_{ut})$ diagonal matrix $\underline{K}_{ut}(k)$ for the user terminal is the ratio of the receive chain response $\underline{R}_{ut}(k)$ to the transmit chain response $\underline{T}_{ut}(k)$.

The matrices $\underline{K}_{ap}(k)$ and $\underline{K}_{ut}(k)$ include values that can account for differences in the transmit/receive chains at the access point and the user terminal. This would then allow the channel response for one link to be expressed by the channel response for the other link, as shown in equation (26).

Calibration may be performed to determine the matrices $\underline{K}_{ap}(k)$ and $\underline{K}_{ut}(k)$. Typically, the true channel response $\underline{H}(k)$ and the transmit/receive chain responses are not known nor can they be exactly or easily ascertained. Instead, the effective downlink and uplink channel responses, $\underline{H}_{dn}(k)$ and $\underline{H}_{up}(k)$, may be estimated based on pilots sent on the downlink and uplink, respectively, as described below. Estimates of the matrices $\underline{K}_{ap}$ and $\underline{K}_{ut}(k)$, which are referred to as correction matrices $\underline{\hat{K}}_{ap}(k)$ and $\underline{\hat{K}}_{ut}(k)$, may then be derived based on the downlink and uplink channel response estimates, $\underline{\hat{H}}_{dn}(k)$ and $\underline{\hat{H}}_{up}(k)$, as described below. The matrices $\underline{\hat{K}}_{ap}(k)$ and $\underline{\hat{K}}_{ut}(k)$ include correction factors that can account for differences in the transmit/receive chains at the access point and the user terminal.

The "calibrated" downlink and uplink channel responses observed by the user terminal and the access point, respectively, may then be expressed as:

$$\underline{H}_{cdn}(k) = \underline{H}_{dn}(k) \hat{\underline{K}}_{ap}(k), \text{ for } k \in K, \text{ and}$$

$$\underline{H}_{cup}(k) = \underline{H}_{up}(k) \hat{\underline{K}}_{ut}(k), \text{ for } k \in K, \quad \text{Eq. (27)}$$

where $\underline{H}_{cdn}^T(k)$ and $\underline{H}_{cup}(k)$ are estimates of the "true" calibrated channel response expressions in equation (26).
Combining the two equations in equation set (27) using the expression in equation (26), it can be shown that $\underline{H}_{cup}(k) \approx \underline{H}_{cdn}^T(k)$. The accuracy of the relationship $\underline{H}_{cup}(k) \approx \underline{H}_{cdn}^T(k)$ is dependent on the accuracy of the matrices $\hat{\underline{K}}_{ap}(k)$ and $\hat{\underline{K}}_{ut}(k)$, which in turn is typically dependent on the quality of the downlink and uplink channel response estimates, $\hat{\underline{H}}_{dn}(k)$ and $\hat{\underline{H}}_{up}(k)$.

The calibration may be performed using various schemes. For clarity, a specific calibration scheme is described below. To perform the calibration, the user terminal initially acquires the timing and frequency of the access point based on the beacon pilot transmitted on the BCH. The user terminal then sends a message on the RACH to initiate a calibration procedure with the access point. The calibration may be performed in parallel with registration/authentication.

Since the frequency responses of the transmit/receive chains at the access point and user terminal are typically flat over most of the band of interest, the phase/gain differences of the transmit/receive chains may be characterized with a small number of subbands. The calibration may be performed for 4, 8, 16, 48 or some other number of subbands, which may be specified in the message sent to initiate the calibration. Calibration may also be performed for the pilot subbands. Calibration constants for subbands on which calibration is not explicitly performed may be computed by interpolation on calibrated subbands. For clarity, the following assumes that calibration is performed for all data subbands.

For the calibration, the access point allocates to the user terminal a sufficient amount of time on the RCH to send an uplink MIMO pilot of sufficient duration plus a message. The duration of the uplink MIMO pilot may be dependent on the number of subbands over which calibration is performed. For example, 8 OFDM symbols may be sufficient if calibration is performed for four subbands, and more (e.g., 20) OFDM symbols may be needed for more subbands. The total transmit power is typically fixed, so if the MIMO pilot is transmitted on a small number of subbands, then higher amounts of transmit power may be used for each of these subbands and the SNR for each subband is high. Conversely, if the MIMO pilot is transmitted on a large number of subbands then smaller amounts of transmit power may be used for each subband and the SNR for each subband is worse. If the SNR of each subband is not sufficiently high, then more OFDM symbols may be sent for the MIMO pilot and integrated at the receiver to obtain a higher overall SNR for the subband.

The user terminal then transmits a MIMO pilot on the RCH, which is used by the access point to derive an estimate of the effective uplink channel response, $\hat{\underline{H}}_{up}(k)$ for each of the data subbands. The uplink channel response estimates are quantized (e.g., to 12-bit complex values, with inphase (I) and quadrature (Q) components) and sent to the user terminal.

The user terminal also derives an estimate of the effective downlink channel response, $\hat{\underline{H}}_{dn}(k)$ for each of the data subbands based on the downlink MIMO pilot sent on the BCH. Upon obtaining the effective uplink and downlink channel response estimates, $\hat{\underline{H}}_{up}(k)$ and $\hat{\underline{H}}_{dn}(k)$ for all data subbands, the user terminal determines correction factors, $\hat{\underline{K}}_{ap}(k)$ and $\hat{\underline{K}}_{ut}(k)$, for each of the data subbands, which are to be used by the access point and user terminal, respectively. A correction vector $\hat{\underline{k}}_{ap}(k)$ may be defined to include only the diagonal elements of $\hat{\underline{K}}_{ap}(k)$, and a correction vector $\hat{\underline{k}}_{ut}(k)$ may be defined to include only the diagonal elements of $\hat{\underline{K}}_{ut}(k)$.

The correction factors may be derived in various manners, including by a matrix-ratio computation and an MMSE computation. Both of these computation methods are described in further detail below. Other computation methods may also be used, and this is within the scope of the invention.

Matrix-Ratio Computation

To determine the correction vectors $\hat{\underline{k}}_{ap}(k)$ and $\hat{\underline{k}}_{ut}(k)$ given the effective downlink and uplink channel response estimates, $\hat{\underline{H}}_{dn}(k)$ and $\hat{\underline{H}}_{up}(k)$, an $(N_{ut} \times N_{ap})$ matrix $\underline{C}(k)$ is first computed for each data subband, as follows:

$$\underline{C}(k) = \frac{\hat{\underline{H}}_{up}^T(k)}{\hat{\underline{H}}_{dn}(k)}, \text{ for } k \in K, \quad \text{Eq. (28)}$$

where the ratio is taken element-by-element.
Each element of $\underline{C}(k)$ may thus be computed as:

$$c_{i,j}(k) = \frac{\hat{h}_{up\, i,j}(k)}{\hat{h}_{dn\, i,j}(k)}, \quad \text{Eq. (29)}$$

for $i = \{1 \ldots N_{ut}\}$ and $j = \{1 \ldots N_{ap}\}$, where
$\hat{h}_{up\, i,j}(k)$ is the (i,j)-th (row, column) element of $\hat{\underline{k}}_{up}^T(k)$, $\hat{h}_{dn\, i,j}(k)$ is the (i,j)-th element of $\hat{\underline{H}}_{dn}(k)$, and $c_{i,j}(k)$ is the (i,j)-th element of $\underline{C}(k)$.

The correction vector $\hat{\underline{k}}_{ap}(k)$ for the access point is then equal to the mean of the normalized rows of $\underline{C}(k)$. Each row of $\underline{C}(k)$ is first normalized by scaling each of the $N_{ap}$ elements in the row with the first element in the row. Thus, if $\underline{c}_i(k) = [c_{i,1}(k) \ldots c_{i,N_{ap}}(k)]$ is the i-th row of $\underline{C}(k)$, then the normalized row $\tilde{\underline{c}}_i(k)$ may be expressed as:

$$\tilde{\underline{c}}_i(k) = [c_{i,1}(k)/c_{i,1}(k) \ldots c_{i,j}(k)/c_{i,1}(k) \ldots c_{i,N_{ap}}(k)/c_{i,1}(k)]. \quad \text{Eq. (30)}$$

The mean of the normalized rows is then the sum of the $N_{ut}$ normalized rows divided by $N_{ut}$, which may be expressed as:

$$\hat{\underline{k}}_{ap}(k) = \frac{1}{N_{ut}} \sum_{i=1}^{N_{ut}} \tilde{\underline{c}}_i(k), \text{ for } k \in K. \quad \text{Eq. (31)}$$

Because of the normalization, the first element of $\hat{\underline{k}}_{ap}(k)$ is unity.

The correction vector $\hat{\underline{k}}_{ut}(k)$ for the user terminal is equal to the mean of the inverses of the normalized columns of $\underline{C}(k)$. The j-th column of $\underline{C}(k)$ is first normalized by scaling each element in the column with the j-th element of the vector $\hat{\underline{k}}_{ap}(k)$ which is denoted as $K_{ap,j,j}(k)$. Thus, if $\underline{c}_j(k) = [c_{1,j}(k) \ldots c_{N_{ut},j}(k)]^T$ is the j-th column of $\underline{C}(k)$, then the normalized column $\check{\underline{c}}_j(k)$ may be expressed as:

$$\check{\underline{c}}_j(k) = [c_{1,j}(k)/K_{ap,j,j}(k) \ldots c_{i,j}(k)/K_{ap,j,j}(k) \ldots c_{N_{ut},j}(k)/K_{ap,j,j}(k)]^T. \quad \text{Eq. (32)}$$

The mean of the inverses of the normalized columns is then the sum of the inverses of the $N_{ap}$ normalized columns divided by $N_{ap}$, which may be expressed as:

$$\hat{k}_{ut}(k) = \frac{1}{N_{ap}} \sum_{j=1}^{N_{ap}} \frac{1}{\check{c}_j(k)}, \text{ for } k \in K, \qquad \text{Eq. (33)}$$

where the inversion of the normalized columns, $\check{c}_j(k)$, is performed element-wise.

MMSE Computation

For the MMSE computation, the correction factors $\hat{\underline{K}}_{ap}(k)$ and $\hat{\underline{K}}_{ut}(k)$ are derived from the effective downlink and uplink channel response estimates, $\hat{\underline{H}}_{dn}(k)$ and $\hat{\underline{H}}_{up}(k)$, such that the mean square error (MSE) between the calibrated downlink channel response and the calibrated uplink channel response is minimized. This condition may be expressed as:

$$\min |(\hat{\underline{H}}_{dn}(k)\hat{\underline{K}}_{ap}(k))^T - (\hat{\underline{H}}_{up}(k)\hat{\underline{K}}_{ut}(k))|^2, \text{ for } k \in K, \qquad \text{Eq. (34)}$$

which may also be written as:

$$\min |\hat{\underline{K}}_{ap}(k)\hat{\underline{H}}_{dn}^T(k) - \hat{\underline{H}}_{up}(k)\hat{\underline{K}}_{ut}(k)|^2, \text{ for } k \in K,$$

where $\hat{\underline{K}}_{ap}^T(k) = \hat{\underline{K}}_{ap}(k)$ since $\hat{\underline{K}}_{ap}(k)$ is a diagonal matrix.

Equation (34) is subject to the constraint that the lead element of $\hat{\underline{K}}_{ap}(k)$ is set equal to unity (i.e., $\hat{K}_{ap,0,0}(k)=1$). Without this constraint, the trivial solution would be obtained with all elements of the matrices $\hat{\underline{K}}_{ap}(k)$ and $\hat{\underline{K}}_{ut}(k)$ set equal to zero. In equation (34), a matrix $\underline{Y}(k)$ is first obtained as $\underline{Y}(k) = \hat{\underline{K}}_{ap}(k)\hat{\underline{H}}_{dn}^T(k) - \hat{\underline{H}}_{up}(k)\hat{\underline{K}}_{ut}(k)$. The square of the absolute value is next obtained for each of the $N_{ap} \cdot N_{ut}$ entries of the matrix $\underline{Y}(k)$. The mean square error (or the square error, since a divide by $N_{ap} \cdot N_{ut}$ is omitted) is then equal to the sum of all $N_{ap} \cdot N_{ut}$ squared values.

The MMSE computation is performed for each designated subband to obtain the correction factors $\hat{\underline{K}}_{ap}(k)$ and $\hat{\underline{K}}_{ut}(k)$ for that subband. The MMSE computation for one subband is described below. For simplicity, the subband index, k, is omitted in the following description. Also for simplicity, the elements of the downlink channel response estimate $\hat{\underline{H}}_{dn}^T$ are denoted as $\{a_{ij}\}$, the elements of the uplink channel response estimate $\hat{\underline{H}}_{up}$ are denoted as $\{b_{ij}\}$, the diagonal elements of the matrix $\hat{\underline{K}}_{ap}$ are denoted as $\{u_i\}$, and the diagonal elements of the matrix $\hat{\underline{K}}_{ut}$ are denoted as $\{v_j\}$ where i={1 ... $N_{ap}$} and j={1 ... $N_{ut}$}.

The mean square error may be rewritten from equation (34), as follows:

$$MSE = \sum_{j=1}^{N_{ut}} \sum_{i=1}^{N_{ap}} |a_{ij}u_i - b_{ij}v_j|^2, \qquad \text{Eq. (35)}$$

again subject to the constraint $u_1=1$. The minimum mean square error may be obtained by taking the partial derivatives of equation (35) with respect to u and v and setting the partial derivatives to zero. The results of these operations are the following equation sets:

$$\sum_{j=1}^{N_{ut}} (a_{ij}u_i - b_{ij}v_j) \cdot a_{ij}^* = 0, \text{ for } i \in \{2 \ldots N_{ap}\}, \text{ and} \qquad \text{Eq. (36a)}$$

$$\sum_{i=1}^{N_{ap}} (a_{ij}u_i - b_{ij}v_j) \cdot b_{ij}^* = 0, \text{ for } j \in \{1 \ldots N_{ut}\}. \qquad \text{Eq (36b)}$$

In equation (36a), $u_1=1$ so there is no partial derivative for this case, and the index i runs from 2 through $N_{ap}$.

The set of $(N_{ap}+N_{ut}-1)$ equations in equation sets (36a) and (36b) may be more conveniently expressed in matrix form, as follows:

$$\underline{A}\underline{y} = \underline{z}, \qquad \text{Eq. (37)}$$

where $$A = \begin{bmatrix} \sum_{j=1}^{N_{ut}} |a_{2j}|^2 & 0 & \cdots & 0 & -b_{21}a_{21}^* & \cdots & -b_{2N_{ap}}a_{2N_{ut}}^* \\ 0 & \sum_{j=1}^{N_{ut}} |a_{3j}|^2 & 0 & \cdots & \cdots & \cdots & \cdots \\ \cdots & 0 & \cdots & 0 & & & \\ 0 & \cdots & 0 & \sum_{j=1}^{N_{ut}} |a_{N_{ap}j}|^2 & -b_{N_{ap}1}a_{N_{ap}1}^* & & -b_{N_{ap}N_{ut}}a_{N_{ap}N_{ut}}^* \\ -a_{21}b_{21}^* & \cdots & -a_{N_{ap}1}b_{N_{ap}1}^* & \sum_{i=1}^{N_{ap}} |b_{i1}|^2 & 0 & \cdots & 0 \\ \cdots & \cdots & & 0 & \sum_{i=1}^{N_{ap}} |b_{i2}|^2 & 0 & \cdots \\ & & & \cdots & 0 & \cdots & 0 \\ -a_{2N_{ut}}b_{2N_{ut}}^* & \cdots & -a_{N_{ap}N_{ut}}b_{N_{ap}N_{ut}}^* & 0 & \cdots & 0 & \sum_{i=1}^{N_{ap}} |b_{iN_{ut}}|^2 \end{bmatrix}$$

$$\underline{y} = \begin{bmatrix} u_2 \\ u_3 \\ \cdots \\ u_{N_{ap}} \\ v_1 \\ v_2 \\ \cdots \\ v_{N_{ut}} \end{bmatrix} \text{ and } \underline{z} = \begin{bmatrix} 0 \\ 0 \\ \cdots \\ 0 \\ a_{11} b_{11}^* \\ a_{12} b_{12}^* \\ \cdots \\ a_{1N_{ut}} b_{1N_{ut}}^* \end{bmatrix}.$$

The matrix $\underline{A}$ includes $(N_{ap}+N_{ut}-1)$ rows, with the first $N_{ap}-1$ rows corresponding to the $N_{ap}-1$ equations from equation set (36a) and the last $N_{ut}$ rows corresponding to the $N_{ut}$ equations from equation set (36b). In particular, the first row of the matrix $\underline{A}$ is generated from equation set (36a) with i=2, the second row is generated with i=3, and so on. The $N_{ap}$-th row of the matrix $\underline{A}$ is generated from equation set (36b) with i=1, and so on, and the last row is generated with j=$N_{ut}$. As shown above, the entries of the matrix $\underline{A}$ and the entries of the vector $\underline{z}$ may be obtained based on the entries in the matrices $\hat{\underline{H}}_{dn}^T$ and $\hat{\underline{H}}_{up}$.

The correction factors are included in the vector $\underline{y}$, which may be obtained as:

$$\underline{y} = \underline{A}^{-1} \underline{z}. \qquad \text{Eq. (38)}$$

The results of the MMSE computation are correction matrices $\hat{\underline{K}}_{ap}$ and $\hat{\underline{K}}_{ut}$ that minimize the mean square error in the calibrated downlink and uplink channel responses, as shown in equation (34). Since the matrices $\hat{\underline{K}}_{ap}$ and $\hat{\underline{K}}_{ut}$ are obtained based on the downlink and uplink channel response estimates, $\hat{\underline{H}}_{dn}$ and $\hat{\underline{H}}_{up}$, the quality of the correction matrices $\hat{\underline{K}}_{ap}$ and $\hat{\underline{K}}_{ut}$ are thus dependent on the quality of the channel estimates $\hat{\underline{H}}_{dn}$ and $\hat{\underline{H}}_{up}$. The MIMO pilot may be averaged at the receiver to obtain more accurate estimates for $\hat{\underline{H}}_{dn}$ and $\hat{\underline{H}}_{up}$.

The correction matrices, $\hat{\underline{K}}_{ap}$ and $\hat{\underline{K}}_{ut}$, obtained based on the MMSE computation are generally better than the correction matrices obtained based on the matrix-ratio computation. This is especially true when some of the channel gains are small and measurement noise can greatly degrade the channel gains.

Post Computation

A pair of correction vectors, $\hat{\underline{k}}_{ap}(k)$ and $\hat{\underline{k}}_{ut}(k)$, may be determined for each of the data subbands. Since adjacent subbands are likely to be correlated, the computation may be simplified. For example, the computation may be performed for every n-th subband instead of each subband, where n may be determined by the expected response of the transmit/receive chains. If the calibration is performed for fewer than all of the data and pilot subbands, then the correction factors for the "uncalibrated" subbands may be obtained by interpolating the correction factors obtained for the "calibrated" subbands.

Various other calibration schemes may also be used to derive the correction vectors, $\hat{\underline{k}}_{ap}(k)$ and $\hat{\underline{k}}_{ut}(k)$, for the access point and the user terminal, respectively. However, the scheme described above allows "compatible" correction vectors to be derived for the access point when the calibration is performed by different user terminals.

After the derivation, the user terminal sends the correction vectors $\hat{\underline{k}}_{ap}(k)$ for all data subbands back to the access point. If the access point has already been calibrated (e.g., by other user terminals), then the current correction vectors are updated with the newly received correction vectors. Thus, if the access point uses correction vectors $\hat{\underline{k}}_{ap1}(k)$ to transmit the MIMO pilot from which the user terminal determines new correction vectors $\hat{\underline{k}}_{ap2}(k)$, then the updated correction vectors are the product of the current and new correction vectors, i.e., $\hat{\underline{k}}_{ap3}(k) = \hat{\underline{k}}_{ap1}(k) \cdot \hat{\underline{k}}_{ap2}(k)$, where the multiplication is element-by-element. The updated correction vectors $\hat{\underline{k}}_{ap3}(k)$ may then be used by the access point until they are updated again.

The correction vectors $\hat{\underline{k}}_{ap1}(k)$ and $\hat{\underline{k}}_{ap2}(k)$ may be derived by the same or different user terminals. In one embodiment, the updated correction vectors are defined as $\hat{\underline{k}}_{ap3}(k) = \hat{\underline{k}}_{ap1}(k) \cdot \hat{\underline{k}}_{ap2}(k)$, where the multiplication is element-by-element. In another embodiment, the updated correction vectors may be redefined as $\hat{\underline{k}}_{ap3}(k) = \hat{\underline{k}}_{ap1}(k) \cdot \hat{\underline{k}}_{ap2}^{\alpha}(k)$, where $\alpha$ is a factor used to provide weighted averaging (e.g., 0<$\alpha$<1). If the calibration updates are infrequent, then □ close to one might perform best. If the calibration updates are frequent but noisy, then a smaller value for □ is better. The updated correction vectors $\hat{\underline{k}}_{ap3}(k)$ may then be used by the access point until they are updated again.

The access point and user terminal use their respective correction vectors $\hat{\underline{k}}_{ap}(k)$ and $\hat{\underline{k}}_{ut}(k)$, or the corresponding correction matrices $\hat{\underline{K}}_{ap}(k)$ and $\hat{\underline{K}}_{ut}(k)$, for k∈K, to scale the modulation symbols prior to transmission, as described below. The calibrated downlink and uplink channels that the user terminal and access point observe are shown in equation (27).

Spatial Processing

The spatial processing at the access point and user terminal may be simplified for a TDD system, after calibration has been performed to account for the difference in the transmit/receive chains. As noted above, the calibrated downlink channel response is $\underline{H}_{cdn}(k) = \underline{H}_{dn}(k) \hat{\underline{K}}_{ap}(k)$. The calibrated uplink channel response is $\underline{H}_{cup}(k) = \underline{H}_{up}(k) \hat{\underline{K}}_{ut}(k) \approx (\underline{H}_{dn}(k) \hat{\underline{K}}_{ap}(k))^T$.

Uplink Spatial Processing

Singular value decomposition of the calibrated uplink channel response matrix, $\underline{H}_{cup}(k)$, may be expressed as:

$$\underline{H}_{cup}(k) = \underline{U}_{ap}(k) \underline{\Sigma}(k) \underline{V}_{ut}^H(k), \text{ for k∈K}, \qquad \text{Eq. (39)}$$

where $\underline{U}_{ap}(k)$ is an $(N_{ap} \times N_{ap})$ unitary matrix of left eigenvectors of $\underline{H}_{cup}(k)$;

$\underline{\Sigma}(k)$ is an $(N_{ap} \times N_{ut})$ diagonal matrix of singular values of $\underline{H}_{cup}(k)$, and $\underline{V}_{ut}(k)$ is an $(N_{ut} \times N_{ut})$ unitary matrix of right eigenvectors of $\underline{H}_{cup}(k)$.

Correspondingly, singular value decomposition of the calibrated downlink channel response matrix, $\underline{H}_{cdn}(k)$, may be expressed as:

$$\underline{H}_{cdn}(k) = \underline{V}_{ut}^*(k) \underline{\Sigma}(k) \underline{U}_{ap}^T(k), \text{ for k∈K}. \qquad \text{Eq. (40)}$$

The matrices $\underline{V}_{ut}^*(k)$ and $\underline{U}_{ap}^*(k)$ are also matrices of left and right eigenvectors, respectively, of $\underline{H}_{cdn}(k)$. As shown in equations (39) and (40) and based on the above description, the matrices of left and right eigenvectors for one link are the complex conjugate of the matrices of right and left eigenvectors, respectively, for the other link. The matrices $\underline{V}_{ut}(k)$, $\underline{V}_{ut}^*(k)$, $\underline{V}_{ut}^T(k)$, and $\underline{V}_{ut}^H(k)$ are different forms of the matrix $\underline{V}_{ut}(k)$, and the matrices $\underline{U}_{ap}(k)$, $\underline{U}_{ap}^*(k)$, $\underline{U}_{ap}^T(k)$, and $\underline{U}_{ap}^H(k)$ are also different forms of the matrix $\underline{U}_{ap}(k)$. For simplicity, reference to the matrices $\underline{U}_{ap}(k)$ and $\underline{V}_{ut}(k)$ in the following description may also refer to their various other forms. The matrices $\underline{U}_{ap}(k)$ and $\underline{V}_{ut}(k)$ are used by the access point and user terminal, respectively, for spatial processing and are denoted as such by their subscripts. The eigenvectors are also often referred to as "steering" vectors.

The user terminal can estimate the calibrated downlink channel response based on the MIMO pilot sent by the access point. The user terminal can then perform the singular value decomposition of the calibrated downlink channel response estimate $\hat{\underline{H}}_{cdn}(k)$ for k∈K, to obtain the diagonal matrix $\hat{\underline{\Sigma}}(k)$ and the matrix $\hat{\underline{V}}_{ut}^*(k)$ of left eigenvectors of $\hat{\underline{H}}_{cdn}(k)$. This singular value decomposition may be given as $\hat{\underline{H}}_{cdn}(k) = \hat{\underline{V}}_{ut}^*(k)\hat{\underline{\Sigma}}(k)\hat{\underline{U}}_{ap}^T(k)$, where the hat ("^") above each matrix indicates that it is an estimate of the actual matrix.

Similarly, the access point can estimate the calibrated uplink channel response based on a MIMO pilot sent by the user terminal. The access point may then perform singular value decomposition for the calibrated uplink channel response estimate $\hat{\underline{H}}_{cup}(k)$, for k∈K, to obtain the diagonal matrix $\hat{\underline{\Sigma}}(k)$ and the matrix $\hat{\underline{U}}_{ap}(k)$ of left eigenvectors of $\hat{\underline{H}}_{cup}(k)$. This singular value decomposition may be given as $\hat{\underline{H}}_{cup}(k) = \hat{\underline{U}}_{ap}^*(k)\hat{\underline{\Sigma}}(k)\hat{\underline{V}}_{ut}^H(k)$.

An ($N_{ut} \times N_{ut}$) matrix $\underline{F}_{ut}(k)$ may be defined as:

$$\underline{F}_{ut}(k) = \hat{\underline{K}}_{ut}(k)\hat{\underline{V}}_{ut}(k), \text{ for } k \in K. \quad \text{Eq. (41)}$$

While it is active, the user terminal keeps a running estimate of the calibrated downlink channel $\hat{\underline{H}}_{cdn}(k)$ and the matrices $\hat{\underline{V}}_{ut}(k)$ of left eigenvectors of $\hat{\underline{H}}_{cdn}(k)$, which are used to update the matrix $\underline{F}_{ut}(k)$.

The user terminal uses the matrix $\underline{F}_{ut}(k)$ for the spatial processing for the beam-steering and spatial multiplexing modes. For the spatial multiplexing mode, the transmit vector $\underline{x}_{up}(k)$ for each subband may be expressed as:

$$\underline{x}_{up}(k) = \underline{F}_{ut}(k)\underline{s}_{up}(k), \text{ for } k \in K, \quad \text{Eq. (42)}$$

where $\underline{s}_{up}(k)$ is a data vector with up to $N_s$ symbols to be transmitted on the $N_s$ eigenmodes of subband k;
$\underline{F}_{ut}(k)$ substitutes for $\underline{V}(k)$ in equation (15), and the signal scaling by $\underline{G}(k)$ to achieve channel inversion is omitted in equation (42) for simplicity; and
$\underline{x}_{up}(k)$ is the transmit vector for the uplink for subband k.

At the access point, the received vector $\underline{r}_{up}(k)$ for the uplink transmission may be expressed as:

$$\begin{aligned}\underline{r}_{up}(k) &= \underline{H}_{up}(k)\underline{x}_{up}(k) + \underline{n}_{up}(k) &&, \text{for } k \in K, \quad \text{Eq. (43)}\\ &= \underline{H}_{up}(k)\hat{\underline{K}}_{ut}(k)\hat{\underline{V}}_{ut}(k)\underline{s}_{up}(k) + \underline{n}_{up}(k)\\ &\approx \hat{\underline{H}}_{cup}(k)\hat{\underline{V}}_{ut}(k)\underline{s}_{up}(k) + \underline{n}_{up}(k)\\ &= \hat{\underline{U}}_{ap}(k)\hat{\underline{\Sigma}}(k)\hat{\underline{V}}_{ut}^H(k)\hat{\underline{V}}_{ut}(k)\underline{s}_{up}(k) + \underline{n}_{up}(k)\\ &= \hat{\underline{U}}_{ap}(k)\hat{\underline{\Sigma}}(k)\underline{s}_{up}(k) + \underline{n}_{up}(k)\end{aligned}$$

where $\underline{r}_{up}(k)$ is the received vector for the uplink subband k; and
$\underline{n}_{up}(k)$ is additive white Gaussian noise (AWGN) for subband k.

Equation (43) uses the following relationships: $\underline{H}_{up}(k)\hat{\underline{K}}_{ut}(k) = \underline{H}_{cup}(k) \approx \hat{\underline{H}}_{cup}(k)$ and $\hat{\underline{H}}_{cup}(k) = \hat{\underline{U}}_{ap}(k)\hat{\underline{\Sigma}}(k)\hat{\underline{V}}_{ut}^H(k)$. As shown in equation (43), at the access point, the received uplink transmission is transformed by $\hat{\underline{U}}_{ap}(k)\hat{\underline{\Sigma}}(k)$, which is the matrix $\hat{\underline{U}}_{ap}(k)$ of left eigenvectors of $\hat{\underline{H}}_{cup}(k)$ scaled by the diagonal matrix $\hat{\underline{\Sigma}}(k)$ of singular values.

The user terminal transmits a steered reference on the uplink using the matrix $\underline{F}_{ut}(k)$. The steered reference is a pilot transmission on one wideband eigenmode using either beam-steering or beam-forming, and is described in detail below. At the access point, the received uplink steered reference (in the absence of noise) is approximately $\hat{\underline{U}}_{ap}(k)\hat{\underline{\Sigma}}(k)$. The access point can thus obtain an estimate of the unitary matrix $\hat{\underline{U}}_{ap}(k)$ and diagonal matrix $\hat{\underline{\Sigma}}(k)$ based on the steered reference sent by the user terminal. Various estimation techniques may be used to obtain the estimate of the unitary and diagonal matrices.

In one embodiment, to obtain an estimate of $\hat{\underline{U}}_{ap}(k)$, the received vector $\underline{r}_m(k)$ for the steered reference for subband k of wideband eigenmode m is first multiplied with the complex conjugate of a pilot OFDM symbol, p*(k), sent for the steered reference. The generation of the steered reference and the pilot OFDM symbol are described in detail below. The result is then integrated over multiple received steered reference symbols for each wideband eigenmode to obtain an estimate of $\hat{\underline{u}}_m(k)\sigma_m(k)$, which is a scaled left eigenvector of $\hat{\underline{H}}_{cup}(k)$ for wideband eigenmode m. Since eigenvectors have unit power, the singular values (or $\sigma_m(k)$) in $\hat{\underline{\Sigma}}(k)$ may be estimated based on the received power of the steered reference, which can be measured for each subband of each wideband eigenmode.

In another embodiment, an MMSE technique is used to obtain an estimate of $\hat{\underline{u}}_m(k)$ based on the received vector $\underline{r}_m(k)$ for the steered reference.

The steered reference may be sent for one wideband eigenmode in any given symbol period, and may in turn be used to obtain an estimate of one eigenvector for each subband of that wideband eigenmode. Thus, the receiver is able to obtain an estimate of one eigenvector in a unitary matrix for any given symbol period. Since estimates of multiple eigenvectors for the unitary matrix are obtained over different symbol periods, and due to noise and other sources of degradation in the transmission path, the estimated eigenvectors for the unitary matrix are not likely be orthogonal. If the estimated eigenvectors are thereafter used for spatial processing of data transmission on the other link, then any errors in orthogonality in these estimated eigenvectors would result in cross-talk among the eigenmodes, which may degrade performance.

In an embodiment, the estimated eigenvectors for each unitary matrix are forced to be orthogonal to each other. The orthogonalization of the eigenvectors may be achieved using various techniques such as QR factorization, minimum square error computation, polar decomposition, and so on. QR factorization decomposes a matrix $\underline{M}^T$ (with non-orthogonal columns) into an orthogonal matrix $\underline{Q}_F$ and an upper triangle matrix $\underline{R}_F$. The matrix $\underline{Q}_F$ forms an orthogonal basis for the columns of $\underline{M}^T$. The diagonal elements of $\underline{R}_F$ give the length of the components of the columns of $\underline{M}^T$ in the directions of the respective columns of $\underline{Q}_F$. The matrix $\underline{Q}_F$ may be used for spatial processing on the downlink. The matrices $\underline{Q}_F$ and $\underline{R}_F$ may be used to derive an enhanced matched filter matrix for the uplink. The QR factorization may be performed by various methods including a Gram-Schmidt procedure, a householder transformation, and so on.

Other techniques to estimate the unitary and diagonal matrices based on the steered reference may also be used, and this is within the scope of the invention.

The access point can thus estimate both $\hat{\underline{U}}_{ap}(k)$ and $\hat{\underline{\Sigma}}(k)$ based on the steered reference sent by the user terminal, without having to perform singular value decomposition on $\hat{\underline{H}}_{cup}(k)$.

A normalized matched filter matrix Map $\underline{M}_{ap}(k)$ for the uplink transmission from the user terminal may be expressed as:

$$\underline{M}_{ap}(k) = \hat{\underline{\Sigma}}^{-1}(k)\hat{\underline{U}}_{ap}^{H}(k), \text{ for } k \in K. \quad \text{Eq. (44)}$$

The matched filtering at the access point for the uplink transmission may then be expressed as:

$$\hat{\underline{s}}_{up}(k) = \underline{M}_{ap}(k)\underline{r}_{up}(k) \quad \text{Eq. (45)}$$
$$= \hat{\underline{\Sigma}}^{-1}(k)\hat{\underline{U}}_{ap}^{H}(k)(\hat{\underline{U}}_{ap}(k)\hat{\underline{\Sigma}}(k)\underline{s}_{up}(k) + \underline{n}_{up}(k)), \text{ for } k \in K,$$
$$= \underline{s}_{up}(k) + \tilde{\underline{n}}_{up}(k)$$

where $\hat{\underline{s}}_{up}(k)$ is an estimate of the vector of modulation symbols $\underline{s}_{up}(k)$ transmitted by the user terminal for the spatial multiplexing mode. For the beam-steering mode, only one row of the matrix $\underline{M}_{ap}(k)$ is used to provide one symbol estimate ŝ(k) for the eigenmode used for data transmission.

Downlink Spatial Processing

For the downlink, the access point uses an ($N_{ap} \times N_{ap}$) matrix $\underline{F}_{ap}(k)$ for spatial processing. This matrix may be expressed as:

$$\underline{F}_{ap}(k) = \hat{\underline{K}}_{ap}(k)\hat{\underline{U}}_{ap}^{*}(k), \text{ for } k \in K. \quad \text{Eq. (46)}$$

The correction matrix $\hat{\underline{K}}_{ap}(k)$ is derived by the user terminal and sent back to the access point during calibration. The matrix $\hat{\underline{U}}_{ap}(k)$ may be obtained based on the steered reference sent on the uplink by the user terminal.

For the spatial multiplexing mode, the transmit vector $\underline{x}_{dn}(k)$ for the downlink for each data subband may be expressed as:

$$\underline{x}_{dn}(k) = \underline{F}_{ap}(k)\underline{s}_{dn}(k), \text{ for } k \in K, \quad \text{Eq. (47)}$$

where $\underline{x}_{dn}(k)$ is the transmit vector, $\underline{s}_{dn}(k)$ is the data vector for the downlink, and the signal scaling by $\underline{G}(k)$ to achieve channel inversion is again omitted for simplicity.

At the user terminal, the received vector $\underline{r}_{dn}(k)$ for the downlink transmission may be expressed as:

$$\underline{r}_{dn}(k) = \underline{H}_{dn}(k)\underline{x}_{dn}(k) + \underline{n}_{dn}(k) \quad \text{Eq. (48)}$$
$$= \underline{H}_{dn}(k)\hat{\underline{K}}_{ap}(k)\hat{\underline{U}}_{ap}^{*}(k)\underline{s}_{dn}(k) + \underline{n}_{dn}(k)$$

-continued
$$\approx \hat{\underline{H}}_{cdn}(k)\hat{\underline{U}}_{ap}^{*}(k)\underline{s}_{dn}(k) + \underline{n}_{dn}(k)$$
$$= \hat{\underline{V}}_{ut}^{*}(k)\hat{\underline{\Sigma}}(k)\hat{\underline{U}}_{ap}^{T}(k)\hat{\underline{U}}_{ap}^{*}(k)\underline{s}_{dn}(k) + \underline{n}_{dn}(k)$$
$$= \hat{\underline{V}}_{ut}^{*}(k)\hat{\underline{\Sigma}}(k)\underline{s}_{dn}(k) + \underline{n}_{dn}(k), \text{ for } k \in K.$$

As shown in equation (48), at the user terminal, the received downlink transmission is transformed by $\hat{\underline{V}}_{ut}^{*}(k)\hat{\underline{\Sigma}}(k)$, which is the matrix $\hat{\underline{V}}_{ut}(k)$ of left eigenvectors of $\hat{\underline{H}}_{cdn}(k)$ scaled by the diagonal matrix $\hat{\underline{\Sigma}}(k)$ of singular values.

A normalized matched filter matrix $\underline{M}_{ut}(k)$ for the downlink transmission from the access point may be expressed as:

$$\underline{M}_{ut}(k) = \hat{\underline{\Sigma}}^{-1}(k)\hat{\underline{V}}_{ut}^{T}(k), \text{ for } k \in K. \quad \text{Eq. (49)}$$

The diagonal matrix $\hat{\underline{\Sigma}}(k)$ and matrix $\hat{\underline{V}}_{ut}(k)$ of left eigenvectors can be derived by the user terminal by performing singular value decomposition on the calibrated downlink channel response estimate $\hat{\underline{H}}_{cdn}(k)$, as described above.

The matched filtering at the user terminal for the downlink transmission may then be expressed as:

$$\hat{\underline{s}}_{dn}(k) = \underline{M}_{ut}(k)\underline{r}_{dn}(k) \quad \text{Eq. (50)}$$
$$= \hat{\underline{\Sigma}}^{-1}(k)\hat{\underline{V}}_{ut}^{T}(k)(\hat{\underline{V}}_{ut}^{*}(k)\hat{\underline{\Sigma}}(k)\underline{s}_{dn}(k) + \underline{n}_{dn}(k)), \text{ for } k \in K.$$
$$= \underline{s}_{dn}(k) + \tilde{\underline{n}}_{dn}(k)$$

Access Point and User Terminal Spatial Processing

Because of the reciprocal channel for the TDD system and the calibration, the spatial processing at both the access point and the user terminal may be simplified. Table 32 summarizes the spatial processing at the access point and user terminal for data transmission and reception.

TABLE 32

| | Uplink | Downlink |
|---|---|---|
| User Terminal | Transmit: $\underline{x}_{up}(k) = \hat{\underline{K}}_{ut}(k)\hat{\underline{V}}_{ut}(k)\underline{s}_{up}(k)$ | Receive: $\hat{\underline{s}}_{dn}(k) = \hat{\underline{\Sigma}}^{-1}(k)\hat{\underline{V}}_{ut}^{T}(k)\underline{r}_{dn}(k)$ |
| Access Point | Receive: $\hat{\underline{s}}_{up}(k) = \hat{\underline{\Sigma}}^{-1}(k)\hat{\underline{U}}_{ap}^{H}(k)\underline{r}_{up}(k)$ | Transmit: $\underline{x}_{dn}(k) = \hat{\underline{K}}_{ap}(k)\hat{\underline{U}}_{ap}^{*}(k)\underline{s}_{dn}(k)$ |

The spatial processing for data reception is also commonly referred to as matched filtering.

Because of the reciprocal channel, $\hat{\underline{V}}_{ut}(k)$ is both the matrix of right eigenvectors of $\hat{\underline{H}}_{cup}(k)$ (to transmit) and left eigenvectors of $\hat{\underline{H}}_{cdn}(k)$ (to receive) for the user terminal. Similarly, $\hat{\underline{U}}_{ap}(k)$ is both the matrix of right eigenvectors of $\hat{\underline{H}}_{cdn}(k)$ (to transmit) and left eigenvectors of $\hat{\underline{H}}_{cup}(k)$ (to receive) for the access point. The singular value decomposition only needs to be performed by the user terminal for the calibrated downlink channel response estimate $\hat{\underline{H}}_{cdn}(k)$ to obtain $\hat{\underline{V}}_{ut}(k)$ and $\hat{\underline{\Sigma}}(k)$. The access point can derive $\hat{\underline{U}}_{ap}(k)$ and $\hat{\underline{\Sigma}}(k)$ based on the steered reference sent by the user terminal and does not need to perform the singular value decomposition on the uplink channel response estimate $\hat{\underline{H}}_{cup}(k)$. The access point and user terminal may have different versions of the matrix $\hat{\underline{\Sigma}}(k)$ due to the different means used by the access point and user terminal to derive $\hat{\underline{\Sigma}}(k)$. Moreover, the matrix $\hat{\underline{U}}_{ap}(k)$ derived by the access point based on the steered reference is typically different from the matrix $\hat{\underline{U}}_{ap}(k)$ derived by the user terminal using singular value decomposition. For simplicity, these differences are not shown in the above derivation.

Beam-Steering

For certain channel conditions, it is better to transmit data on only one wideband eigenmode—typically the best or principal wideband eigenmode. This may be the case if the received SNRs for all other wideband eigenmodes are sufficiently poor so that improved performance is achieved by using all of the available transmit power on the principal wideband eigenmode.

Data transmission on one wideband eigenmode may be achieved using either beam-forming or beam-steering. For beam-forming, the modulation symbols are spatially processed with the eigenvectors $\hat{v}_{ut,1}(k)$ or $\hat{u}_{ap,1}(k)$, for $k \in K$, for the principal wideband eigenmode (i.e., the first column of $\hat{V}_{ut}(k)$ or $\hat{U}_{ap}(k)$, after the ordering). For beam-steering, the modulation symbols are spatially processed with a set of "normalized" (or "saturated") eigenvectors $\tilde{v}_{ut}(k)$ or $\tilde{u}_{ap}(k)$ for $k \in K$, for the principal wideband eigenmode. For clarity, beam-steering is described below for the uplink.

For the uplink, the elements of each eigenvector $\hat{v}_{ut,1}(k)$, for $k \in K$, for the principal wideband eigenmode may have different magnitudes. Thus, the preconditioned symbols for each subband, which are obtained by multiplying the modulation symbol for subband k with the elements of the eigenvector $\hat{v}_{ut,1}(k)$ for subband k, may then have different magnitudes. Consequently, the per-antenna transmit vectors, each of which includes the preconditioned symbols for all data subbands for a given transmit antenna, may have different magnitudes. If the transmit power for each transmit antenna is limited (e.g., because of limitations of power amplifiers), then beam-forming may not fully use the total power available for each antenna.

Beam-steering uses only the phase information from the eigenvectors $\hat{v}_{ut,1}(k)$, for $k \in K$, for the principal wideband eigenmode and normalizes each eigenvector such that all elements in the eigenvector have equal magnitudes. The normalized eigenvector $\tilde{v}_{ut}(k)$ for subband k may be expressed as:

$$\tilde{v}_{ut}(k) = [A e^{j\theta_1(k)} \, A e^{j\theta_2(k)} \ldots A e^{j\theta_{N_{ut}}(k)}]^T, \quad \text{Eq. (51)}$$

where A is a constant (e.g., A=1); and
$\theta_i(k)$ is the phase for subband k of transmit antenna i, which is given as:

$$\theta_i(k) = \angle \hat{v}_{ut,1,i}(k) = \tan^{-1}\left(\frac{\text{Im}\{\hat{v}_{ut,1,i}(k)\}}{\text{Re}\{\hat{v}_{ut,1,i}(k)\}}\right). \quad \text{Eq. (52)}$$

As shown in equation (52), the phase of each element in the vector $\tilde{v}_{ut}(k)$ is obtained from the corresponding element of the eigenvector $\hat{v}_{ut,1}(k)$ (i.e., $\theta_i(k)$ is obtained from $\hat{v}_{ut,1,i}(k)$, where $\hat{v}_{ut,1}(k) = [\hat{v}_{ut,1,2}(k) \ \hat{v}_{ut,1,N_{ut}}(k)]^T$).

Uplink Beam-Steering

The spatial processing by the user terminal for beam-steering on the uplink may be expressed as:

$$\underline{x}_{up}(k) = \hat{K}_{ut} \tilde{v}_{ut}(k) s_{up}(k), \text{ for } k \in K, \quad \text{Eq. (53)}$$

where $s_{up}(k)$ is the modulation symbol to be transmitted on subband k; and
$\underline{\tilde{x}}_{up}(k)$ is the transmit vector for subband k for beam-steering.

As shown in equation (53), the $N_{ut}$ elements of the normalized steering vector $\tilde{v}_{ut}(k)$ for each subband have equal magnitude but possibly different phases. The beam-steering thus generates one transmit vector $\underline{\tilde{x}}_{up}(k)$ for each subband, with the $N_{ut}$ elements of $\underline{\tilde{x}}_{up}(k)$ having the same magnitude but possibly different phases.

The received uplink transmission at the access point for beam-steering may be expressed as:

$$\begin{aligned}\tilde{r}_{up}(k) &= H_{up}(k)\tilde{x}_{up}(k) + n_{up}(k) \quad \text{, for } k \in K, \quad \text{Eq. (54)} \\ &= H_{up}(k)\hat{K}_{ut}(k)\tilde{v}_{ut}(k)s_{up}(k) + n_{up}(k) \\ &= H_{cup}(k)\tilde{v}_{ut}(k)s_{up}(k) + n_{up}(k)\end{aligned}$$

where $\tilde{r}_{up}(k)$ is the received vector for the uplink for subband k for beam-steering.

A matched filter row vector $\tilde{m}_{ap}(k)$ for the uplink transmission using beam-steering may be expressed as:

$$\tilde{m}_{ap}(k) = (H_{cup}(k)\tilde{v}_{ut}(k))^H, \text{ for } k \in K. \quad \text{Eq. (55)}$$

The matched filter vector $\tilde{m}_{ap}(k)$ may be obtained as described below. The spatial processing (or matched filtering) at the access point for the received uplink transmission with beam-steering may be expressed as:

$$\begin{aligned}\hat{s}_{up}(k) &= \tilde{\lambda}_{up}^{-1}(k)\tilde{m}_{ap}(k)\tilde{r}_{up}(k) \quad \text{for } k \in K, \quad \text{Eq. (56)} \\ &= \tilde{\lambda}_{up}^{-1}(k)(H_{cup}(k)\tilde{v}_{ut}(k))^H \\ &\quad (H_{cup}(k)\tilde{v}_{ut}(k)s_{up}(k) + n_{up}(k)) \\ &= s_{up}(k) + \tilde{n}_{up}(k),\end{aligned}$$

where $\tilde{\lambda}_{up}(k) = (H_{cup}(k)\tilde{v}_{ut}(k))^H(H_{cup}(k)\tilde{v}_{ut}(k))$ (i.e., $\tilde{\lambda}_{up}(k)$ is the inner product of $\tilde{m}_{ap}(k)$ and its conjugate transpose),
$\hat{s}_{up}(k)$ is an estimate of the modulation symbol $s_{up}(k)$ transmitted by the user terminal on the uplink, and
$\tilde{n}_{up}(k)$ is the post-processed noise.

Downlink Beam-Steering

The spatial processing by the access point for beam-steering on the downlink may be expressed as:

$$\underline{\tilde{x}}_{dn}(k) = \hat{K}_{ap}\tilde{u}_{ap}(k)s_{dn}(k), \text{ for } k \in K, \quad \text{Eq. (57)}$$

where $\tilde{u}_{ap}(k)$ is the normalized eigenvector for subband k, which is generated based on the eigenvector $\hat{u}_{ap,1}*(k)$, for the principal wideband eigenmode, similar to that described above for the uplink.

A matched filter row vector $\tilde{m}_{ut}(k)$ for the downlink transmission using beam-steering may be expressed as:

$$\tilde{m}_{ut}(k) = (H_{cdn}(k)\tilde{u}_{ap}(k))^H, \text{ for } k \in K. \quad \text{Eq. (58)}$$

The spatial processing (or matched filtering) at the user terminal for the received downlink transmission may be expressed as:

$$\begin{aligned}\hat{s}_{dn}(k) &= \tilde{\lambda}_{dn}^{-1}(k)\tilde{m}_{ut}(k)\tilde{r}_{dn}(k) \quad \text{for } k \in K, \quad \text{Eq. (59)} \\ &= \tilde{\lambda}_{dn}^{-1}(k)(H_{cdn}(k)\tilde{u}_{ap}(k))^H \\ &\quad (H_{cdn}(k)\tilde{u}_{ap}(k)s_{up}(k) + n_{dn}(k)), \\ &= s_{dn}(k) + \tilde{n}_{dn}(k)\end{aligned}$$

where $\tilde{\lambda}_{dn}(k) = (H_{cdn}(k)\tilde{u}_{ap}(k))^H(H_{cdn}(k)\tilde{u}_{ap}(k))$ (i.e., $\tilde{\lambda}_{dn}(k)$ is the inner product of $\tilde{m}_{ut}(k)$ and its conjugate transpose).

Spatial Processing with Channel Inversion

For the uplink, the transmit vector $\underline{x}_{up}(k)$ for the spatial multiplexing mode may be derived by the user terminal as:

$$\underline{x}_{up}(k) = \hat{K}_{ut}(k)\hat{V}_{ut}(k)\underline{G}(k)\underline{s}_{up}(k), \text{ for } k \in K, \quad \text{Eq. (60)}$$

where $\underline{G}(k)$ is a diagonal matrix of gains for the channel inversion described above.

Equation (60) is similar to equation (15), except that $\hat{\underline{K}}_{ut}(k)\hat{\underline{V}}_{ut}(k)$ is used in place of $\underline{V}(k)$. The elements of $\hat{\underline{K}}_{ut}(k)\hat{\underline{V}}_{ut}(k)$ are provided to multipliers 952 within beam-formers 950 in FIG. 9B.

For the uplink, the transmit vector $\tilde{\underline{x}}_{up}(k)$ for the beam-steering mode may be derived by the user terminal as:

$$\tilde{\underline{x}}_{up}(k) = \hat{\underline{K}}_{ut}(k)\tilde{\underline{v}}_{ut}(k)\tilde{g}(k)s_{up}(k), \text{ for } k \in K, \quad \text{Eq. (61)}$$

where $\tilde{\underline{v}}_{ut}(k)$ is a vector with four elements having equal magnitude but phases obtained based on eigenvector $\tilde{\underline{v}}_{ut,1}(k)$ for the principal eigenmode.

The vector $\tilde{\underline{v}}_{ut}(k)$ may be derived similar to that shown above in equations (16) and (17). The gain $\tilde{g}(k)$ achieves channel inversion and may be derived similar to that shown above in equations (18) through (20), except that $\tilde{\lambda}_1(k) = \tilde{\underline{v}}_{ut}^H(k)\hat{\underline{H}}_{cup}^H(k)\hat{\underline{H}}_{cup}(k)\tilde{\underline{v}}_{ut}(k)$ is used for equation (20). The elements of $\tilde{\underline{v}}_{ut}(k)$ are provided to multipliers 1052 within beam-steering unit 1050 in FIG. 10B.

For the downlink, the transmit vector $\underline{x}_{dn}(k)$ for the spatial multiplexing mode may be derived by the access point as:

$$\underline{x}_{dn}(k) = \hat{\underline{K}}_{ap}(k)\hat{\underline{U}}_{ap}^*(k)\underline{G}(k)\underline{s}_{dn}(k), \text{ for } k \in K. \quad \text{Eq. (62)}$$

Equation (62) is similar to equation (15), except that $\hat{\underline{K}}_{ap}(k)\hat{\underline{U}}_{ap}^*(k)$ is used in place of $\underline{V}(k)$. The elements of $\hat{\underline{K}}_{ap}(k)\hat{\underline{U}}_{ap}^*(k)$ may be provided to multipliers 952 within beam-formers 950 in FIG. 9B.

For the downlink, the transmit vector $\tilde{\underline{x}}_{dn}(k)$ for the beam-steering mode may be derived by the access point as:

$$\tilde{\underline{x}}_{dn}(k) = \hat{\underline{K}}_{ap}(k)\tilde{\underline{u}}_{ap}(k)\tilde{g}(k)s_{dn}(k), \text{ for } k \in K, \quad \text{Eq. (63)}$$

where $\tilde{\underline{u}}_{ap}(k)$ is a vector with four elements having equal magnitude but phases obtained based on eigenvector $\hat{\underline{u}}_{ap,1}(k)$ for the principal eigenmode.

The gain $\tilde{g}(k)$ achieves channel inversion and may be derived in a similar manner to that shown above in equations (18) through (20), except that $\tilde{\lambda}_1(k) = \tilde{\underline{u}}_{ap}^H(k)\hat{\underline{H}}_{cdn}^H(k)\hat{\underline{H}}_{cdn}(k)\tilde{\underline{u}}_{ap}(k)$ is used for equation (20). The elements of $\tilde{\underline{u}}_{ap}(k)$ are provided to multipliers 1052 within beam-steering unit 1050 in FIG. 10B.

Pilot Structure

A pilot structure is provided for the MIMO WLAN system to allow the access points and user terminals to perform timing and frequency acquisition, channel estimation, and other functions needed for proper system operation. Table 33 lists four types of pilot and their short description for an exemplary pilot structure. Fewer, different, and/or additional pilot types may also be used for the pilot structure.

TABLE 33

Pilot Types

| Pilot Type | Description |
| --- | --- |
| Beacon Pilot | A pilot transmitted from all transmit antennas and used for timing and frequency acquisition. |
| MIMO Pilot | A pilot transmitted from all transmit antennas with different orthogonal codes and used for channel estimation. |
| Steered Reference or Steered Pilot | A pilot transmitted on specific eigenmodes of a MIMO channel for a specific user terminal and used for channel estimation and possibly rate control. |
| Carrier Pilot | A pilot used for phase tracking of a carrier signal. |

Steered reference and steered pilot are synonymous terms.

In an embodiment, the pilot structure includes (1) for the downlink—a beacon pilot, a MIMO pilot, a steered reference, and a carrier pilot transmitted by the access point, and (2) for the uplink—a MIMO pilot, a steered reference, and a carrier pilot transmitted by the user terminals.

The downlink beacon pilot and MIMO pilot are sent on the BCH (as shown in FIG. 5A) in each TDD frame. The beacon pilot may be used by the user terminals for timing and frequency acquisition and Doppler estimation. The MIMO pilot may be used by the user terminals to (1) obtain an estimate of the downlink MIMO channel, (2) derive the steering vectors for uplink transmission (if the beam-steering or spatial multiplexing mode is supported), and (3) derive a matched filter for downlink transmission. The downlink steered reference may also be used by a specified user terminal for channel estimation.

An uplink steered reference is transmitted by each active user terminal that supports the beam-steering or spatial multiplexing mode and may be used by the access point to (1) derive the steering vectors for the downlink transmission and (2) derive a matched filter for the uplink transmission. In general, the steered reference is only sent for/by user terminals that support the beam-steering and/or spatial multiplexing modes. The reference sent works regardless of whether or not it is steered properly (e.g., due to a poor channel estimate). That is, the reference becomes orthogonal on a per transmit antenna basis since the steering matrix is diagonal.

If a user terminal is calibrated, then it can transmit a steered reference on the principal eigenmode on the RACH using the vector $\hat{\underline{K}}_{ut}(k)\hat{\underline{v}}_{ut,0}(k)$, for $k \in K$, where $\hat{\underline{v}}_{ut,0}(k)$ is the column of $\hat{\underline{V}}_{ut}(k)$ for the principal eigenmode. If the user terminal is not calibrated, then it can transmit a pilot on the RACH using a vector $\underline{v}_{ut,p}(k) = [e^{j\theta_1(k)} e^{j\theta_2(k)} \ldots e^{j\theta_{N_{ut}}(k)}]^T$, for $k \in K$. The vector $\underline{v}_{ut,p}(k)$ for each subband includes Nut random steering coefficients whose phases $\theta_i(k)$ for $i \in \{1, 2, \ldots N_{ut}\}$, may be selected in accordance with a pseudo-random procedure. Since only the relative phases among the Nut steering coefficients matter, the phase of the first steering coefficient may be set to zero (i.e., $\theta_1(k)=0$). The phases of the other $N_{ut}-1$ steering coefficients may change for each access attempt, so that all 360° are covered by each steering coefficient in intervals of $360°/N_{\theta_i}$, where $N_{\theta_i}$ is a function of Nut. The perturbation of the phases of the Nut elements of the steering vector $\underline{v}_{ut,p}(k)$ on every RACH attempt, when using the RACH in the beam-steering mode prior to calibration, is so that the user terminal does not use a bad steering vector for all access attempts. A MIMO pilot may be sent for/by user terminals that do not support beam-steering and/or spatial multiplexing modes.

The access point does not have knowledge of the channel for any user terminal until the user terminal communicates directly with the access point. When a user terminal desires to transmit data, it first estimates the channel based on the MIMO pilot transmitted by the access point. The user terminal then sends steered reference in the preamble of the RACH when it attempts to access the system. The access point uses the reference on the RACH preamble for signal detection and channel estimation.

Once the user terminal has been granted access to the system and assigned FCH/RCH resources by the access point, the user terminal sends a reference (e.g., a MIMO pilot) at the beginning of each RCH PDU it transmits. If the user terminal is using the diversity mode, then the reference is sent on the RCH without steering. If the user terminal is using the beam-steering or spatial multiplexing mode, then a steered reference is sent on the RCH to allow the access point to determine the eigenvector for the principal eigenmode (for the beam-steering mode) or the set of four eigenvectors (for the spatial multiplexing mode) for each of the 48 data subbands. The steered reference allows the access point to improve its estimate of the channel and to track the channel.

Beacon Pilot—Downlink

The downlink beacon pilot is included in the first portion of the BCH (as shown in FIG. 5A) and transmitted in each TDD frame. The beacon pilot includes a specific OFDM symbol (denoted as "B") that is transmitted from each of the four antennas at the access point. The same B OFDM symbol is transmitted twice in the 2-symbol duration for the beacon pilot.

In a specific embodiment, the B OFDM symbol comprises a set of 12 BPSK modulation symbols, $b(k)$, for 12 specific subbands, which is shown in Table 34.

TABLE 34

| Subband Index | Pilot Symbols | |
|---|---|---|
| | Beacon Pilot $b(k)$ | MIMO Pilot $p(k)$ |
| . | 0 | 0 |
| . | | |
| . | | |
| −26 | 0 | −1 − j |
| −25 | 0 | −1 + j |
| −24 | 1 + j | −1 + j |
| −23 | 0 | −1 + j |
| −22 | 0 | 1 − j |
| −21 | 0 | 1 − j |
| −20 | −1 − j | 1 + j |
| −19 | 0 | −1 − j |
| −18 | 0 | −1 + j |
| −17 | 0 | 1 + j |
| −16 | 1 + j | −1 + j |
| −15 | 0 | 1 − j |
| −14 | 0 | 1 + j |
| −13 | 0 | 1 − j |
| −12 | −1 − j | 1 − j |
| −11 | 0 | −1 − j |
| −10 | 0 | −1 − j |
| −9 | 0 | 1 − j |
| −8 | −1 − j | −1 − j |
| −7 | 0 | 1 + j |
| −6 | 0 | −1 + j |
| −5 | 0 | −1 − j |
| −4 | 1 + j | −1 + j |
| −3 | 0 | −1 + j |
| −2 | 0 | 1 − j |
| −1 | 0 | −1 + j |
| 0 | 0 | 0 |
| 1 | 0 | 1 − j |
| 2 | 0 | −1 − j |
| 3 | 0 | −1 − j |
| 4 | −1 − j | −1 − j |
| 5 | 0 | −1 + j |
| 6 | 0 | 1 + j |
| 7 | 0 | −1 − j |
| 8 | −1 − j | −1 + j |
| 9 | 0 | −1 − j |
| 10 | 0 | −1 − j |
| 11 | 0 | 1 + j |
| 12 | 1 + j | 1 − j |
| 13 | 0 | −1 + j |
| 14 | 0 | −1 − j |
| 15 | 0 | 1 + j |
| 16 | 1 + j | −1 + j |
| 17 | 0 | −1 + j |
| 18 | 0 | 1 − j |
| 19 | 0 | 1 + j |
| 20 | 1 + j | −1 + j |
| 21 | 0 | 1 + j |
| 22 | 0 | −1 + j |
| 23 | 0 | 1 + j |

TABLE 34-continued

| Subband Index | Pilot Symbols | |
|---|---|---|
| | Beacon Pilot $b(k)$ | MIMO Pilot $p(k)$ |
| 24 | 1 + j | −1 + j |
| 25 | 0 | 1 − j |
| 26 | 0 | −1 − j |
| . | 0 | 0 |
| . | | |
| . | | |

For the beacon pilot embodiment shown in Table 34, the B OFDM symbol comprises (1) BPSK modulation symbol (1+j) for subbands −24, −16, −4, 12, 16, 20, and 24, (2) BPSK modulation symbol −(1+j) for subbands −20, −12, −8, 4, and 8, and (3) signal values of zero for the remaining 52 subbands. The B OFDM symbol is specifically designed to facilitate timing and frequency acquisition by the user terminals. However, other OFDM symbols may also be used for the beacon pilot, and this is within the scope of the invention.

MIMO Pilot—Downlink

The downlink MIMO pilot is included in the second portion of the BCH (as shown in FIG. 5A) and also transmitted in each TDD frame. The MIMO pilot includes a specific OFDM symbol (denoted as "P") that is transmitted from each of the four antennas at the access point. The same P OFDM symbol is transmitted eight times in the 8-symbol duration for the MIMO pilot. However, the eight P OFDM symbols for each antenna are "covered" with a different 4-chip Walsh sequence assigned to that antenna. Covering is a process whereby a given pilot or data symbol (or a set of L pilot/data symbols with the same value) to be transmitted is multiplied by all L chips of an L-chip orthogonal sequence to obtain L covered symbols, which are then transmitted. Decovering is a complementary process whereby received symbols are multiplied by the L chips of the same L-chip orthogonal sequence to obtain L decovered symbols, which are then accumulated to obtain an estimate of the transmitted pilot/data symbol. The covering achieves orthogonality among the NT pilot transmissions from the NT transmit antennas and allows the user terminals to distinguish the individual transmit antennas. Covering may be achieved with Walsh sequences or other orthogonal sequences.

In a specific embodiment, the P OFDM symbol comprises a set of 52 QPSK modulation symbols, $p(k)$, for the 48 data subbands and 4 pilot subbands, which is shown in Table 34. Signal values of zero are transmitted on the remaining 12 subbands. The P OFDM symbol comprises a unique "word" of 52 QPSK modulation symbols that is designed to facilitate channel estimation by the user terminals. This unique word is also selected to minimize the peak-to-average variation in the transmitted MIMO pilot. This may then reduce the amount of distortion and non-linearity generated by the receiver circuitry at the user terminals, which can result in improved accuracy for the channel estimation. However, other OFDM symbols may also be used for the MIMO pilot, and this is within the scope of the invention.

In an embodiment, the four antennas at the access point are assigned 4-chip Walsh sequences of $W_1=1111$, $W_2=1010$ $W_3=1100$ and $W_4=1001$ for the MIMO pilot. For a given Walsh sequence, a value of "1" indicates that a P OFDM symbol is transmitted and a value of "0" indicates that a −P OFDM symbol is transmitted (i.e., each of the 52 modulation symbols in P is inverted).

Table 35 lists the OFDM symbols to be transmitted from each of the four antennas at the access point for the beacon pilot and MIMO pilot. The B and P OFDM symbols are as described above.

TABLE 35

Beacon and MIMO Pilots

| Pilot | OFDM Symbol | Antenna 1 | Antenna 2 | Antenna 3 | Antenna 4 |
|---|---|---|---|---|---|
| Beacon Pilot | 1 | B | B | B | B |
|  | 2 | B | B | B | B |
| MIMO Pilot | 3 | +P | +P | +P | +P |
|  | 4 | +P | −P | +P | −P |
|  | 5 | +P | +P | −P | −P |
|  | 6 | +P | −P | −P | +P |
|  | 7 | +P | +P | +P | +P |
|  | 8 | +P | −P | +P | −P |
|  | 9 | +P | +P | −P | −P |
|  | 10 | +P | −P | −P | +P |

The MIMO pilot may be used by the user terminal to estimate the channel response of the downlink. In particular, to recover the pilot sent from access point antenna i and received by user terminal antenna j, the pilot received by terminal antenna j is first multiplied with the Walsh sequence assigned to access point antenna i. The eight decovered OFDM symbols for all eight symbol periods for the MIMO pilot are then accumulated, where the accumulation is performed individually for each of the 52 subbands used to carry the MIMO pilot. The results of the accumulation is $\hat{h}_{cdn\,i,j}(k)$, for $k=\pm\{1,\ldots,26\}$, which is an estimate of the calibrated downlink channel response from access point antenna i to user terminal antenna j for the 52 data and pilot subbands.

The same pilot processing may be performed by the access point to recover the pilot from each access point antenna at each user terminal antenna. The pilot transmitted from each access point antenna may be recovered by decovering with the Walsh sequence assigned to that antenna. The pilot processing provides $N_{ap} \cdot N_{ut}$ values for each of the 52 subbands, where $N_{ap}$ denotes the number of antennas at the access point and $N_{ut}$ denotes the number of antennas at the user terminal. The $N_{ap} \cdot N_{ut}$ values for each subband are the elements of the calibrated downlink channel response estimate $\underline{\hat{H}}_{cdn}(k)$ for that subband.

The MIMO pilot may also be transmitted on the uplink by the user terminal for calibration and in the diversity mode. The same processing described above for the user terminal to recover the MIMO pilot sent by the access point may also be performed by the access point to recover the MIMO pilot sent by the user terminal.

Steered Reference

A steered reference may be transmitted in the preamble portion of an RACH PDU (as shown in FIG. 5C) or an RCH PDU (as shown in FIGS. 5E and 5G) by each active user terminal. A steered reference may also be transmitted in the preamble portion of an FCH PDU (as shown in FIGS. 5E and 5F) by the access point to an active user terminal.

Steered Reference for Spatial Multiplexing

The steered reference comprises a specific OFDM symbol (e.g., the same P OFDM symbol used for the MIMO pilot) that is transmitted from all of the transmit antennas at the user terminal (for the uplink) or the access point (for the downlink). However, the P OFDM symbol for each symbol period is spatially processed (i.e., beam-formed) with a steering vector for one eigenmode.

The first symbol of steered reference transmitted by the user terminal in the preamble of the RACH may be expressed as:

$$\underline{x}(k) = \underline{\hat{K}}_{ut}(k) \cdot \underline{\hat{v}}_{ut,1}(k) \cdot p(k), \text{ for } k \in K', \quad \text{Eq. (64)}$$

where $\underline{x}(k)$ is the transmit vector for subband k;
$\underline{\hat{K}}_{ut}(k)$ is the correction matrix for subband k for the user terminal;
$\underline{\hat{v}}_{ut,1}(k)$ is the steering vector for subband k of the principal wideband eigenmode;
p(k) is the pilot symbol for subband k; and
K'={−32, . . . , 31} is the set of indices for all 64 subbands.
The vector $\underline{x}(k)$ includes four transmit symbols for each value of k, which are to be transmitted from the four antennas at the user terminal. The steering vector $\underline{\hat{v}}_{ut,1}(k)$ is the first column of the matrix $\underline{\hat{V}}_{ut}(k)$ of right eigenvectors of the calibrated uplink channel response estimate $\underline{\hat{K}}_{cup}(k)$, where $\underline{\hat{V}}_{ut}(k)=[\underline{\hat{v}}_{ut,1}(k)\,\underline{\hat{v}}_{ut,2}(k)\,\underline{\hat{v}}_{ut,3}(k)\,\underline{\hat{v}}_{ut,4}(k)]$ and $\underline{\hat{v}}_{ut,i}(k)$ is the i-th column of $\underline{\hat{V}}_{ut}(k)$. The above assumes that the singular values in $\underline{\hat{\Sigma}}(k)$ and the columns of $\underline{\hat{V}}_{ut}(k)$ are ordered as described above.

The second symbol of steered reference transmitted by the user terminal in the preamble of the RACH includes the data rate indicator (DRI) for the RACH PDU. The DRI indicates the rate used for the RACH message sent in the RACH PDU. The DRI is embedded in the second steered reference symbol by mapping the DRI to a specific QPSK symbol $s_{dri}$, as shown in Table 15. The $s_{dri}$ symbol is then multiplied with the pilot symbol p(k) before performing the spatial processing. The second symbol of steered reference for the RACH may be expressed as:

$$\underline{x}(k) = \underline{\hat{K}}_{ut}(k) \cdot \underline{\hat{v}}_{ut,1}(k) \cdot s_{dri} \cdot p(k), \text{ for } k \in K'. \quad \text{Eq. (65)}$$

As shown in equations (64) and (65), only eigenvector $\underline{\hat{v}}_{ut,1}(k)$ for the principal eigenmode is used for the steered reference for the RACH.

A symbol of steered reference transmitted by the user terminal in the preamble of the RCH may be expressed as:

$$\underline{x}_{up,sr,m}(k) = \underline{\hat{K}}_{ut}(k) \cdot \underline{\hat{v}}_{ut,m}(k) \cdot p(k), \text{ for } k \in K', \quad \text{Eq. (66)}$$

where $\underline{x}_{up,sr,m}(k)$ is the transmit vector for subband k of wideband eigenmode m; and
$\underline{\hat{v}}_{ut,m}(k)$ is the steering vector for subband k of wideband eigenmode m (i.e., the m-th column of $\underline{\hat{V}}_{ut}(k)$).

A symbol of steered reference transmitted by the access point in the preamble of the FCH may be expressed as:

$$\underline{x}_{dn,sr,m}(k) = \underline{\hat{K}}_{ap}(k) \cdot \underline{\hat{u}}_{ap,m}^{*}(k) p(k), \text{ for } k \in K', \quad \text{Eq. (67)}$$

where $\underline{x}_{dn,sr,m}(k)$ is the transmit vector for subband k of wideband eigenmode m;
$\underline{\hat{K}}_{ap}(k)$ is the correction matrix for subband k for the access point; and
$\underline{\hat{u}}_{ap,m}^{*}(k)$ is the steering vector for subband k of wideband eigenmode m.

The steering vector $\underline{\hat{u}}_{ap,m}(k)$ is the m-th column of the matrix $\underline{\hat{U}}_{ap}(k)$ of right eigenvectors of the calibrated downlink channel response estimate $\underline{\hat{H}}_{cdn}(k)$, where $\underline{\hat{U}}_{ap}(k)=[\underline{\hat{u}}_{ap,1}(k)\,\underline{\hat{u}}_{ap,2}(k)\,\underline{\hat{u}}_{ap,3}(k)\,\underline{\hat{u}}_{ap,4}(k)]$.

The steered reference may be transmitted in various manners. In one embodiment, one or more eigenvectors are used for the steered reference for each TDD frame and are dependent on the duration of the steered reference, which is indicated by the FCH/RCH Preamble Type fields in the FCCH information element. Table 36 lists the eigenmodes used for the preamble for the FCH and RCH for various preamble sizes, for an exemplary design.

TABLE 36

| Type | Preamble Size | Eigenmodes Used |
|---|---|---|
| 0 | 0 OFDM symbol | no preamble |
| 1 | 1 OFDM symbol | eigenmode m, where m = frame counter mod 4 |
| 2 | 4 OFDM symbols | cycle through all 4 eigenmodes in the preamble |
| 3 | 8 OFDM symbols | cycle through all 4 eigenmodes twice in the preamble |

As shown in Table 36, the steered reference is transmitted for all four eigenmodes within a single TDD frame when the preamble size is four or eight OFDM symbols. The steered reference transmitted by the user terminal for the n-th OFDM symbol in the preamble for the RCH may be expressed as:

$$\underline{x}_{up,sr,n}(k) = \hat{\underline{K}}_{ut}(k) \cdot \hat{\underline{v}}_{ut,n \bmod 4}(k) \cdot p(k), \text{ for } k \in K' \text{ and } n = \{1, \ldots, L\}, \quad \text{Eq. (68)}$$

where L is the preamble size, i.e., L=4 for Type 2 and L=8 for Type 3.

Similarly, the steered reference transmitted by the access point for the n-th OFDM symbol in the preamble for the FCH may be expressed as:

$$\hat{\underline{x}}_{dn,sr,n}(k) = \hat{\underline{K}}_{ap}(k) \cdot \hat{\underline{u}}_{ap,n \bmod 4}^*(k) p(k), \text{ for } k \in K' \text{ and } n = \{1, \ldots L\}. \quad \text{Eq. (69)}$$

As shown in equations (68) and (69), the four eigenmodes are cycled through in each 4-symbol period by the (n mod 4) operation for the steering vector. This scheme may be used if the channel changes more rapidly and/or during the early part of a connection when a good channel estimate needs to be obtained quickly for proper system operation.

In another embodiment, the steered reference is transmitted for one wideband eigenmode for each TDD frame. The steered reference for four wideband eigenmodes may be cycled through in four TDD frames. For example, the steering vectors $\hat{\underline{v}}_{ut,1}(k)$, $\hat{\underline{v}}_{ut,2}(k)$, $\hat{\underline{v}}_{ut,3}(k)$, and $\hat{\underline{v}}_{ut,4}(k)$ may be used for the first, second, third, and fourth TDD frames, respectively, by the user terminal. The particular steering vector to use may be specified by the 2 LSBs of the Frame Counter value in the BCH message. This scheme allows a shorter preamble portion to be used in the PDU but may require a longer time period to obtain a good estimate of the channel.

For both embodiments described above, the steered reference may be transmitted on all four eigenmodes that may be used for data transmission, even though fewer than four eigenmodes are currently used (e.g., because the unused eigenmodes are poor and discarded by the water-filling). The transmission of the steered reference on a currently unused eigenmode allows the receiver to determine when the eigenmode improves enough to be selected for use.

Steered Reference for Beam-Steering

For the beam-steering mode, the spatial processing on the transmit side is performed using a set of normalized eigenvectors for the principal wideband eigenmode. The overall transfer function with a normalized eigenvector is different from the overall transfer function with an unnormalized eigenvector (i.e., $\underline{H}_{cup}(k) \hat{\underline{v}}_{ut,1}(k) \neq \underline{H}_{cup}(k) \tilde{\underline{v}}_{ut}(k)$). A steered reference generated using the set of normalized eigenvectors for all subbands may then be sent by the transmitter and used by the receiver to derive the matched filter vectors for these subbands for the beam-steering mode.

For the uplink, the steered reference for the beam-steering mode may be expressed as:

$$\underline{x}_{up,sr}(k) = \hat{\underline{K}}_{ut}(k) \tilde{\underline{v}}_{ut}(k) p(k), \text{ for } k \in K. \quad \text{Eq. (70)}$$

At the access point, the receive uplink steered reference for the beam-steering mode may be expressed as:

$$\tilde{\underline{r}}_{up,sr}(k) = \underline{H}_{up}(k) \underline{x}_{up,sr}(k) + \underline{n}_{up}(k) \quad , \text{ for } k \in K. \quad \text{Eq. (71)}$$
$$= \underline{H}_{up}(k) \hat{\underline{K}}_{ut}(k) \tilde{\underline{v}}_{ut}(k) p(k) + \underline{n}_{up}(k)$$
$$= \underline{H}_{cup}(k) \tilde{\underline{v}}_{ut}(k) p(k) + \underline{n}_{up}(k)$$

To obtain the matched filter row vector $\hat{\underline{m}}_{ap}(k)$ for the uplink transmission with beam-steering, the received vector $\tilde{\underline{r}}_{up,sr}(k)$ for the steered reference is first multiplied with p*(k). The result is then integrated over multiple received steered reference symbols to form an estimate of $\underline{H}_{cup}(k) \tilde{\underline{v}}_{ut}(k)$. The vector $\hat{\underline{m}}_{ap}(k)$ is then the conjugate transpose of this estimate.

While operating in the beam-steering mode, the user terminal may transmit multiple symbols of steered reference, for example, one or more symbols using the normalized eigenvector $\tilde{\underline{v}}_{ut}(k)$, one or more symbols using the eigenvector $\hat{\underline{v}}_{ut,1}(k)$ for the principal wideband eigenmode, and possibly one or more symbols using the eigenvectors for the other wideband eigenmodes. The steered reference symbols generated with $\tilde{\underline{v}}_{ut}(k)$ may be used by the access point to derive the matched filter vector $\hat{\underline{m}}_{ap}(k)$. The steered reference symbols generated with $\hat{\underline{v}}_{ut,1}(k)$ may be used to obtain $\hat{\underline{u}}_{ap,1}(k)$, which may then be used to derive the normalized eigenvector $\tilde{\underline{u}}_{ap}(k)$ that is used for beam-steering on the downlink. The steered reference symbols generated with the eigenvectors $\hat{\underline{v}}_{ut,2}(k)$ through $\hat{\underline{v}}_{ut,N_s}(k)$ for the other eigenmodes may be used by the access point to obtain $\hat{\underline{u}}_{ap,2}(k)$ through $\hat{\underline{u}}_{ap,N_s}(k)$ and the singular values for these other eigenmodes. This information may then be used by the access point to determine whether to use the spatial multiplexing mode or the beam-steering mode for data transmission.

For the downlink, the user terminal may derive the matched filter vector $\hat{\underline{m}}_{ut}(k)$ for the beam-steering mode based on the calibrated downlink channel response estimate $\hat{\underline{H}}_{cdn}(k)$. In particular, the user terminal has $\hat{\underline{u}}_{ap,1}(k)$ from the singular value decomposition of $\hat{\underline{H}}_{cdn}(k)$ and can derive the normalized eigenvector $\tilde{\underline{u}}_{ap}(k)$. The user terminal can then multiply $\tilde{\underline{u}}_{ap}(k)$ with $\hat{\underline{H}}_{cdn}(k)$ to obtain $\hat{\underline{H}}_{cdn}(k) \tilde{\underline{u}}_{ap}(k)$, and may then derive $\hat{\underline{m}}_{ut}(k)$ based on $\hat{\underline{H}}_{cdn}(k) \tilde{\underline{u}}_{ap}(k)$. Alternatively, a steered reference may be sent by the access point using the normalized eigenvector $\tilde{\underline{u}}_{ap}(k)$, and this steered reference may be processed by the user terminal in the manner described above to obtain $\hat{\underline{m}}_{ut}(k)$.

Carrier Pilot—Uplink

The OFDM subband structure described herein includes four pilot subbands with indices of $-21$, $-7$, 7, and 21. In an embodiment, a carrier pilot is transmitted on the four pilot subbands in all OFDM symbols that are not part of a preamble. The carrier pilot may be used by the receiver to track phase changes due to drifts in the oscillators at both the transmitter and receiver. This may provide improved data demodulation performance.

The carrier pilot comprises four pilot sequences, $P_{c1}(n)$, $P_{c2}(n)$, $P_{c3}(n)$, and $P_{c4}(n)$, which are transmitted on the four pilot subbands. The pilot sequences may be defined as:

$$P_{c1}(n) = P_{c2}(n) = P_{c3}(n) = -P_{c4}(n), \text{ for } n = \{1, 2, \ldots 127\}, \quad \text{Eq. (72)}$$

where n is an index for OFDM symbol period.

The pilot sequences may be defined based on various data sequences. In an embodiment, the pilot sequence $P_{c1}(n)$ is generated based on a polynomial $G(x) = x^7 + x^4 + x$, where the initial state is set to all ones and the output bits are mapped to signal values as follows: $1 \Rightarrow -1$ and $0 \Rightarrow 1$. The pilot sequence $P_{c1}(n)$, for $n = \{1, 2, \ldots 127\}$ may then be expressed as:

$P_{c1}(n)$={1,1,1,1,−1,−1,−1,1,−1,−1,−1,−1,1,1,−1,1,−1,−
1,1,−1,1,1,−1,1,1,1,1,1,1,−1,1, 1,1,−1,1,1,−1,−1,
1,1,1,−1,1,−1,−1,−1,1,−1,1,1,−1,−1,1,−1,1,1,1,1,
1,1,−1,−1,1,1, −1,−1,−1,1,−1,1,1,1,−1,−1,1,1,1,−
1,−1,−1,−1,1,−1,−1,1,−1,1,1,1,1,1,−1,1,−1,1,−1,1,
−1,−1,−1,−1,−1,1,−1,1,1,1,−1,1,−1,−1,1,1,1,1,−1,−1,1,−
1,−1,−1,1,1,1,−1,−1,−1,−1,−1,−1,−1}.

The values of "1" and "−1" in the pilot sequence $P_{c1}(n)$ may be mapped to pilot symbols using a particular modulation scheme. For example, using BPSK, a "1" may be mapped to 1+j and a "−1" may be mapped to −(1+j). If there are more than 127 OFDM symbols, then the pilot sequence may be repeated so that $P_{c1}(n)=P_{c1}(n \mod 127)$ for n>127.

In one embodiment, the four pilot sequences are reset for each transport channel. Thus, on the downlink, the pilot sequences are reset for the first OFDM symbol of the BCH message, reset again for the first OFDM symbol of the FCCH message, and reset for the first OFDM symbol sent on the FCH. In another embodiment, the pilot sequences are reset at the start of each TDD frame and repeat as often as needed. For this embodiment, the pilot sequences may be stalled during the preamble portions of the BCH and FCH.

In the diversity mode, the four pilot sequences are mapped to four subband/antenna pairings as shown in table 29. In particular, $P_{c1}(n)$ is used for subband −21 of antenna 1, $P_{c2}(n)$ is used for subband −7 of antenna 2, $P_{c3}(n)$ is used for subband 7 of antenna 3, and $P_{c4}(n)$ is used for subband 21 of antenna 4. Each pilot sequence is then transmitted on the associated subband and antenna.

In the spatial multiplexing mode, the four pilot sequences are transmitted on the principal eigenmode of their respective subbands. The spatial processing for the carrier pilot symbols is similar to that performed for the modulation symbols, as described above. In the beam-steering mode, the four pilot sequences are transmitted on their respective subbands using beam-steering. The beam-steering for the carrier pilot symbols is also similar to that performed for the modulation symbols.

A specific pilot structure has been described above for the MIMO WLAN system. Other pilot structures may also be used for the system, and this is within the scope of the invention.

System Operation

Figure 12A:
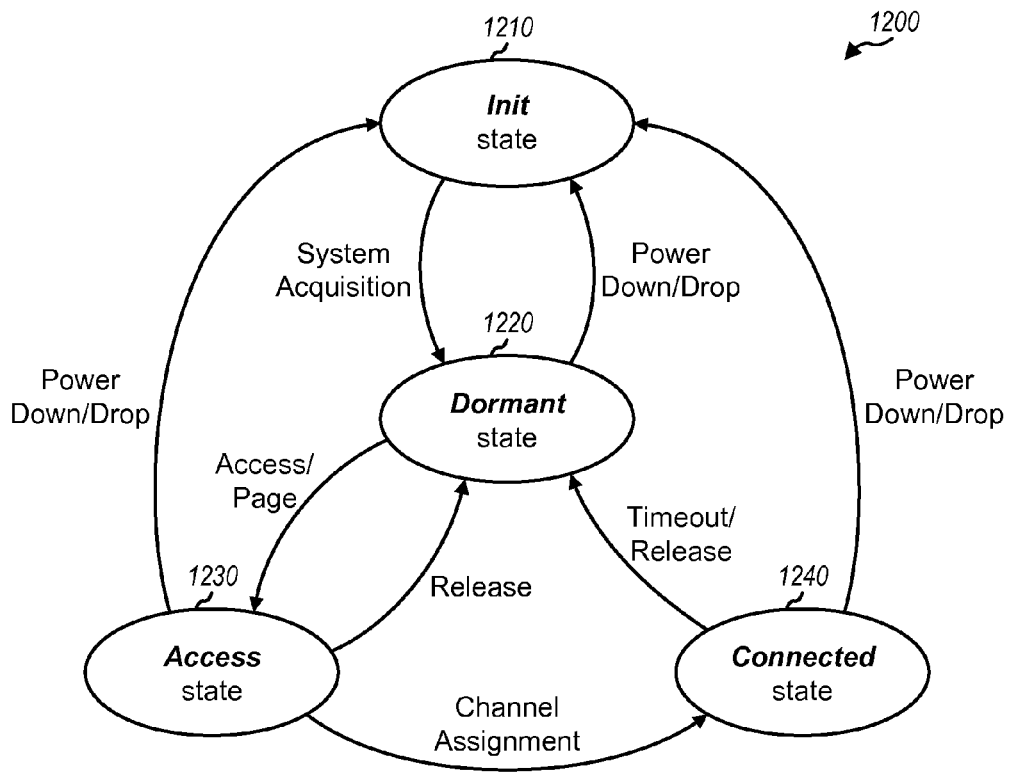
FIGS. 12A and 12B show a state diagram for operation of a user terminal.

FIG. 12A shows a specific embodiment of a state diagram 1200 for the operation of a user terminal. This state diagram includes four states—an Init state 1210, a Dormant state 1220, an Access state 1230, and a Connected state 1240. Each of states 1210, 1220, 1230, and 1240 may be associated with a number of substates (not shown in FIG. 12A for simplicity).

In the Init state, the user terminal acquires the system frequency and timing and obtains system parameters sent on the BCH. In the Init state, the user terminal may perform the following functions:

System determination—the user terminal determines which carrier frequency to acquire the system on.

Frequency/timing acquisition—the user terminal acquires the beacon pilot and adjusts its frequency and timing accordingly.

Parameter acquisition—the user terminal processes the BCH to obtain the system parameters associated with the access point from which the downlink signal is received.

Upon completing the required functions for the Init state, the user terminal transitions to the Dormant state.

In the Dormant state, the user terminal periodically monitors the BCH for updated system parameters, indications of pages and broadcast messages being sent on the downlink, and so on. No radio resources are allocated to the user terminal in this state. In the Dormant state, the user terminal may perform the following functions:

If a registration is warranted, the user terminal enters the Access state with a registration request.

If calibration of the transmitter/receiver is warranted, the user terminal enters the Access state with a calibration request.

The user terminal monitors the BCH for indication of pages and broadcast messages sent on the FCH.

If the user terminal has data to send on the uplink, it enters the Access state with a resource request.

The user terminal performs maintenance procedures such as updating the system parameters and tracking the channel.

The user terminal may enter a slotted mode of operation for power savings, if this mode is supported by the user terminal.4

If the user terminal desires radio resources from the access point for any task, it transitions to the Access state. For example, the user terminal may transition to the Access state in response to a page or DST indicator being sent in the BCH message, for registration or request for calibration, or to request dedicated resources.

In the Access state, the user terminal is in the process of accessing the system. The user terminal may send short messages and/or requests for FCH/RCH resources using the RACH. The operation on the RACH is described in further detail below. If the user terminal is released by the access point, then it transitions back to the Dormant state. If the user terminal is assigned resources for the downlink and/or uplink, then it transitions to the Connected state.

In the Connected state, the user terminal is assigned the FCH/RCH resources, although not necessarily for every TDD frame. The user terminal may actively use the allocated resources or may be idle (while still maintaining the connection) in the Connected state. The user terminal remains in the Connected state until it is released by the access point or if it times out after no activity for a particular timeout period, in which case it transitions back to the Dormant state.

While in the Dormant, Access, or Connected state, the user terminal transitions back to the Init state if it is powered down or if the connection is dropped.

Figure 12B:
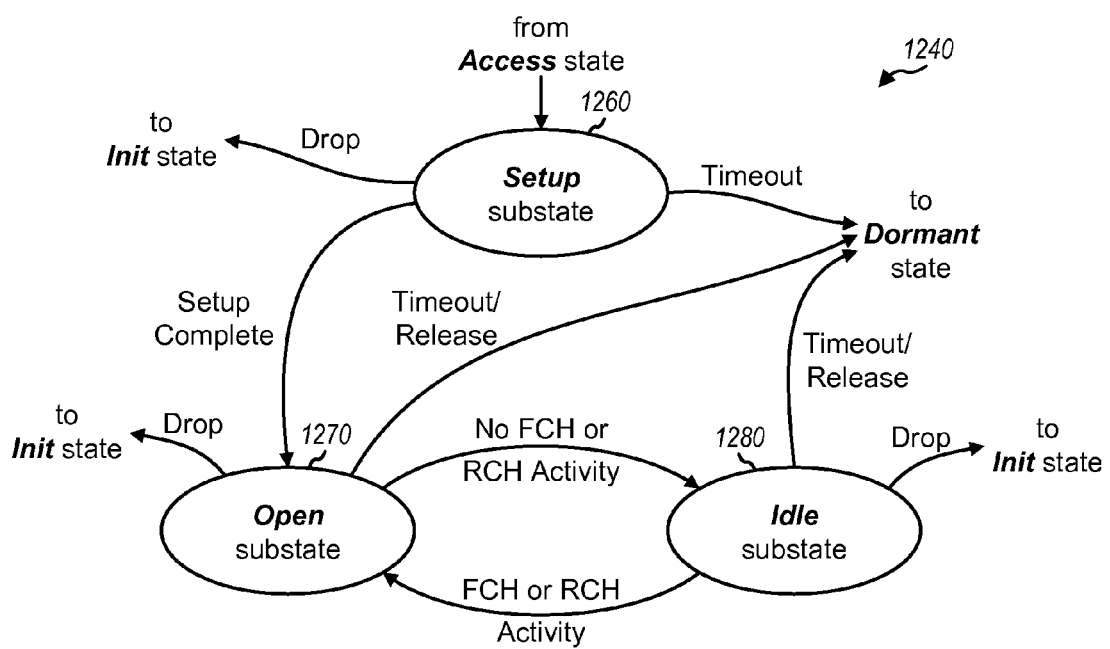

FIG. 12B shows a specific embodiment of a state diagram for Connected state 1240. In this embodiment, the Connected state includes three substates—a Setup substate 1260, an Open substate 1270, and an Idle substate 1280. The user terminal enters the Setup substate upon receiving an assignment on the FCCH.

In the Setup substate, the user terminal is in the process of setting up the connection and is not yet exchanging data. The connection setup may include channel estimation for the access point, rate determination, service negotiation, and so on. Upon entering the Setup substate, the user terminal sets a timer for a specified amount of time. If the timer expires before the user terminal leaves this substate, then it transitions back to the Dormant state. The user terminal transitions to the Open substate upon completion of the connection setup.

In the Open substate, the user terminal and access point exchange data on the downlink and/or uplink. While in the Open substate, the user terminal monitors the BCH for system parameters and indication of page/broadcast messages. If a BCH message cannot be decoded correctly within a specified number of TDD frames, then the user terminal transitions back to the Init state.

The user terminal also monitors the FCCH for channel assignment, rate control, RCH timing control, and power control information. The user terminal estimates the received SNR using the BCH beacon pilot and the FCH preamble and determines the maximum rate that can be sustained reliably on the FCH.

The FCH and RCH assignments for the user terminal for each TDD frame are given by the information elements in the FCCH PDU transmitted in the current (or possibly prior) TDD frame. The user terminal may not be assigned for data transmission on the FCH and/or RCH for any given TDD frame. For each TDD frame in which the user terminal is not scheduled for data transmission, it does not receive an FCH PDU on the downlink and does not transmit on the uplink.

For each TDD frame in which the user terminal is scheduled, the data transmissions on the downlink and/or uplink are performed using the rate, transmission mode, and RCH timing offset (for the uplink) indicated in the FCCH assignments (i.e., the FCCH information elements addressed to the user terminal). The user terminal receives, demodulates, and decodes FCH PDUs sent to it. The user terminal also transmits RCH PDUs, which include the preamble and FCH data rate indicator. The user terminal adjusts the rate used on the RCH according to the rate control information contained in the FCCH assignment. If power control is being applied for the uplink transmission, then the user terminal adjusts its transmit power based on the power control commands included in the FCCH assignment. The data exchange may be bursty, in which case the user terminal may enter into the Idle substate whenever no data is being exchanged. The user terminal enters the Idle substate when directed by the access point. If the access point does not assign the FCH or RCH to the user terminal within a specified number of TDD frames, then the user terminal transitions back to the Dormant state and retains its MAC ID.

In the Idle substate, both the uplink and downlink are idling. Data is not being sent in either direction. However, the links are maintained with the steered reference and control messages. In this substate, the access point periodically assigns Idle PDUs to the user terminal on the RCH and possibly the FCH (not necessarily simultaneously). The user terminal may be able to remain in the Connected state indefinitely, provided that the access point periodically assigns Idle PDUs on the FCH and RCH to maintain the link.

While in the Idle substate, the user terminal monitors the BCH. If a BCH message is not decoded correctly within a specified number of TDD frames, then the user terminal transitions back to the Init state. The user terminal also monitors the FCCH for channel assignment, rate control, RCH timing control, and power control information. The user terminal may also estimate the receive SNR and determine the maximum rate supported by the FCH. The user terminal transmits an Idle PDU on the RCH, when assigned, and sets the RCH Request bit in the Idle PDU if it has data to send. If the access point does not assign an FCH or RCH to the user terminal within a specified number of TDD frames, then the user terminal transitions back to the Dormant state and retains its MAC ID.

A time-out timer may be set to a particular value upon entering any of the three substates. This timer would then count down if there is no activity while in the substate. While in the Setup, Active, or Idle substate, the terminal would transition back to the Dormant state if the time-out timer expires and to the Init state if the connection is dropped. While in the Active or Idle substate, the terminal would also transition back to the Dormant state if the connection is released.

FIGS. 12A and 12B show a specific embodiment of a state diagram that may be used for the user terminal. Various other state diagrams with fewer, additional, and/or different states and substates may also be used for the system, and this is within the scope of the invention.

Random Access

In an embodiment, a random access scheme is employed to allow the user terminals to access the MIMO WLAN system. In an embodiment, the random access scheme is based on a slotted Aloha scheme whereby a user terminal transmits in a randomly selected RACH slot to attempt to gain access to the system. The user terminal may send multiple transmissions on the RACH until access is gained or the maximum number of access attempts has been reached. Various parameters for each RACH transmission may be changed to improve the likelihood of success, as described below.

Figure 13:
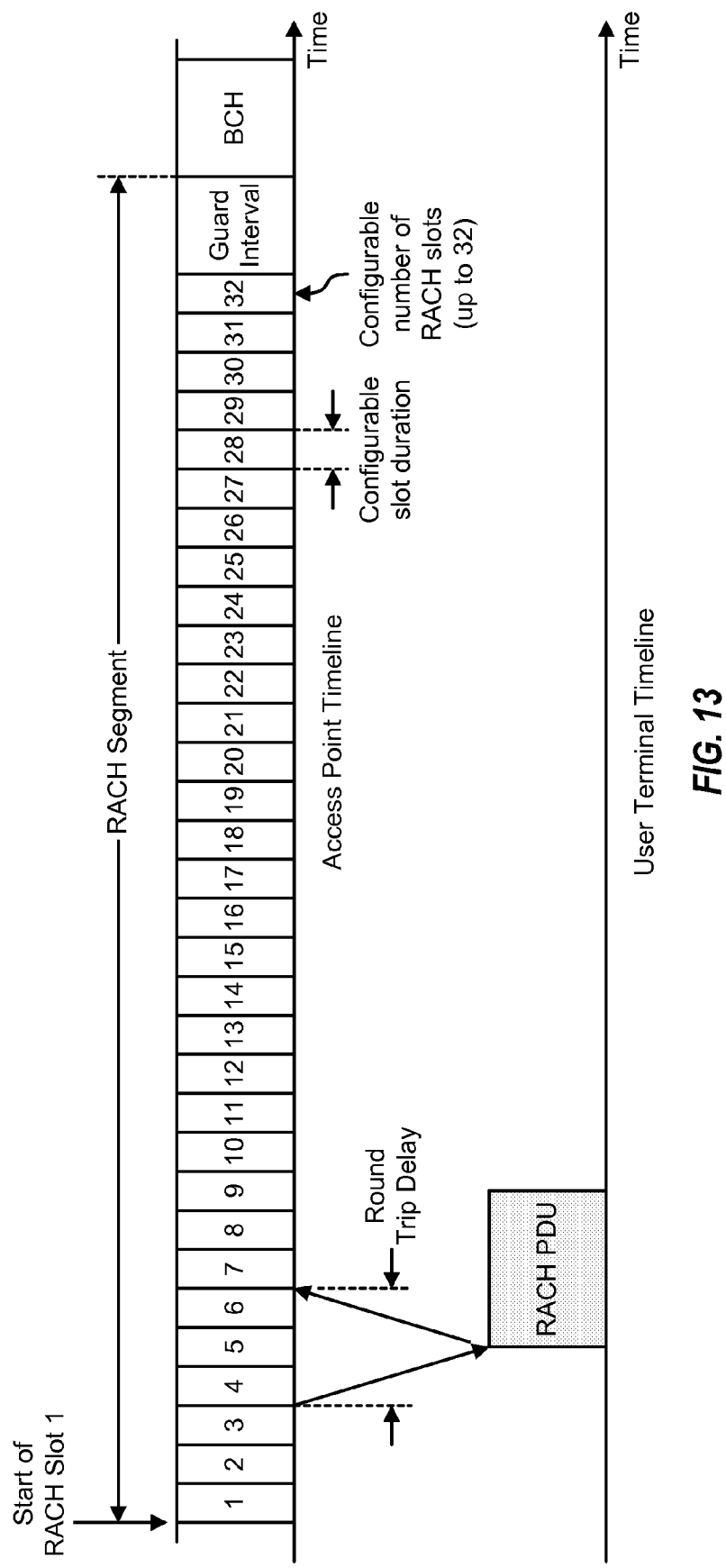
FIG. 13 shows a timeline for the RACH.

FIG. 13 illustrates a timeline for the RACH, which is partitioned into RACH slots. The number of RACH slots available for use in each TDD frame and the duration of the RACH slot are configurable parameters. A maximum of 32 RACH slots may be available for use in each TDD frame. The guard interval between the end of the last RACH slot and the start of the BCH PDU for the next TDD frame is also a configurable parameter. These three parameters for the RACH can change from frame to frame and are indicated by the RACH Length, RACH Slot Size, and RACH Guard Interval fields of the BCH message.

When a user terminal desires to access the system, it first processes the BCH to obtain pertinent system parameters. The user terminal then sends a RACH PDU on the RACH. This RACH PDU includes a RACH message that contains information needed by the access point to process the access request from the user terminal. For example, the RACH message includes the user terminal's assigned MAC ID that allows the access point to identify the user terminal. A registration MAC ID (i.e., a specific MAC ID value) may be reserved for unregistered user terminals. In this case, the user terminal's long ID may be included in the Payload field of the RACH message along with the registration MAC ID.

As described above, the RACH PDU may be transmitted at one of four data rates, which are listed in Table 15. The selected rate is embedded in the preamble of the RACH PDU (as shown in FIG. 5C). The RACH PDU also has a variable length of 1, 2, 4, or 8 OFDM symbols (as also listed in Table 15), which is indicated in the Message Duration field of the RACH message.

To transmit the RACH PDU, the user terminal first determines the number of RACH slots that may be used for transmission (i.e., the number of "usable" RACH slots). This determination is made based on (1) the number of RACH slots available in the current TDD frame, (2) the duration of each RACH slot, (3) the guard interval, and (4) the length of the RACH PDU to be transmitted. The RACH PDU cannot extend beyond the end of the RACH segment of the TDD frame. Thus, if the RACH PDU is longer than one RACH slot plus the guard interval, then this PDU may not be transmitted in one or more later available RACH slots. The number of RACH slots that may be used to transmit the RACH PDU may be fewer than the number of available RACH slots, based on the factors enumerated above. The RACH segment includes a guard interval, which is provided to prevent the uplink transmission from the user terminals from interfering with the next BCH segment, which is a possibility for user terminals that do not compensate for their round trip delay.

The user terminal then randomly selects one of the usable RACH slots to transmit the RACH PDU. The user terminal then transmits the RACH PDU starting in the selected RACH slot. If the user terminal knows the round trip delay to the access point, then it can account for this delay by adjusting its timing accordingly.

When the access point receives a RACH PDU, it checks the received RACH message using the CRC included in the message. The access point discards the RACH message if the CRC fails. If the CRC passes, the access point sets the RACH Acknowledgment bit on the BCH in the subsequent TDD frame and transmits an RACH acknowledgement on the FCCH within 2 TDD frames. There may be a delay between the setting of the Acknowledgment bit on the BCH and the sending of the acknowledgment on the FCCH, which may be used to account for scheduling delay and so on. For example, if the access point receives the message on the RACH, it can set the Acknowledgment bit on the BCH and have a delay response on the FCCH. The Acknowledgment bit prevents user terminals from retrying and allows unsuccessful user terminals to retry quickly, except during busy RACH periods.

If the user terminal is performing a registration, then it uses the registration MAC ID (e.g., 0x0001). The access point responds by sending a MAC ID Assignment Message on the FCH. All other RACH transmission types include the user terminal's MAC ID assigned by the system. The access point explicitly acknowledges all correctly received RACH messages by sending acknowledgments on the FCCH using the MAC ID assigned to the user terminal.

After the user terminal sends the RACH PDU, it monitors the BCH and FCCH to determine whether or not its RACH PDU has been received and processed by the access point. The user terminal monitors the BCH to determine whether or not the RACH Acknowledgment Bit in the BCH message is set. If this bit is set, which indicates that an acknowledgment for this and/or some other user terminals is being sent on the FCCH, then the user terminal further processes the FCCH to obtain IE Type 3 information elements containing acknowledgements. Otherwise, if the RACH Acknowledgment Bit is not set, then the user terminal continues to monitor the BCH or resumes its access procedure on the RACH.

The FCCH IE Type 3 is used to carry quick acknowledgements for successful access attempts. Each acknowledgement information element contains the MAC ID associated with the user terminal for which the acknowledgment is sent. A quick acknowledgement is used to inform the user terminal that its access request has been received but is not associated with an assignment of FCH/RCH resources. Conversely, an assignment-based acknowledgement is associated with an FCH/RCH assignment. If the user terminal receives a quick acknowledgement on the FCCH, it transitions to the Dormant state. If the user terminal receives an assignment-based acknowledgement, it obtains scheduling information sent along with the acknowledgment and begins using the FCH/RCH as assigned in the current TDD frame.

The user terminal resumes the access procedure on the RACH if it does not receive an acknowledgement on the FCCH within a specified number of TDD frames after transmitting the RACH PDU. In this case, the user terminal can assume that the access point did not receive the RACH PDU correctly. A counter is maintained by the user terminal to count the number of access attempts. This counter may be initialized to zero for the first access attempt and is incremented by one for each subsequent access attempt. The user terminal would terminate the access procedure if the counter value reaches the maximum number of attempts.

For each subsequent access attempt, the user terminal first determines various parameters for this access attempt including (1) the amount of time to wait before transmitting the RACH PDU, (2) the RACH slot to use for the RACH PDU transmission, and (3) the rate for the RACH PDU. To determine the amount of time to wait, the user terminal first determines the maximum amount of time to wait for the next access attempt, which is referred to as the contention window (CW). In an embodiment, the contention window (which is given in units of TDD frames) exponentially increases for each access attempt (i.e., $CW=2^{access\_attempt}$). The contention window may also be determined based on some other function (e.g., a linear function) of the number of access attempts. The amount of time to wait for the next access attempt is then randomly selected between zero and CW. The user terminal would wait this amount of time before transmitting the RACH PDU for the next access attempt.

For the next access attempt, the user terminal reduces the rate for the RACH PDU, if the lowest rate was not used for the last access attempt. The initial rate used for the first access attempt may be selected based on the received SNR of the pilot sent on the BCH. The failure to receive an acknowledgment may be caused by the access point's failure to correctly receive the RACH PDU. Thus, the rate for the RACH PDU in the next access attempt is reduced to improve the likelihood of correct reception by the access point.

After waiting the randomly selected wait time, the user terminal again randomly selects an RACH slot for transmission of the RACH PDU. The selection of the RACH slot for this access attempt may be performed in similar manner as that described above for the first access attempt, except that the RACH parameters (i.e., number of RACH slots, slot duration, and guard interval) for the current TDD frame, as conveyed in the BCH message, are used along with the current RACH PDU length. The RACH PDU is then transmitted in the randomly selected RACH slot.

The access procedure described above continues until either (1) the user terminal receives an acknowledgment from the access point or (2) the maximum number of permitted access attempts has been reached. For each access attempt, the amount of time to wait before transmitting the RACH PDU, the RACH slot to use for the RACH PDU transmission, and the rate for the RACH PDU may be selected as described above. If the acknowledgment is received, then the user terminal operates as indicated by the acknowledgment (i.e., it waits in the Dormant state if a quick acknowledgment is received or starts using the FCH/RCH if an assignment-based acknowledgment is received). If the maximum number of permitted access attempts has been reached, then the user terminal transitions back to the Init state.

Rate, Power, and Timing Control

The access point schedules downlink and uplink transmissions on the FCH and RCH and further controls the rates for all active user terminals. Moreover, the access point adjusts the transmit power of certain active user terminals on the uplink. Various control loops may be maintained to adjust the rate, transmit power, and timing for each active user terminal.

Fixed and Variable Rate Services

The access point can support both fixed and variable rate services on the FCH and RCH. Fixed-rate services may be used for voice, video, and so on. Variable rate services may be used for packet data (e.g., Web browsing).

For fixed rate services on the FCH/RCH, a fixed rate is used for the entire connection. Best effort delivery is used for the FCH and RCH (i.e., no retransmission). The access point schedules a constant number of FCH/RCH PDUs per specified time interval to satisfy the QoS requirements of the service. Depending on the delay requirements, the access point may not need to schedule an FCH/RCH PDU for every TDD frame. Power control is exercised on the RCH but not the FCH for fixed rate services.

For variable rate services on the FCH/RCH, the rate used for the FCH/RCH is allowed to change with channel conditions. For some isochronous services (e.g., video, audio), the QoS requirements may impose a minimum rate constraint. For these services, the scheduler at the access point adjusts the FCH/RCH allocation so that a constant rate is provided. For asynchronous data services (e.g., web browsing, file transfer, and so on), a best effort delivery is provided with the option of retransmissions. For these services, the rate is the maximum that can be reliably sustained by the channel conditions. The scheduling of the FCH/RCH PDUs for the user terminals is typically a function of their QoS requirements. Whenever there's no data to send on the downlink/uplink, an Idle PDU is sent on the FCH/RCH to maintain the link. Closed loop power control is not exercised on the FCH or RCH for variable rate services.

Rate Control

Rate control may be used for variable rate services operating on the FCH and RCH to adapt the rate of the FCH/RCH to changing channel conditions. The rates to use for the FCH and RCH may be independently controlled. Moreover, in the spatial multiplexing mode, the rate for each wideband eigenmode of each dedicated transport channel may be independently controlled. The rate control is performed by the access point based on feedback provided by each active user terminal. The scheduler within the access point schedules data transmission and determines rate assignments for the active user terminals.

The maximum rate that can be supported on either link is a function of (1) the channel response matrix for all of the data subbands, (2) the noise level observed by the receiver, (3) the quality of the channel estimate, and possibly other factors. For a TDD system, the channel may be considered to be reciprocal for the downlink and uplink (after calibration has been performed to account for any differences at the access point and user terminal). However, this reciprocal channel does not imply that the noise floors are the same at the access point and user terminal. Thus, for a given user terminal, the rates on the FCH and RCH may be independently controlled.

Closed-loop rate control may be used for data transmission on one or more spatial channels. Closed-loop rate control may be achieved with one or multiple loops. An inner loop estimates the channel conditions and selects a suitable rate for each spatial channel used for data transmission. The channel estimation and rate selection may be performed as described above. An outer loop may be used to estimate the quality of the data transmission received on each spatial channel and to adjust the operation of the inner loop. The data transmission quality may be quantified by packet error rate (PER), decoder metrics, and so on, or a combination thereof. For example, the outer loop may adjust the SNR offset for each spatial channel to achieve the target PER for that spatial channel. The outer loop may also direct the inner loop to select a lower rate for a spatial channel if excessive packet errors are detected for the spatial channel.

Downlink Rate Control

Each active user terminal can estimate the downlink channel based on the MIMO pilot transmitted on the BCH in each TDD frame. The access point may also transmit a steered reference in an FCH PDU sent to a specific user terminal. Using the MIMO pilot on the BCH and/or the steered reference on the FCH, the user terminal can estimate the received SNR and determine the maximum rate that can be supported on the FCH. If the user terminal is operating in the spatial multiplexing mode, then the maximum rate may be determined for each wideband eigenmode. Each user terminal can send back to the access point the maximum rate supported by each wideband eigenmode (for the spatial multiplexing mode), the maximum rate supported by the principal wideband eigenmode (for the beam-steering mode), or the maximum rate supported by the MIMO channel (for the diversity mode) in the FCH Rate Indicator field of the RCH PDU. These rates may be mapped to received SNRs, which may then be used to perform the water-filling described above. Alternatively, the user terminal may send back sufficient information (e.g., the received SNRs) to allow the access point to determine the maximum rate supported by the downlink.

The determination of whether to use the diversity, beam-steering, or spatial multiplexing mode may be made based on the feedback from the user terminal. The number of wideband eigenmodes selected for use may increase as isolation between the steering vectors improves.

FIG. 14A illustrates a process for controlling the rate of a downlink transmission for a user terminal. A BCH PDU is transmitted in the first segment of each TDD frame and includes the beacon and MIMO pilots that can be used by the user terminals to estimate and track the channel. A steered reference may also be sent in the preamble of an FCH PDU sent to the user terminal. The user terminal estimates the channel based on the MIMO and/or steered reference and determines the maximum rate(s) that can be supported by the downlink. One rate is provided for each wideband eigenmode if the user terminal is operating in the spatial multiplexing mode. The user terminal then sends the rate indicator for the FCH in the FCH Rate Indicator field of the RCH PDU it sends to the access point.

The scheduler uses the maximum rates that the downlink can support for each active user terminal to schedule downlink data transmission in subsequent TDD frames. The rates and other channel assignment information for the user terminal are reflected in an information element sent on the FCCH. The rate assigned to one user terminal can impact the scheduling for other user terminals. The minimum delay between the rate determination by the user terminal and its use is approximately a single TDD frame.

Using the Gram-Schmidt ordered procedure, the access point can accurately determine the maximum rates supported on the FCH directly from the RCH preamble. This can then greatly simplify rate control.

Uplink Rate Control

Each user terminal transmits a steered reference on the RACH during system access and on the RCH upon being assigned FCH/RCH resources. The access point can estimate the received SNR for each of the wideband eigenmodes based on the steered reference on the RCH and determine the maximum rate supported by each wideband eigenmode. Initially, the access point may not have a good estimate of the channel to permit reliable operation at or near the maximum rate supported by each wideband eigenmode. To improve reliability, the initial rate used on the FCH/RCH may be much lower than the maximum supported rate. The access point can integrate the steered reference over a number of TDD frames to obtain improved estimate of the channel. As the estimate of the channel improves, the rate may be increased.

FIG. 14B illustrates a process for controlling the rate of an uplink transmission for a user terminal. When scheduled for uplink transmission, the user terminal transmits an RCH PDU that includes the reference, which is used by the access point to determine the maximum rate on the uplink. The scheduler then uses the maximum rates that the uplink can support for each active user terminal to schedule uplink data transmission in subsequent TDD frames. The rates and other channel assignment information for the user terminal are reflected in an information element sent on the FCCH. The minimum delay between the rate determination by the access point and its use is approximately a single TDD frame.

Power Control

Power control may be used for uplink transmissions on the RCH (instead of rate control) for fixed-rate services. For fixed-rate services, the rate is negotiated at call setup and remains fixed for the duration of the connection. Some fixed-rate services may be associated with limited mobility requirement. In an embodiment, power control is implemented for the uplink to guard against interference among the user terminals but is not used for the downlink.

A power control mechanism is used to control the uplink transmit power of each active user terminal such that the received SNR at the access point is maintained at a level that achieves the desired service quality. This level is often referred to as the target received SNR, the operating point, or the setpoint. For a mobile user terminal, the propagation loss will likely change as the user terminal moves about. The power control mechanism tracks changes in the channel so that the received SNR is maintained near the setpoint.

Figure 15:
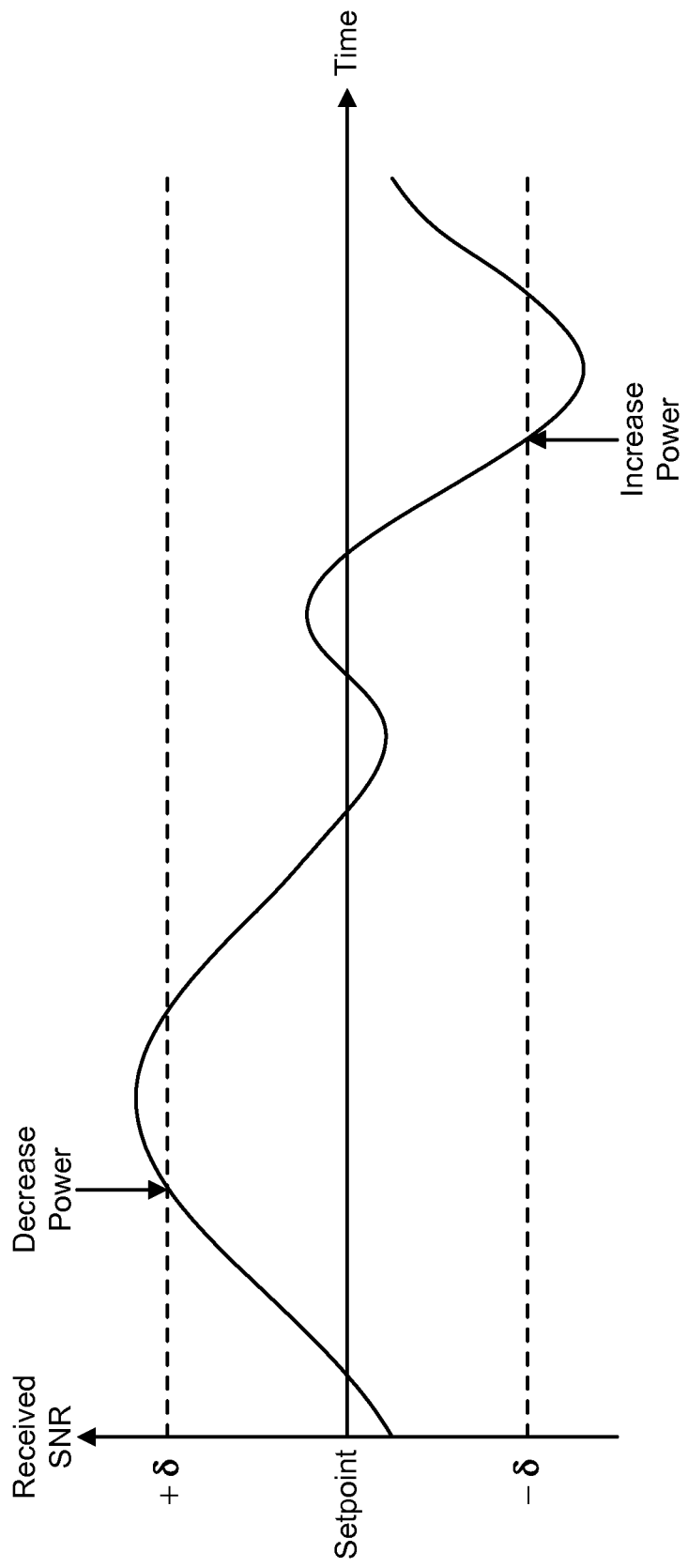
FIG. 15 shows the operation of a power control loop.

The power control mechanism may be implemented with two power control loops—an inner loop and an outer loop. The inner loop adjusts the transmit power of the user terminal such that the received SNR at the access point is maintained near the setpoint. The outer loop adjusts the setpoint to achieve a particular level of performance, which may be quantified by a particular frame error rate (FER) (e.g., 1% FER), packet error rate (PER), block error rate (BLER), message error rate (MER), or some other measure FIG. 15 illustrates the operation of the inner power control for a user terminal. After the user terminal is assigned the FCH/RCH, the access point estimates the received SNR on the RCH and compares it to the setpoint. The initial power to be used by the user terminal may be determined at call setup and is typically near its maximum transmit power level. For each frame interval, if the received SNR exceeds the setpoint by a particular positive margin $\delta$, then the access point can direct the user terminal to reduce its transmit power by a particular amount (e.g., 1 dB) in an FCCH information element sent to this user terminal. Conversely, if the received SNR is lower than the threshold minus the margin $\delta$, then the access point can direct the user terminal to increase its transmit power by the particular amount. If the received SNR is within the acceptable limits of the setpoint, then the access point will not request a change in transmit power by the user terminal. The uplink transmit power is given as the initial transmit power level plus the sum of all power adjustments received from the access point.

The initial setpoint used at the access point is set to achieve a particular level of performance. This setpoint is adjusted by the outer loop based on the FER or PER for the RCH. For example, if no frame/packet errors occur over a specified time period, then the setpoint may be reduced by a first amount (e.g., 0.1 dB). If the average FER is exceeded by the occurrence of one or more frame/packet errors, then the setpoint may be increased by a second amount (e.g., 1 dB). The setpoint, hysteresis margin, and outer loop operation are specific to the power control design used for the system.

Timing Control

Timing control may be advantageously used in a TDD-based frame structure where the downlink and uplink share the same frequency band in a time division duplexed manner. The user terminals may be located throughout in the system and may thus be associated with different propagation delays to the access point. In order to maximize efficiency on the uplink, the timing of the uplink transmission on the RCH and RACH from each user terminal can be adjusted to account for its propagation delay. This would then ensure that the uplink transmissions from different user terminals arrive within a particular time window at the access point and do not interfere with one another on the uplink, or with the downlink transmission.

Figure 16:
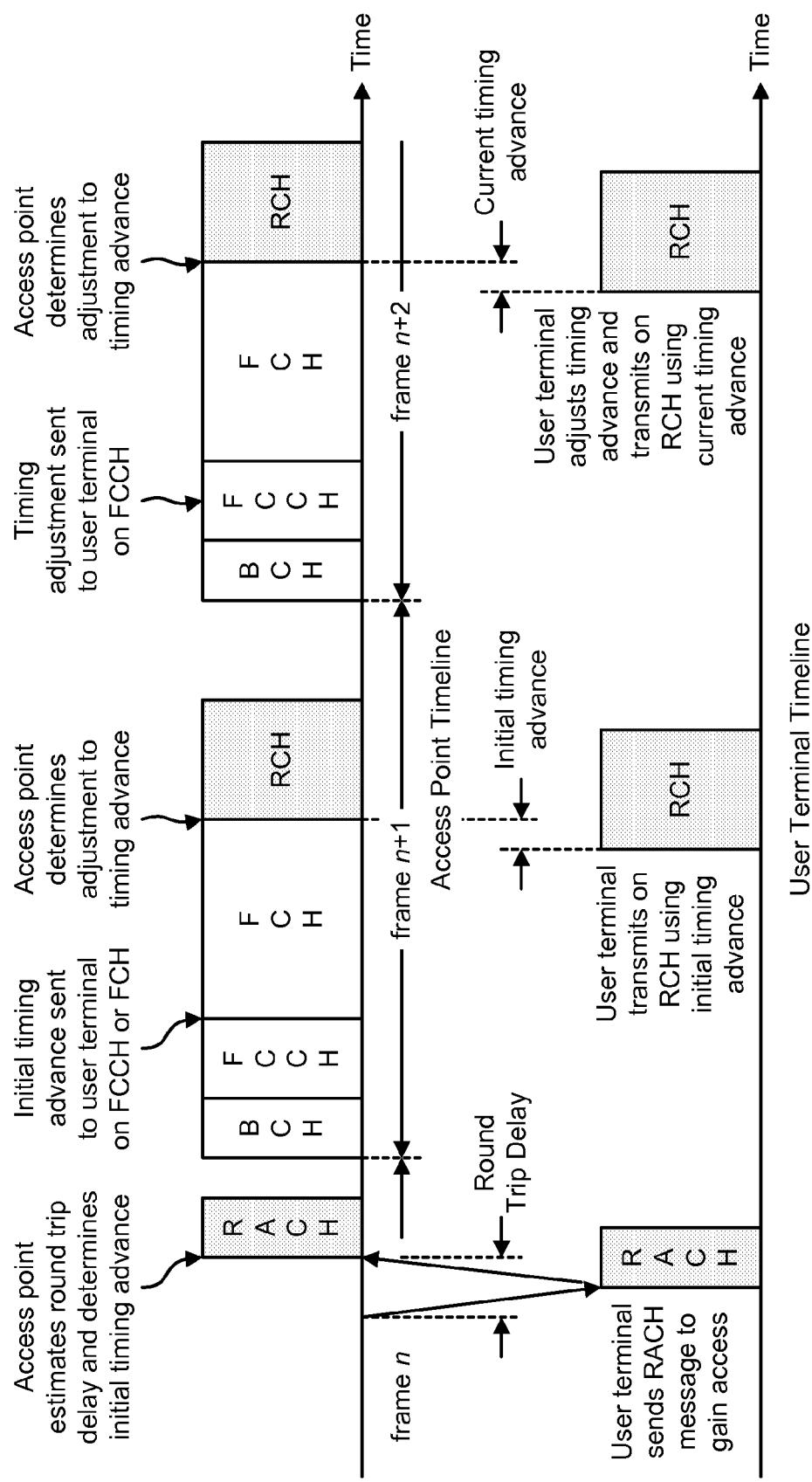
FIG. 16 shows a process for adjusting the uplink timing of a user terminal.

FIG. 16 illustrates a process for adjusting the uplink timing of a user terminal. Initially, the user terminal sends an RACH PDU on the uplink to gain access to the system. The access point derives an initial estimate of the round trip delay (RTD) associated with the user terminal. The round trip delay may be estimated based on (1) a sliding correlator used at the access point to determine the start of transmission, and (2) the slot ID included in the RACH PDU sent by the user terminal. The access point then computes an initial timing advance for the user terminal based on the initial RTD estimate. The initial timing advance is sent to the user terminal prior to its transmission on the RCH. The initial timing advance may be sent in a message on the FCH, a field of an FCCH information element, or by some other means.

The user terminal receives the initial timing advance from the access point and thereafter uses this timing advance on all subsequent uplink transmissions on both the RCH and RACH. If the user terminal is assigned FCH/RCH resources, then its timing advance can be adjusted by commands sent by the access point in the RCH Timing Adjustment field of an FCCH information element. The user terminal would thereafter adjust its uplink transmissions on the RCH based on the current timing advance, which is equal to the initial timing advance plus all timing adjustments sent by the access point to the user terminal.

Various parts of the MIMO WLAN system and various techniques described herein may be implemented by various means. For example, the processing at the access point and user terminal may be implemented in hardware, software, or a combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the processing may be implemented with modules (e.g., procedures, functions, and so on) that perform the functions described herein. The software codes may be stored in a memory unit (e.g., memory 732 or 782 in FIG. 7) and executed by a processor (e.g., controller 730 or 780). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing channel estimation in a wireless multiple-input multiple-output (MIMO) communication system, comprising:
   receiving a steered pilot via at least one eigenmode of an uplink from a user terminal, the steered pilot being transmitted via a plurality of antennas at the user terminal;
   estimating a channel response of the at least one eigenmode of the uplink for the user terminal based on the received steered pilot;
   deriving a matched filter based on the estimated channel response of the at least one eigenmode of the uplink;
   receiving a data transmission via the at least one eigenmode of the uplink from the user terminal; and
   using the matched filter for matched filtering of the data transmission.

2. A method of performing channel estimation in a wireless multiple-input multiple-output (MIMO) communication system, comprising:
   receiving a steered pilot via at least one eigenmode of an uplink from a user terminal, the steered pilot being transmitted via a plurality of antennas at the user terminal;
   estimating a channel response of the at least one eigenmode of the uplink for the user terminal based on the received steered pilot;
   deriving at least one steering vector based on the estimated channel response of the at least one eigenmode of the downlink; and
   using the at least one steering vector for data transmission on the at least one eigenmode of the downlink to the user terminal.

3. The method of claim 2, wherein the steered pilot is received via a plurality of eigenmodes of the uplink, wherein the channel response of a plurality of eigenmode of the downlink for the user terminal is estimated based on the received steered pilot, and wherein a plurality of steering vectors are derived based on the estimated channel response of the plurality of eigenmodes of the downlink.

4. The method of claim 3, wherein the plurality of steering vectors are derived to be orthogonal to one another.

5. An apparatus in a wireless multiple-input multiple-output (MIMO) communication system, comprising:
   a receive spatial processor operative to receive a steered pilot via at least one eigenmode of an uplink from a user terminal, the steered pilot being transmitted via a plurality of antennas at the user terminal; and
   a controller operative to estimate a channel response of the at least one eigenmode of the uplink for the user terminal based on the received steered pilot, wherein the controller is further operative to derive a matched filter based on the estimated channel response of the at least one eigenmode of the uplink;
   wherein the receive spatial processor operative to receive a data transmission via the at least one eigenmode of the uplink from the user terminal and use the matched filter for matched filtering of the data transmission.

6. An apparatus in a wireless multiple-input multiple-output (MIMO) communication system, comprising:
   a receive spatial processor operative to receive a steered pilot via at least one eigenmode of an uplink from a user terminal, the steered pilot being transmitted via a plurality of antennas at the user terminal;
   a controller operative to estimate a channel response of the at least one eigenmode of the uplink for the user terminal based on the received steered pilot, to estimate a channel response of at least one eigenmode of a downlink for the user terminal based on the received steered pilot, and to derive at least one steering vector based on the estimated channel response of the at least one eigenmode of the downlink; and
   a transmit spatial processor operative to use the at least one steering vector for data transmission on the at least one eigenmode of the downlink to the user terminal.

7. An apparatus in a wireless multiple-input multiple-output (MIMO) communication system, comprising:
   means for receiving a steered pilot via at least one eigenmode of an uplink from a user terminal, the steered pilot being transmitted via a plurality of antennas at the user terminal; and
   means for estimating a channel response of the at least one eigenmode of the uplink for the user terminal based on the received steered pilot;
   means for deriving a matched filter based on the estimated channel response of the at least one eigenmode of the uplink;
   means for receiving a data transmission via the at least one eigenmode of the uplink from the user terminal; and
   means for using the matched filter for matched filtering of the data transmission.

8. The apparatus of claim 7, further comprising:
   means for estimating a channel response of at least one eigenmode of a downlink for the user terminal based on the received steered pilot.

9. An apparatus in a wireless multiple-input multiple-output (MIMO) communication system, comprising:
   means for receiving a steered pilot via at least one eigenmode of an uplink from a user terminal, the steered pilot being transmitted via a plurality of antennas at the user terminal;
   means for estimating a channel response of the at least one eigenmode of the uplink for the user terminal based on the received steered pilot;
   means for estimating a channel response of at least one eigenmode of a downlink for the user terminal based on the received steered pilot;
   means for deriving at least one steering vector based on the estimated channel response of the at least one eigenmode of the downlink; and
   means for using the at least one steering vector for data transmission on the at least one eigenmode of the downlink to the user terminal.

10. A memory unit used in a wireless multiple-input multiple-output (MIMO) communication system having software codes stored thereon, the software codes being executable by one or more processors and the software codes comprising:
    codes for receiving a steered pilot via at least one eigenmode of an uplink from a user terminal, the steered pilot being transmitted via a plurality of antennas at the user terminal;
    codes for estimating a channel response of the at least one eigenmode of the uplink for the user terminal based on the received steered pilot;
    codes for deriving a matched filter based on the estimated channel response of the at least one eigenmode of the uplink;
    codes for receiving a data transmission via the at least one eigenmode of the uplink from the user terminal; and
    codes for using the matched filter for matched filtering of the data transmission.

11. A memory unit used in a wireless multiple-input multiple-output (MIMO) communication system having software codes stored thereon, the software codes being executable by one or more processors and the software codes comprising:
- codes for receiving a steered pilot via at least one eigenmode of an uplink from a user terminal, the steered pilot being transmitted via a plurality of antennas at the user terminal;
- codes for estimating a channel response of the at least one eigenmode of the uplink for the user terminal based on the received steered pilot;
- codes for estimating a channel response of at least one eigenmode of a downlink for the user terminal based on the received steered pilot;
- codes for deriving at least one steering vector based on the estimated channel response of the at least one eigenmode of the downlink: and
- codes for using the at least one steering vector for data transmission on the at least one eigenmode of the downlink to the user terminal.

* * * * *